(12) United States Patent
Takahashi

(10) Patent No.: US 11,349,420 B2
(45) Date of Patent: May 31, 2022

(54) ROTARY ELECTRIC MACHINE, ROTARY ELECTRIC MACHINE DRIVE SYSTEM, MAGNET, METHOD OF MANUFACTURING MAGNET, MAGNETIZING APPARATUS, AND MAGNET UNIT

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 202 days.

(21) Appl. No.: 16/779,831

(22) Filed: Feb. 3, 2020

(65) Prior Publication Data

US 2020/0228038 A1 Jul. 16, 2020

Related U.S. Application Data

(63) Continuation of application No. PCT/JP2018/028935, filed on Aug. 1, 2018.

(30) Foreign Application Priority Data

Aug. 1, 2017 (JP) .............................. JP2017-149184
Feb. 16, 2018 (JP) .............................. JP2018-026511
(Continued)

(51) Int. Cl.
*H02P 21/00* (2016.01)
*H02P 21/10* (2016.01)
(Continued)

(52) U.S. Cl.
CPC .............. *H02P 21/10* (2013.01); *H01F 1/22* (2013.01); *H02K 1/16* (2013.01); *H02K 1/18* (2013.01);
(Continued)

(58) Field of Classification Search
CPC .......... H02P 21/00; H02P 27/12; H02P 21/06; H02P 21/141; H02P 21/10; H02P 21/22;
(Continued)

(56) References Cited

U.S. PATENT DOCUMENTS

2005/0231057 A1 10/2005 Kloepzig et al.
2012/0262019 A1 10/2012 Smith et al.
(Continued)

FOREIGN PATENT DOCUMENTS

| CN | 106712425 A | 5/2017 |
|----|-------------|--------|
| JP | H11-206046 A | 7/1999 |

(Continued)

OTHER PUBLICATIONS

Nov. 6, 2018 International Search Report issued in International Patent Application No. PCT/JP2018/028935.
(Continued)

*Primary Examiner* — Karen Masih
(74) *Attorney, Agent, or Firm* — Oliff PLC

(57) ABSTRACT

In a rotary electric machine, magnets provided in a core generate circumferentially arranged magnetic poles. Each magnetic pole defines d- and q-axes. The d-axis represents a center of the corresponding magnetic pole. The rotary electric machine includes an armature including an armature winding. Each magnet includes a magnet body having opposing first and second flux effective surfaces. The first flux effective surface is a surface out of which magnetic flux flows. The second flux effective surface into which magnetic flux flows. The magnet body has a thickness defined as a minimum distance between the first and second flux effective surfaces. The magnet body has easy axes of magnetization. A length of a line along at least one of the easy axes of magnetization between the first and second flux effective surfaces is longer than the thickness of the magnet body.

64 Claims, 64 Drawing Sheets

| (30) | Foreign Application Priority Data | | | *H02P 21/22* (2016.02); *H02P 27/12* (2013.01); *H02K 2213/03* (2013.01) |
|---|---|---|---|---|

(30) Foreign Application Priority Data

| Feb. 16, 2018 | (JP) | ............................ | JP2018-026512 |
|---|---|---|---|
| Feb. 16, 2018 | (JP) | ............................ | JP2018-026513 |
| Feb. 16, 2018 | (JP) | ............................ | JP2018-026514 |
| Jul. 31, 2018 | (JP) | ............................ | JP2018-144612 |
| Jul. 31, 2018 | (JP) | ............................ | JP2018-144613 |
| Jul. 31, 2018 | (JP) | ............................ | JP2018-144614 |
| Jul. 31, 2018 | (JP) | ............................ | JP2018-144615 |
| Jul. 31, 2018 | (JP) | ............................ | JP2018-144616 |
| Jul. 31, 2018 | (JP) | ............................ | JP2018-144617 |
| Jul. 31, 2018 | (JP) | ............................ | JP2018-144618 |

(51) Int. Cl.

| *H02K 1/276* | (2022.01) |
|---|---|
| *H02K 1/278* | (2022.01) |
| *H02K 15/03* | (2006.01) |
| *H02P 21/22* | (2016.01) |
| *H02P 27/12* | (2006.01) |
| *H02K 21/14* | (2006.01) |
| *H01F 1/22* | (2006.01) |
| *H02K 1/16* | (2006.01) |
| *H02K 1/18* | (2006.01) |
| *H02K 1/30* | (2006.01) |
| *H02K 3/12* | (2006.01) |
| *H02K 3/28* | (2006.01) |
| *H02K 15/12* | (2006.01) |

(52) U.S. Cl.
CPC ............. *H02K 1/276* (2013.01); *H02K 1/278* (2013.01); *H02K 1/2766* (2013.01); *H02K 1/30* (2013.01); *H02K 3/12* (2013.01); *H02K 3/28* (2013.01); *H02K 15/03* (2013.01); *H02K 15/12* (2013.01); *H02K 21/14* (2013.01); *H02P 21/22* (2016.02); *H02P 27/12* (2013.01); *H02K 2213/03* (2013.01)

(58) Field of Classification Search
CPC ........ H02P 21/12; H02K 1/276; H02K 1/278; H02K 15/03; H02K 21/14
See application file for complete search history.

(56) References Cited

U.S. PATENT DOCUMENTS

| 2014/0070742 | A1* | 3/2014 | Schulz ............. | H02M 7/53875 318/400.22 |
|---|---|---|---|---|
| 2014/0125182 | A1 | 5/2014 | Takahashi | |
| 2015/0137632 | A1 | 5/2015 | Takahashi | |
| 2017/0133958 | A1 | 5/2017 | Hoshino et al. | |
| 2018/0115205 | A1 | 4/2018 | Fujihara et al. | |

FOREIGN PATENT DOCUMENTS

| JP | 2008-245384 A | 10/2008 |
|---|---|---|
| JP | 2009-254143 A | 10/2009 |
| JP | 2010-154744 A | 7/2010 |
| JP | 2012-228016 A | 11/2012 |
| JP | 2012-239327 A | 12/2012 |
| JP | 2013-251977 A | 12/2013 |
| JP | 2016-32027 A | 3/2016 |
| JP | 2017-034917 A | 2/2017 |

OTHER PUBLICATIONS

Nov. 6, 2018 Search Report issued in International Patent Application No. PCT/JP2018/028762.

U.S. Appl. No. 16/779,829, filed Feb. 3, 2020 in the name of Takahashi.

\* cited by examiner

CURRENT

FIG.82
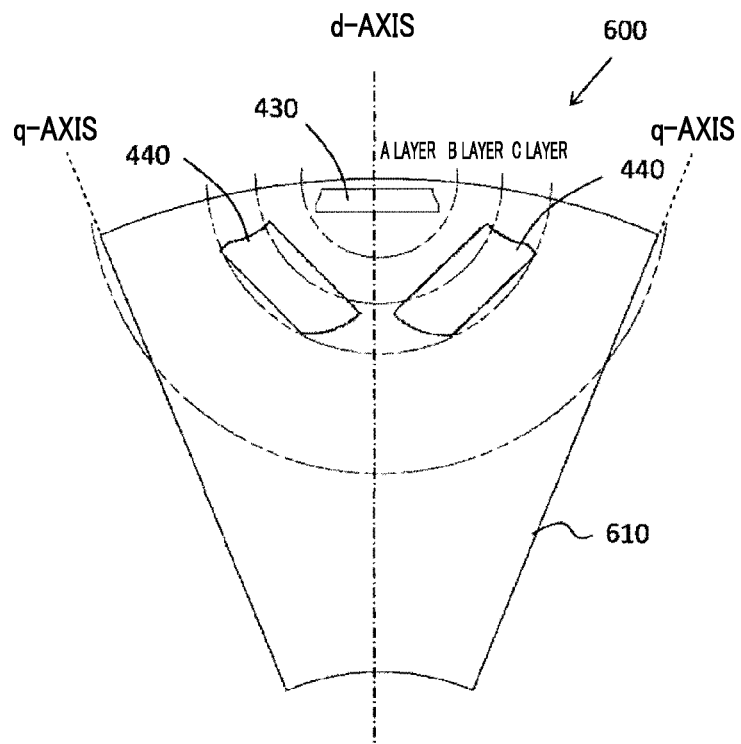
FIG. 83(a)
FIG. 83(b)
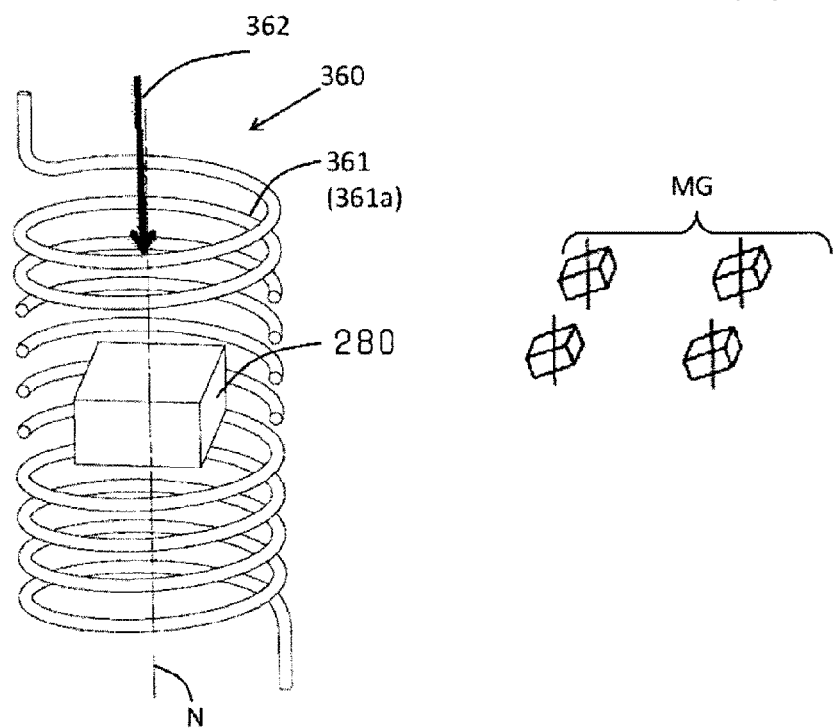

FIG. 85(a) U-PHASE VOLTAGE
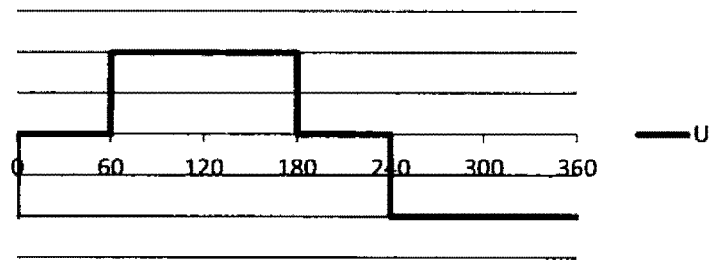
FIG. 85 (b) V-PHASE VOLTAGE
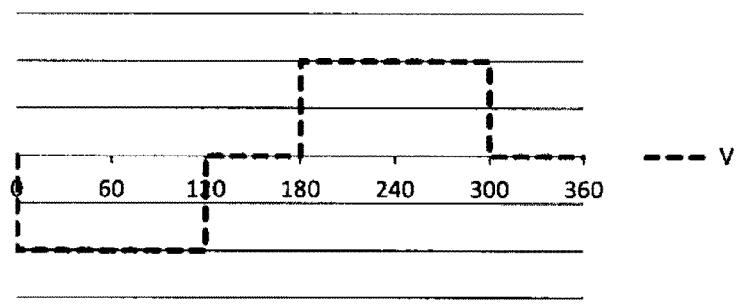
FIG. 85(c) W-PHASE VOLTAGE
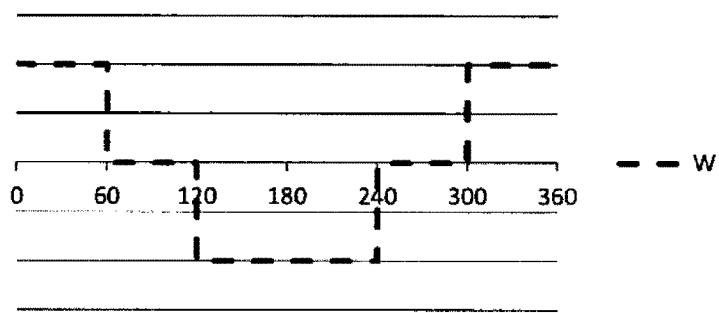

ROTARY ELECTRIC MACHINE, ROTARY ELECTRIC MACHINE DRIVE SYSTEM, MAGNET, METHOD OF MANUFACTURING MAGNET, MAGNETIZING APPARATUS, AND MAGNET UNIT

CROSS-REFERENCE TO RELATED APPLICATIONS

This application is a bypass continuation application of currently pending international application No. PCT/JP2018/028935 filed on Aug. 1, 2018 designating the United States of America, the entire disclosure of which is incorporated herein by reference.

This application is based on and claims the benefit of priority from
 1. Japanese Patent Application No. 2017-149184 filed on Aug. 1, 2017
 2. Japanese Patent Application No. 2018-026511 filed on Feb. 16, 2018
 3. Japanese Patent Application No. 2018-026512 filed on Feb. 16, 2018
 4. Japanese Patent Application No. 2018-026513 filed on Feb. 16, 2018
 5. Japanese Patent Application No. 2018-026514 filed on Feb. 16, 2018
 6. Japanese Patent Application No. 2018-144612 filed on Jul. 31, 2018
 7. Japanese Patent Application No. 2018-144613 filed on Jul. 31, 2018
 8. Japanese Patent Application No. 2018-144614 filed on Jul. 31, 2018
 9. Japanese Patent Application No. 2018-144615 filed on Jul. 31, 2018
 10. Japanese Patent Application No. 2018-144616 filed on Jul. 31, 2018
 11. Japanese Patent Application No. 2018-144617 filed on Jul. 31, 2018
 12. Japanese Patent Application No. 2018-144618 filed on Jul. 31, 2018

The entire disclosure of each of these Japanese Patent Applications is incorporated herein by reference.

The present disclosure relates to rotary electric machines, rotary electric machine drive systems, magnets, methods of manufacturing a magnet, magnetizing apparatuses, and magnet units.

BACKGROUND

Interior permanent magnet (IPM) rotors for, for example, rotary electric machines have been widespread. Such an IPM rotor includes a rotor core comprised of the stack of electromagnetic steel sheets. The rotor core has defined therein magnet installation holes, and magnets are installed in the respective magnet installation holes.

For example, Japanese Patent Application Publication No. 2014-93859 discloses a technology that devises the shape of each magnet installation hole to thereby reduce a magnetic field in a direction opposite to a direction of magnetic flux from a rotor to a stator, thus increasing magnetic flux interlinking to the stator. Such a rotary electric machine is designed to optimize the shape of each permanent magnet, the rotor, and the stator to thereby aim to balance improvement of performance of the rotary electric machine and improvement of resistance of the permanent magnet against a demagnetization field.

SUMMARY

In recent years, many vehicles have been designed to have a slant-nose profile with a smaller travel resistance and/or have a smaller engine compartment. For each vehicle having a slant-nose profile and/or a smaller engine compartment, it is necessary for an installation space of a vehicular power generator and/or a stator to have been minimized.

For each vehicle having a minimized installation space of a vehicular power generator and/or a stator, it is required to use a compact rotary electric machine having a capability of both starting the corresponding vehicle and causing the corresponding vehicle to travel on a slope. For achieving this requirement, we have considered designing rotary electric machines each with higher torque density.

When designing such a rotary electric machine with higher torque density, we are concerned that, if an excitation current generated in a stator becomes a large current within a very short time, a rotating magnetic field based on the excitation current from the stator may become a demagnetization field for the permanent magnets of a rotor, so that the permanent magnets may be demagnetized due to the demagnetization field.

Typical rotors usable for IPM motors disclosed in the patent literature 1 have a d-axis and a q-axis for each magnetic pole; the d-axis represents a center axis of magnetic flux generated from a corresponding magnet for providing the corresponding magnetic pole, and the q-axis represents a neutral axis for the magnetic flux of the magnet. In recent years, space vector control has been stepped up; the space vector control is configured to individually control a d-axis current flowing in the d-axis and a q-axis current flowing in the q-axis.

A typical IPM motor is configured such that a convex core part is arranged on the q-axis, so that the inductance in the q-axis is larger than the inductance in the d-axis. This inductance difference generates reluctance torque Tr. That is, such a typical IPM motor is designed to generate resultant torque of magnet torque Tm based on flux of the magnet located on the d-axis, and the reluctance torque Tr.

Note that field-weakening control is known as a technology for increasing the rotational speed of a motor under a predetermined battery-voltage condition. Executing the field-weakening control may cause a magnetic field, i.e. a demagnetization field, to weak magnetic force of the magnets of the motor. In an IPM motor, the field-weakening control uses a reluctance torque component in the q-axis when reducing magnet torque based on weakened magnetic flux of the magnets. For this reason, the resultant torque of the reluctance torque and magnet torque for operating an IPM motor using the field-weakening control is likely to be higher than only magnet torque for operating the same IPM motor without using the field-weakening control. IPM motors therefore tend to be positively adjusted based on the field-weakening control. This means that permanent magnets installed in the IPM motor are frequently subjected to a demagnetization field, so that irreversible demagnetization of the permanent magnets is frequently prompted.

For addressing such an irreversible demagnetization of the permanent magnets of an IPM motor, we have considered the following first to third measures:

(i) The first measure of using expensive heavy rare earth elements, which include a terbium (Tb) element and a dysprosium (Dy) element, as the materials of each permanent magnet (ii) The second measure of increasing the thickness of each permanent magnet (iii) The third measure of increasing the volume of each permanent magnet Each of these first to third measures however may result in an increase in the manufacturing cost of the rotor.

The rotor of an IPM motor has a known structure that permanent magnets of each pair are provided at both sides of a corresponding d-axis to have a V-shape. In the rotor with the above structure, each of the permanent magnets provided at both sides of each d-axis generates magnetic flux that is obliquely oriented with respect to the corresponding d-axis, so that mutual interference between the magnetic flux generated by one of the permanent magnets of each pair and the magnetic flux generated by the other thereof may result in demagnetization of the permanent magnets of the corresponding pair.

For addressing the above problems, the present disclosure aims to provide rotary electric machines, rotary-electric machine drive systems, magnets, methods of manufacturing a magnet, magnetizing apparatuses, and magnet units, each of which is capable of properly reducing demagnetization of a magnet.

Various aspects disclosed in this specification respectively utilize technical measures, which are different from each other, for achieving respective objects. The objects, features, and effects disclosed in this specification are more clarified with reference to the following detailed-descriptions, and the accompanying figures.

First, the following describes a basic configuration of a rotor comprised of magnets in order to easily understand latter descriptions with reference to FIGS. 86 to 90. In each of FIGS. 86 to 90, a rotor core 650 of an interior magnet motor includes a pair of magnets 415 provided for each magnetic pole and arranged to have a V shape. Each of FIGS. 86 to 90 illustrates the structure of a lateral cross-sectional view of the rotor, which is perpendicular to the axial direction of the rotor.

Note that FIGS. 86 to 90 illustrate an embodiment of the rotary electric machine itself or its structure. That is, rotary electric machines or their structures according to the present disclosure can be applied to various rotary electric machines each having a different structure from the structure illustrated in FIGS. 86 to 90.

FIG. 89 illustrates an equivalent magnetic circuit of an interior magnet rotor illustrated in FIG. 90. The magnetic resistance of each portion in the rotor is represented by a corresponding electrical-resistance symbol.

That is, the magnetic resistance from the outer-side flux effective surface of each magnet 415 to the outer surface of the rotor is represented by symbol R1, and the magnetic resistance laterally crossing between the flux effective surfaces is represented by symbol Rm. In addition, the magnetic resistance between the inner-side flux effective surfaces of the respective magnets 415 of each pair across the corresponding q-axis is represented by symbol R2.

Using the symbols R1, Rm, and R2 enables the magnetic circuit of the rotor to be represented by a series circuit comprised of the two magnetic resistances R1, the two magnetic resistances Rm, and the one magnetic resistance R2. Note that the center axis of each magnetic pole of a motor is defined as a d-axis, and a direction magnetically perpendicular to the d-axis is defined as a q-axis.

FIG. 87 illustrates a path through which magnetic flux passes in the rotor illustrated in FIG. 90 when the corresponding motor is driven in a normal control mode without using the field-weakening control. As illustrated in FIG. 87, an excitation magnetic field 661 based on power of the stator acts on the rotor core 650 to pass through the d-axis. The excitation magnetic field 661 acts on the outer q-axis side end of the magnet 415, urging demagnetization of the outer q-axis side end of the magnet 415.

FIG. 88 illustrates a path through which magnetic flux passes when the corresponding motor is driven based on the field-weakening control. As illustrated in FIG. 88, an excitation magnetic field 662 acts on the rotor core 650 to pass through the q-axis. FIG. 88 illustrates that the excitation magnetic field 662 acts on a portion of the rotor core 650, which is closer to the d-axis, in a direction closer to the parallel direction parallel to the d-axis. The excitation magnetic field 661 causes stronger magnetic flux to act on an end of each magnet, which is closer to the outer periphery of the rotor core 650, i.e. which is closer to the corresponding q-axis. FIG. 89 illustrates an equivalent magnetic circuit while magnetic flux passes through the q-axis. Note that, in this specification, permanent magnets can also be referred to simply as magnets.

As illustrated in FIG. 86(*a*), in the interior magnet rotor including the magnets 415 of each pair arranged to have a V shape, a magnetic flux component oriented to be perpendicular to the d-axis is generated in the d-axis side end of each of the magnets 415 of the pair, so that the magnetic flux component generated in the d-axis side of one of the magnets 415 of the pair is oriented to be opposite to the magnetic flux component generated in the d-axis side of the other of the magnets 415 of the pair. The opposite magnetic flux components from the respective magnets 415 of each pair may facilitate demagnetization of the mutual magnets 415 of the corresponding pair. That is, FIG. 86(*a*) illustrates the conventional magnetic orientation in which magnetic flux is oriented to be perpendicular to the flux effective surfaces of the magnet 415.

As described above, when the magnets 415 are arranged to be inclined to face each other across the d-axis, magnetic flux Φ10 generated in the magnet 415 is divided into a component Φ11 parallel to the d-axis, and a component Φ12 perpendicular to the d-axis. In this case, the components Φ12 generated from the respective magnets 415, which are perpendicular to the d-axis, act to be opposite directions from each other. These opposite-directional components Φ12 may result in demagnetization of the mutual magnets 415 of each pair.

In contrast, FIG. 86(*b*) illustrates magnetic orientations of each magnet 415 according to the present disclosure. Specifically, magnetic orientations of each magnet 415 are inclined to be closer to the direction parallel to the d-axis with respect to the direction perpendicular to the flux effective surfaces of the corresponding magnet 415. That is, the magnetic orientations of each magnet 415 are inclined to have an inclination angle α, which is smaller than 90°, with respect to the flux effective surfaces.

This results in the component Φ22, which is perpendicular to the d-axis, of each magnet 415 being smaller than the component Φ12. This therefore reduces magnetic flux components, which demagnetize the mutual magnets 415 of each pair.

A rotary electric machine of a first measure includes a plurality of magnets provided in a core and configured to generate magnetic poles arranged in a circumferential direction of the core. Each of the magnetic poles defines a d-axis and a q-axis, the d-axis representing a center of the corresponding magnetic pole. The rotary electric machine includes an armature including an armature winding.

Each of the magnets includes a magnet body having a pair of opposing flux effective surfaces. One of the flux effective surfaces is a surface out of which magnetic flux flows, and the other of the flux effective surfaces is a surface into which magnetic flux flows. The magnet body has a thickness defined as a minimum distance between the opposing flux effective surfaces. The magnet body has a plurality of easy axes of magnetization. A length of a line along at least one of the easy axes of magnetization between the flux effective surfaces is longer than the thickness of the magnet body.

In the rotary electric machine including the magnets configured to generate the magnetic poles, the magnet body of each magnet has the easy axes of magnetization. The length of the line along at least one of the easy axes of magnetization between the flux effective surfaces is longer than the thickness of the magnet body.

This configuration enables the effective flux density of each magnet as compared with a magnet that has the length of the line along at least one of the easy axes of magnetization between the flux effective surfaces being equal to the thickness between the flux effective surfaces. This therefore strengthens magnetic force against a demagnetization field if a magnetic field based on the armature winding acts on each magnet as the demagnetization field, thus properly reducing demagnetization of each magnet.

That is, the first measure enables the demagnetization resistance performance of each magnet to be higher as compared with a same-sized magnet usable for rotary electric machines. Specifically, as illustrated in FIG. 50(a), it is assumed that the angle of a magnetic path in a magnet with respect to a direction perpendicular to the flux effective surfaces of the magnet, that is, the angle of the magnetic orientation with respect to the direction perpendicular to the flux effective surfaces of the magnet, is referred to as an angle θ. In this assumption, the permeance of the magnet becomes (1/cos θ) times larger based on the angle θ. For this reason, increasing the angle θ enables the demagnetization resistance performance of each magnet to increase.

In the rotary electric machine of a second measure, which depends on the first measure, the magnet body has a plurality of easy axes of magnetization, and each of the easy axes of magnetization is oriented along a corresponding one of the magnetic paths.

In the rotary electric machine of a third measure, one of the flux effective surfaces faces the armature winding, and the other of the flux effective surfaces faces a direction opposite to the armature winding. Each of the magnets has first and second portions, the first portion is closer to the q-axis than the second portion to the q-axis, and the second portion is closer to the d-axis than the first portion to the d-axis. At least one of the first and second portions includes one of the magnetic paths, one of the magnetic paths being longer than the thickness of the magnet body.

In the rotary electric machine of a fourth measure, which depends on the third measure, the first portion includes one of the magnetic paths as a first magnetic path, and the second portion includes one of the magnetic paths as a second magnetic path. The first magnetic path is longer than the second magnetic path.

In the rotary electric machine of a fifth measure, which depends on the third measure the first portion includes one of the magnetic paths as a first magnetic path, and the second portion includes one of the magnetic paths as a second magnetic path. The first magnetic path of the first portion is inclined with respect to the d-axis at a first angle, and the second magnetic path of the second portion is inclined with respect to the d-axis at a second angle. The first angle is larger than the second angle.

In the rotary electric machine of a sixth measure, which depends on any one of the first to fifth measures, the magnetic paths defined in the magnet body are inclined with respect to the flux effective surfaces, and an orientation of each of the magnetic paths is inclined to be closer to the d-axis toward the armature winding.

In the rotary electric machine of a seventh measure, which depends on the first measure, the magnet body of each of the magnets is located on the d-axis, and each of the magnets has a first portion and a second portion, the first portion being closer to the q-axis than the second portion. The second portion is located on the d-axis. The first portion includes one of the magnetic paths as a first magnetic path, and the second portion includes one of the magnetic paths as a second magnetic path. The first magnetic path is oriented to be inclined with respect to the d-axis, and the second magnetic path is oriented to be parallel to the d-axis.

In the rotary electric machine of an eighth measure, which depends on the seventh measure, the second portion is located within an angular range of 32.7 electrical degrees around the d-axis or within an angular range defined from 27.7 electrical degrees inclusive to 32.7 electrical degrees inclusive around the d-axis.

In the rotary electric machine of a ninth measure, which depends on any one of the first to eighth measures, the magnet body of each of the magnets has a longitudinal length along the flux effective surfaces; the flux effective surfaces respectively serve as first flux effective surfaces. The magnet body of each of the magnets has opposing surfaces in a direction of the longitudinal length; at least one of the surfaces serves as a second flux effective surface out of which magnetic flux flows or into which magnetic flux flows. One of the first flux effective surfaces located closer to the armature winding than the other thereto is defined as an outer first flux effective surface. The magnetic paths include at least one magnetic path that extends from one of the outer first flux effective surface and the second flux effective surface to the other thereof.

In the rotary electric machine of a tenth measure, which depends on the ninth measure, the rotary electric machine includes a plurality of magnet installation holes formed through the core, and the magnets are respectively installed in the magnet installation holes. The second flux effective surface of the magnet body of each of the magnets abuts on an inner wall surface of the corresponding magnet installation hole.

In the rotary electric machine of an eleventh measure, which depends on the ninth or tenth measure, the first portion in the magnet body of each magnet has an ineffective surface between the outer first flux effective surface and the second flux effective surface; no magnetic flux flows from the ineffective surface, and no magnetic flux flows into the ineffective surface. The magnet body of each magnet includes a non-magnetic member arranged between the ineffective surface and the core.

In the rotary electric machine of a twelfth measure, which depends on the ninth or tenth measure, at least one magnetic path extending from one of the outer first flux effective surface and the second flux effective surface and the other thereof has a circular-arc shape.

A rotary electric machine of a thirteenth measure includes a plurality of magnets provided in a core and configured to generate magnetic poles arranged in a circumferential direction of the core. Each of the magnetic poles defines a d-axis that represents a center of the corresponding magnetic pole. The rotary electric machine includes an armature including an armature winding. Each of the magnets includes a first portion arranged to be closest to the d-axis and to the armature, and a second portion arranged to be closest to a q-axis that is magnetically perpendicular to the d-axis and arranged to be farthest from the armature. The first portion has an outer surface serving as one of a flux inflow surface and a flux outflow surface. The first portion has an inner surface serving as the other of the flux inflow surface and the flux outflow surface.

A rotary electric machine of a fourteenth measure includes a plurality of magnets provided in a core and configured to generate magnetic poles arranged in a circumferential direction of the core. The magnetic poles define d-axes and q-axes. The rotary electric machine includes an armature including an armature winding. Each of the magnets includes a magnet body having a circular arc shape to be convex toward a center axis of the core. The magnet body of each magnet includes a center portion arranged on a corresponding one of the q-axes, and first and second ends extending from the center portion and located to be respectively on the corresponding d-axes or thereabout. Each of the first and second ends has a flux effective surface into which magnetic flus flows or out of which magnetic flux flows.

A rotary electric machine drive system of a fifteenth measure is configured to drive the rotary electric machine of any one of the first to fourteenth measures. The rotary electric machine includes multiphase armature windings as the armature winding. The rotary electric machine drive system includes a power adjuster including at least one switch connected to the multiphase armature windings, and a controller configured to control on-off switching operations of the at least one switch to thereby control a current supplied to each of the multiphase armature windings. The rotary electric machine drive system includes a voltage converter arranged between a direct-current power source and the power adjuster, and capable of controlling an input voltage to the power adjuster. The controller is configured to control the current for each of the multiphase armature windings in a rectangular voltage control mode.

In the rotary electric machine drive system of a sixteenth measure, which depends on the fifteenth measure, the at least one switch includes a plurality of switches, and the controller includes a first control unit configured to 1. Generate, for each of the switches, a pulse-width modulation signal (PWM signal) based on a command voltage for each phase and a periodic carrier wave having a predetermined frequency 2. Control, based on the PWM signal for each of the switches, on-off switching operations of the corresponding switch in accordance with the corresponding pulse-width modulation signal to thereby control the current to be supplied to each of the multi-phase armature windings The controller also includes a second control unit configured to 1. Have switching pattern information indicative of a relationship between values of the electrical rotational angle of the rotor and a plurality of on-off switching patterns for each switch 2. Select, based on a present value of the electrical rotational angle of the rotor, a corresponding one of the on-off switching patterns for each switch from the switching pattern information 3. Control on-off switching operations of each switch in accordance with the selected on-off switching pattern for the corresponding switch to thereby control the current to be supplied to each of the multi-phase armature windings A magnet of a seventeenth measure includes a magnet body having a pair of opposing flux effective surfaces. One of the flux effective surfaces is a surface out of which magnetic flux flows, and the other of the flux effective surfaces is a surface into which magnetic flux flows. The magnet body has a thickness defined as a minimum distance between the opposing flux effective surfaces. The magnet body has a plurality of easy axes of magnetization. A length of a line along at least one of the easy axes of magnetization between the flux effective surfaces is longer than the thickness of the magnet body.

The magnet body of the magnet configured set forth above has the thickness defined as the minimum distance between the opposing flux effective surfaces. The magnet body has the plurality of easy axes of magnetization. The length of the line along at least one of the easy axes of magnetization between the flux effective surfaces is longer than the thickness of the magnet body.

This configuration of the magnet enables the effective flux density to be higher as compared with a magnet that has the length of the line along at least one of the easy axes of magnetization between the flux effective surfaces being equal to the thickness between the flux effective surfaces.

That is, positively increasing the length of at least one magnetic path of the magnet body to be longer than the physical thickness of the magnet body enables the permeance of the magnet to be higher. This therefore strengthens magnetic flux of the magnet without increasing the thickness of the magnet, that is, increasing the amount of magnet materials in the magnet. In particular, magnetic orientations of the magnet are defined to be respectively along the magnetic paths in the magnet, making it possible to significantly increase the effect of the strength of magnetic flux of the magnet. This therefore efficiently reduces demagnetization of each magnet.

In the magnet of an eighteenth measure, which depends on the seventeenth measure, the magnet body includes a typical easy axis of magnetization defined in the easy axes of magnetization as the at least one of the easy axes of magnetization, and a length of a line along the typical easy axis of magnetization is longer than the thickness of the magnet body.

In the magnet of a nineteenth measure, which depends on the seventeenth or eighteenth measure, the magnet body includes a plurality of magnetic paths defined therein, and each of the magnetic paths is oriented along a corresponding one of the easy axes of magnetization.

In the magnet of a twentieth measure, which depends on the seventeenth or eighteenth measure, at least one of the magnetic paths is oriented to intersect with at least one of the flux effective surfaces.

In the magnet of a twenty-first measure, which depends on the nineteenth or twentieth measure, the magnet body has a length along the flux effective surfaces, and has opposing first and second ends in a direction of the length, and the first end of the magnet body has one of the magnetic paths as a first magnetic path. The second end of the magnet body has one of the magnetic paths as a second magnetic path, and the first magnetic path is oriented to be different from the second magnetic path.

In the magnet of a twenty-second measure, which depends on the nineteenth measure, the magnet body has a length along the flux effective surfaces, and the flux effective surfaces respectively serve as first flux effective surfaces. The magnet body has opposing surfaces in a direction of the longitudinal length. At least one of the surfaces serves as a second flux effective surface out of which magnetic flux flows or into which magnetic flux flows. The magnetic paths include at least one magnetic path that links one of the first flux effective surfaces to the second flux effective surface.

In the magnet of a twenty-third measure, which depends on the twenty-first measure, when the magnet body is installed in a rotor of a rotary electric machine for generating a magnetic pole that defines a d-axis and a q-axis, the magnet body is arranged to have a first end closer to the d-axis and a second end closer to the q-axis. The first effective surfaces are arranged to extend from the first end to the second end. The second end of the magnet body has the second effective surface.

In the magnet of a twenty-fourth measure, which depends on the twenty-third measure, the rotary electric machine is an interior magnet rotary electric machine, the rotor includes a core including a plurality of magnet installation holes, and the magnet body is installed in in one of the magnet installation holes.

In the magnet of a twenty-fifth measure, which depends on the twenty-third measure, the rotary electric machine is a surface magnet rotary electric machine, the rotor includes a core having an outer circumferential surface, and the magnet body is mounted on the outer circumferential surface of the core.

A magnet of a twenty-sixth measure is to be installed in a rotary electric machine with an armature winding for generating a magnetic pole that defines a d-axis and a q-axis. The magnet includes a magnet body located on the d-axis and having first and second ends extending toward opposite directions across the d-axis, and a plurality of magnetic paths defined in the magnet body. The first end of the magnet body has one of the magnetic paths as a first magnetic path and the first magnetic path is oriented to intersect with the d-axis at a first angle. The second end of the magnet body has one of the magnetic paths as a second magnet path and the second magnetic path is oriented to be inclined with respect to the d-axis at a second angle. The first angle is identical to the second angle.

A rotary electric machine of a twenty-seventh measure includes a plurality of magnets configured to generate magnetic poles, each of the magnetic poles defining a d-axis and a q-axis, and an armature winding located close to the magnets. Each of the magnets includes a magnet body located on the d-axis and having first and second ends extending toward opposite directions across the d-axis, and a plurality of magnetic paths defined in the magnet body. The first end of the magnet body has one of the magnetic paths as a first magnetic path, and the first magnetic path is oriented to cross the d-axis at a first angle. The second end of the magnet body has one of the magnetic paths as a second magnetic path, the second magnetic path is oriented to be inclined with respect to the d-axis at a second angle, and the first angle is identical to the second angle.

A method of manufacturing a magnet of a twenty-eighth measure includes (a) Arranging a mold in which a magnetic powdery member has been filled in a magnetic field (b) Performing orientation of easy axes of magnetization of the magnetic powdery member (c) Sintering the magnetic powdery member with the oriented easy axes of magnetization to thereby produce a magnet body having a pair of opposing surfaces (d) Magnetizing the magnet body to thereby manufacture a magnet The magnetizing step includes (1) Locating a core and a conductor member to face each other to provide an arrangement space between the conductor and the core (2) Arranging the magnet body in the arrangement space (3) Energizing the conductor member to generate a magnetic field in the arrangement space, the magnetic field forming an arc-shaped magnetic path between the opposing surfaces of the magnet body The above manufacturing method energizes the conductor member to thereby generate the magnetic field toward the core around the conductor member. Because the magnet body is arranged in the arrangement space located close to the core, magnetization of the magnet body is carried out in the magnetic field. At that time, because the magnetic field forms the arc-shaped magnetic path between the opposing surfaces, i.e. flux effective surfaces, of the magnet body, it is possible to properly manufacture a magnet having longer magnetic paths to thereby have a higher demagnetization resistance performance.

In the method of a twenty-ninth measure, which depends on the twenty-eighth measure, the locating step includes (1) Locating a first core as the core (2) Locating a second core having a surface with a concaved recess formed therein such that the surface of the second core faces the first core In the method of a thirtieth measure, which depends on the twenty-ninth measure, the concaved recess formed in the surface of the first core includes a plurality of concaved recesses arranged at predetermined pitches therebetween, and the conductor member includes a plurality of conductor members provided in the respective concaved recesses. The energizing step is adapted to energize a selected one of the conductor members as a first conductor member in a predetermined first direction, and to energize a selected another of the conductor members as a second conductor member located adjacent to the first conductor member in a second direction opposite to the first direction. The first core used by the magnetizing step has a substantially annular shape and has an inner circumferential surface and an outer circumferential surface with a predetermined minimum distance therebetween as a thickness in a radial direction of the second core. The thickness of the first core in the radial direction is smaller than each of the predetermined pitches.

In the method of a thirty-first measure, which depends on the twenty-ninth measure, the concaved recess formed in the surface of the first core includes a plurality of concaved recesses arranged at predetermined pitches therebetween, and the conductor member includes a plurality of conductor members provided in the respective concaved recesses. The energizing step is adapted to energize a selected one of the conductor members as a first conductor member in a predetermined first direction, and to energize a selected another of the conductor members as a second conductor member located adjacent to the first conductor member in a second direction opposite to the first direction. The second core used by the magnetizing step has a substantially annular shape and has an inner circumferential surface and an outer circumferential surface with a predetermined minimum distance therebetween as a thickness in a radial direction of the second core. The thickness of the second core in the radial direction is greater than each of the predetermined pitches.

In the method of a thirty-second measure, which depends on any one of the twenty-eighth measure to the thirty-first measure, the orientation performing step generates an orientation magnetic field including magnetic field components that are each oriented to substantially have an arc shape, to thereby orient the easy axes of magnetization of the magnetic powdery member based on the orientation magnetic field.

In the method of a thirty-third measure, which depends on the thirty-second measure, the orientation performing step further includes 1. Coaxially arranging a pair of first and second coils to face each other with a predetermined space region therebetween 2. Arranging an orientation yoke in the space region, the orientation yoke being separated to face a common center axis of the first and second coils 3. Energizing the first and second coils to cause the first and second coils to respectively generate opposite first and second magnetic fields to the space region so that the first and second magnetic fields interact each other in the space region, resulting in radially expanding magnetic field components away from the common center axis of the first and second coils At least part of the radially expanding magnetic field components is collected to the orientation yoke as the orientation magnetic field.

In the method of a thirty-fourth measure, which depends on the thirty-second measure, the orientation performing step further includes (1) Arranging a conductor having a predetermined length around the magnetic powdery member (2) Energizing the conductor to generate a magnetic field circulating around a direction of the length of the conductor as the orientation magnetic field, thus performing orientation of the easy axes of magnetization of the magnetic powdery member based on the circulating magnetic field A magnetizing apparatus of a thirty-fifth measure includes a plurality of conductor members circumferentially arranged with intervals therebetween, and a core arranged to face the conductor members to thereby provide an arrangement space between the conductor members and the core. A magnet body having a pair of opposing surfaces is arranged in the arrangement space. The magnetizing apparatus includes an energizing unit configured to energize a selected one of the conductor members as a first conductor member in a predetermined first direction. The energizing unit is also configured to energize a selected another of the conductor members as a second conductor member located adjacent to the first conductor member in a second direction opposite to the first direction to thereby generate a magnetic field in the arrangement space. The magnetic field forms an arc-shaped magnetic path between the opposing surfaces of the magnet body.

In the magnetizing apparatus of a thirty-sixth measure, which depends on the thirty-fifth measure, the core is a first core, and the first core has a substantially annular shape and has an inner circumferential surface and an outer circumferential surface with a predetermined minimum distance therebetween as a thickness in a radial direction of the first core. The magnetizing apparatus further includes a second core arranged to face the first core. The second core has a surface with a plurality of concaved recesses formed therein, and the plurality of conductor members are respectively provided in the plurality of concaved recesses. The thickness in the radial direction of the first core is smaller than each of the predetermined intervals.

In the magnetizing apparatus of a thirty-seventh measure, which depends on the thirty-fifth measure, the core is a first core, and the first core has a substantially annular shape and has an inner circumferential surface and an outer circumferential surface with a predetermined minimum distance therebetween as a thickness in a radial direction of the first core. The magnetizing apparatus further includes a second core arranged to face the first core. The second core has a surface with a plurality of concaved recesses formed therein, and the plurality of conductor members are respectively provided in the plurality of concaved recesses. The thickness in the radial direction of the first core is larger than each of the predetermined intervals.

A rotary electric machine drive system of a thirty-eighth measure for driving a rotary electric machine that includes a plurality of magnets provided in a core and configured to generate magnetic poles arranged in a circumferential direction of the core. Each of the magnetic poles defines a d-axis and a q-axis. The rotary electric machine includes an armature including multi-phase armature windings. Each of the magnets includes a magnet body having a first flux effective surface that has a pair of opposing first flux effective surfaces. One of the flux effective surfaces is a surface out of which magnetic flux flows, and the other of the flux effective surfaces is a surface into which magnetic flux flows. The magnet body has opposing first and second ends, the first end being closer to the q-axis than the second end thereto. The first end has a surface serving as a second flux effective surface out of which magnetic flux flows or into which magnetic flux flows. The magnet body has a plurality of magnetic paths defined in the magnet body. The magnet body has a thickness defined as a minimum distance between the opposing flux effective surfaces, and at least one of the magnetic paths is longer than the thickness of the magnet body. The magnet body has a plurality of easy axes of magnetization. Each of the easy axes of magnetization is oriented along a corresponding one of the magnetic paths, and the magnetic paths include at least one magnetic path that links one of the first flux effective surfaces to the second flux effective surface. The rotary electric machine system includes a power adjuster including switches connected to the respective multi-phase armature windings, and a controller configured to control on-off switching operations of the respective switches of the power adjuster to control a current to be supplied to each of the multi-phase armature windings. The controller is configured to control on-off switching operations of the respective switches of the power adjuster to thereby adjust 1. A first current that flows through each of the multi-phase windings, the first current having a first phase that generates first magnetic flux perpendicular to the d-axis 2. A second current that flows through each of the multi-phase windings, the second current having a second phase that is different from the first phase The magnet body of each magnet according to the rotary electric machine to be driven in the thirty-eighth measure has the pair of opposing first flux effective surfaces, and the second flux effective surface provided at the first end close to the q-axis.

The magnet body of each magnet has the magnetic paths defined in the magnet body. At least one of the magnetic paths is longer than the thickness of the magnet body; the thickness is defined as the minimum distance between the opposing flux effective surfaces.

The magnetic paths include the at least one magnetic path that links one of the first flux effective surfaces to the second flux effective surface.

This configuration of each magnet enables magnetic flux of the corresponding magnet to flow through the second magnetic flux surface, i.e. the q-axis end surface. Adjustment of the magnetic flux flowing through the q-axis end surface enables magnetic saturation at a portion of the rotor core around the q-axis to be adjusted. That is, changing how the portion of the rotor core around the q-axis is magnetically saturated enables the magnetic resistance of the portion of the rotor core to be varied.

In addition, when controlling the phase of energization of each of the multi-phase windings, the controller changes the second phase of the second current flowing through each of the multi-phase windings to be different from the first phase of the first current that flows through each of the multi-phase windings for generating the first magnetic flux perpendicular to the d-axis.

This configuration enables, while the portion of the rotor core around the q-axis is magnetically saturated, magnetic flux based on each magnet to be weakened due to a reduction in magnetic permeability of the rotor core. This makes it possible to perform field-weakening control based on adjustment of the magnetic flux of each magnet. That is, the thirty-eighth measure enables execution of both 1. The first field-weakening control based on adjustment of the d-axis current flowing in the d-axis
2. The second field-weakening control based on adjustment of the magnetic saturation state of the portion of the rotor core around the d-axis This therefore results in an increase in the current control range of the rotary electric machine drive system of the thirty-eighth measure.

For example, FIG. 70 illustrates that, in the rotor 600, the first current having the phase for generating the first magnetic flux perpendicular to the d-axis is flowing through the wire 721. In contrast, FIG. 71(a) illustrates that magnetic flux based on the magnet 470 is passing through the second effective surface 471c of the magnet 470. This causes magnetic saturation to be generated in the portion 628 of the rotor core 610 around the q-axis, thus weakening the magnetic flux of the magnet.

Note that, while the magnetic saturation is generated in the q-axis portion 28, the magnetic resistance, which is illustrated by R3 in FIG. 71(b), in the magnetic circuit passing through the second effective surface 471c becomes higher, resulting in the permeance becoming lower.

In the rotary electric machine drive system of a thirty-ninth measure, which depends on the thirty-eighth measure, the controller is configured to adjust the first current and the second current to thereby variably control a magnetically saturated state of a portion of the core and a magnetically non-saturated state of the portion of the core. The portion of the core is located between the second flux effective surfaces of each adjacent pair of the plurality of poles.

In the rotary electric machine drive system of a fortieth measure, which depends on the thirty-eighth or thirty-ninth measure, each of the magnets is configured to generate, as magnetic flux linked to the armature, composite magnetic flux based on fundamental magnetic flux having a predetermined polarity and third-order harmonic magnetic flux having the same polarity.

In the rotary electric machine drive system of a forty-first measure, which depends on any one of the thirty-eighth to fortieth measures, the armature includes an armature core including a plurality of slots arranged in a circumferential direction of the core. The multi-phase armature windings are provided in the slots. Each of the armature windings has a substantially rectangular shape or a substantially ellipsoidal shape.

In the rotary electric machine drive system of a forty-second measure, which depends on any one of the thirty-eighth to forty-first measures, the controller is configured to generate, for each of the switches, a pulse-width modulation signal (PWM signal) based on a command voltage for each phase and a periodic carrier wave having a predetermined frequency. The controller is configured to control, based on the PWM signal for each of the switches, on-off switching operations of the corresponding switch in accordance with the corresponding pulse-width modulation signal to thereby control the current to be supplied to each of the multi-phase armature windings. The frequency of the periodic carrier signal is set to be higher than 15 kHz.

The rotary electric machine drive system of a forty-third measure, which depends on any one of the thirty-eighth to forty-second measures, further includes a voltage converter located between a direct-current power source and the power adjuster and adapted to control an input voltage to the power adjuster. The controller is configured to control the current to be supplied to each of the multi-phase windings in a rectangular voltage control mode.

In the rotary electric machine drive system of a forty-fourth measure, which depends on any one of the thirty-eighth to forty-third measures, the rotary electric machine includes a rotor including the core and the magnets provided in the core. The rotor is rotatable relative to the armature. The controller includes a first control unit configured to generate, for each of the switches, a pulse-width modulation signal (PWM signal) based on a command voltage for each phase and a periodic carrier wave having a predetermined frequency. The first control unit is configured to control, based on the PWM signal for each of the switches, on-off switching operations of the corresponding switch in accordance with the corresponding pulse-width modulation signal to thereby control the current to be supplied to each of the multi-phase armature windings.

The controller includes a second control unit configured to have switching pattern information indicative of a relationship between values of the electrical rotational angle of the rotor and a plurality of on-off switching patterns for each switch. The second control unit is configured to select, based on a present value of the electrical rotational angle of the rotor, a corresponding one of the on-off switching patterns for each switch from the switching pattern information. The second control unit is configured to control on-off switching operations of each switch in accordance with the selected on-off switching pattern for the corresponding switch to thereby control the current to be supplied to each of the multi-phase armature windings.

A magnet unit of a forty-fifth measure is to be installed in a rotary electric machine with an armature winding. The magnet unit includes a magnet assembly configured to generate a magnetic pole, the magnetic pole defining a d-axis and a q-axis, and a holder including a magnet installation hole. The holder is configured to hold the magnet assembly installed in the magnet installation hole. The magnet assembly includes a first magnet, and a second magnet. The first and second magnets are located within a range from the d-axis to the q-axis. The first magnet is located closer to the d-axis than the second magnet thereto, and the second magnet is located closer to the q-axis than the first magnet thereto. The first magnet has linear first magnetic paths defined therein, the first magnetic paths being parallel with each other. The second magnet has linear second magnetic paths defined therein, the second magnetic paths being parallel with each other. The first and second magnets are installed in the corresponding magnet installation hole while an orientation of each of the first magnetic paths is different from an orientation of each of the second magnetic paths.

In the magnet unit of the forty-fifth measure, the first and second magnets are located within the range from the d-axis to the q-axis, and the first and second magnets are installed in the magnet installation hole of the holder. The first magnet is located closer to the d-axis than the second magnet thereto, and the second magnet is located closer to the q-axis than the first magnet thereto. The first magnet has linear first magnetic paths defined therein, the first magnetic paths being parallel with each other. The first and second magnets are installed in the corresponding magnet installation hole while the orientation of each of the first magnetic paths is different from the orientation of each of the second magnetic paths.

This configuration positively increases magnetic flux at a specified position within the range from the d-axis to the q-axis to thereby strengthen a demagnetization resistance performance against a demagnetization field from the armature winding. That is, although there might be a possibility of demagnetization of the first magnet if the first magnet were only installed in the rotor core, the second magnet having the magnetic paths different from those of the first magnet reduces demagnetization of the first magnet. This therefore results in reduction in demagnetization of each magnet. In particular, the forty-fifth measure can achieve a desired level of reduction in demagnetization of the magnet unit while using relatively inexpensive parallel anisotropic magnets as the first and second magnets.

In the magnet unit of a forty-sixth measure, which depends on the forty-fifth measure, the magnet installation hole is inclined with respect to the d-axis, and has a first end closer to the d-axis than to the q-axis. The first end is located to be farther from the armature winding than the second end therefrom. The orientation of each of the second magnetic paths in the second magnet is closer to a direction perpendicular to the d-axis than the orientation of each of the first magnetic paths is.

In the magnet unit of a forty-seventh measure, which depends on the forty-sixth measure, the first magnet has a pair of opposing flux effective surfaces. One of the flux effective surfaces is a surface out of which magnetic flux flows, and the other of the flux effective surfaces is a surface into which magnetic flux flows. The first magnet has a thickness defined as a minimum distance between the opposing flux effective surfaces. The first magnet has a plurality of easy axes of magnetization. A length of a line along at least one of the easy axes of magnetization between the flux effective surfaces is longer than the thickness of the first magnet.

In the magnet unit of a forty-eighth measure, which depends on the forty-seventh measure, the second magnet has a pair of opposing flux effective surfaces. One of the flux effective surfaces being a surface out of which magnetic flux flows, and the other of the flux effective surfaces is a surface into which magnetic flux flows. The second magnet has a thickness defined as a minimum distance between the opposing flux effective surfaces. The second magnet has a plurality of easy axes of magnetization. A length of a line along at least one of the easy axes of magnetization between the flux effective surfaces is longer than the thickness of the first magnet.

In the magnet unit of a forty-ninth measure, which depends on the forty-seventh or forty-eighth measure, the first magnet has a first end and a second end, the first end closer to the d-axis than the second end is, the second end being closer to the q-axis than the first end is. The second end has a surface intersecting with the flux effective surfaces, and the surface is oriented to be parallel to the first magnetic paths.

In the magnet unit of a fiftieth measure, which depends on the forty-fifth measure, the first magnet is located on the d-axis to be closer to the armature winding than the second magnet is. The second magnet has first and second end surfaces. The second magnet is arranged such that, the farther the second end surface from the first end surface, the farther the second end surface from the armature winding. The first and second end surfaces respectively serve as flux effective surfaces out of which magnetic flux flows or into which magnetic flux flows.

A magnet unit of a fifty-first measure is to be installed in a rotary electric machine with an armature winding. The magnet unit includes a magnet assembly configured to generate a magnetic pole, the magnetic pole defining a d-axis and a q-axis, and a holder including a magnet installation hole. The holder is configured to hold the magnet assembly installed in the magnet installation hole. The magnet assembly includes a first magnet, and a second magnet. The first and second magnets are located within a range from the d-axis to the q-axis. The first magnet is located closer to the d-axis than the second magnet thereto, and the second magnet is located closer to the q-axis than the first magnet thereto. The first magnet and the second magnet are joined to each other to be convex toward the armature winding. Each of the first and second magnets has a pair of opposing flux effective surfaces. One of the flux effective surfaces is a surface out of which magnetic flux flows, and the other of the flux effective surfaces is a surface into which magnetic flux flows. Each of the first and second magnets has a thickness defined as a minimum distance between the opposing flux effective surfaces thereof. Each of the first and second magnets has a plurality of easy axes of magnetization. A length of a line along at least one of the easy axes of magnetization between the flux effective surfaces of each of the first and second magnets is longer than the thickness thereof.

In this configuration of the magnet unit of the fifty-first measure, the first and second magnets are arranged to be closer to the armature winding as compared with the first and second magnets linearly connected to each other, thus increasing torque of the rotary electric machine. Making shorter the distance between the armature winding and the first and second magnets may cause a demagnetization field to increase. However, the length of the line along at least one of the easy axes of magnetization between the flux effective surfaces, i.e. flux inflow and flux outflow surfaces, of each of the first and second magnets being longer enables the above problem to be solved.

In the core serving as the holder, it is possible to set the percentage of a region of the core, which is located to be closer to the armature winding, than the magnet assembly, i.e. the magnet installation hole, is, to be smaller; the region is subjected to the sum of the magnetic flux of the armature winding and the magnetic flux of the magnet assembly. This therefore reduces a saturation region in which magnetic saturation may occur based on the magnetic flux of the armature winding and the magnetic flux of the magnet assembly, thus more efficiently obtaining the performance from the magnet assembly.

Note that, if the magnet unit is used as a rotor of an interior rotation rotary electric machine, the holder serves as a rotor core, and the first and second magnets are provided in the rotor core to convexly project in a radially outward direction. For this reason, the percentage of the region in the rotor core located to be radially outward from the magnet installation hole. This reduces the centrifugal force stress concentration factor rotor core, thus increasing the mechanical strength of the rotor core.

In the magnet unit of a fifty-second measure, which depends on the fifty-first measure, each of the first and second magnets has magnetic paths linearly along the respective easy axes of magnetization, the magnetic paths being parallel to each other.

In the magnet unit of a fifty-third measure, which depends on the fifty-first or fifty-second measure, each of the first and second magnets has an isosceles trapezoidal shape in a cross-section perpendicular to the flux effective surfaces. The isosceles trapezoidal shape of each of the first and second magnets has a pair of first and second bases and first and second legs. Each of the first base, second base, first leg, and second leg of the isosceles trapezoidal shape of the first magnet is identical to a corresponding one of the first base, second base, first leg, and second leg of the isosceles trapezoidal shape of the second magnet. Orientations of the easy axes of magnetization of the first magnet are identical to orientations of the easy axes of magnetization of the second magnet.

In the magnet unit of a fifty-fourth measure, which depends on any one of the forty-fifth to fifty-third measures, each of the first and second magnets has the same shape in a cross-section perpendicular to the flux effective surfaces, and the first and second magnets are installed in the corresponding magnet installation hole while the first and second magnets are oppositely oriented and corresponding surfaces of the respective first and second magnets are joined to each other.

A rotary electric machine drive system of a fifty-fifth measure is capable of driving a rotary electric machine in which the magnet unit according to any one of the forty-fifth to fifty-fourth measures is installed as a magnetic pole. The rotary electric machine includes multiphase armature windings as an armature winding. The rotary electric machine drive system includes a power adjuster including at least one switch connected to the armature winding, and a controller configured to control on-off switching operations of the at least one switch to thereby control a current supplied to each of the multiphase armature windings. The rotary electric machine drive system includes a voltage converter arranged between a direct-current power source and the power adjuster, and capable of controlling an input voltage to the power adjuster. The controller is configured to control the current for each of the multiphase armature windings in a rectangular voltage control mode.

In the rotary electric machine drive system of a fifty-sixth measure, which depends on the fifty-fifth measure, the at least one switch includes a plurality of switches. The controller includes a first control unit configured to generate, for each of the switches, a pulse-width modulation signal (PWM signal) based on a command voltage for each phase and a periodic carrier wave having a predetermined frequency. The first control unit is configured to control, based on the PWM signal for each of the switches, on-off switching operations of the corresponding switch in accordance with the corresponding pulse-width modulation signal to thereby control the current to be supplied to each of the multi-phase armature windings. The controller includes a second control unit configured to have switching pattern information indicative of a relationship between values of the electrical rotational angle of the rotor and a plurality of on-off switching patterns for each switch. The second control unit is configured to select, based on a present value of the electrical rotational angle of the rotor, a corresponding one of the on-off switching patterns for each switch from the switching pattern information. The second control unit is configured to control on-off switching operations of each switch in accordance with the selected on-off switching pattern for the corresponding switch to thereby control the current to be supplied to each of the multi-phase armature windings.

A method of manufacturing a magnet of a fifty-seventh measure includes

1. Arranging a mold in which a magnetic powdery member has been filled in a magnetic field 2. Performing orientation of easy axes of magnetization of the magnetic powdery member 3. Sintering the magnetic powdery member with the oriented easy axes of magnetization to thereby produce a magnet body 4. Magnetizing the magnet body to thereby manufacture a magnet The orientation performing step generates an orientation magnetic field including magnetic field components that are inequivalently oriented to thereby orient the easy axes of magnetization of the magnetic powdery member based on the inequivalently oriented magnetic field components.

In the above manufacturing method, the magnetic field components that are inequivalently oriented orient the easy axes of magnetization of the magnetic powdery member. This orientation technology enables magnets, each of which has the magnetic paths longer than the thickness dimension between the pair of opposing flux effective surfaces, such as the magnets 404 illustrated in FIG. 52 or the magnets 440 and 450 illustrated in FIGS. 64(*a*) and 64(*b*), to be efficiently manufactured. The above manufacturing method can be carried out by, for example, the orientation apparatus illustrated in FIG. 56 or 58.

In the method of a fifty-eighth measure, which depends on the fifty-seventh measure, the orientation performing step generates, as the inequivalently oriented magnetic field components, inequivalently arced magnetic field components to thereby orient the easy axes of magnetization of the magnetic powdery member based on the inequivalently arced magnetic field components.

In the method of a fifty-ninth measure, which depends on the fifty-seventh measure, the orientation performing step includes the steps of:

(1) Coaxially arranging a pair of first and second coils to face each other with a predetermined space region therebetween (2) Arranging an orientation yoke in the space region, the orientation yoke being separated to face a common center axis of the first and second coils (3) Energizing the first and second coils to cause the first and second coils to respectively generate opposite first and second magnetic fields to the space region so that the first and second magnetic fields interact each other in the space region, resulting in radially expanding magnetic field components away from the common center axis of the first and second coils At least part of the radially expanding magnetic field components is collected to the orientation yoke as the orientation magnetic field.

In the method of a sixtieth measure, which depends on the fifty-seventh measure, the orientation performing step includes the steps of:

(1) Arranging a conductor having a predetermined length around the magnetic powdery member (2) Energizing the conductor to generate a magnetic field circulating around a direction of the length of the conductor as the orientation magnetic field, thus performing orientation of the easy axes of magnetization of the magnetic powdery member based on the circulating magnetic field A method of manufacturing a magnet of a sixty-first measure includes 1. Arranging a mold in which a magnetic powdery member has been filled in a magnetic field
2. Performing orientation of easy axes of magnetization of the magnetic powdery member
3. Sintering the magnetic powdery member with the oriented easy axes of magnetization to thereby produce a magnet body
4. Magnetizing the magnet body to thereby manufacture a magnet The orientation performing step applies, to an outer surface of the magnetic powdery member, a magnetic field oriented to be inclined to the outer surface of the magnetic powdery member, thus orienting the easy axes of magnetization of the magnetic powdery member based on the orientation magnetic field.

The orientation performing step of the above manufacturing method orients the easy axes of magnetization of the magnetic powdery member based on the magnetic field oriented to be inclined to the outer surface of the magnetic powdery member. This orientation technology enables magnets, each of which has the magnetic paths longer than the thickness dimension between the pair of opposing flux effective surfaces, such as the magnets 400 illustrated in FIG. 59, to be efficiently manufactured. Specifically, this orientation technology enables magnets, each of which has the orientation ratio of equal to or more than 90%, to be stably manufactured. Increasing the orientation ratio of each magnet is capable of solving at least one of 1. Missing of material characteristics from each magnet
2. Deficiency of demagnetization resistance performance of each magnet
3. Deficiency of magnetic force of each magnet The above manufacturing method can be carried out by, for example, the orientation apparatus illustrated in FIG. 54.

In the method of a sixth-second measure, which depends on the sixty-first measure, the orientation performing step includes the steps of arranging an orientation coil in the magnetic field, and energizing the orientation coil while the magnetic powdery member is arranged in the orientation coil to thereby generate the orientation magnetic field.

In the method of a sixth-third measure, which depends on the sixty-first or sixty-second measure, the magnet has a pair of opposing flux effective surfaces. One of the flux effective surfaces is a surface out of which magnetic flux flows, and the other of the flux effective surfaces is a surface into which magnetic flux flows. The magnet body has a thickness defined as a minimum distance between the opposing flux effective surfaces. The magnet has a plurality of easy axes of magnetization. A length of a line along at least one of the easy axes of magnetization between the flux effective surfaces is longer than the thickness of the magnet body. The magnetic powdery member has a pair of outer surfaces respectively corresponding to the flux effective surfaces. While the mold is arranged such that at least one of the outer surfaces of the magnetic powdery member obliquely intersects with the orientation magnetic field, the orientation performing step performs orientation of the easy axes of magnetization based on the orientation magnetic field.

In the method of a sixth-fourth measure, which depends on the sixty-third measure, the mold arranged in the magnetic field has, as inner walls for defining an internal space therein, a first wall portion inclined with respect to the orientation magnetic field, and a second wall portion parallel to the orientation magnetic field.

It is possible to represent the first to sixty-fourth measures as the following measures.

A rotary electric machine of a measure A1 includes an armature winding, and a plurality of magnets provided in respective magnetic poles circumferentially arranged in a core.

Each of the magnets has a pair of opposing flux effective surfaces. The flux effective surfaces respectively serve as flux inflow surface and flux outflow surface. Each of the magnets has magnetic paths each having a length longer than a thickness dimension of the corresponding one of the magnets between the opposing flux effective surfaces. Each of the magnets has a plurality of easy axes of magnetization; the easy axes of magnetization are oriented to be along the respective magnetic paths.

This configuration enables the effective flux density of each magnet to be higher as compared with a magnet that has the length of the line along at least one of the easy axes of magnetization between the flux effective surfaces being equal to the thickness between the flux effective surfaces. This therefore strengthens magnetic force against a demagnetization field if a magnetic field based on the armature winding acts on each magnet as the demagnetization field, thus properly reducing demagnetization of each magnet. In particular, the easy axes of magnetization defined in each magnet are oriented to be along the respective magnetic paths, making it possible significantly increase the effect of the strength of magnetic flux of the rotary electric machine.

Accordingly, even if a magnetic field given from the armature winding acts on each magnet as a demagnetization field, it is possible to strengthen magnetic force against the demagnetization field, thus efficiently reducing demagnetization of each magnet.

That is, the measure A1 enables the demagnetization resistance performance of each magnet to be higher as compared with a same-sized magnet usable for rotary electric machines. Specifically, as illustrated in FIG. 50($a$), it is assumed that the angle of a magnetic path in a magnet with respect to a direction perpendicular to the flux effective surfaces of the magnet, that is, the angle of the magnetic orientation with respect to the direction perpendicular to the flux effective surfaces of the magnet, is referred to as an angle $\theta$. In this assumption, the permeance of the magnet becomes $(1/\cos \theta)$ times larger based on the angle $\theta$. For this reason, increasing the angle $\theta$ enables the demagnetization resistance performance of each magnet to increase.

In the rotary electric machine of a measure A2, which depends on the measure A1, the pair of opposing flux effective surfaces of each magnet are a first outer surface of the corresponding magnet oriented toward the armature winding, and a second outer surface opposite to the first outer surface. Each magnet has a d-axis closer portion closer to the d-axis indicative of a center of the corresponding magnet pole, and a q-axis closer portion closer to the q-axis indicative of a boundary of the corresponding magnetic pole. The d-axis closer portion includes at least one magnetic path, and the q-axis closer portion includes at least one magnetic path, and the magnetic path of at least one of the d-axis closer portion and q-axis closer portion being longer than the thickness dimension of the corresponding one of the magnets.

Because the magnetic path of at least one of the d-axis closer portion and q-axis closer portion of each of the magnets is longer than the thickness dimension of the corresponding one of the magnets, it is possible to strengthen a demagnetization resistance performance of the at least one of the d-axis side end and q-axis side end of each of the magnets.

Note that, in the interior magnet structure of the inner rotor, at least one of the d-axis closer portion and q-axis closer portion of each of the magnets, whose magnetic path is longer than the thickness dimension of the corresponding one of the magnets, can be located to be closer to the outer circumferential surface of the rotor core. This obtains an excellent demagnetization resistance performance in an interior magnet rotary electric machine.

In the rotary electric machine of a measure A3, which depends on the measure A2, the at least one magnetic path in the q-axis closer portion is longer than the at least one magnetic path in the d-axis closer portion.

Because the at least one magnetic path in the q-axis closer portion is longer than the at least one magnetic path in the d-axis closer portion, it is possible to properly reduce demagnetization of the d-axis side end of each magnet due to a demagnetization field given from the armature winding.

For example, in each magnet 410 of a rotor 600 illustrated in FIG. 59, the magnetic paths in a q-axis closer portion 412b of the corresponding magnet 410 is larger than the magnetic paths in a d-axis closer portion 412a of the corresponding magnet 410.

In the rotary electric machine of a measure A4, which depends on the measure A2 or A3, an inclination of a magnetic orientation in the q-axis closer portion of each magnet with respect to the d-axis is larger than an inclination of a magnetic orientation in the d-axis closer portion of the corresponding magnet with respect to the d-axis.

If magnetic flux of the d-axis side end of each of the pair of magnets located at both sides of the d-axis is oriented toward the d-axis, mutual flux repulsion between d-axis side end of one of the pair of magnets and the d-axis side end of the other thereof may reduce demagnetization of the magnetic fluxes. On the other hand, in the q-axis side end of each of the pair of magnets, there may be a concern about demagnetization of the q-axis side end of each of the pair of magnets due to a demagnetization field given from the armature winding.

From this viewpoint, the above measure A4 is configured such that the inclination of the magnetic orientation in each magnet in the q-axis closer portion with respect to the d-axis is larger than the inclination of the magnetic orientation in the corresponding magnet in the d-axis closer portion with respect to the d-axis. This therefore results in reduction of both 1. Demagnetization of the d-axis side end of each magnet 410
2. Demagnetization of the q-axis side end of each magnet 410

For example, in each magnet 410 of the rotor 600 illustrated in FIG. 59, the magnetic orientations in the q-axis closer portion 412b of the corresponding magnet 410 are widely inclined as compared with those in the d-axis closer portion 412a of the corresponding magnet 410. Preferably, the magnetic orientations of each magnet 410 are gradually changed from the q-axis closer portion 412b to the d-axis closer portion 412a.

In the rotary electric machine of a measure A5, which depends on any one of the measure A1 to A4, the magnetic orientations defined in each magnet are inclined with respect to the flux effective surfaces, and each of the magnetic orientations is inclined to be closer to the d-axis toward the armature winding.

Because the magnetic orientations defined in each magnet are inclined with respect to the flux effective surfaces, and each of the magnetic orientations is inclined with respect to the d-axis, it is possible to give a proper demagnetization resistance performance to each magnet disposed inside the core.

For example, in each magnet 400 of the rotor 600 illustrated in FIG. 48, the magnetic orientations in the corresponding magnet 410 are inclined with respect to the d-axis, and each of the magnetic orientations is inclined to be closer to the d-axis toward the radially outer portion of the rotor core 610, i.e. toward the armature winding. Note that each of the magnetic orientations in each magnet is preferably set to a predetermined constant orientation in the whole of the corresponding magnet, making it possible to easily manufacture the magnets.

In the rotary electric machine of a measure A6, which depends on any one of the measure A1 to A5, each magnet is located across the corresponding d-axis of the corresponding magnetic pole. In a d-axis portion of each magnet, which includes a portion located on the d-axis, the magnetic orientations are parallel to the d-axis. In a q-axis portion of each magnet, which is closer to the q-axis than the d-axis portion is, the magnetic orientations are inclined with respect to the d-axis.

Because the magnetic orientations are parallel to the d-axis in the d-axis portion of each magnet, which includes the portion located on the d-axis, it is possible to reduce demagnetization of the d-axis portion of each magnet. Because the magnetic orientations are inclined with respect to the d-axis in the q-axis portion of each magnet, which is closer to the q-axis than the d-axis portion is, it is also possible to reduce demagnetization of the q-axis portion of each magnet.

For example, in the rotor 600 illustrated in FIG. 62, a magnet 430 is provided to extend to be linear symmetrical about the d-axis. In a d-axis portion of each magnet 430, which includes a portion located on the d-axis, the magnetic orientations are parallel to the d-axis. In a q-axis portion of each magnet 430, which is closer to the q-axis than the d-axis portion is, the magnetic orientations are inclined with respect to the d-axis.

In the rotary electric machine of a measure A7, which depends on the measure A6, the d-axis portion is located within an angular range of 32.7 electrical degrees around the d-axis or within an angular range defined from 27.7 electrical degrees inclusive to 32.7 electrical degrees inclusive around the d-axis.

An eight-pole distributed-winding rotary electric machine is normally configured to have 24 slots. If an eight-pole distributed-winding rotary electric machine is designed as a doble-slot rotary electric machine, which is widespread as a vehicular motor, the doble-slot distributed-winding rotary electric machine has 48 slots. In the 8-pole, 48-slot rotary electric machine, in order to reduce 11- to 13-order harmonics, specific design of magnetic orientation in each magnet are carried out. As a conventional technology, there is a sintered neodymium magnet having radial magnetic orientations. However, in this conventional technology, there may be a concern about the above flux repulsion between the d-axis side portion of one of the pair of magnets and the d-axis side portion of the other of the pair of magnets.

From this viewpoint, it is preferable that each magnet has a portion close to the d-axis in which magnetic orientations are defined to be parallel to the d-axis. In addition, the d-axis portion is located within the angular range of 32.7 electrical degrees around the d-axis or within the angular range defined from 27.7 electrical degrees inclusive to 32.7 electrical degrees inclusive around the d-axis. 32.7 electrical degrees can be calculated by dividing the 360 electrical degrees by 11 that is the order of the 11-th harmonics. Alternately, the d-axis portion is located within the angular range defined from 27.7 electrical degrees inclusive to 32.7 electrical degrees inclusive around the d-axis. 27.7 electrical degrees can be calculated by dividing the 360 electrical degrees by 13 that is the order of the 13-th harmonics. This reduces demagnetization of each magnet while reducing harmonics.

In the rotary electric machine of a measure A8, which depends on any one of the measures A1 to A7, each of the magnets has the flux effective surfaces respectively serving as first effective surfaces. Each of the magnets has a second effective surface at the q-axis side end; the second effective surface serves as a surface out of which magnetic flux flows or into which magnetic flux flows. One of the first effective surfaces located closer to the armature winding than the other thereto is defined as an outer first effective surface. The magnetic paths include at least one magnetic path that extends from one of the outer first effective surface and the second effective surface to the other thereof.

In the rotary electric machine of the measure A8, at least one magnetic path is defined between the first effective surfaces of each magnet, and at least one magnetic path is also defined between the outer first effective surface and the second effective surface of each magnet. It is preferable that the length of the at least one magnetic path defined between the outer first effective surface and the second effective surface of each magnet is longer than the thickness dimension of the corresponding magnet between the first effective surfaces.

If it is assumed that the second effective surface is a flux inflow surface, magnetic flux flowing from the other of the first effective surfaces and the second effective surface flows out of the outer first effective surface. Note that the other of the first flux effective surfaces located opposite to the outer first effective surface will be referred to as an inner first effective surface.

Otherwise, if it is assumed that the second effective surface is a flux outflow surface, magnetic flux flowing from the outer first effective surface flows out of both the inner first effective surface and the second effective surface. This makes it possible to collect magnetic flux components to a region of the core around the q-axis side end of the magnet, or distribute magnetic flux components from the region.

Because the second effective surface is provided at a surface of the q-axis side end of each magnet, magnetic flux flow through the second effective surface of the magnet in a first magnetic pole and the second effective surface of the magnet in a second magnetic pole adjacent to the first magnetic pole; the magnet of the first magnetic pole and the magnet 410 of the second magnetic pole are adjacent to each other.

This therefore makes it possible to adjust magnetic saturation on each region in the core; each region is located around the corresponding one of the q-axes. That is, this configuration positively uses each q-axis region in the core as a magnetic-circuitry path of each magnet; each q-axis region in the interior magnet rotor core has been conventionally unused.

For example, as described with reference to FIG. 61, each magnet 420 has the pair of opposing first effective surfaces 421*a* and 421*b* arranged radially at respective outer and inner sides. In addition, the surface of the q-axis side end of each magnet 420 has the second effective surface 421*c*. At that time, if the second effective surface 421*c* is a flux inflow surface, magnetic flux flowing from the two effective surfaces 421*b* and 421*c* flows out of the first effective surface 421*a*.

In the rotary electric machine of a measure A9, which depends on the measure A8, the rotary electric machine includes a plurality of magnet installation holes formed through the core, and the magnets are respectively installed in the magnet installation holes. The second flux effective surface of the magnet body of each of the magnets abuts on an inner wall surface of the corresponding installation hole.

Because the second flux effective surface of the magnet body of each of the magnets abuts on the inner wall surface of the corresponding installation hole, it is possible to properly generate a magnetic circuit path through the second effective surfaces of the magnets located adjacent to each other across the q-axis. This therefore properly adjusts magnetic saturation on each region in the core; each region is located around the corresponding one of the q-axes.

In the rotary electric machine of a measure A10, which depends on the measure A8 or A9, each magnet has an ineffective surface between the outer first flux effective surface and the second flux effective surface; no magnetic flux flows from the ineffective surface, and no magnetic flux flows into the ineffective surface. Each magnet includes a non-magnetic member arranged between the ineffective surface and the core.

Each magnet of the measure A10 is configured such that the second effective surface, which is a part of the q-axis end surface, abuts on the inner wall surface of the corresponding magnet installation hole of the core, and the remaining part of the q-axis end surface does not abut on the core; the part of the q-axis end surface is located to be farther from the armature winding than the remaining part is.

This configuration of the measure A10 therefore properly adjusts the state of magnetic saturation based on the second effective surface while preventing magnet flux from flowing in a closed loop through or around the q-axis region.

In the rotary electric machine of a measure A11, which depends on any one of the measures A8 to A10, at least one magnetic path extending from one of the outer first flux effective surface and the second flux effective surface and the other thereof has a circular-arc shape.

The at least one magnetic path extending from one of the outer first flux effective surface and the second flux effective surface and the other thereof has a circular-arc shape. This makes longer the length of the at least one magnetic path as compared with a linear magnetic path.

This therefore enables demagnetization of each magnet to be more properly addressed.

A rotary electric machine of a measure A12 includes an armature winding, and a plurality of magnets provided in respective magnetic poles circumferentially arranged in a core.

Each of the magnets includes a d-axis portion arranged to be closest to the d-axis and to the armature, and a q-axis that serves as a pole boundary portion. The d-axis portion is arranged such that, the closer the d-axis portion to the q-axis, the farther the d-axis portion from the armature winding. Each magnet has a first outer surface arranged to be closest to the armature winding, and a second outer surface arranged to be farthest from the armature winding. The first and second outer surfaces serve as a pair of flux effective surfaces; one of the flux effective surfaces serves as one of a flux inflow surface and a flux outflow surface, and the other thereof serves as the other of the flux inflow surface and the flux outflow surface.

The d-axis portion of each magnet of the measure A12 has a concave shape arranged to be closest to the armature winding. One of the pair of flux effective surfaces of each magnet serves as one of the flux inflow surface and the flux outflow surface, and the other thereof serves as the other of the flux inflow surface and the flux outflow surface. Magnetic paths can be defined between the pair of flux effective surfaces. This makes it longer each of the magnetic paths defined in each magnet in its thick-walled direction of the corresponding magnet, thus improving a demagnetization resistance performance of the rotary electric machine.

For example, a magnet 480 of a rotary electric machine 600 illustrated in FIG. 78 has a d-axis side end arranged to be closest to a stator, i.e. stator windings, and arranged to be farther from the stator, i.e. stator windings, as being closer to the q-axis. The magnet 480 has a top 482 at its center; the top 482 is arranged to be closest to the stator. The magnet 480 has both end surfaces 481 in the longitudinal direction thereof, which are arranged to be farthest to the stator. The end surfaces 481 serve as flux inflow and flux outflow surfaces. Note that, on the d-axis, magnetic orientations in the d-axis side end are preferably to be parallel to the d-axis.

A rotary electric machine of a measure A13 includes an armature winding, and a plurality of magnets provided in respective magnetic poles circumferentially arranged in a core that faces the armature winding.

Each of the magnets has a circular arc shape to be convex toward a direction opposite to a direction of the armature winding.

Each magnet includes a center portion arranged on a corresponding one of the q-axes, and first and second both ends located to be respectively on the corresponding d-axes or thereabout; each of the d-axes represents a center of the corresponding magnetic pole. Each of the first and second ends has an effective surface into which magnetic flus flows or out of which magnetic flux flows.

Each of the magnets according to the measure A13 has a circular arc shape centered on the q-axis, and has the first and second both ends located to be respectively on the corresponding d-axes or thereabout. Each of the first and second ends has the effective surface into which magnetic flus flows or out of which magnetic flux flows.

This configuration results in circular-arc side surfaces of each magnet, which extends in the circular arc shape centered on the q-axis, respectively serving as non-effective surfaces. Magnetic orientations of each magnet are defined along the non-effective surfaces. This makes it longer each of the magnetic paths defined in each magnet in its thick-walled direction of the corresponding magnet, thus improving a demagnetization resistance performance of the rotary electric machine.

For example, each magnet 490 of a rotary electric machine 600 illustrated in FIG. 80 has a circular arc shape centered on the q-axis to be convex toward a direction opposite to the direction of the armature winding. Each magnet 490 also has the first and second both ends located to be respectively on the corresponding d-axes or thereabout.

Each of the first and second ends has a surface 490 serving as an effective surface into which magnetic flus flows or out of which magnetic flux flows.

Each magnet 490 has non-effective surfaces each having a circular-arc shape centered at a point on the outer circumferential surface of the rotor core 610, i.e. on an air-gap surface of the rotor core 610 with respect to the stator. The magnetic orientations of each magnet 490 are defined along the non-effective surfaces. In each magnet 490, it is possible to substantially match a pole-pitch circular arc with the length of each magnetic path on the d-axis, thereby strongly counteracting against demagnetization.

Each magnet can have non-effective surfaces each having a circular-arc shape centered at any point located radially outward from the rotor core.

A rotary electric machine drive system of a measure A14 is configured to drive the rotary electric machine of any one of the measures A1 to A13. The rotary electric machine includes multiphase armature windings as the armature winding. The rotary electric machine drive system includes a power adjuster including a switch provided for each phase of the multiphase armature windings. The power adjuster is configured to adjust an energization current for each of the multiphase armature windings based on on-off operations of the at least one switch. The rotary electric machine drive system includes a controller configured to control the on-off switching operations of the at least one switch.

The rotary electric machine drive system includes a voltage converter arranged between a direct-current power source and the power adjuster. The voltage converter is capable of controlling an input voltage to the power adjuster. The controller is configured to control the energization current for each of the multiphase armature windings in a rectangular voltage control mode.

This configuration of the rotary electric machine drive system controls the input voltage, which is a voltage applied from the direct-current power source, to the power adjuster, thus adjusting power for the armature windings in accordance with the controlled input voltage. This configuration reduces current change in the rotary electric machine whose inductance becomes lower at a predetermined carrier frequency, thus preventing divergence of the current control. In the rotary electric machine having a low inductance, energization control is carried out in accordance with the predetermined carrier frequency, so that there may be divergence of the current control. However, this configuration of the rotary electric machine drive system makes it possible to reduce current variations, thus preventing divergence of the current control.

Controlling the energization current for each of the multiphase armature windings in the rectangular voltage control mode drastically reduces the number of switching operations of the switches in the power adjuster, so that, even if the inductance of the stator windings is small, it is possible to prevent the occurrence of current ripples. For example, it is possible to adjust the energization current for each of the multiphase armature windings based on the input voltage adjusted by the power adjuster. Note that the power adjuster can easily perform PWM control at a frequency higher than 15 kHz, making it possible to perform power control of the rotary electric machine without using specific technical difficulty.

The controller performs, in the rectangular voltage control mode, a 120-degree rectangular voltage control mode using on duration corresponding to 120 electrical degrees. Note that the controller can be configured to perform another rectangular voltage control mode using on duration corresponding to any angle selected from the range from 120 electrical degrees to 180 electrical degrees inclusive.

In the rotary electric machine drive system of a measure A15, which depends on the measure A14, the at least one switch includes a plurality of switches, and the controller includes a first control unit configured to 1. Generate, for each of the switches, a pulse-width modulation signal (PWM signal) based on a command voltage for each phase and a periodic carrier wave having a predetermined frequency 2. Control, based on the PWM signal for each of the switches, on-off switching operations of the corresponding switch in accordance with the corresponding pulse-width modulation signal to thereby control the current to be supplied to each of the multi-phase armature windings The controller also includes a second control unit configured to 1. Have switching pattern information indicative of a relationship between values of the electrical rotational angle of the rotor and a plurality of on-off switching patterns for each switch 2. Select, based on a present value of the electrical rotational angle of the rotor, a corresponding one of the on-off switching patterns for each switch from the switching pattern information 3. Control on-off switching operations of each switch in accordance with the selected on-off switching pattern for the corresponding switch to thereby control the current to be supplied to each of the multi-phase armature windings The drive system may make it difficult to control the rotary electric machine using low carrier frequencies due to low-inductance characteristics of the rotary electric machine. The rotary electric machine having a low inductance and a larger amount of inertia, obtains a large benefit based on the large amount of inertia.

From this viewpoint, the drive system makes it possible to perform both

1. PWM control, i.e. current-feedback control, to thereby drive the rotary electric machine 2. Pattern control of each switch in accordance with a selected on-off switching pattern The drive system therefore selects one of the PWM control and the pattern control in accordance with the various situations. For example, the drive system selects the pattern control if it is difficult to perform current detection. This therefore enables the drive system to selectively determine the drive range of the rotary electric machine.

A magnet of a measure B1 has a pair of opposing effective surfaces. One of the effective surfaces is a surface out of which magnetic flux flows, and the other of the effective surfaces is a surface into which magnetic flux flows. The magnet has magnetic paths each having a length longer than a thickness dimension of the magnet between the opposing flux effective surfaces. The magnet has a plurality of easy axes of magnetization; the easy axes of magnetization are oriented to be along the respective magnetic paths.

This configuration of the magnet enables the effective flux density to be higher as compared with a magnet that has the length of the line along at least one of the easy axes of magnetization between the flux effective surfaces being equal to the thickness between the flux effective surfaces.

That is, positively increasing the length of at least one magnetic path of the magnet body to be longer than the physical thickness of the magnet body enables the permeance of the magnet to be higher. This therefore strengthens magnetic flux of the magnet without increasing the thickness of the magnet, that is, increasing the amount of magnet materials in the magnet. In particular, magnetic orientations of the magnet are defined to be respectively along the magnetic paths in the magnet, making it possible to significantly increase the effect of the strength of magnetic flux of the magnet. This therefore efficiently reduces demagnetization of each magnet.

The length of a magnetic path defined in a magnet represents a magnetic length along a corresponding magnetic orientation defined between the pair of flux inflow and flus outflow surfaces. In other words, the length of a magnetic path defined in a magnet can also represent a thickness of the magnet in a magnet circuit. The easy axes of magnetization in a magnet are easy-magnetizable crystal orientations in the magnet. In the present disclosure, the magnetic orientations in a magnet show the magnetic orientations of respective magnetic lines in the magnet, i.e. the magnetic orientations of the respective easy axes of magnetization defined in the magnet.

In the magnet of a measure B2, which depends on the measure B1, the magnet has a first pair of longitudinal magnet surfaces in a lateral cross section, and a second pair of lateral magnet surfaces in the lateral cross section. The longitudinal magnet surfaces of the first pair respectively serve as the effective surfaces. The magnetic paths defined in the magnet are oriented to obliquely intersect with at least one of the effective surfaces.

In the structure of the magnet, the longitudinal magnet surfaces of the first pair respectively serve as the effective surfaces. The magnetic paths defined in the magnet are oriented to obliquely intersect with at least one of the effective surfaces, that is, are oriented to non-orthogonally intersect with at least one of the effective surfaces. This intersection enables the length of each of the magnetic paths to be longer than the thickness dimension between the effective surfaces. This configuration therefore strengthens magnetic flux of the magnet while serving the effective respectively surfaces as main flux effective surfaces.

In the magnet of a measure B3, which depends on the measure B2, the magnetic orientations of the magnetic paths in one end of the magnet in its longitudinal direction are different from those in the other end of the magnet in its longitudinal direction.

This enables orientations and/or magnitudes of magnetic force in a magnet to be adjusted for each portion of the magnet.

In the magnet of a measure B4, which depends on the measure B2 or B3, the effective surfaces as the longitudinal magnet surfaces respectively serve as first effective surfaces. The magnet has a second effective surface at least one of the lateral magnet surfaces; the second effective surface serves as a surface out of which magnetic flux flows or into which magnetic flux flows. The magnetic paths are defined in the magnet such that one of the first effective surfaces is linked to the second effective surface.

In the magnet configured set forth above, the magnetic paths are defined in the magnet such that 1. The first effective surfaces are linked to each other 2. One of the first effective surfaces is linked to the second effective surface If the second effective surface is a flux inflow surface, magnetic flux flowing from one of the first effective surfaces and the second effective surface flows out of the other of the first effective surfaces. Otherwise, if the second effective surface is a flux outflow surface, magnetic flux flowing from one of the first effective surfaces flows out of both the other of the first effective surfaces and the second effective surface. This makes it possible to collect magnetic flux components, or distribute magnetic flux components.

For example, as described with reference to FIG. 61, each magnet 420 has the pair of opposing first effective surfaces 421*a* and 421*b* arranged radially at respective outer and inner sides. In addition, the surface of the q-axis side end of each magnet 420 has the second effective surface 421*c*. At that time, if the second effective surface 421c is a flux inflow surface, magnetic flux flowing from the two effective surfaces 421b and 421c flows out of the first effective surface 421a.

In the magnet of a measure B5, which depends on the measure B4, the magnet is used in a rotary electric machine having a plurality of magnetic poles. The magnet is arranged to be close to an armature winding of the rotary electric machine. The first effective surfaces are each arranged to extend from a d-axis of a corresponding one of the magnetic poles to a q-axis thereof, and the second effective surface is provided at a q-axis side end of the magnet.

In a rotary electric machine, there may be a concern about demagnetization of the q-axis side end of the magnet due to a demagnetization field given from the armature winding.

From this viewpoint, because the second effective surface is provided at the q-axis side end of the magnet, it is possible to reduce demagnetization of the q-axis side end of the magnet.

In the magnet of a measure B6, which depends on the measure B5, the rotary electric machine is an interior magnet rotary electric machine, the rotor includes a core including a magnet installation hole, and the magnet is installed in in the magnet installation hole.

In the magnet of a measure B7, which depends on the measure B5, the rotary electric machine is a surface magnet rotary electric machine, the rotor includes a core having an outer surface that faces the armature winding, and the magnet is mounted on the outer surface of the core.

The magnet having longer magnetic paths defined therein can be preferably applied to interior magnet rotary electric machines (IPM motors) and to surface magnet rotary electric machines (SPM motors).

A magnet of a measure B8 is used for a rotary electric machine with a plurality of magnetic poles. The magnet is located on a d-axis for each magnetic pole, and has first and second ends extending toward opposite directions across the d-axis for each magnetic pole. The magnet has a plurality of magnetic paths defined therein. The first end of the magnet has one of the magnetic paths as a first magnetic path and the first magnetic path is oriented to obliquely intersect with the d-axis. The second end of the magnet has one of the magnetic paths as a second magnet path and the second magnetic path is oriented to be obliquely intersect with the d-axis. The orientation of the first magnetic path has a first inclination with respect to the circumferential direction, and the orientation of the second magnetic path has a second inclination with respect to the circumferential direction. The first and second inclinations are identical to each other.

A rotary electric machine of a measure B9 includes a magnet for forming a plurality of magnetic poles, and an armature winding located to be close to the magnet. The magnet is located on a d-axis for each magnetic pole, and has first and second ends extending toward opposite directions across the d-axis for each magnetic pole. The magnet has a plurality of magnetic paths defined therein. The first end of the magnet has one of the magnetic paths as a first magnetic path and the first magnetic path is oriented to obliquely intersect with the d-axis. The second end of the magnet has one of the magnetic paths as a second magnet path and the second magnetic path is oriented to be obliquely intersect with the d-axis. The orientation of the first magnetic path has a first inclination with respect to the circumferential direction, and the orientation of the second magnetic path has a second inclination with respect to the circumferential direction. The first and second inclinations are identical to each other.

In a usual rotary electric machine, a magnet is located to be linear symmetrical about the d-axis on the premise of the design that the rotary electric machine can be equally rotated in both a forward direction and a reverse direction.

In contrast, in each of the structures of the measures B8 and B9, for a rotary electric machine having magnetic paths of a magnet that are asymmetric about the d-axis, the magnet is configured such that the first inclination of the orientation of the first magnetic path as one of the magnet paths in the first end of the magnet with respect to the circumferential direction is identical to the second inclination of the orientation of the second magnetic path as one of the magnet paths in the second end of the magnet with respect to the circumferential direction.

The above configuration of the rotary electric machine having the magnetic paths of a magnet that are asymmetric about the d-axis results in a larger peak of torque generated by the rotary electric machine rotating in the forward direction as compared with a case where the magnetic paths of a magnet that are symmetric about the d-axis. For this reason, the magnet having the magnetic orientations being asymmetric about the d-axis is preferably used for rotary electric machines each rotating in only one direction or rotating in mainly one direction.

A method of manufacturing a magnet of a measure C1 includes (a) Performing orientation of aligned easy axes of magnetization of a mold in which a magnetic powdery member has been filled arranged in a magnetic field (b) Sintering the magnetic powdery member with the oriented easy axes of magnetization to thereby produce a magnet having opposing surfaces (c) Magnetizing the magnet after the sintering step The magnetizing step includes (1) Arranging a magnetizing core and a conductor in one of first and second regions defined in a thickness direction of the magnetizing core (2) Energizing the conductor to generate a magnetizing magnetic field that forms an arc-shaped magnetic path between the opposing surfaces of the magnet The above manufacturing method energizes the conductor arranged in one of the first and second regions defined in the thickness direction of the magnetizing core to thereby generate the magnetizing magnetic field toward the magnetizing core around the conductor. Because the magnet is arranged in the one of the first and second regions defined in the thickness direction of the magnetizing core, magnetization of the magnet is carried out in the magnetizing magnetic field. Therefore, it is possible to properly manufacture a magnet having circular-arc magnetic paths, i.e. longer magnetic paths, between a pair of opposing surfaces (a pair of flux effective surfaces) to thereby have a higher demagnetization resistance performance.

In the magnetizing core, the state of magnetic saturation is changed depending on the thickness dimension of the magnetic core, and orientations of magnetizing flux components are changed depending on the state of magnetic saturation. For this reason, designing the thickness dimension of the magnetizing core in accordance with the aligned easy axes of magnetization in the orientation step makes it possible to perform proper magnetization of the magnet in accordance with the orientations of the magnetic paths.

In the method of a measure C2, which depends on the measure C1, the magnetizing step includes (1) Locating a first magnetizing core as the magnetizing core (2) Locating a second magnetizing core having a surface with a concaved recess formed therein such that the surface of the second magnetizing core faces the first magnetizing core (3) Locating the magnet in a magnet insertion space defined between the first and second magnetizing cores (4) Energizing the conductor installed in the concave recess to generate the magnetizing magnetic field that forms the arc-shaped magnetic path between the opposing surfaces of the magnet In the above manufacturing method, energizing the conductor installed in the concave recess of the second magnetizing core enables the magnetizing magnetic field to be generated in the magnet insertion space across both the first and second magnetizing cores. Then, magnetizing the magnet located in the magnet insertion space is carried out based on the magnetizing magnetic field. This efficiently magnetizes the magnet using the magnetic flux generated between the first and second magnetizing cores. Therefore, it is possible to properly manufacture a magnet having circular-arc magnetic paths, i.e. longer magnetic paths, between a pair of opposing surfaces (a pair of flux effective surfaces) to thereby have a higher demagnetization resistance performance.

In the method of a measure C3, which depends on the measure C2, the concaved recess formed in the surface of the first magnetizing core includes a plurality of concaved recesses arranged at predetermined pitches therebetween, and the conductor includes a plurality of conductors provided in the respective concaved recesses. The energizing step is adapted to energize a selected one of the conductors as a first conductor in a predetermined first direction, and to energize a selected another of the conductors as a second conductor located adjacent to the first conductor in a second direction opposite to the first direction. The first magnetizing core used by the magnetizing step has a thickness in a direction of the arrangement of the first and second magnetizing cores. The thickness of the first magnetizing core is smaller than each of the predetermined pitches.

Because the thickness of the first magnetizing core in the direction of the arrangement of the first and second magnetizing cores is smaller than each of the predetermined pitches, the first magnetizing core is likely to be magnetically saturated. Because the first magnetizing core is magnetically saturated, the circular-arc magnetizing magnetic field having a relatively large curvature, i.e. a relatively small radius of curvature, is generated in the magnet insertion space.

Using the circular-arc magnetizing magnetic field enables a magnet having magnetic paths, each of which has a desired curvature, to be properly manufactured. Note that, in the measure C3, each of the predetermined pitches represents a distance between a center position of one of adjacent concave recesses and a center position of the other of the adjacent concave recesses, or a width dimension of a core portion between the adjacent concave recesses. This can be applied to the following measure C4 similarly to the measure C3.

For example, a magnetizing apparatus 340 illustrated in FIG. 66(a) is comprised of an outer magnetizing core 342 as the first magnetizing core, and an inner magnetizing core 341 as the second magnetizing core. A space between the magnetizing cores 341 and 342 serves as a magnet insertion space 343. The inner magnetizing core 341 has a plurality of slots 344 formed in the outer circumferential surface with predetermined pitches therebetween; each of the slots 344 serves as the conductor insertion concave recess in which a magnetizing coil 345 is to be installed. The outer magnetizing core 342 has a radial thickness dimension T11, and the radial thickness dimension T11 is set to be smaller than a pole pitch of the inner magnetizing core 341. Note that the pole pitch of the inner magnetizing core 341 represents, along the circumferential direction, a distance pitch between a center position of one of adjacent slots 344 and a center position of the other of the adjacent slots 344, or a width dimension of a core portion between adjacent slots 344.

In the method of a measure C4, which depends on the measure C2, the concaved recess formed in the surface of the first magnetizing core includes a plurality of concaved recesses arranged at predetermined pitches therebetween, and the conductor includes a plurality of conductors provided in the respective concaved recesses.

The energizing step is adapted to energize a selected one of the conductors as a first conductor in a predetermined first direction, and to energize a selected another of the conductors as a second conductor located adjacent to the first conductor in a second direction opposite to the first direction. The first magnetizing core used by the magnetizing step has a thickness in a direction of the arrangement of the first and second magnetizing cores. The thickness of the first magnetizing core is larger than each of the predetermined pitches.

Because the thickness of the first magnetizing core in the direction of the arrangement of the first and second magnetizing cores is larger than each of the predetermined pitches, the first magnetizing core is less likely to be magnetically saturated. In this case, the circular-arc magnetizing magnetic field having a relatively small curvature, i.e. a relatively large radius of curvature, is generated in the magnet insertion space.

Using the circular-arc magnetizing magnetic field enables a magnet having magnetic paths, each of which has a desired curvature, to be properly manufactured.

For example, a magnetizing apparatus 350 illustrated in FIG. 67 is comprised of an outer magnetizing core 352 as the first magnetizing core, and an inner magnetizing core 351 as the second magnetizing core. A space between the magnetizing cores 351 and 352 serves as a magnet insertion space 353. The inner magnetizing core 351 has a plurality of slots 354 formed in the outer circumferential surface with predetermined pitches therebetween; each of the slots 354 serves as the conductor insertion concave recess in which a magnetizing coil 355 is to be installed. The outer magnetizing core 352 has a radial thickness dimension T12, and the radial thickness dimension T12 is set to be larger than a pole pitch of the inner magnetizing core 351. Note that the pole pitch of the inner magnetizing core 351 represents, along the circumferential direction, a distance pitch between a center position of one of adjacent slots 354 and a center position of the other of the adjacent slots 354, or a width dimension of a core portion between adjacent slots 354.

Note that, as compared with the magnetizing step of the measure C4, the magnetizing step of the measure C3 is preferably used for magnetizing magnets each having a circular-arc magnetic path with a relatively small radius, i.e. a relatively large curvature. In contrast, the magnetizing step of the measure C4 is preferably used for magnetizing magnets each having a circular-arc magnetic path with a relatively large radius, i.e. a relatively small curvature.

In the method of a measure C5, which depends on any one of the measures C1 to C4, the orientation performing step generates an orientation magnetic field using a magnetic field generator such that the orientation magnetic field has a circular arc shape, and orients the magnetic powdery member based on the orientation magnetic field.

In the method of the measure C5, orientation of the magnetic powdery member is carried out based on the circular-arc orientation magnetic field generated by the magnetic field generator in the orientation performing step for aligning the easy axes of magnetization of the magnetic powdery member. This enables the easy axes of magnetization of the magnet between the opposing surfaces (flux effective surfaces) to be aligned with each other. In the magnetizing step after the orientation performing step, magnetizing the magnet along the orientations of the respective easy axes of magnetization enables the magnet having superior magnetic characteristics to be manufactured. For example, orientation is carried out preferably using the magnetic field generator illustrated in, for example, FIG. 56 or 58.

In the method of a measure C6, which depends on the measure C5, the magnetic field generator includes 1. A pair of first and second coils coaxially arranged to face each other with a predetermined space region therebetween, and energized to respectively generate opposite first and second magnetic fields 2. An orientation yoke arranged in the space region and separated outwardly from a common center axis of the first and second coils The orientation performing step energizes the first and second coils to cause the first and second coils to respectively generate the opposite first and second magnetic fields to the space region so that the first and second magnetic fields interact each other in the space region, resulting in radially expanding magnetic field components away from the common center axis of the first and second coils. Then, the orientation performing step collects the radially expanding magnetic field components to the orientation yoke as the orientation magnetic field, and performs the orientation based on the orientation magnetic field.

Because the method causes the first and second magnetic fields to interact each other in the space region, and resulting in radially expanding magnetic field components away from the common center axis of the first and second coils, and collects the radially expanding magnetic field components to the orientation yoke as the orientation magnetic field, it is possible to properly generate the circular-arc orientation magnetic field. This enables the easy axes of magnetization to be aligned with a desired orientation.

For example, as illustrated in, for example, FIG. 56, the method energizes first and second coils 311 and 312 to cause the first and second coils 311 and 312 to respectively generate the opposite first and second magnetic fields, and causes the first and second magnetic fields to interact each other in the space region, resulting in radially expanding magnetic field components away from the common center axis of the first and second coils.

Then, the method collects the radially expanding magnetic field components to a core (an orientation yoke) 313, which is arranged in a circle, as the orientation magnetic field. In this example, a magnet production mold, that is, a magnet as a magnetic orientation target, can be arranged at a radially outer portion of the coils 311 and 312. This prevents upsizing of the coils 311 and 312, making the size of the magnetic field generator compact.

In the method of a measure C7, which depends on the measure C5, the magnetic field generator includes a conductor. The orientation performing step energizes the conductor to generate a magnetic field circulating around a direction of the length of the conductor as the orientation magnetic field, thus performing orientation of the easy axes of magnetization of the magnetic powdery member based on the circulating magnetic field.

According to the above method, it is possible to properly generate the circular-arc orientation magnetic field using the circulating magnetic field. This enables the easy axes of magnetization to be aligned with a desired orientation.

It is desired that the magnetic field generator used by the magnetizing step can properly magnetize a magnet having magnetic paths each having a circular-arc shape.

A magnetizing apparatus of a measure C8 is usable for magnetizing a magnet having a pair of opposing surfaces, and having easy axes of magnetization each having a circular-arc shape. The magnetizing apparatus includes a magnetizing core having a predetermined thickness, and a conductor arranged in one of first and second regions defined in a thickness direction of the magnetizing core. The magnetizing apparatus is configured to, while a magnet as a magnetic orientation target is arranged in the one of first and second regions, energize the conductor to generate a magnetizing magnetic field that forms an arc-shaped magnetic path between the opposing surfaces of the magnet.

The above magnetizing apparatus energizes the conductor arranged in one of the first and second regions defined in the thickness direction of the magnetizing core to thereby generate the magnetizing magnetic field toward the magnetizing core around the conductor. Because the magnet is arranged in the one of the first and second regions defined in the thickness direction of the magnetizing core, magnetization of the magnet is carried out in the magnetizing magnetic field. Therefore, it is possible to properly manufacture a magnet having circular-arc magnetic paths, i.e. longer magnetic paths, between a pair of opposing surfaces (a pair of flux effective surfaces) to thereby have a higher demagnetization resistance performance.

The magnetizing apparatus of a measure C9, which depends on the measure C8, includes a first magnetizing core as the magnetizing core, and a second magnetizing core separated to face the first magnetizing core. The magnet is located in a magnet insertion space defined between the first and second magnetizing cores.

The second magnetizing core has a surface facing the first magnetization core. The surface has a plurality of concaved recesses formed to be arranged at predetermined pitches therebetween. In the concaved recesses, a plurality of conductors are respectively provided. A selected one of the conductors is energized in a predetermined first direction as a first conductor, and a selected another of the conductors located adjacent to the first conductor is energized in a second direction opposite to the first direction as a second conductor. The first magnetizing core has a thickness in a direction of the arrangement of the first and second magnetizing cores. The thickness of the first magnetizing core is smaller than each of the predetermined pitches.

In the above magnetizing apparatus, energizing the conductor installed in each concave recess of the second magnetizing core enables the magnetizing magnetic field to be generated in the magnet insertion space across both the first and second magnetizing cores. Then, magnetizing the magnet located in the magnet insertion space is carried out based on the magnetizing magnetic field. This efficiently magnetizes the magnet using the magnetic flux generated between the first and second magnetizing cores.

Because the thickness of the first magnetizing core in the direction of the arrangement of the first and second magnetizing cores is smaller than each of the predetermined pitches, the first magnetizing core is likely to be magnetically saturated. Because the first magnetizing core is magnetically saturated, the circular-arc magnetizing magnetic field having a relatively large curvature, i.e. a relatively small radius of curvature, is generated in the magnet insertion space.

Using the circular-arc magnetizing magnetic field enables a magnet having magnetic paths, each of which has a desired curvature, to be properly manufactured. For example, a specific structure of the magnetizing apparatus can be illustrated in FIG. 66(a) as a magnetizing apparatus 340.

The magnetizing apparatus of a measure C10, which depends on the measure C8, includes a first magnetizing core as the magnetizing core, and a second magnetizing core separated to face the first magnetizing core. The magnet is located in a magnet insertion space defined between the first and second magnetizing cores.

The second magnetizing core has a surface facing the first magnetization core. The surface has a plurality of concaved recesses formed to be arranged at predetermined pitches therebetween. In the concaved recesses, a plurality of conductors are respectively provided. A selected one of the conductors is energized in a predetermined first direction as a first conductor, and a selected another of the conductors located adjacent to the first conductor is energized in a second direction opposite to the first direction as a second conductor. The first magnetizing core has a thickness in a direction of the arrangement of the first and second magnetizing cores. The thickness of the first magnetizing core is larger than each of the predetermined pitches.

In the above magnetizing apparatus, energizing the conductor installed in each concave recess of the second magnetizing core enables the magnetizing magnetic field to be generated in the magnet insertion space across both the first and second magnetizing cores. Then, magnetizing the magnet located in the magnet insertion space is carried out based on the magnetizing magnetic field. This efficiently magnetizes the magnet using the magnetic flux generated between the first and second magnetizing cores.

Because the thickness of the first magnetizing core in the direction of the arrangement of the first and second magnetizing cores is larger than each of the predetermined pitches, the first magnetizing core is less likely to be magnetically saturated. Because the first magnetizing core is less likely to be magnetically saturated, the circular-arc magnetizing magnetic field having a relatively small curvature, i.e. a relatively large radius of curvature, is generated in the magnet insertion space.

Using the circular-arc magnetizing magnetic field enables a magnet having magnetic paths, each of which has a desired curvature, to be properly manufactured. For example, a specific structure of the magnetizing apparatus can be illustrated in FIG. 67 as a magnetizing apparatus 350.

Note that, as compared with the magnetizing apparatus of the measure C10, the magnetizing apparatus of the measure C9 is preferably used for magnetizing magnets each having a circular-arc magnetic path with a relatively small radius, i.e. a relatively large curvature. In contrast, the magnetizing apparatus of the measure C10 is preferably used for magnetizing magnets each having a circular-arc magnetic path with a relatively large radius, i.e. a relatively small curvature.

A rotary electric machine drive system of a measure D1 includes a rotary electric machine that includes an armature winding with multiphase windings, and a plurality of magnets provided in respective magnetic poles arranged in a circumferential direction. The rotary electric machine drive system includes a power adjuster including switches provided for the respective multi-phase armature windings. The power adjuster is configured to adjust an energization current for each of the multiphase armature windings based on on-off operations of the corresponding switch. The rotary electric machine drive system includes a controller configured to control the on-off switching operations of each of the switches.

Each of the magnets has a pair of opposing first flux effective surfaces. One of the first flux effective surfaces is a surface out of which magnetic flux flows, and the other of the first flux effective surfaces is a surface into which magnetic flux flows. Each of the magnets has, as a q-axis side end, a surface serving as a second flux effective surface out of which magnetic flux flows or into which magnetic flux flows.

Each of the magnets has a plurality of magnetic paths defined therein, and has a thickness between the opposing first flux effective surfaces. Each of the magnets has at least one of the magnetic paths that is longer than the thickness of the corresponding one of the magnets. Each of the magnets has a plurality of easy axes of magnetization. Each of the easy axes of magnetization is oriented along a corresponding one of the magnetic paths. One of the first flux effective surfaces located closer to the armature winding than the other thereto is defined as an outer first flux effective surface. The magnetic paths include at least one magnetic path that extends from one of the outer first flux effective surface and the second flux effective surface to the other thereof.

The controller is configured to control on-off switching operations of the respective switches of the power adjuster to thereby adjust 1. A first current that flows through each of the multi-phase windings, the first current having a first phase that generates first magnetic flux perpendicular to the d-axis 2. A second current that flows through each of the multi-phase windings, the second current having a second phase that is different from the first phase Each magnet according to the rotary electric machine to be driven in the measure D1 has the pair of opposing first flux effective surfaces, and the second flux effective surface provided at the q-axis side end.

Each magnet has the magnetic paths defined therein. At least one of the magnetic paths is longer than the thickness of the corresponding magnet. The magnetic paths include the at least one magnetic path that extends from one of the outer first flux effective surface and the second flux effective surface to the other thereof.

This configuration of each magnet enables magnetic flux of the corresponding magnet to flow through the second magnetic flux surface, i.e. the q-axis end surface. Adjustment of the magnetic flux flowing through the q-axis end surface enables magnetic saturation at a portion of the rotor core around the q-axis to be adjusted. That is, changing how the portion of the rotor core around the q-axis is magnetically saturated enables the magnetic resistance of the portion of the rotor core to be varied.

In addition, when controlling the phase of energization of each of the multi-phase windings, the controller changes the second phase of the second current flowing through each of the multi-phase windings to be different from the first phase of the first current that flows through each of the multi-phase windings for generating the first magnetic flux perpendicular to the d-axis.

This configuration enables, while the portion of the rotor core around the q-axis is magnetically saturated, magnetic flux based on each magnet to be weakened due to a reduction in magnetic permeability of the rotor core. This makes it possible to perform field-weakening control based on adjustment of the magnetic flux of each magnet. That is, the thirty-eighth measure enables execution of both 1. The first field-weakening control based on adjustment of the d-axis current flowing in the d-axis
2. The second field-weakening control based on adjustment of the magnetic saturation state of the portion of the rotor core around the d-axis This therefore results in an increase in the current control range of the rotary electric machine drive system of the measure D1.

For example, FIG. 70 illustrates that, in the rotor 600, the first current having the phase for generating the first magnetic flux perpendicular to the d-axis is flowing through the wire 721. In contrast, FIG. 71(*a*) illustrates that magnetic flux based on the magnet 470 is passing through the second effective surface 471*c* of the magnet 470. This causes magnetic saturation to be generated in the portion 628 of the rotor core 610 around the q-axis, thus weakening the magnetic flux of the magnet.

Note that, while the magnetic saturation is generated in the q-axis portion 28, the magnetic resistance, which is illustrated by R3 in FIG. 71(*b*), in the magnetic circuit passing through the second effective surface 471*c* becomes higher, resulting in the permeance becoming lower.

In the rotary electric machine drive system of a measure D2, which depends on the measure D1, the controller is configured to adjust the first current and the second current to thereby variably control a magnetically saturated state of a portion of the core and a magnetically non-saturated state of the portion of the core. The portion of the core is located between the second flux effective surfaces of each adjacent pair of the plurality of poles.

The above configuration enables the magnetically saturated state of the portion of the core and the magnetically non-saturated state of the portion of the core to be variably controlled as need arises. This results in a further increase in the current control range of the rotary electric machine drive system of the measure D2.

This also carries out the field-weakening control based on the d-axis current Id while performing the variable magnetic-saturation control in addition to the field-weakening control. This preferably variably controls between the magnetic saturation state and non-magnetic saturation state in accordance with, for example, a torque command value and/or the rotational speed of the rotary electric machine. For example, this controls the portion of the core in the magnetically saturation state upon low-torque and high-rotation requirement of the rotary electric machine, and controls the portion of the core in the non-magnetic saturation state upon another state except for the low-torque and high-rotation requirement of the rotary electric machine.

In the rotary electric machine drive system of a measure D3, which depends on the measure D1 or D2, each magnet is configured to generate, as interlinkage magnetic flux to the rotary electric machine, magnetic flux that is a synthesis of first-order magnetic flux and third-order magnetic flux, which have the same polarity, on the d-axis.

As compared with each magnet having polar anisotropy orientations, which are like sinusoidal patterns, or a halbach array of magnets, the structure of each magnet enables larger torque to be generated.

For example, FIG. 76 illustrates the surface magnetic flux density generated by the magnets of the measure D3. In FIG. 76, the magnetic flux density on the d-axis, which is expressed by a solid line, is higher than the first-order magnetic flux density, which is expressed by a dashed line, and the magnetic flux density on the d-axis is more aggregated toward the d-axis than the first-order waveform is. This waveform of the magnetic flux density of the magnets enables the rotary electric machine to output larger torque.

In particular, the controller is capable of controlling a 120-degree rectangular energization mode, a 150-degree energization mode, or a 180-degree energization mode of the rotary electric machine. When the controller performs one of the 120-degree rectangular energization mode, 150-degree energization mode, or 180-degree energization mode of the rotary electric machine, energization currents for the respective phase windings may include the third-order harmonic current. From this viewpoint, the rotary electric machine uses the magnets configured set forth above makes it possible to output excellent torque.

Note that each waveform of the magnetic flux density illustrated in FIG. 76 can be obtained by tracing the cylindrical air-gap surface of a rotary-electric machine member, such as a rotor, provided with the magnets with a flux measurement element, such as a gauss meter, while the core of a non-magnet member, such as the stator, has been eliminated to thereby measure the corresponding waveform of the magnetic flux density. If the air-gap surface of a rotary-electric machine member does not have a cylindrical shape, it is assumed that the assembly points at which the stator and rotor are the arranged to be closest to each other is defined as a mechanical air-gap surface. At that time, tracing the mechanical air-gap surface with a flux measurement element, such as a gauss meter, enables measurement of each waveform of the magnetic flux density.

In the rotary electric machine drive system of a measure D4, which depends on any one of the measures D1 to D3, the rotary electric machine of the rotary electric machine drive system includes an armature core including a plurality of slots arranged in a circumferential direction of the core. The multi-phase armature windings are provided in the slots, and each of the armature windings has a substantially rectangular shape or a substantially ellipsoidal shape.

This configuration enables a conductor cross-sectional area in each slot to be larger. This makes it possible to install, in each of smaller slots, a rectangular or an ellipsoidal conductor as compared with a case of installing, in each slots, a round conductor while the volume of the rectangular or an ellipsoidal conductor is set to be identical to the volume of the round conductor. This makes the radial dimension of the stator smaller, thus enabling, for an inner-rotor rotary electric machine, the radius of the rotor located inside the stator to be larger.

The larger the radius of the rotor, the higher the torque and the higher the moment of inertia, resulting in the electrical and mechanical time constant Tk being increased. There may be concern about deterioration of the rotational controllability of the rotary electric machine. At that time, the electrical and mechanical time constant Tk can be expressed by the following equation (1):

$$Tk = (J \cdot L) \div (Kt \cdot Ke) \qquad (1)$$

where J represents the inertia moment, L represents inductance, Kt represents a torque constant, and Ke represents a back-emf constant.

The rotary electric machine as a drive target of the measure D4 has each magnet having a higher demagnetization resistance performance. This means that using each magnet having a higher value of the permeance and higher magnetic force of the corresponding magnet results in the rotary electric machine having a higher value of the back-emf constant Ke. At that time, because it is possible to increase the value of the back-emf constant Ke while keeping the amount of magnet materials in each magnet unchanged, it is possible to set the number of turns of each armature winding to be smaller by the reciprocal of an increment of the electrical and mechanical time constant Tk, thus keeping the electrical and mechanical time constant Tk unchanged. That is, adjusting the rotary electric machine to have low inductance and high inertia moment enables a motor capacity, which is similar to a conventional motor capacity, to be obtained while maintaining the electrical and mechanical time constant Tk unchanged.

The larger diameter of the rotor, the larger the inertia moment, resulting in lower noise and larger the electrical and mechanical time constant Tk. This may therefore result in the larger diameter of the rotor being restricted. In an interior magnet rotor, using reluctance torque based on inductance may result in a problem of the mechanical time constant. For this reason, the rotary electric machine is forced to use a surface magnet rotor or a limited interior magnet rotor conforming to such a surface magnet rotor. From this viewpoint, the rotary electric machine is configured to prevent the electrical and mechanical time constant Tk from being excessively increased, making it possible to use an interior magnet rotor having a proper structure.

In the rotary electric machine drive system of a measure D5, which depends on any one of the measures D1 to D4, the controller is configured to generate, for each of the switches, a pulse-width modulation signal (PWM signal) based on a command voltage for each phase and a periodic carrier wave having a predetermined frequency. The controller is configured to control, based on the PWM signal for each of the switches, on-off switching operations of the corresponding switch in accordance with the corresponding pulse-width modulation signal to thereby control the current to be supplied to each of the multi-phase armature windings. The frequency of the periodic carrier signal is set to be higher than 15 kHz.

In an electric vehicle or a hybrid vehicle, there may be noise due to the frequency of the cyclic carrier signal, i.e. a carrier frequency, being within an audible frequency range. From this viewpoint, the rotary electric machine of this drive system has a lower value of the electrical time constant with a lower inductance, making it possible to perform energization control of the rotary electric machine using a value of the carrier frequency higher than the audible frequency range, i.e. a value higher than 15 kHz. This also obtains an effect of lower noise based on a larger value of the inertia moment, making it possible to provide the rotary electric machine with lower noise.

The rotary electric machine drive system of a measure D6, which depends on any one of the measures D1 to D5, includes a voltage converter arranged between a direct-current power source and the power adjuster. The power converter is capable of controlling an input voltage to the power adjuster. The controller is configured to control the current for each of the multiphase armature windings in a rectangular voltage control mode.

This configuration of the rotary electric machine drive system controls the input voltage, which is a voltage applied from the direct-current power source, to the power adjuster, thus adjusting power for the armature windings in accordance with the controlled input voltage. This configuration reduces current change in the rotary electric machine whose inductance becomes lower at a predetermined carrier frequency, thus preventing divergence of the current control. In the rotary electric machine having a low inductance, energization control is carried out in accordance with the predetermined carrier frequency, so that there may be divergence of the current control. However, this configuration of the rotary electric machine drive system makes it possible to reduce current variations, thus preventing divergence of the current control.

Controlling the energization current for each of the multiphase armature windings in the rectangular voltage control mode drastically reduces the number of switching operations of the switches in the power adjuster, so that, even if the inductance of the stator windings is small, it is possible to prevent the occurrence of current ripples. For example, it is possible to adjust the energization current for each of the multiphase armature windings based on the input voltage adjusted by the power adjuster. Note that the power adjuster can easily perform PWM control at a frequency higher than 15 kHz, making it possible to perform power control of the rotary electric machine without using specific technical difficulty.

The controller performs, in the rectangular voltage control mode, the 120-degree rectangular voltage control mode using on duration corresponding to 120 electrical degrees. Note that the controller can be configured to perform another rectangular voltage control mode using on duration corresponding to any angle selected from the range from 120 electrical degrees to 180 electrical degrees inclusive.

In the rotary electric machine drive system of a measure D7, which depends on the any one of the measures D1 to D6, the controller includes a first control unit configured to 1. Generate, for each of the switches, a pulse-width modulation signal (PWM signal) based on a command voltage for each phase and a periodic carrier wave having a predetermined frequency 2. Control, based on the PWM signal for each of the switches, on-off switching operations of the corresponding switch in accordance with the corresponding pulse-width modulation signal to thereby control the current to be supplied to each of the multi-phase armature windings The controller also includes a second control unit configured to 1. Have switching pattern information indicative of a relationship between values of the electrical rotational angle of the rotor and a plurality of on-off switching patterns for each switch 2. Select, based on a present value of the electrical rotational angle of the rotor, a corresponding one of the on-off switching patterns for each switch from the switching pattern information 3. Control on-off switching operations of each switch in accordance with the selected on-off switching pattern for the corresponding switch to thereby control the current to be supplied to each of the multi-phase armature windings The drive system may make it difficult to control the rotary electric machine using low carrier frequencies due to low-inductance characteristics of the rotary electric machine. The rotary electric machine having a low inductance and a larger amount of inertia, obtains a large benefit based on the large amount of inertia.

From this viewpoint, the drive system makes it possible to perform both

1. PWM control, i.e. current-feedback control, to thereby drive the rotary electric machine
2. Pattern control of each switch in accordance with a selected on-off switching pattern The drive system therefore selects one of the PWM control and the pattern control in accordance with the various situations. For example, the drive system selects the pattern control if it is difficult to perform current detection. This therefore enables the drive system to selectively determine the drive range of the rotary electric machine.

A magnet unit of a measure E1 is to be installed in a rotary electric machine with an armature winding arranged to face a plurality of magnetic poles. The magnet unit includes a magnet provided for each magnetic pole, and a holder including a magnet installation hole. The holder is configured to hold the magnet installed in the magnet installation hole. The magnet includes a first magnet, and a second magnet. The first and second magnets are located within a range from the d-axis to the q-axis. The first magnet is located closer to the d-axis than the second magnet thereto, and the second magnet is located closer to the q-axis than the first magnet thereto. The first magnet has linear first magnetic paths defined therein, the first magnetic paths being parallel with each other. The second magnet has linear second magnetic paths defined therein, the second magnetic paths being parallel with each other. The first and second magnets are installed in the corresponding magnet installation hole while an orientation of each of the first magnetic paths is different from an orientation of each of the second magnetic paths.

In the magnet unit of the measure E1, the first and second magnets are located within the range from the d-axis to the q-axis, and the first and second magnets are installed in the magnet installation hole of the holder. The first magnet is located closer to the d-axis than the second magnet thereto, and the second magnet is located closer to the q-axis than the first magnet thereto. The first magnet has linear first magnetic paths defined therein, the first magnetic paths being parallel with each other. The first and second magnets are installed in the corresponding magnet installation hole while the orientation of each of the first magnetic paths is different from the orientation of each of the second magnetic paths.

This configuration positively increases magnetic flux at a specified position within the range from the d-axis to the q-axis to thereby strengthen a demagnetization resistance performance against a demagnetization field from the armature winding. That is, although there might be a possibility of demagnetization of the first magnet if the first magnet were only installed in the rotor core, the second magnet having the magnetic paths different from those of the first magnet reduces demagnetization of the first magnet. This therefore results in reduction in demagnetization of each magnet. In particular, the forty-fifth measure can achieve a desired level of reduction in demagnetization of the magnet unit while using relatively inexpensive parallel anisotropic magnets as the first and second magnets.

In the magnet unit of a measure E2, which depends on the measure E1, the magnet installation hole is inclined with respect to the d-axis, and has a first end closer to the d-axis than to the q-axis. The first end is located to be farther from the armature winding than the second end therefrom. The orientation of each of the second magnetic paths in the second magnet is closer to a direction perpendicular to the d-axis than the orientation of each of the first magnetic paths is.

The magnet installation hole is inclined with respect to the d-axis, and, the first end of the closer to the d-axis is located to be farther from the armature winding than the second end therefrom, for example, the magnet installation hole is located across the d-axis to have a V shape. This may be demagnetization of the q-axis end of each magnet. From this viewpoint, the orientation of each of the second magnetic paths in the second magnet is closer to a direction perpendicular to the d-axis than the orientation of each of the first magnetic paths is. This reduces demagnetization of the q-axis end of each magnet.

The first magnet of the magnet unit of a measure E3 has a pair of opposing flux effective surfaces. One of the flux effective surfaces is a surface out of which magnetic flux flows, and the other of the flux effective surfaces is a surface into which magnetic flux flows. The first magnet has a thickness between the opposing flux effective surfaces. The first magnet has a plurality of easy axes of magnetization. A length of a line along at least one of the easy axes of magnetization between the flux effective surfaces is longer than the thickness of the first magnet.

This configuration of the first magnet of the magnet unit enables the effective flux density to be higher as compared with a magnet that has the length of the line along at least one of the easy axes of magnetization between the flux effective surfaces being equal to the thickness between the flux effective surfaces. That is, positively increasing the length of at least one magnetic path of the first magnet to be longer than the physical thickness of the first magnet enables the permeance of the first magnet to be higher. This therefore strengthens magnetic flux of the first magnet without increasing the thickness of the first magnet, that is, increasing the amount of magnet materials in the first magnet. In particular, magnetic orientations of the first magnet are defined to be respectively along the magnetic paths in the first magnet, making it possible to significantly increase the effect of the strength of magnetic flux of the first magnet. This therefore efficiently reduces demagnetization of the first magnet.

The length of a magnetic path defined in a magnet represents a magnetic length along a corresponding magnetic orientation defined between the pair of flux inflow and flus outflow surfaces. In other words, the length of a magnetic path defined in a magnet can also represent a thickness of the magnet in a magnet circuit. The easy axes of magnetization in a magnet are easy-magnetizable crystal orientations in the magnet. In the present disclosure, the magnetic orientations in a magnet show the magnetic orientations of respective magnetic lines in the magnet, i.e. the magnetic orientations of the respective easy axes of magnetization defined in the magnet.

The magnet unit of a measure E4, which depends on the measure E3, the second magnet has a pair of opposing flux effective surfaces. One of the flux effective surfaces is a surface out of which magnetic flux flows, and the other of the flux effective surfaces is a surface into which magnetic flux flows. The second magnet has a thickness between the opposing flux effective surfaces. The second magnet has a plurality of easy axes of magnetization. A length of a line along at least one of the easy axes of magnetization between the flux effective surfaces is longer than the thickness of the second magnet.

Like the first magnet, this configuration of the second magnet strengthens magnetic flux of the second magnet without increasing the thickness of the second magnet, that is, increasing the amount of magnet materials in the second magnet. This therefore more efficiently reduces demagnetization of the first magnet.

In the magnet unit of a measure E5, which depends on the measure E3 or E4, a q-axis end surface of the first magnet intersecting with the pair of flux effective surfaces is oriented to be parallel to the magnetic paths of the first magnet.

In the first magnet, the length of the line along at least one of the easy axes of magnetization between the flux effective surfaces is longer than the thickness of the first magnet. If the first magnet has a rectangular shape in its lateral cross section, relatively shorter magnetic paths are locally located at the q-axis end surface of the first magnet. This shorter magnetic-path portion may become a specific weak portion against demagnetization. From this viewpoint, because the q-axis end surface of the first magnet is oriented to be parallel to the magnetic paths of the first magnet, it is possible to eliminate the specific weak portion against demagnetization from the first magnet.

In the magnet unit of a measure E6, which depends on the measure E1, the first magnet is arranged to be closer to the armature winding than the second magnet is. The first magnet is oriented to be perpendicular to the d-axis. The second magnet is arranged such that, the closer the second magnet to the q-axis, the farther the second magnet from the armature winding.

The second magnet has a first outer surface arranged to be closest to the armature winding, and a second outer surface arranged to be farthest from the armature winding. The first and second outer surfaces serve as a pair of flux effective surfaces; one of the flux effective surfaces serves as one of a flux inflow surface and a flux outflow surface, and the other thereof serves as the other of the flux inflow surface and the flux outflow surface.

The d-axis portion of the magnet of the measure E6 has a concave shape arranged to be closest to the armature winding. One of the pair of flux effective surfaces of the second magnet serves as one of the flux inflow surface and the flux outflow surface, and the other thereof serves as the other of the flux inflow surface and the flux outflow surface. Magnetic paths can be defined between the pair of flux effective surfaces. This makes it longer each of the magnetic paths defined in the second magnet in its thick-walled direction of the corresponding second magnet, thus improving a demagnetization resistance performance.

For example, in a magnet assembly 480C illustrated in FIG. 79(*c*), a center magnet 484*a* serving as the first magnet is located across the d-axis. The center magnet 484*a* is arranged to be closer to the armature winding than end magnets 484*b* and 484*c* respectively serving as the second magnet are. The end magnets 484*b* and 484*c* are arranged such that, the closer the end magnets 484*b* and 484*c* to the q-axis, the farther the end magnets 484*b* and 484*c* from the armature winding.

The end surfaces 485*a* and 485*b* of the respective end magnets 484*a* and 484*b* respectively serve as flux effective surfaces into which magnetic flux flows or out of which magnetic flux flows. The end surface 485*a* is the closest to the armature winding, and the end surface 485*b* is the farthest from the armature winding. Note that, on the d-axis, the magnetic orientations in the d-axis side end are preferably to be parallel to the d-axis.

A magnet unit of a measure E7 is to be installed in a rotary electric machine with an armature winding arranged to face a plurality of magnetic poles. The magnet unit includes a magnet provided for each magnetic pole, and a holder including a magnet installation hole. The holder is configured to hold the magnet. The magnet includes a first magnet, and a second magnet. The first and second magnets are located within a range from the d-axis to the q-axis. The first magnet is located closer to the d-axis than the second magnet thereto, and the second magnet is located closer to the q-axis than the first magnet thereto. The first and second magnets are installed in the corresponding magnet installation hole.

The first and second magnets are bent at a joined portion therebetween to be convex toward the armature winding. Each of the first and second magnets has a pair of opposing effective surfaces that respectively serve as flux inflow-outflow surfaces. Each of the first and second magnets has linear magnetic paths each being loner than a thickness between the effective surfaces of the corresponding one of the first and second magnets.

In this configuration of the magnet unit of the measure E7, the first and second magnets are arranged to be closer to the armature winding as compared with the first and second magnets linearly connected to each other, thus increasing torque. Making shorter the distance between the armature winding and the first and second magnets may cause a demagnetization field to increase. However, the length of the line along at least one of the easy axes of magnetization between the flux effective surfaces, i.e. flux inflow and flux outflow surfaces, of each of the first and second magnets being longer enables the above problem to be solved.

In the core serving as the holder, it is possible to set the percentage of a region of the core, which is located to be closer to the armature winding, than the magnet assembly, i.e. the magnet installation hole, is, to be smaller; the region is subjected to the sum of the magnetic flux of the armature winding and the magnetic flux of the magnet. This therefore reduces a saturation region in which magnetic saturation may occur based on the magnetic flux of the armature winding and the magnetic flux of the magnet, thus more efficiently obtaining the performance from the magnet.

Note that, if the magnet unit is used as a rotor of an interior rotation rotary electric machine, the holder serves as a rotor core, and the first and second magnets are provided in the rotor core to convexly project in a radially outward direction. For this reason, the percentage of the region in the rotor core located to be radially outward from the magnet installation hole. This reduces the centrifugal force stress concentration factor rotor core, thus increasing the mechanical strength of the rotor core.

In the magnet unit of a measure E8, which depends on the measure E7, each of the first and second magnets has linear magnetic paths that are parallel to each other.

The measure E8 can achieve a desired level of reduction in demagnetization of the magnet unit while using relatively inexpensive parallel anisotropic magnets as the first and second magnets.

In the magnet unit of a measure E9, which depends on the measure E7 or E8, each of the first and second magnets has an isosceles trapezoidal shape in a cross-section perpendicular to the flux effective surfaces. The isosceles trapezoidal shape of each of the first and second magnets has a pair of first and second bases and first and second legs. Each of the first base, second base, first leg, and second leg of the isosceles trapezoidal shape of the first magnet is identical to a corresponding one of the first base, second base, first leg, and second leg of the isosceles trapezoidal shape of the second magnet. Orientations of the easy axes of magnetization of the first magnet are identical to orientations of the easy axes of magnetization of the second magnet.

The measure E9 can achieve a desired level of reduction in demagnetization of the magnet unit while using the same size and shape magnets as the respective first and second magnets.

Each of the first and second magnets is preferably arranged such that the longer one of the first and second bases is located to be closer to the armature winding than the other thereof is.

In the magnet unit of a measure E10, which depends on any one of the measures E1 to E9, wherein each of the first and second magnets has the same shape in a cross-section perpendicular to the flux effective surfaces of the corresponding one of the first and second magnets. The first and second magnets are installed in the corresponding magnet installation hole while the first and second magnets are oppositely oriented and corresponding surfaces of the respective first and second magnets intersect with each other at a non-orthogonal angle.

The same shape magnets can be used as the respective first and second magnets, making it possible to reduce the manufacturing cost and the number of the manufacturing steps.

For example, it is possible to manufacture, as the respective first and second magnets, magnets respectively having the same-oriented easy axes of magnetization, and having opposite magnetic orientations from each other.

A rotary electric machine drive system of a measure E11 is configured to drive a rotary electric machine including the magnet unit of any one of the measures E1 to E10. The rotary electric machine drive system includes a power adjuster including a switch provided for each phase of the multiphase armature windings. The power adjuster is configured to adjust an energization current for each of the multiphase armature windings based on on-off operations of the at least one switch. The rotary electric machine drive system includes a controller configured to control the on-off switching operations of the at least one switch.

The rotary electric machine drive system includes a voltage converter arranged between a direct-current power source and the power adjuster. The voltage converter is capable of controlling an input voltage to the power adjuster. The controller is configured to control the energization current for each of the multiphase armature windings in a rectangular voltage control mode.

This configuration of the rotary electric machine drive system controls the input voltage, which is a voltage applied from the direct-current power source, to the power adjuster, thus adjusting power for the armature windings in accordance with the controlled input voltage. This configuration reduces current change in the rotary electric machine whose inductance becomes lower at a predetermined carrier frequency, thus preventing divergence of the current control. In the rotary electric machine having a low inductance, energization control is carried out in accordance with the predetermined carrier frequency, so that there may be divergence of the current control. However, this configuration of the rotary electric machine drive system makes it possible to reduce current variations, thus preventing divergence of the current control.

Controlling the energization current for each of the multiphase armature windings in the rectangular voltage control mode drastically reduces the number of switching operations of the switches in the power adjuster, so that, even if the inductance of the stator windings is small, it is possible to prevent the occurrence of current ripples. For example, it is possible to adjust the energization current for each of the multiphase armature windings based on the input voltage adjusted by the power adjuster. Note that the power adjuster can easily perform PWM control at a frequency higher than 15 kHz, making it possible to perform power control of the rotary electric machine without using specific technical difficulty.

The controller performs, in the rectangular voltage control mode, a 120-degree rectangular voltage control mode using on duration corresponding to 120 electrical degrees. Note that the controller can be configured to perform another rectangular voltage control mode using on duration corresponding to any angle selected from the range from 120 electrical degrees to 180 electrical degrees inclusive.

In the rotary electric machine drive system of a measure E12, which depends on the measure E11, the controller includes a first control unit configured to 1. Generate, for each of the switches, a pulse-width modulation signal (PWM signal) based on a command voltage for each phase and a periodic carrier wave having a predetermined frequency 2. Control, based on the PWM signal for each of the switches, on-off switching operations of the corresponding switch in accordance with the corresponding pulse-width modulation signal to thereby control the current to be supplied to each of the multi-phase armature windings The controller also includes a second control unit configured to 1. Have switching pattern information indicative of a relationship between values of the electrical rotational angle of the rotor and a plurality of on-off switching patterns for each switch 2. Select, based on a present value of the electrical rotational angle of the rotor, a corresponding one of the on-off switching patterns for each switch from the switching pattern information 3. Control on-off switching operations of each switch in accordance with the selected on-off switching pattern for the corresponding switch to thereby control the current to be supplied to each of the multi-phase armature windings The drive system may make it difficult to control the rotary electric machine using low carrier frequencies due to low-inductance characteristics of the rotary electric machine. The rotary electric machine having a low inductance and a larger amount of inertia, obtains a large benefit based on the large amount of inertia.

From this viewpoint, the drive system makes it possible to perform both

1. PWM control, i.e. current-feedback control, to thereby drive the rotary electric machine 2. Pattern control of each switch in accordance with a selected on-off switching pattern The drive system therefore selects one of the PWM control and the pattern control in accordance with the various situations. For example, the drive system selects the pattern control if it is difficult to perform current detection. This therefore enables the drive system to selectively determine the drive range of the rotary electric machine.

A method of manufacturing a magnet of a measure F1 includes (a) Performing orientation of aligned easy axes of magnetization of a mold in which a magnetic powdery member has been filled arranged in a magnetic field (b) Sintering the magnetic powdery member as a magnet after the orientation performing step (c) Magnetizing the magnet after the sintering step The orientation performing step generates an orientation magnetic field using a magnetic field generator (311 to 313, 321) such that the orientation magnetic field has a circular arc shape, and orients the magnetic powdery member based on the orientation magnetic field.

In the method of the measure F1, orientation of the magnetic powdery member is carried out based on the circular-arc orientation magnetic field generated by the magnetic field generator in the orientation performing step for aligning the easy axes of magnetization of the magnetic powdery member. This enables magnets each having magnetic paths longer than the thickness dimension between a pair of opposing flux effective surfaces (see for example a magnet 404 in FIG. 52, or magnets 440, 450 in FIGS. 64(*a*) and 64(*b*)) to be efficiently manufactured. The above manufacturing method can be carried out by, for example, the orientation apparatus illustrated in FIG. 56 or 58.

In the method of manufacturing a magnet of a measure F2, which depends on the measure F1, the magnetic field generator includes 1. A pair of first and second coils coaxially arranged to face each other with a predetermined space region therebetween, and energized to respectively generate opposite first and second magnetic fields 2. An orientation yoke arranged in the space region and separated outwardly from a common center axis of the first and second coils The orientation performing step energizes the first and second coils to cause the first and second coils to respectively generate the opposite first and second magnetic fields to the space region so that the first and second magnetic fields interact each other in the space region, resulting in radially expanding magnetic field components away from the common center axis of the first and second coils. Then, the orientation performing step collects the radially expanding magnetic field components to the orientation yoke as the orientation magnetic field, and performs the orientation based on the orientation magnetic field.

Because the method causes the first and second magnetic fields to interact each other in the space region, and resulting in radially expanding magnetic field components away from the common center axis of the first and second coils, and collects the radially expanding magnetic field components to the orientation yoke as the orientation magnetic field, it is possible to properly generate the circular-arc orientation magnetic field. This enables the easy axes of magnetization to be aligned with a desired orientation.

For example, as illustrated in, for example, FIG. 56, the method energizes first and second coils 311 and 312 to cause the first and second coils 311 and 312 to respectively generate the opposite first and second magnetic fields, and causes the first and second magnetic fields to interact each other in the space region, resulting in radially expanding magnetic field components away from the common center axis of the first and second coils.

Then, the method collects the radially expanding magnetic field components to a core (an orientation yoke) 313, which is arranged in a circle, as the orientation magnetic field. In this example, a magnet production mold, that is, a magnet as a magnetic orientation target, can be arranged at a radially outer portion of the coils 311 and 312. This prevents upsizing of the coils 311 and 312, making the size of the magnetic field generator compact.

In the method of a measure F3, which depends on the measure F1, the magnetic field generator includes a conductor. The orientation performing step energizes the conductor to generate a magnetic field circulating around a direction of the length of the conductor as the orientation magnetic field, thus performing orientation of the easy axes of magnetization of the magnetic powdery member based on the circulating magnetic field.

According to the above method, it is possible to properly generate the circular-arc orientation magnetic field using the circulating magnetic field. This enables the easy axes of magnetization to be aligned with a desired orientation.

In a measure F4 depending on any one of the measures F1 to F3, there is a method of manufacturing a magnet having magnetic paths each being longer than a thickness dimension between a pair of opposing flux effective surfaces; the flux effective surfaces respectively serve as flux inflow surface and flux outflow surface.

The orientation performing step includes

1. Arranging the mold such that at least one of the outer surfaces of the magnet is oriented to obliquely intersect with the orientation magnetic field 2. While the mode is arranged such that at least one of the outer surfaces of the magnet obliquely intersects with the orientation magnetic field, performing orientation of the easy axes of magnetization based on the orientation magnetic field.

In the method of the measure F4, the mold is arranged such that at least one of the outer surfaces of the magnet is oriented to obliquely intersect with the orientation magnetic field. This enables magnets each having magnetic paths longer than the thickness dimension between a pair of opposing flux effective surfaces (see for example a magnet 404 in FIG. 52, or magnets 440, 450 in FIGS. 64(*a*) and 64(*b*)) to be efficiently manufactured.

A method of manufacturing a magnet of a measure G1 includes

1. Performing orientation of aligned easy axes of magnetization of a mold in which a magnetic powdery member has been filled arranged in a magnetic field 2. Sintering a magnet as the magnetic powdery member after the orientation performing step 3. Magnetizing the magnet after the sintering step The orientation performing step applies, to an outer surface of the magnet, a magnetic field oriented to be inclined to the outer surface of the magnet, thus orienting the easy axes of magnetization of the magnet based on the orientation magnetic field.

The orientation performing step of the above manufacturing method orients the easy axes of magnetization of the magnet based on the magnetic field oriented to be inclined to the outer surface of the magnet. This orientation technology enables magnets, each of which has the magnetic paths longer than the thickness dimension between the pair of opposing flux effective surfaces, such as the magnets 400 illustrated in FIG. 49, to be efficiently manufactured. Specifically, this orientation technology enables magnets, each of which has the orientation ratio of equal to or more than 90%, to be stably manufactured. Increasing the orientation ratio of each magnet is capable of solving at least one of 1. Missing of material characteristics from each magnet 2. Deficiency of demagnetization resistance performance of each magnet 3. Deficiency of magnetic force of each magnet The above manufacturing method can be carried out by, for example, the orientation apparatus illustrated in FIG. 54.

In the method of a measure G2, the orientation performing step includes the steps of arranging an orientation coil in the magnetic field, and energizing the orientation coil while the mold is arranged in the orientation coil to thereby generate the orientation magnetic field.

The method of the measure G2 enables liner magnetic orientations, which are parallel to each other, to be generated in the orientation coil. This therefore easily performs parallel orientation of the magnet by causing the easy axes of magnetization to be aligned with a linear direction.

In a measure G3 depending on the measure G1 or G2, there is a method of manufacturing a magnet having magnetic paths each being longer than a thickness dimension between a pair of opposing flux effective surfaces; the flux effective surfaces respectively serve as flux inflow surface and flux outflow surface.

The orientation performing step includes

1. Arranging the mold such that at least one of the outer surfaces of the magnet is oriented to obliquely intersect with the orientation magnetic field 2. While the mode is arranged such that at least one of the outer surfaces of the magnet obliquely intersects with the orientation magnetic field, performing orientation of the easy axes of magnetization based on the orientation magnetic field.

In the method of the measure G3, the mold is arranged such that at least one of the outer surfaces of the magnet is oriented to obliquely intersect with the orientation magnetic field. This enables magnets each having magnetic paths longer than the thickness dimension between a pair of opposing flux effective surfaces (see for example a magnet 400 in FIG. 49) to be efficiently manufactured.

In the method of a measure G4, which depends on the measure G3, the mold arranged in the magnetic field has, as inner walls for defining an internal space therein, a first wall portion inclined with respect to the orientation magnetic field, and a second wall portion parallel to the orientation magnetic field.

Because the first wall portion inclined with respect to the orientation magnetic field and the second wall portion parallel to the orientation magnetic field are provided in the mold as the inner walls for defining the internal space therein, it is possible to eliminate a partially weak portion in the magnet while generating the magnetic paths defined in the magnet being longer than the thickness between the pair of opposing effective surfaces.

That is, if the magnet has a rectangular profile in its lateral cross section, performing orientation of the magnet in a direction obliquely inclined with respect to the pair of effective surfaces of the magnet, relatively shorter magnetic paths are locally located in the magnet. This shorter magnetic-path portion may become a specific weak portion against demagnetization. From this viewpoint, because the method eliminates the partially specific weak portion in the magnet during the orientation forming step before the magnetizing step, it is possible to reduce both magnetic materials from the magnet, and/or a cutting process for the partially specific weak portion.

BRIEF DESCRIPTION OF THE DRAWINGS

FIG. 51(a) and FIG. 50(b) are views illustrating magnetic orientations for magnets.

FIG. 82 is a view illustrating a structure of a multi-layered structure.

FIG. 83(a) and FIG. 83(b) are views illustrating another example of an orientation performing step of a magnet.

FIG. 85(a)-FIG. 85(c) are graphs illustrating the waveform of each phase current controlled in a 120-degree rectangular energization mode.

DESCRIPTION OF EMBODIMENTS

Figure 1:
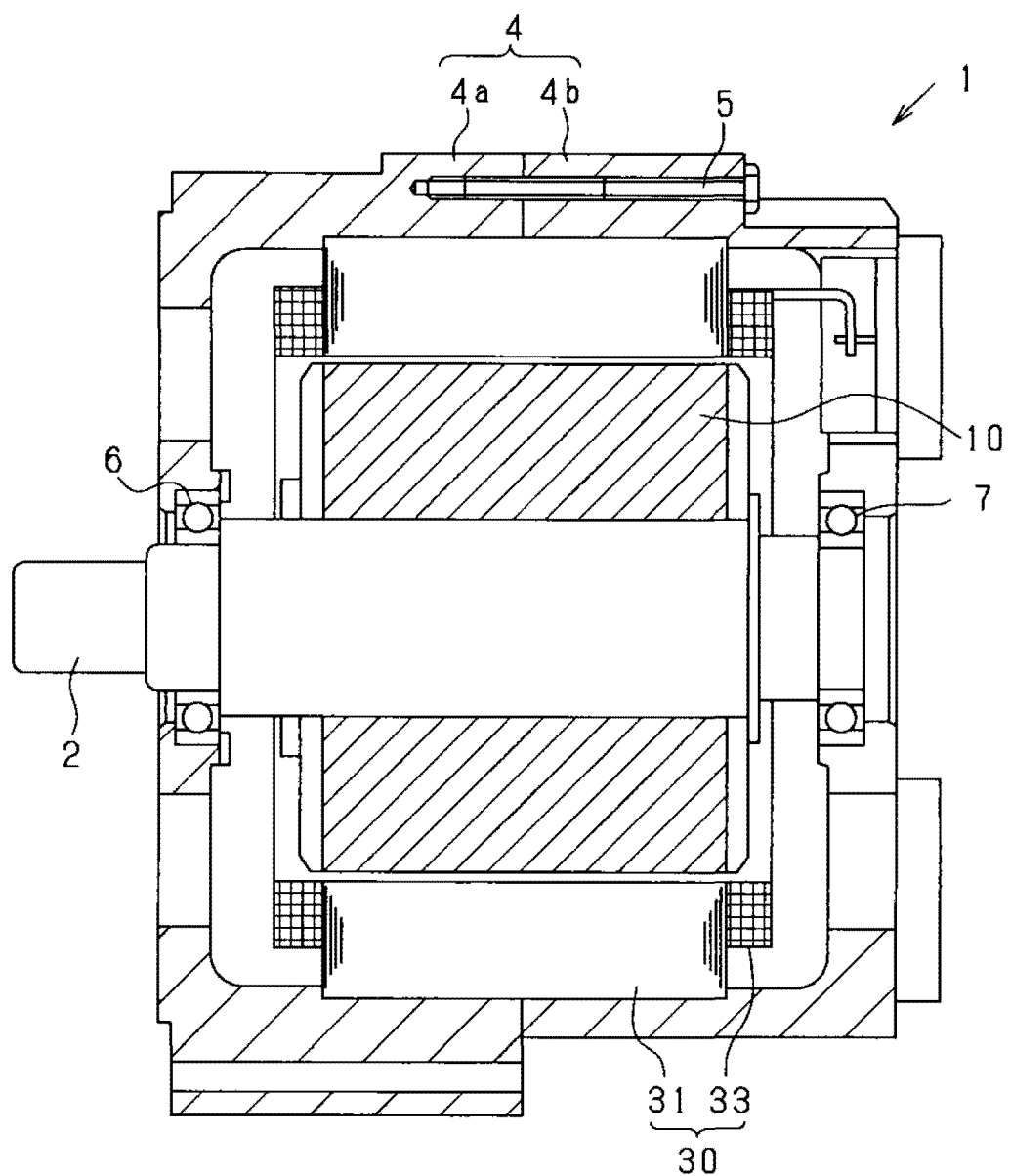
FIG. 1 is a longitudinal cross-sectional view of a rotary electric machine.

The following describes embodiments of the present disclosure with reference to the accompanying drawings. The present disclosure embodies rotary electric machines each serving as a motor; these rotary electric machines are each for example used as a power source for vehicles. As the other applications, each of the rotary electric machines according to the present disclosure can be widely used for industrial use, traffic, home appliances, office automation equipment, and game machines.

Descriptions of elements of each embodiment can be applied to the corresponding elements, to which like reference characters are assigned, of the other embodiments.

First Embodiment

Figure 2:
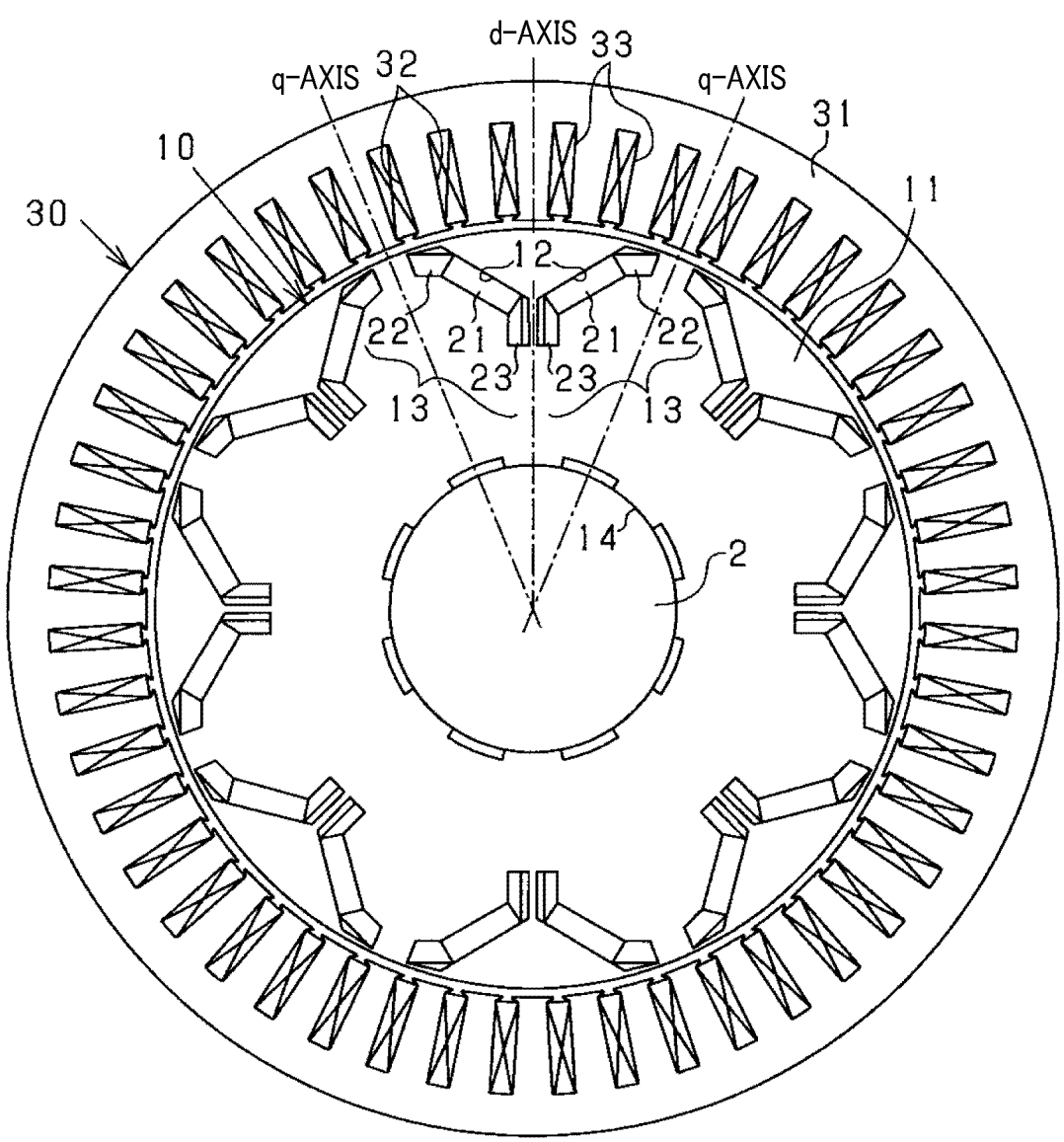
FIG. 2 is a lateral cross-sectional view of a rotor and a stator of the rotary electric machine.

The following describes a schematic structure of a rotary electric machine 1 according to the first embodiment, which is designed as an inner-rotor interior permanent magnet (IPM) motor with reference to FIGS. 1 and 2. FIG. 1 is a longitudinal cross-sectional view of a rotary electric machine taken along the direction of a rotary shaft 2 of the rotary electric machine 1, and FIG. 2 is a lateral cross-sectional view of a rotor 10 and a stator 30 taken along a direction perpendicular to the rotary shaft 2. The following defines an extending direction of the rotary shaft 2 as an axial direction, and directions extending radially around the rotary shaft 2 as radial directions. The following also defines a direction extending circumferentially around the rotary shaft 2 as a circumferential direction.

The rotary electric machine 1 includes the rotor 10, the stator 30, and a housing 4. The rotor 10 is mounted to the rotary shaft 2, and the stator 30 has an annular shape, and is located to surround the rotor 10. The housing 4 houses the rotor 10 and stator 30. The rotor 10 and stator 30 are arranged to be coaxial with each other. The rotor 10 is located at an inner side of the stator 30 in a radial direction of the stator 30 to face the stator 30. An air gap is provided between the outer circumferential surface of the rotor 10 and the inner circumferential surface of the stator 30.

The housing 4 includes a pair of tubular housing members 4a and 4b each having an opening and a bottom. The housing members 4a and 4b are integrated with each other with bolts 5 while the opening of the housing member 4a is joined to the opening of the housing member 4b. Bearings 6 and 7 are mounted to the housing 4, and the rotary shaft 2 and the rotor 10 are rotatably supported by the bearings 6 and 7.

Referring to FIG. 2, the rotor 10 includes a rotor core 11 having a hollow cylindrical shape and an inner circumferential surface to which the rotary shaft 2 is mounted. The rotor core 11 has formed magnet installation holes 12 arranged in the circumferential direction. Magnets 13, such as permanent magnets 13, are installed in the respective installation holes 12. Detailed descriptions of the magnet installation holes 12 will be described later.

The stator 30 includes a stator core 31 having a substantially cylindrical shape, and is comprised of the stack of many electromagnetic steel sheets. The stator core 31 has slots 32 each formed therethrough in its axial direction, and the slots 32 are circumferentially arranged with regular intervals therebetween. For example, three-phase stator windings 33 are wound in the slots 32. The stator core 31 of the first embodiment has 48 slots 32 arranged circumferentially with regular intervals; the 48 slots 32 allows the three-phase stator windings 33 wound therein to conform with a predetermined number of magnetic poles, i.e. poles, of the rotor 10.

Figure 3:
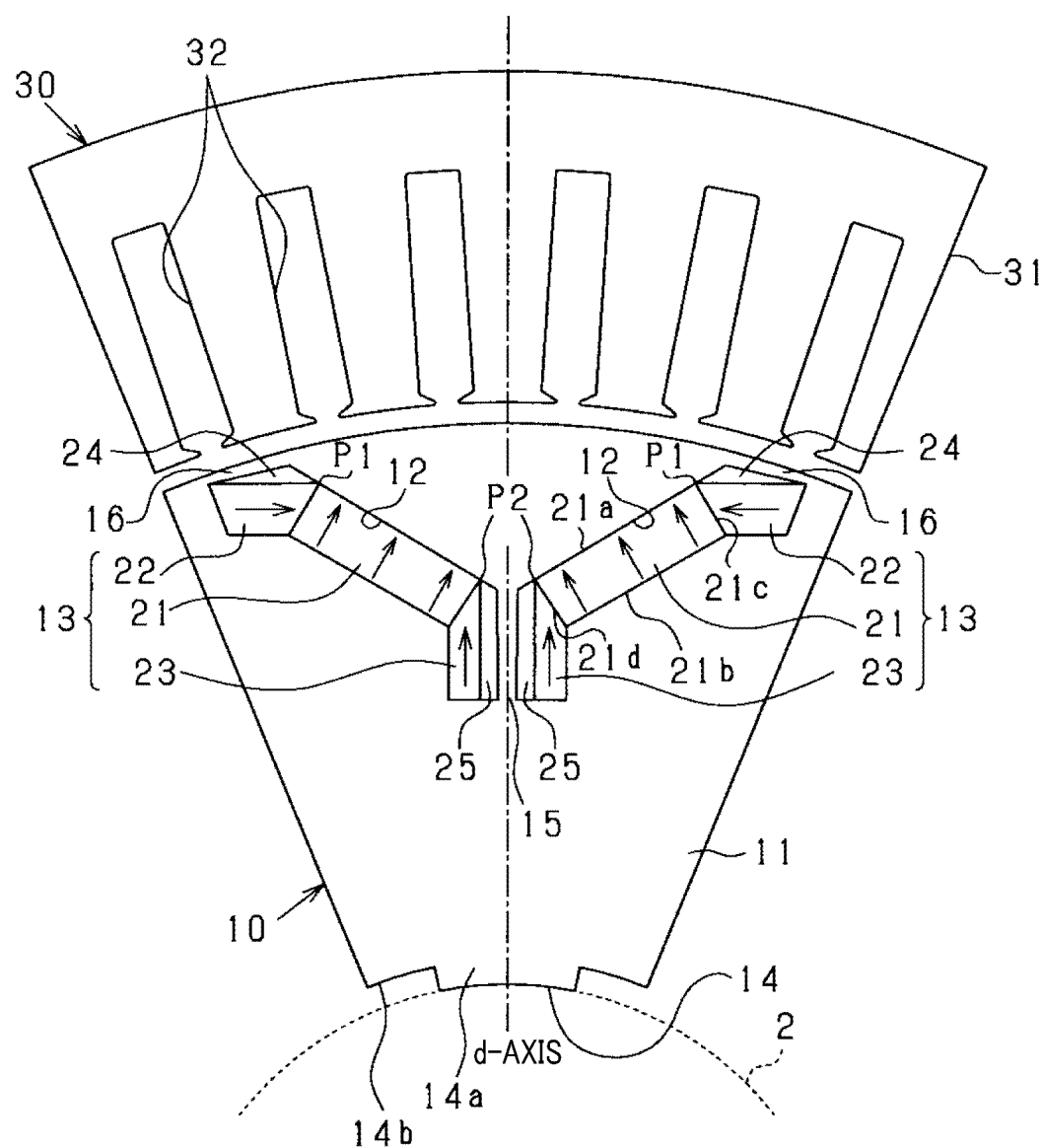
FIG. 3 is a partial plan view of the rotor and the stator of the rotary electric machine.
Figure 4:
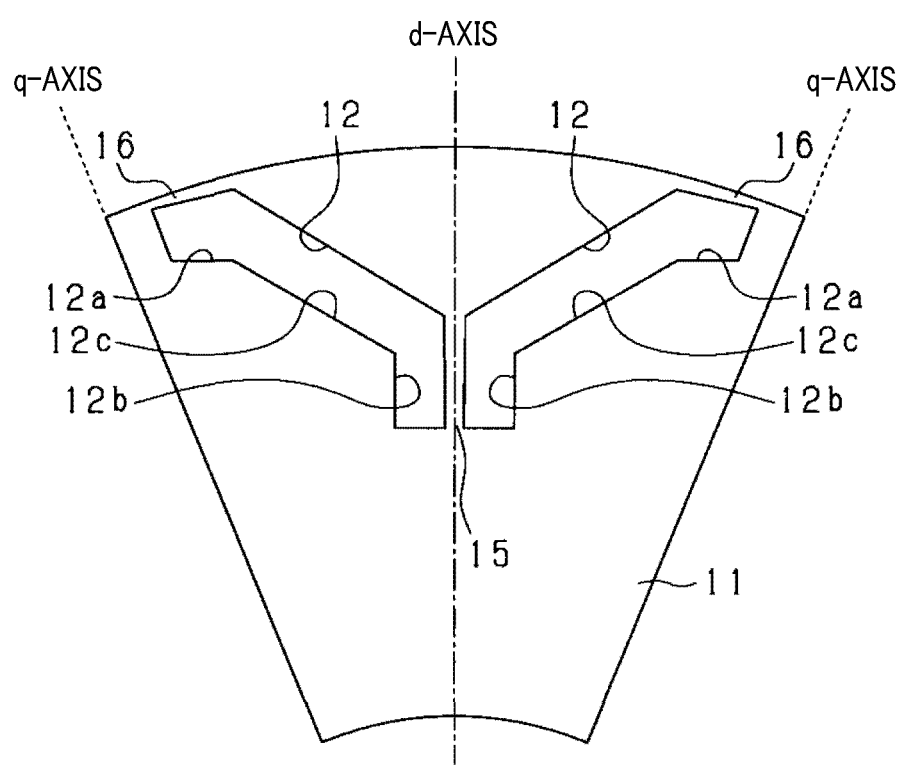
FIG. 4 is a partial plan view of the rotor and the stator of the rotary electric machine.

Next, the following describes the magnet installation holes 12 of the rotor core 11, and the magnets 13 in detail with reference to FIGS. 3 and 4. Note that FIGS. 3 and 4 each illustrate a part of the rotary electric machine 1, which corresponds to one pole in the poles, for example, 8 poles in total, of the rotary electric machine 1.

The rotor core 11 is comprised of many electromagnetic steel sheets stacked to have a substantially cylindrical shape, and has a through hole 14 formed through a center portion of the rotor core 11. Fitting the rotary shaft 2 in the through hole 14 results in the rotor core 11 being mounted to the rotary shaft 2.

Note that the electromagnetic steel sheets constituting the rotor core 11 are fixed to each other in their axial direction using fixture means, such as swages or welds.

As illustrated in FIG. 3, the rotor core 11 has a d-axis and a q-axis, and the fixture means is preferably located at a q-axis magnetic path of the rotor core 11. The rotor core 11 can be fixed to the rotary shaft 2 using adhesive, their concave-convex structures, such as their key and key-groove structures or their spline structures, or press-fitting. Note that the d-axis represents a center axis of magnetomotive force, that is, magnetic flux, and the q-axis represents an axis magnetically perpendicular to the d-axis. In other words, the q-axis usually has no magnetic polarities, i.e. north and south polarities.

The inner circumferential surface 14b of the through hole 14 has formed convex portions 14a each located on the corresponding d-axis; each convex portion 14a projects inwardly in the corresponding radial direction to abut on the outer circumferential surface of the rotary shaft 2. Each convex portion 14a can have any shape, such as a rectangular shape, a trapezoidal shape, or a triangular crest shape. That is, the inner circumferential surface 14b of the through hole 14 has formed the convex portions 14a and concave portions each interposed between a corresponding adjacent pair of the convex portions 14a; the convex portions 14a are configured to abut on the outer circumferential surface of the rotary shaft 2.

Note that, in place of providing the convex portions 14a on the inner circumferential surface of the through hole 14, convex portions can be provided to the outer circumferential surface of the rotary shaft 2.

The magnet installation holes 12, such as sixteen magnet installation holes 12 according to the first embodiment, have been formed through a peripheral portion of the rotor core 11 in the axial direction thereof; the peripheral portion is located to be adjacent to the outer circumferential surface of the rotor core 11, which faces the inner circumferential surface of the stator 30. The magnet installation holes 12 are arranged with regular intervals in the circumferential direction.

The magnet installation holes 12 is comprised of plural pairs of magnet installation holes 12, each pair consists of two magnet installation holes 12. The two magnet installation holes 12 of each pair have a substantially V shape such that a distance between the two magnet installation holes 12 becomes larger toward the radially outside of the rotor core 11. In other words, a distance of each magnet installation hole 12 relative to the stator 30 becomes larger toward the d-axis. The magnet installation holes 12 of each pair have a symmetrical profile with respect to the d-axis, that is, the magnetic pole center axis. The first embodiment provides the total eight pairs of the magnet installation holes 12 in the rotor core 11 so as to be arranged regularly in the circumferential direction.

The combination of the magnets 13 installed in the respective magnet installation holes 12 of each pair serves as a magnet assembly, which will be referred to as a magnet assembly 13; the magnet assembly 13 of each pair constitutes one magnetic pole. That is, the magnet assemblies 13 of eight pairs provide plural magnetic poles, i.e. eight poles in the first embodiment, with their polarities being alternately changed in the circumferential direction. The magnets 13 of each pair constituting one magnetic pole are arranged to be symmetrical with respect to the corresponding d-axis.

Next, the following describes the shape of each magnet installation hole 12 in detail. FIG. 4 illustrates the rotor core 11 having each pair of the magnet installation holes 12 in which the corresponding magnet assembly 13 is not installed. In FIG. 4, an axis radially extending between the magnet installation holes 12 of one pair is defined as the d-axis, and axes, which are located on both outer sides of the magnet installation holes 12 to radially extend, and are magnetically perpendicular to the d-axis, are defined as the q-axes.

Referring to FIG. 4, each magnet installation hole 12 is comprised of a first hole portion 12a, a second hole portion 12b, and a third hole portion 12c. The first hole portion 12a is located to be adjacent to the outer circumferential surface of the rotor core 11 and adjacent to the corresponding q-axis. The second hole portion 12b is located to be closer to the inner circumferential surface of the rotor core 11 and the d-axis than the first hole portion 12a is. The third hole portion 12c connect between the first and second hole portions 12a and 12b.

The first hole portion 12a is arranged to extend along the outer circumferential surface of the rotor core 11, and the second hole portion 12b is arranged to extend along the d-axis. The third hole portion 12c is arranged to linearly join the first and second hole portions 12a and 12b to each other.

Each of the first, second, and third hole portions 12a, 12b, and 12c has a substantially rectangular shape in its lateral cross section that is perpendicular to the axial direction of the rotor core 11. The lateral cross section of each of the first, second, and third hole portions 12a, 12b, and 12c has a length in a longitudinal, i.e. lengthwise, direction of the corresponding one of the first, second, and third hole portions 12a, 12b, and 12c. The length of the lateral cross section of the third hole portion 12c in its lengthwise direction is the longest. Note that, unless otherwise mentioned, the lengthwise direction of each of a magnet and a magnet installation hole represents a lengthwise direction, i.e. a length direction, of the corresponding lateral cross section.

Referring to FIG. 4, the second hole portions 12b of one pair of the magnet installation holes 12 are adjacent to each other across the d-axis, an intermediate bridge 15 of the rotor core 11 is located between the second hole portions 12b so as to radially extend. The intermediate bridge 15, which has a narrow width, causes magnetic flux saturation on the d-axis to thereby inhibit or block the formation of a magnetic circuit. This reduces the amount of leakage flux generated through the intermediate bridge 15.

In addition, the first hole portion 12a of the magnet installation hole 12 has a radially outer wall surface located to be adjacent to the outer circumferential surface of the rotor core 11, resulting in an outer bridge 16 between the first hole portion 12a and the outer circumferential surface of the rotor core 11.

As illustrated in FIG. 3, as the magnet assembly 13, a main magnet 21 is arranged in the third hole portion 12c of each magnet installation hole 12, and auxiliary magnets 22 and 23 are respectively arranged in the first and second hole portions 12a and 12b. That is, the auxiliary magnets 22 and 23 are installed in each magnet installation hole 12 so as to be respectively adjacent to both ends of the main magnet 21. The main magnet 21 has a rectangular shape in its lateral cross section perpendicular to the axial direction of the rotor core 11. The main magnet 21 has opposing flux effective surfaces, i.e. main surfaces, 21a and 21b. The flux effective surface 21a is located to be closer to the stator 30 than the flux effective surface 21b is. Note that a flux effective surface means a surface into which magnetic flux flows, and out of which magnetic flux flows.

The rotor core 11 has a stator-side portion, i.e. a first portion, closer to the stator 30 relative to each magnet installation hole 12, and an opposite stator portion, i.e. a second portion, farther from the stator 30 relative to the corresponding magnet installation hole 12.

The main magnet 21 is arranged such that (1) An orientation of easy axes of magnetization, i.e. easy-magnetization axes, formed therein or magnetization directions, that is, inner magnetic lines constituting magnetic paths, is inclined with respect to the d-axis (2) The orientation of the easy axes of magnetization intersect with the d-axis at the stator-side portion of the rotor core 11 relative to the magnet installation hole 12

The main magnet 21 serves as a first magnet member.

In each embodiment, each of magnets is comprised of a body having previously oriented easy axes of magnetization; the body has been magnetized in one or more predetermined magnetization directions. The magnetized body of each magnet has lines of magnetic flux with respective directions, and the directions of the respective lines of magnetic flux of the magnetized body mean magnetization directions of the corresponding magnet in each embodiment.

Note that, in each embodiment, the orientation of each magnetic path, i.e. each magnetic line, of a magnet shows an orientation of a corresponding magnetic flux thereof. The orientation of each magnetic path can be measured using, for example, probes, or can be computationally calculated.

The main magnet 21 has first and second ends 21c and 21d, which face each other, in the lengthwise direction thereof. The first and second ends 21c and 21d are adjacent to the respective q-axis and d-axis.

The auxiliary magnets 22 and 23 are arranged in the respective first and second holes 12a and 12b, so that the first and second holes 12a and 12b are located to respectively abut on or be adjacent to the first and second ends 21c and 21d of the main magnet 21. Each of the auxiliary magnets 22 and 23 has the easy-magnetization axes thereinside; the easy-magnetization axes (see arrows) are defined to have an orientation intersecting with the easy-magnetization axes of the main magnet 21. For example, rare-earth magnets, such as sintered neodymium magnets, can be used for the main and auxiliary magnets 21, 22, and 23.

These magnets 21 to 23 are preferably arranged to abut on the respective inner wall surfaces of the magnet installation hole 12, but these magnets 21 to 23 can be arranged to face the respective inner wall surfaces of the magnet installation hole 12 with predetermined infinitesimal clearances in consideration of the difference in linear expansion coefficient between the magnets 21 to 23 and the rotor core 11. For example, a resin material or an adhesive can be filled in each of the clearances between the magnets 21 to 23 and the respectively corresponding inner wall surfaces of the magnet installation hole 12 to thereby fix the magnets 21 to 23. Fixture of the magnets 21 to 23 using a resin material or an adhesive reduces noise due to vibration, and reduces imbalances between the phases of electrical currents applied to the stator 30 relative to the rotor 10.

The main magnets 21 each have the largest size of all the magnets 21 to 23, and each pair of the main magnets 21 is provided for the polarity of the corresponding pole. Each of the main magnets 21 has a rectangular shape in its lateral cross section.

As described above, the main magnets 21 of one pair constituting a corresponding pole (for example, the north pole in FIG. 3) each have the easy axes of magnetization, and are arranged such that the easy axes of magnetization are directed toward the d-axis while being inclined with respect to the d-axis.

In particular, each main magnet 21 has the easy axes of magnetization, that is, easy-magnetizable crystal orientations. The easy axes of magnetization of each main magnet 21 are directed to be perpendicular to the first and second flux effective surfaces 21a and 21b, in other words, be parallel to the surfaces of the first and second ends 21c and 21d. This results in the easy axes of magnetization of each main magnet 21 installed in the corresponding magnet installation hole 12 are inclined with respect to the d-axis.

In FIGS. 1 and 3, the north pole is illustrated, so that the easy axes of magnetization of each of the main magnets 21 of the corresponding pair are directed to approach the d-axis toward the outer circumferential surface of the rotor core 11.

Note that, in each embodiment, we should consider, for example, measure, the direction and/or length of each easy axis of magnetization and/or each magnetic path in a magnet used in the corresponding embodiment as long as no magnetic flux generation units, each of which can generate a magnet field greater than the magnetic coercive force of the magnet, are located around the magnet.

An orientation ratio of easy axes of magnetization represents an orientation ratio or percentage of the easy axes of magnetization. An orientation of easy axes of magnetization of a magnet represents an orientation with 50% or more of the orientation ratio, or represents an averaged orientation of the easy axes of magnetization.

For example, the following describes the orientation ratio of a magnet in a first example case where the magnet has six easy axes of magnetization, the five of which are each oriented toward the same first direction while the remaining one of which is oriented toward a second direction perpendicular to the first direction. In this first example case, the orientation ratio is 5/6. As another example, if the remaining one of the six easy axes of magnetization is oriented toward a third direction tilted at 45 degrees to the first direction, the orientation ratio is (5+0.707)/6, because cos 45° is equal to 0.707.

Note that an averaged orientation, i.e. an averaged direction, in aligned orientations of all the easy axes of magnetization, i.e. magnetic paths, of a magnet may be described as one representative direction of easy axis of magnetization or one representative magnetic path direction. Similarly, the orientation or direction of the most common axis in the easy axes of magnetization, which has 50% or more of the orientation ratio, may be described as one representative direction of easy axis of magnetization or one representative magnetic path direction.

The main magnet 21 has a higher value of the orientation ratio for each of the flux effective surfaces 21a and 21b that respectively constitute the long sides of the lateral cross section thereof. The orientation of the main magnet 21 is determined to be perpendicular to the flux effective surfaces 21a and 21b. Note that, if the main magnet 21 has a magnetically aligned component directed to be perpendicular to the flux effective surfaces 21a and 21b, the main magnet 21 can have a function of outputting magnetic flux in the direction perpendicular to the flux effective surfaces 21a and 21b.

The auxiliary magnets 22 and 23 are installed in respective spaces of the magnet installation hole 12, in which the main magnet 21 is not disposed, so as to be respectively adjacent to the surfaces of the first and second ends 21c and 21d of the main magnet 21 in its lengthwise direction. The easy axes of magnetization of each of the auxiliary magnets 22 and 23 are different from the easy axes of magnetization of the main magnet 21. Specifically, the easy axes of magnetization, i.e. the magnetization directions or aligned orientations, of each of the auxiliary magnets 22 and 23 are defined to intersect with the surface of the corresponding one of the first and second ends 21c and 21d of the main magnet 21 in its lengthwise direction.

In the structure illustrated in FIG. 1, the easy axes of magnetization of each of the auxiliary magnets 22 and 23 are defined to be oriented toward the surface of the corresponding one of the first and second ends 21c and 21d of the main magnet 21.

An angle formed between the orientation of the easy axes of magnetization of the main magnet 21 at the first end 21c and the orientation of the easy axes of magnetization of the auxiliary magnet 22 is set to an acute angle smaller than 90 degrees. In other words, an angle between the travel direction of the magnetic paths of the main magnet 21 and the travel direction of the magnetic paths of the auxiliary magnet 22 is set to an acute angle smaller than 90 degrees.

Similarly, an angle formed between the orientation of the easy axes of magnetization of the main magnet 21 at the second end 21d and the orientation of the easy axes of magnetization of the auxiliary magnet 23 is set to an acute angle smaller than 90 degrees. In other words, an angle between the travel direction of the magnetic paths of the main magnet 21 and the travel direction of the magnetic paths of the auxiliary magnet 23 is set to an acute angle smaller than 90 degrees.

The first embodiment is configured such that the auxiliary magnets 22 and 23 are provided to be respectively adjacent to the respective ends of the main magnet 21 in its lengthwise direction. This configuration enables the main magnet 21 to be positioned while the main magnet 21 is supported by the auxiliary magnets 22 and 23. This configuration therefore eliminates formation of positioning projections at walls of the rotor core 11 surrounding the magnet installation hole 12 for fixing the main magnet 21. This makes it possible to eliminate the need of designing the rotor core 11 and the main magnet 21 in consideration of the difference in linear expansion coefficient between the positioning projections of the rotor core 11 and the main magnet 21.

As described above, the radially outer wall surface of the first hole portion 12a of the magnet installation hole 12 is located to be adjacent to the outer circumferential surface of the rotor core 11, resulting in the outer bridge 16 between the first hole portion 12a and the outer circumferential surface of the rotor core 11. The outer bridge 16, which has a narrow width, prevents self-shorting of the magnetic flux of the auxiliary magnet 22 in the vicinity of the outer circumferential surface of the rotor core 11.

The auxiliary magnets 22 and 23 in addition to the main magnet 21, which constitute the magnet assembly 13 arranged in the magnet installation hole 12 results in an improvement of demagnetization-resistance performance at the respective both ends, i.e. the first and second ends 21c and 21d, of the main magnet 21 in its lengthwise direction. That is, the auxiliary magnets 22 and 23 extend the magnetic paths in the magnet installation hole 12 to thereby increase the magnetic permeance of the magnetic assembly 13, making it possible to strengthen the resistance of the magnetic assembly 13 against opposite magnetic field, such as demagnetization field. The following describes it in detail.

Figure 5A:
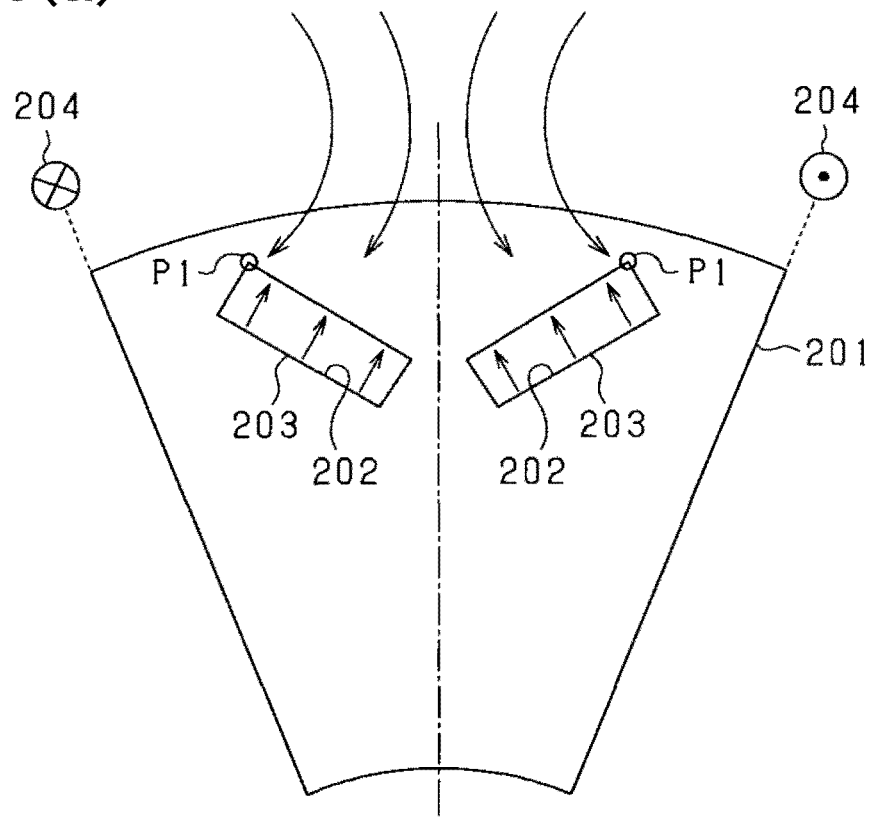
FIG. 5(a) and FIG. 5(b) are views illustrating an influence of a demagnetization field with respect to magnets.
Figure 5B:
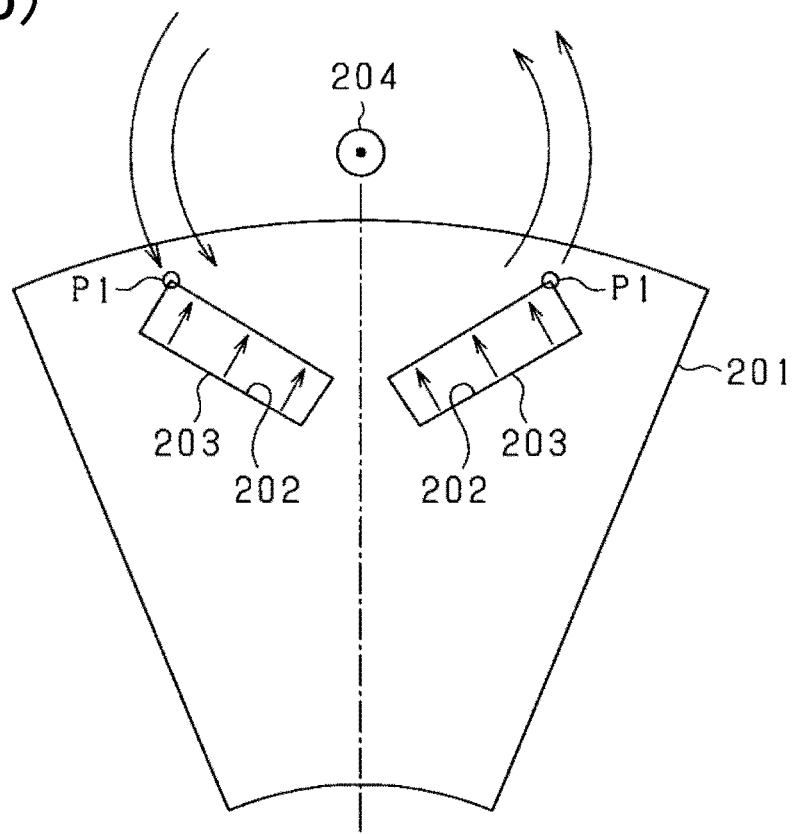
Figure 6:
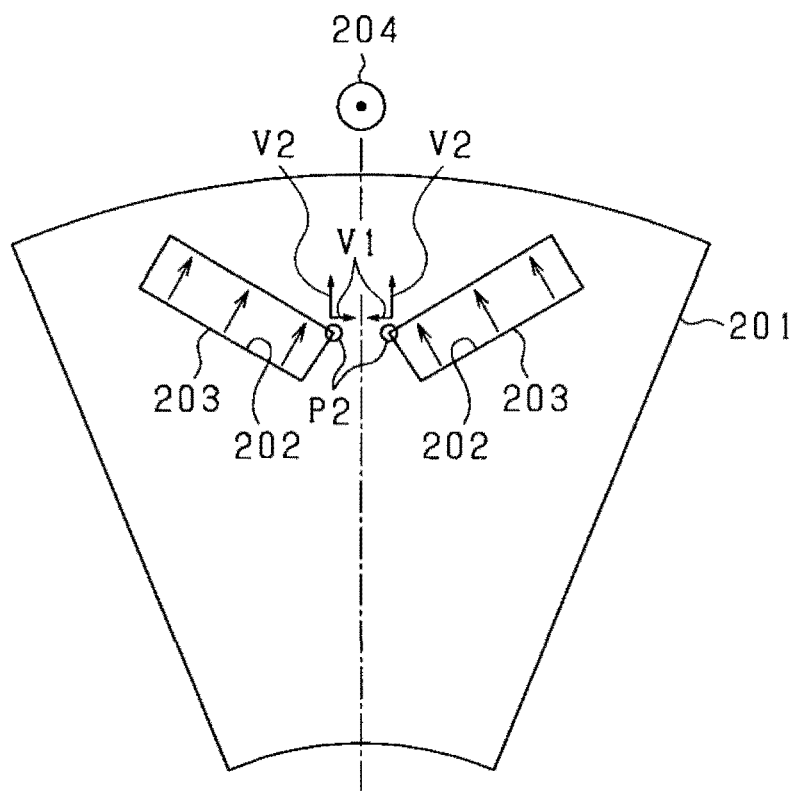
FIG. 6 is a view illustrating a mutual interference among magnetic flux components.

In particular, the following describes features of the rotor 10 while describing a rotor having magnets arranged to have a V shape illustrated in FIGS. 5(a), 5(b), and 6 as a comparative example.

In the rotor illustrated in FIGS. 5(a), 5(b), and 6, rectangular magnet installation holes 202 are formed in a rotor core 201 to be symmetrical with respect to the d-axis; the magnet installation holes 202 are arranged to have a V shape. A pair of permanent magnets 203 are respectively installed in the magnet installation holes 202 while the easy axes of magnetization of each of the permanent magnets 203 are inclined with respect to the d-axis.

Each of FIGS. 5(a) and 5(b) illustrates that energizing conductors 204 of the stator windings causes the stator to generate a rotating magnetic field serving as a demagnetization field.

Specifically, FIG. 5(a) illustrates a first energization state where the conductor 204 located on the q-axis is energized, and FIG. 5(b) illustrates a second energization state where the conductor 204 located on the d-axis is energized. In each of the first and second energization states, the corresponding rotating magnetic field generated by the stator acts on the rotor as a demagnetization field. In the comparative example, the demagnetization field may demagnetize a corer P1 of a q-axis side end of each permanent magnet 203.

For addressing such an issue, the auxiliary magnet 22 provided to be adjacent to or abut on the first end 21c of the main magnet 21 has the following functions.

As illustrated in FIG. 3, the auxiliary magnet 22 is configured such that the easy axes of magnetization thereof are oriented to be closer to the right angle to the q-axis than those of the main magnet 21, thus strengthening the magnetic flux of the q-axis side end of the main magnet 21 by the magnetic flux of the auxiliary magnet 22. This therefore causes the magnetic flux to be applied from the auxiliary magnet 22 to the q-axis side end of the main magnet 21; the applied magnetic flux counteracts the demagnetization flux from the stator 30. This results in an improvement of the resistance of the rotor around the q-axis against the demagnetization field.

The auxiliary magnet 22 is provided to face the surface of the first end 21c of the main magnet 21. This increases the length of a target magnetic path in the auxiliary magnet 22 passing through a near-side corner P1 of the main magnet 21 to the stator 30, which is extracted from magnetic paths in the auxiliary magnet 22 oriented toward the surface of the first end 21c of the main magnet 21, to be longer than the lengths of the magnetic paths in the auxiliary magnet 22 passing through the other points of the main magnet 21.

This configuration efficiently reduces demagnetization of the corner P1 of the first end 21c of the main magnet 21; the corner P1 has the highest possibility of demagnetization in all the points of the first end 21c of the main magnet 21. Note that the length of the magnetic path in the auxiliary magnet 22 passing through any point can be set to a constant length.

Referring to FIG. 6, the easy axes of magnetization of each permanent magnet 203 are inclined with respect to the d-axis, and an extending direction of each easy axis of magnetization intersects with the d-axis. This configuration may cause, for the north pole, the magnetic flux outputted from the right-and-left permanent magnets 203 to be oriented toward the d-axis, so that the magnetic fluxes interfere with each other. This may result in demagnetization of the permanent magnets 203.

Specifically, the magnetic flux outputted from each of the right-and-left permanent magnets 203 include magnetic flux vectors V1 perpendicular to the d-axis, and magnetic flux vectors V2 parallel to the d-axis. The magnetic flux vectors V1 perpendicular to the d-axis interfere with each other. This may result in demagnetization of a d-axis side corner P2 of each permanent magnet 203.

Against these issues, the auxiliary magnet 23 located to be adjacent to the d-axis side end of each main magnet 21 performs the following functions. Specifically, as illustrated in FIG. 3, the auxiliary magnet 23 has the easy axes of magnetization that are parallel to the d-axis, so that the magnetic flux of the auxiliary magnet 23 strengthen the magnetic flux of the second end 21d of each main magnet 21. That is, the magnetic flux of the auxiliary magnet 23 supplement opposite magnetic flux of the right-and-left main magnets 21 to thereby improve resistance of the rotor around the d-axis against the demagnetization field.

Note that, for designing torque of the rotary electric machine 1, multiplying the effective flux density of a magnet by the surface area of the magnet calculates magnet force of the magnet. Magnet force of the magnet assembly installed in the magnet installation hole 12 depends on an inclination angle of the magnet force of the magnet assembly with respect to the d-axis. For this reason, the smaller an angle of the V-shaped magnet installation holes 12, i.e. the smaller the inclination angle of the lengthwise direction of the main magnet 21 with respect to the d-axis, the larger the effect of the auxiliary magnet 23.

The auxiliary magnet 23 is arranged to face the surface of the second end 21d of the main magnet 21. The length of at least one magnetic path passing through the corner P2 closer to the stator 30 in the magnetic paths directed toward the surface of the second end 21d of the main magnet 21 is longer than the lengths of the other magnetic paths. This efficiently reduces demagnetization of the corner P2 that has the highest possibility of demagnetization in the d-axis side end of the main magnet 21. Note that the length of the magnetic path in the auxiliary magnet 23 passing through any point can be set to a constant length.

Note that, in a conventional technology, each magnet installation hole 12 includes spaces in which no main magnet is installed, or includes a non-magnetic material or a fixing adhesive filled in each of the spaces, so that the spaces serve as dead spaces.

In contrast, the auxiliary magnets 22 and 23 are arranged in the respective dead spaces, making it possible to reinforce the magnetic flux without increasing the size of the magnet assembly 13.

Although illustration is omitted, for the magnet assembly 13 serving as the south pole, the easy axes of magnetization of the main magnet 21 and auxiliary magnets 22 and 23 are oriented in the opposite directions as compared with the easy axes of magnetization of the main magnet 21 and auxiliary magnets 22 and 23 of the magnet assembly 13 serving as the north pole.

A portion in the magnet installation hole 12, in which no magnetic assembly 13 is disposed, serves as a flux barrier that reduces self-shorting of magnet flux in the rotor 10. In the structure illustrated in FIG. 3, an outer flux barrier 24 is provided in an outer peripheral region of the first hole portion 12a of the magnet installation hole 12. The outer flux barrier 24 reduces self-shorting of the magnetic flux at an outer peripheral portion of the rotor core 11, which is adjacent to the outer circumferential surface of the rotor core 11 facing the stator 30; the outer peripheral portion is located to be close to the auxiliary magnet 22.

In addition, the flux barrier 24 reduces demagnetization of the auxiliary magnet 22 due to the demagnetization field from the stator 30. A space in the outer peripheral region of the first hole portion 12a of the magnet installation hole 12, in which no magnetic assembly 13 is disposed, can serve as the outer flux barrier 24, or a non-magnetic material filled in the space can serve as the outer flux barrier 24.

In a region in the second hole portion 12b of each magnet installation hole 12, which is adjacent to the auxiliary magnet 23 and to the d-axis, an inner flux barrier 25 is provided. That is, each of the second hole portions 12b serves as a d-axis side expanded portion. In each of the second holes 12b, the auxiliary magnet 23 is provided, and the inner flux barrier 25 is provided to be closer to the d-axis than the auxiliary magnet 23 is.

The inner flux barriers 25 reduce magnetic flux components oriented to be perpendicular to the d-axis from the auxiliary magnets 22 and 23 that are arranged on both sides of the d-axis. The inner flux barriers 25 also reduce an inductance in the d-axis to thereby efficiently create reluctance torque. A void or a space in the region in the second hole portion 12b of each magnet installation hole 12, which is adjacent to the auxiliary magnet 23 and to the d-axis, can serve as the inner flux barrier 25, or a non-magnetic material filled in the space can serve as the inner flux barrier 25.

Demagnetization of each of the auxiliary magnets 22 and 23 is basically acceptable. This is because a surface of the main magnet 21, which abuts on the rotor core 11, mainly serves to output magnetic flux in the magnet assembly 13, and the auxiliary magnets 22 and 23 serve to improve the magnetic permeance of the magnet assembly 13. For this reason, the first embodiment uses neodymium magnets as the respective auxiliary magnets 22 and 23; the neodymium magnets have a composition with 1. A higher value of the remanent flux density Br than the main magnet 21
2. A smaller value of the coercive force iHc than the main magnet 21

Combination of different types of materials, such as neodymium magnets and ferrite magnets, can be selected as the material of each of the auxiliary magnets 22 and 23.

Magnets, which have a smaller value of the coercive force than neodymium magnets, include samarium magnets, ferrite magnets, FCC magnets, and alnico magnets in order of decreasing coercive force. That is, if a samarium magnet is selected as the main magnet 21, it is possible to select a ferrite magnet as the material of each of the auxiliary magnets 22 and 23, which sufficiently obtains desired effects in the first embodiment.

Note that, for avoiding demagnetization, a conventional technology may use magnets each configured to 1. Have a portion with a larger thickness; this portion is subjected to a large demagnetization field
2. Contain a larger percentage of heavy rare-earth elements, and/or
3. Have a finer design In contrast, the rotary electric machine 1 according to the first embodiment is configured to substantially halve the demagnetization field, making it possible to construct the rotary electric machine 1 using non rare earth magnets. Eliminating the usage of heavy rare earth elements, which are valuable in current vehicular products, enables the percentage of neodymium elements with higher flux density in the magnets to be increased. This results in the rotary electric machine 1 having the output torque more than thirty percent of the output torque of a rotary electric machine of the conventional technology while 1. Maintaining the total amount of magnets used by the machine 1, which is the same as that used by the rotary electric machine of the conventional technology
2. Maintaining or reducing the cost of the rotary electric machine 1 as compared with the cost of the rotary electric machine of the conventional technology The first embodiment described above obtains the following excellent effects.

Each magnet assembly 13 of the rotor 10 includes the auxiliary magnet 22 in addition to the main magnet 21 that generates magnetic flux based on a predetermined polarity. The auxiliary magnet 22 is provided to abut on or be adjacent to the first end 21c, i.e. a pole-boundary side end, of each main magnet 21 such that the easy axes of magnetization in the auxiliary magnet 22 intersect with the easy axes of magnetization of the corresponding main magnet 21.

This configuration enables the auxiliary magnet 22 to strengthen magnetic flux of the first end 21c. This results in an improvement of demagnetization-resistance performance at the first end 21c of the main magnet 21 against the demagnetization field, thus appropriately reducing demagnetization of the main magnet 21 serving as a magnet for generating the corresponding magnetic pole.

The auxiliary magnet 23 is provided to abut on or be adjacent to the second end 21d of each main magnet 21 such that the easy axes of magnetization in the auxiliary magnet 23 intersect with the easy axes of magnetization of the corresponding main magnet 21.

This configuration enables the auxiliary magnet 23 to strengthen magnetic flux of the second end 21d. This results in an improvement of demagnetization-resistance performance against mutual flux interferences in the vicinity of the d-axis, thus appropriately reducing demagnetization of the main magnet 21

There may be a high possibility of demagnetization at the corner P1 of the surface of the first end 21c of the main magnet 21; the surface of the first end 21c faces the q-axis. The corner P1 is closer to the stator 30 than the opposite corner of the end surface of the first end 21c. From this viewpoint, the auxiliary magnet 22 is provided to face the surface of the first end 21c. This increases the length of a target magnetic path in the auxiliary magnet 22 passing through the corner P1 of the main magnet 21 to be longer than the lengths of the magnetic paths in the auxiliary magnet 22 passing through the other points of the main magnet 21. That is, this configuration selects the corner P1 as a magnetic-flux strengthening point, and causes the auxiliary magnet 22 to reinforce the magnetic-flux strengthening point. This configuration efficiently reduces demagnetization of the first end 21c of the main magnet 21.

There may also be a high possibility of demagnetization at the corner P2 of the surface of the second end 21d of the main magnet 21; the surface of the second end 21d faces the d-axis. The corner P2 is closer to the stator 30 than the opposite corner of the end surface of the second end 21d. From this viewpoint, the auxiliary magnet 23 is provided to face the surface of the second end 21d. This increases the length of a target magnetic path in the auxiliary magnet 23 passing through the corner P2 of the main magnet 21 to be longer than the lengths of the magnetic paths in the auxiliary magnet 23 passing through the other points of the main magnet 21. That is, this configuration selects the corner P2 as a magnetic-flux strengthening point, and causes the auxiliary magnet 23 to reinforce the magnetic-flux strengthening point. This configuration efficiently reduces demagnetization of the second end 21d of the main magnet 21.

The auxiliary magnet 23 and the inner flux barrier 25 are provided in the second hole 12b, i.e. the d-axis side expanded portion, in each magnet installation hole 12. This configuration obtains the above desired effects while reducing the amount of magnet material in the auxiliary magnet 23 at the d-axis side end of the main magnet 21, thus resulting in reduction of the cost of the rotor 10.

Each of the auxiliary magnets 22 and 23 can have a smaller value of the coercive force iHc than the main magnet 21. This configuration makes it possible to magnetically strengthen the main magnet 21 while using an affordable magnet as each of the auxiliary magnets 22 and 23.

Note that each main magnet 21 can have a smaller value of the coercive force iHc than each of the auxiliary magnets 22 and 23. This configuration makes it possible to use an affordable magnet as each main magnet 21, thus reducing the cost of the magnets of the rotor 10. This configuration efficiently reduces the cost of the rotor 10, because magnet flux is substantially determined by the total surface area of all the main magnets 21.

The configuration where each of the auxiliary magnets 22 and 23 has a smaller value of the coercive force iHc than the main magnet 21 increases the resistance of the magnetic assembly 13 against demagnetization. The configuration of the rotor 10 therefore can be preferably used when the rotor 10 is subjected to a strong demagnetization field from the stator 30.

The auxiliary magnets 22 and 23 located at both ends of the main magnet 21 respectively can have different values of the coercive force iHc. This makes it possible to, even if the first degree of influence of the d-axis side end of the main magnet 21 from a demagnetization field is different from the second degree of influence of the q-axis side end of the main magnet 21 from the demagnetization field, appropriately set values of the coercive force iHc for the respective auxiliary magnets 22 and 23 in accordance with the first and second degrees of influence of the respective d-axis and q-axis side ends of the main magnet 21 from the demagnetization field.

The inner circumferential surface of the through hole 14 has formed the convex portions 14a each located on the corresponding d-axis; each convex portion 14a projects inwardly in the corresponding radial direction to abut on the outer circumferential surface of the rotary shaft 40.

While the rotor core 11 is assembled to the rotary shaft 40, each magnetic assembly 13 is subjected to corresponding stress from the inner circumferential surface of the through hole 14 of the rotor core 11 toward the radially outside. This reduces the quantity of deviation of each magnetic assembly 13 from its designed position, making it possible to reduce inconvenience, such as unintentional change of the magnetic characteristics of the corresponding magnetic assembly 13.

The following describes modifications of the rotor 10 according to the first embodiment; at least one part of the rotor 10 is modified in each modification. The following describes mainly the different points between the structure of the rotor 10 according to each modification and the structure of the rotor 10 illustrated in FIG. 1. Note that, in the following figures, other components except for the rotors 10 of the respective modifications are omitted from illustration. In each modification, the corresponding rotor 10 is arranged at the radially inner side of the stator 30 to face the stator 30.

First Modification

Figure 7:
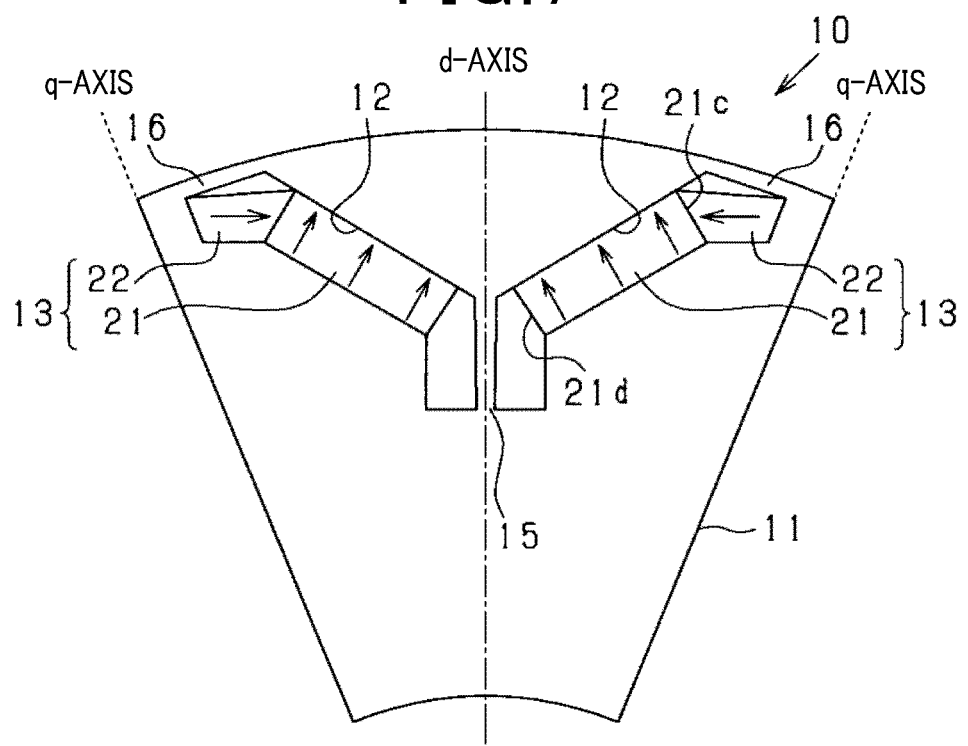
FIG. 7 is a partial plan view of a rotor according to a first modification of the first embodiment.

The rotor 10 according to the first modification illustrated in FIG. 7 includes the auxiliary magnet 22 arranged only at the first end 21c of each main magnet 21 without using the auxiliary magnet 23. For example, if the main magnets 21 of each pair have relatively small magnetic forces that degauss with each other, it is possible to eliminate the d-axis side auxiliary magnets 23.

Second Modification

Figure 8:
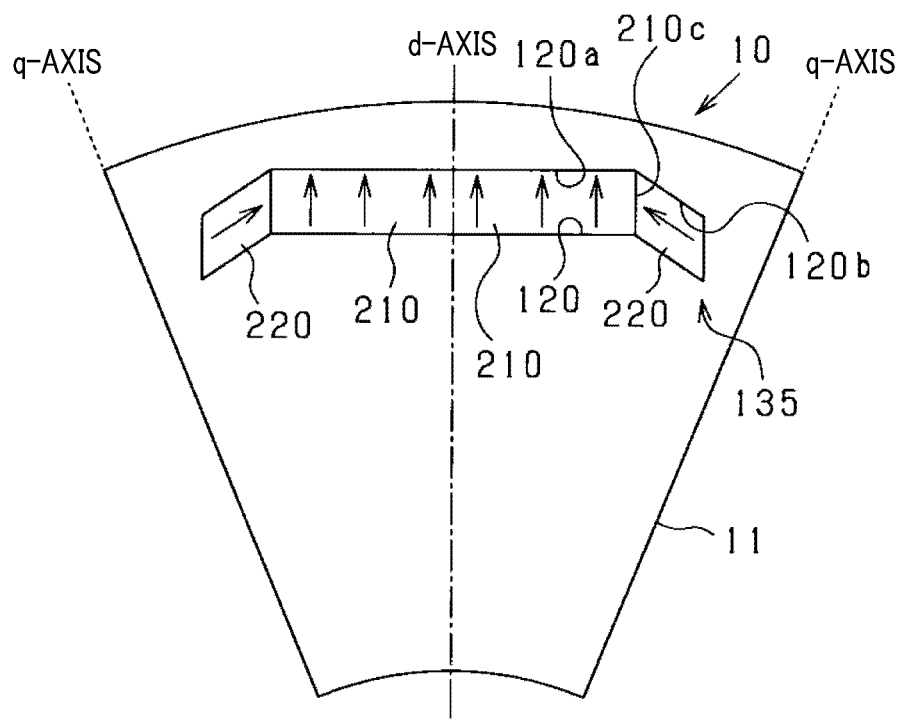
FIG. 8 is a partial plan view of a rotor according to a second modification of the first embodiment.

The rotor core 11 of the rotor 10 according to the second modification illustrated in FIG. 8 includes eight magnet installation holes 120 that have been formed through a peripheral portion of the rotor core 11 in the axial direction thereof; the peripheral portion is located to be adjacent to the outer circumferential surface of the rotor core 11, which faces the inner circumferential surface of the stator 30. The magnet installation holes 120 are arranged with regular intervals in the circumferential direction.

In the second modification, a magnet assembly 135 installed in each of the magnet installation holes 120 constitutes one magnetic pole. That is, the eight magnet assemblies 135 provide plural magnetic poles, i.e. eight poles, with their polarities being alternately changed in the circumferential direction. Each magnet assembly 135 constituting a corresponding pole (for example, the north pole in FIG. 8) is arranged to be symmetrical with respect to the corresponding d-axis.

Specifically, each magnet installation hole 120 is comprised of a first hole portion 120a, and second hole portions 120b.

The first hole portion 120a is symmetrically located on the corresponding d-axis that is the center of the corresponding magnetic pole, and is arranged to be perpendicular to the corresponding d-axis. Each of the second hole portions 120b is bent from the corresponding one of the ends of the first pole portion 120a at a predetermined angle to extend toward the rotary shaft 2. The rotor 10 includes main magnets 210, each of which has a rectangular shape in its lateral cross section, installed in the respective first hole portions 120a. The rotor 10 also includes plural pairs of auxiliary holes 220; the auxiliary holes 220 of each pair are installed in the respective second hole portions 120 of the corresponding magnet installation holes 120.

That is, as is the case with the rotor 10 illustrated in FIG. 7, the auxiliary magnets 220 are provided to be adjacent to the respective first ends 210c of the main magnet 210.

Third Modification

Figure 9:
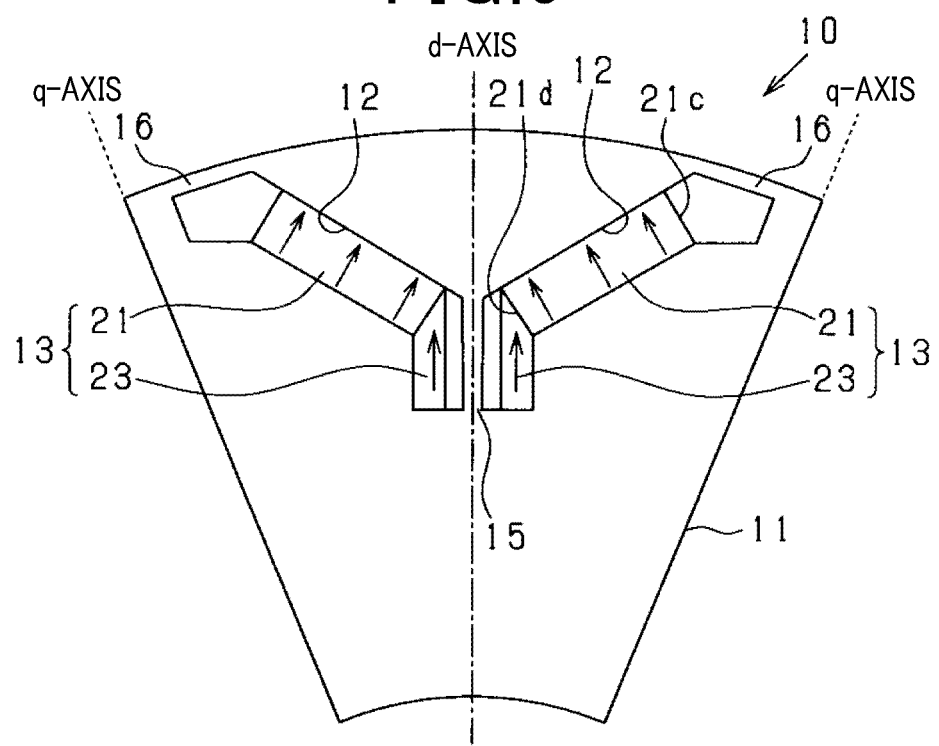
FIG. 9 is a partial plan view of a rotor according to a third modification of the first embodiment.

The rotor 10 according to the third modification illustrated in FIG. 9 includes the auxiliary magnet 23 arranged only at the second end 21d of each main magnet 21 without using the auxiliary magnet 22. For example, if the demagnetization field from the stator 30 is relatively small, it is possible to eliminate the q-axis side auxiliary magnets 22.

Fourth Modification

Figure 10:
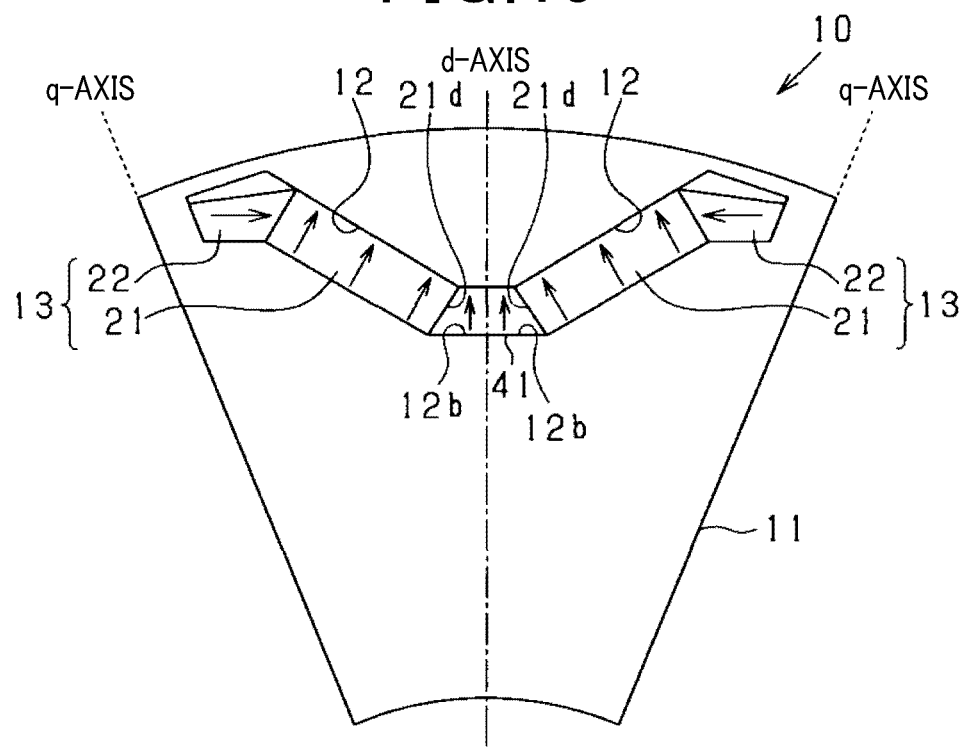
FIG. 10 is a partial plan view of a rotor according to a fourth modification of the first embodiment.

The rotor 10 according to the fourth modification illustrated in FIG. 10 is configured such that the second hole portions 12b of the respective magnet installation holes 12 of each pair are joined to each other. This results in the integrated magnet installation holes 12 being continuously arranged on the d-axis in the circumferential direction of the rotor 10.

An auxiliary magnet 41 is provided in the integrated combination of the second hole portions 12b of the integrated combination of the magnet installation holes 12. The auxiliary magnet 41 is arranged between the right-and-left pair of main magnets 21 installed in the respective magnet installation holes 12 of the integrated combination.

The auxiliary magnet 41 is located to abut on or be adjacent to the second ends 12b of the respective main magnets 21, and the easy axes of magnetization of the auxiliary magnet 41 are oriented to be parallel to the d-axis.

The rotor 10 of the fourth modification reinforces the magnetic flux of the second end 21d of each of the main magnets 21. That is, like the auxiliary magnet 23 illustrated in, for example, FIG. 1, the magnetic flux of the auxiliary magnet 41 supplements opposite magnetic flux of the rightand-left main magnets 21 to thereby improve resistance of the rotor around the d-axis against the demagnetization field.

Fifth Modification

Figure 11:
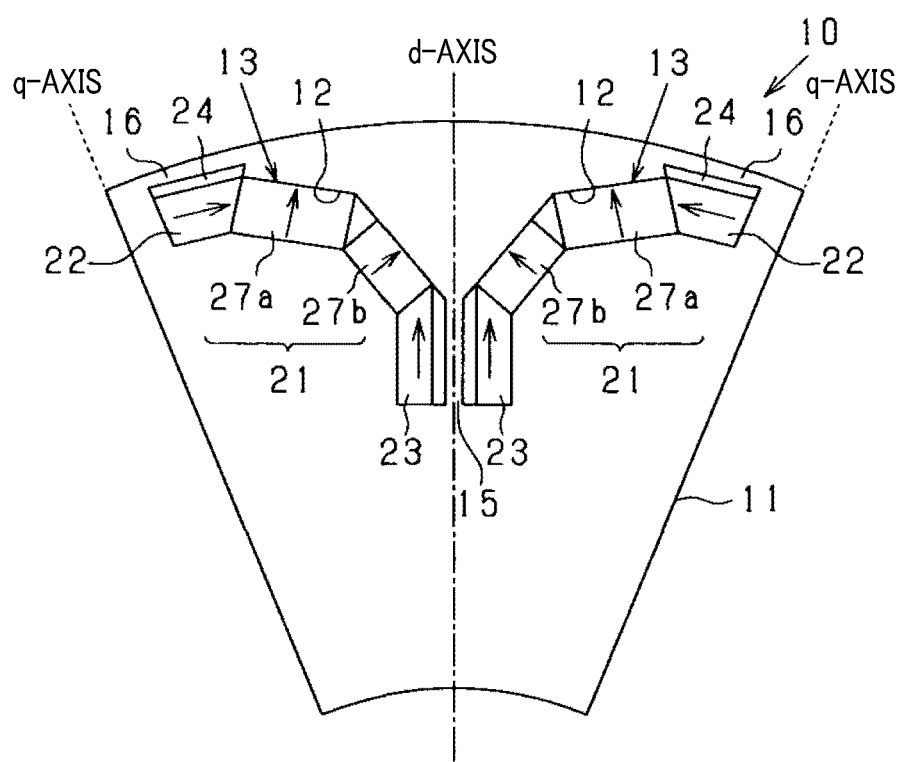
FIG. 11 is a partial plan view of a rotor according to a fifth modification of the first embodiment.

In the rotor 10 according to the fifth modification illustrated in FIG. 11, each main magnet 21 is comprised of magnet segments 27a and 27b, which has been obtained by dividing the corresponding main magnet 21 in the longitudinal direction, i.e. in the direction from the q-axis to the d-axis. The easy axes of magnetization of the magnet segment 27a are different from the easy axes of magnetization of the magnet segment 27b. Each of the magnet segments 27a and 27b is comprised of a permanent magnet having a substantially rectangular shape in its lateral cross section. The magnet segment 27a, which is arranged to be closer to the d-axis than the magnet segment 27b thereto, is configured such that the easy axes of magnetization of the magnet segment 27a are oriented to be closer to the q-axis than the easy axes of magnetization of the magnet segment 27b thereto.

According to the configuration of the rotor 10 of the fifth modification, the easy axes of magnetization of the magnet segment 27a, which are closer to the corresponding q-axis than the easy-magnet axes. This results in an improvement of demagnetization-resistance performance at the d-axis side end of the main magnet 21 against the demagnetization field, thus appropriately reducing demagnetization of the main magnet 21 serving as a magnet for generating the corresponding magnetic pole.

The magnet segments 27a and 27b are arranged such that their adjacent corners face each other, and the adjacent corners convexly project toward the stator 30.

That is, the magnet segments 27a and 27b are not arranged in a single line segment, but are disposed to be respectively bent in two-line segments, so that the magnet segments 27a and 27b convexly project toward the stator 30.

This enables the main magnet 21, i.e. the magnet segments 27a and 27b, to be closer to the outer circumferential surface of the rotor core 11. This makes smaller the minimum distance between the stator 30 and the main magnet 21, thus increasing torque of the rotary electric machine 1. Making shorter the minimum distance between the stator 30 and the main magnet 21 may cause a demagnetization field to increase. The auxiliary magnets 22 and 23 of the fifth modification however reduce the influence of the increase in the demagnetization field.

This arrangement of the magnet segments 27a and 27b enables the area of a region of the rotor core 11, which is located to be closer to the stator 30 than each magnet assembly 13, i.e. the magnet installation hole 12, is, to be smaller; the region is subjected to the sum of the magnetic flux of the stator 30 and the magnetic flux of the corresponding magnet assembly 13. This therefore reduces, in the rotor 10, a saturation region in which magnetic saturation may occur based on the magnetic flux of the stator 30 and the magnetic flux of each magnet assembly 13, thus more efficiently obtain the performance from each magnet assembly 13.

Sixth Modification

Figure 12:
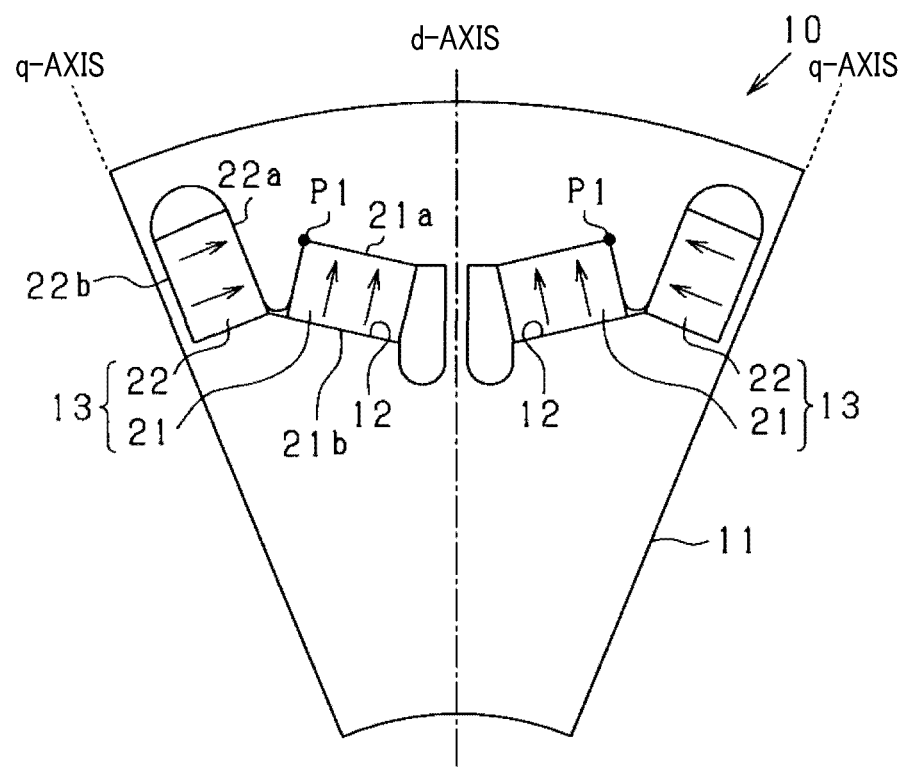
FIG. 12 is a partial plan view of a rotor according to a sixth modification of the first embodiment.

In the rotor 10 according to the sixth modification illustrated in FIG. 12, each magnet assembly 13 includes the main magnet 21, and the auxiliary magnet 22 located to be adjacent to or abut on the first end 21c of the main magnet 21. Each of the main magnet 21 and auxiliary magnet 22 has a rectangular shape in its lateral cross section.

The easy axes of magnetization of the main magnet 21 are perpendicular to the opposing flux effective surfaces 21a and 21b, and the easy-magnetization axes of the auxiliary magnet 22 are perpendicular to the opposing flux effective surfaces 22a and 22b. The main magnet 21 and auxiliary magnet 22 are disposed in the magnet installation hole 12 of the rotor core 11 such that an angle of each easy axis of magnetization of the main magnet 21 with respect to the d-axis or q-axis is different from an angle of each easy axis of magnetization of the auxiliary magnet 22 with respect to the d-axis or q-axis.

The main magnet 21 and the auxiliary magnet 22 are located to be separated from each other. Specifically, the auxiliary magnet 22 is arranged to face a surface of a q-axis side end of the main magnet 21 across a portion of the rotor core 11. The easy-magnetization axes of the main magnet 21 are parallel to or inclined with the d-axis, and the angle of each of the easy axes of magnetization of the auxiliary magnet 22 with respect to the d-axis is closer to 90 degrees than the angle of each of the easy axes of magnetization of the main magnet 21 with respect to the d-axis is.

The corner P1 of the main magnet 21, which is a flux strengthening point being the closest to the stator 30 in all points of the q-axis side end of the main magnet 21, is located on an extension of a corresponding easy axis of magnetization of the auxiliary magnet 22. The magnetic flux of the auxiliary magnet 22 strengthen the corner P1 of the main magnet 21.

Magnets, each of which has a rectangular shape in its lateral cross section and has easy axes of magnetization oriented to be perpendicular to a pair of opposing flux effective surfaces thereof, are most versatile and superior in terms of manufacturing and cost. The sixth modification uses such magnets as the respective main magnet 21 and auxiliary magnet 22, and is configured such that an angle of each easy axis of magnetization of the main magnet 21 with respect to the d-axis or q-axis is different from an angle of each easy axis of magnetization of the auxiliary magnet 22 with respect to the d-axis or q-axis.

This configuration efficiently reinforces the q-axis side end of the main magnet 21 while the rotor 10 has a simpler structure.

Note that, in the above configuration of the sixth modification, magnets, which have the same dimensions and the same performances, such as the same product-number magnets, can be used as the respective main magnet 21 and the auxiliary magnet 22. This enables desired demagnetization-resistance performance to be obtained. Each of the main magnet 21 and the auxiliary magnet 22 however can have different dimensions in the lateral width thereof; the lateral width of each of the main magnet 21 and auxiliary magnet 22 is perpendicular to each easy axis of magnetization thereof. Each of the main magnet 21 and the auxiliary magnet 22 also can have different dimensions in the longitudinal length thereof; the longitudinal direction of each of the main magnet 21 and auxiliary magnet 22 is parallel to each easy axis of magnetization thereof.

Seventh Modification

Figure 13A:
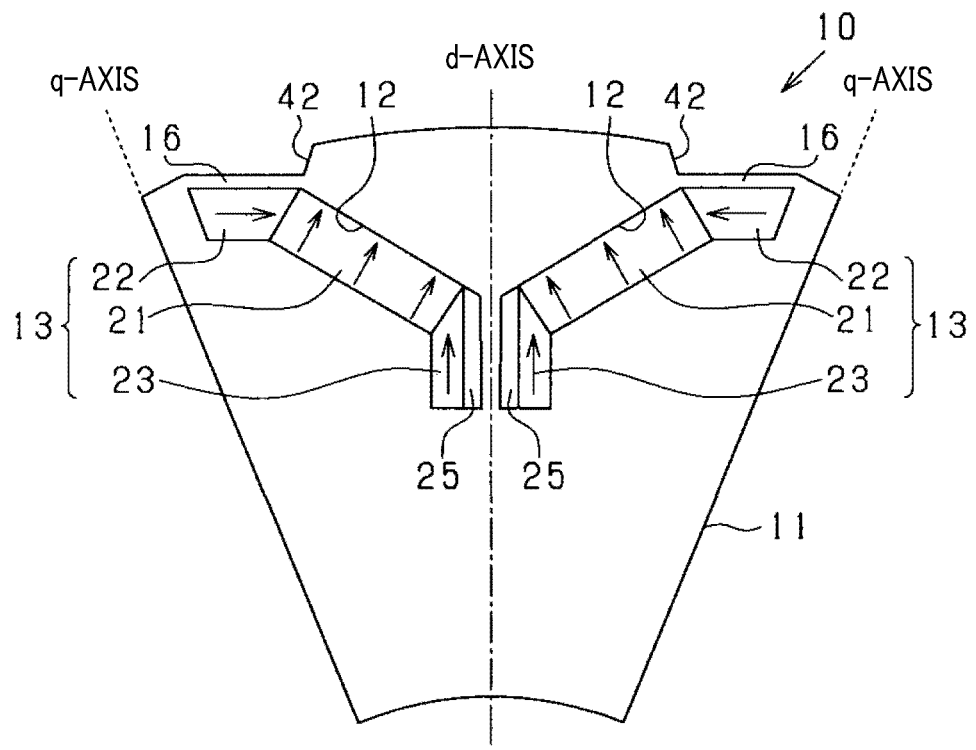
FIG. 13(a) and FIG. 13(b) are partial plan views of a rotor according to a seventh modification of the first embodiment.

The rotor core 11 of the rotor 10 according to the seventh modification illustrated in FIG. 13(a) has formed grooves 42 on the outer circumferential surface thereof, which faces the stator 30; each of the grooves 42 extends in the axial direction of the rotor core 11. Each of the grooves 42 is arranged on the outer circumferential surface of the rotor core 11 to be radially adjacent to the corresponding auxiliary magnet 22. Each of the auxiliary magnets 22 and the corresponding one of the grooves 42 define the corresponding outer bridge 16 therebetween.

Figure 13B:
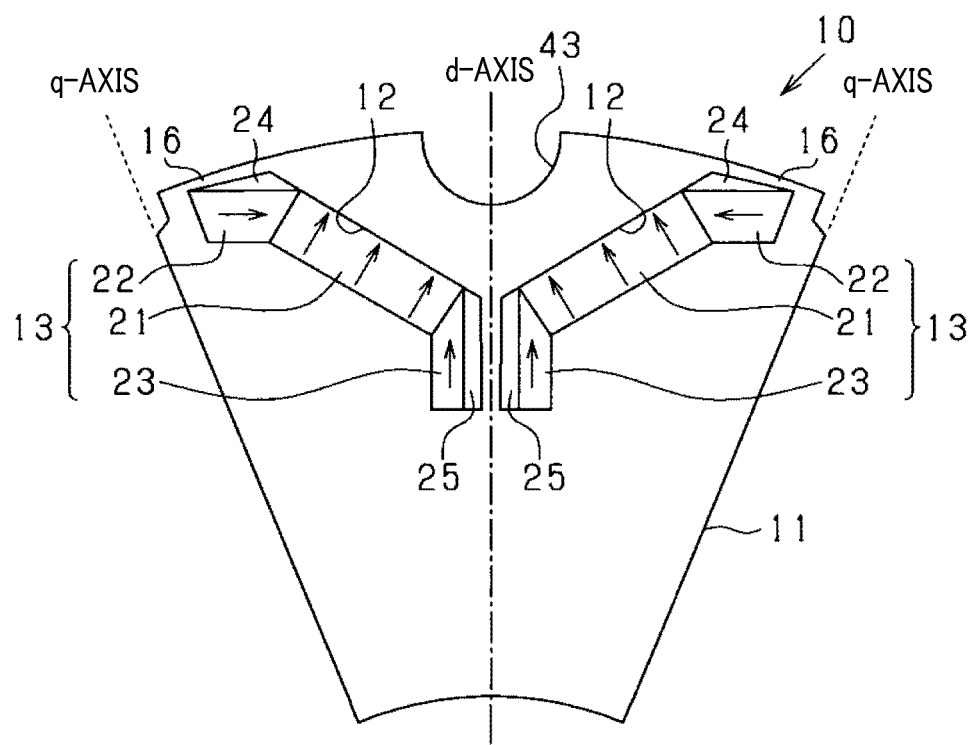

The rotor core 11 of the rotor 10 according to the seventh modification illustrated in FIG. 13(b) has formed grooves 43 on the outer circumferential surface thereof; each of the grooves 43 extends in the axial direction of the rotor core 11. Each of the grooves 43 is arranged on the corresponding d-axis of the outer circumferential surface of the rotor core 11. Grooves 43 can be formed on the outer circumferential surface of the rotor core 11 to be arranged on the respective q-axes.

The outer circumferential surface of the rotor core 11, which faces the stator 30, is likely to be magnetically saturated due to rotating magnetic flux from the stator 30 and the magnetic flux of the rotor 10. From this viewpoint, the grooves 42 and/or 43, which are formed on the outer circumferential surface of the rotor core 11 facing the stator 30 and extend in the axial direction of the rotor core 11, enable adjustment of the orientations of the lines of the magnetic flux in the outer circumferential edge of the rotor core 11 around the stator 30, and also adjustment of the quantity of the magnetic flux in the outer circumferential edge of the rotor core 11 around the stator 30. This therefore makes it possible to efficiently obtain excellent performances from each magnet assembly 13.

Second Embodiment

The following describes the second embodiment while focusing on one or more different points of the second embodiment from the first embodiment. The second embodiment uses magnets each with easy axes of magnetization intersecting with at least one of flux effective surfaces of the corresponding magnet at an angle except for 90 degrees.

In particular, the orientation of each of the easy axes of magnetization of the magnet is changed from a predetermined first orientation through one of the opposing flux effective surfaces to a predetermined second orientation through the other of the opposing flux effective surfaces; the first orientation is different from the second orientation.

Figure 14:
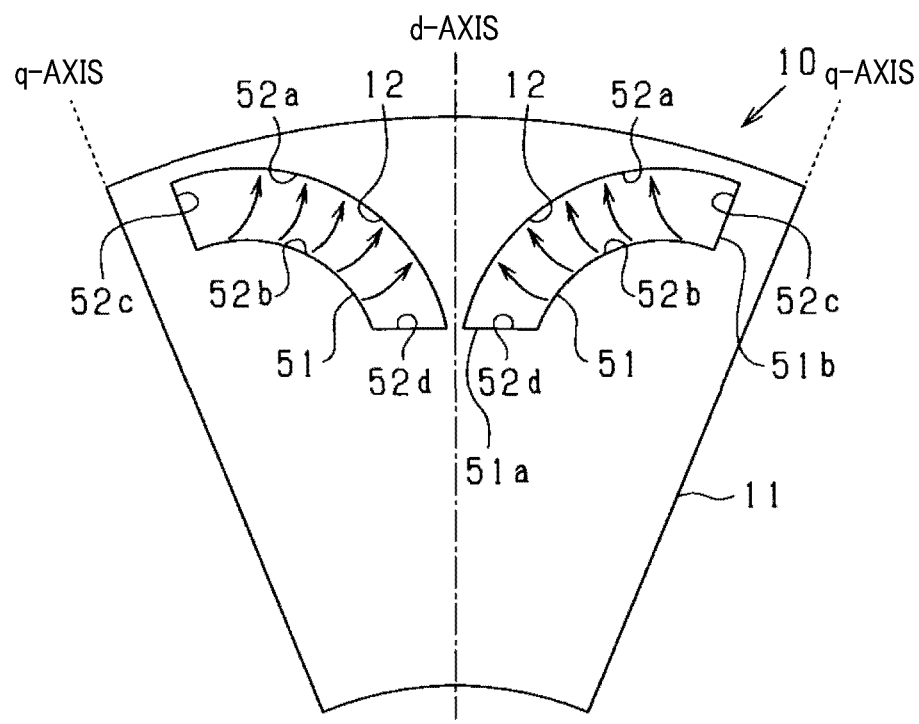
FIG. 14 is a partial plan view of a rotor according to a second embodiment.

FIG. 14 schematically illustrates a rotor 10 of the second embodiment.

Referring to FIG. 14, the rotor core 11 has formed a pair of magnet installation holes 12 for each d-axis; each of the magnet installation holes 12 has a circular-arc shape, i.e., an arched shape. Like the structure illustrated in, for example, FIG. 3, the two magnet installation holes 12 of each pair have a substantially V shape such that a distance between the two magnet installation holes 12 becomes larger toward the radially outside of the rotor core 11. The magnet installation holes 12 of each pair have a symmetrical profile with respect to the d-axis, that is, the magnetic pole center axis. In other words, a distance of each magnet installation hole 12 relative to the stator 30 becomes larger toward the d-axis.

Each magnet installation hole 12 is defined by circular-arc curved surfaces 52a and 52b with a regular interval therebetween, and flat joint surfaces 52c and 52d; the joint surface 52c joins both ends of the circular-arc curved surface 52a, and the joint surface 52d joins both ends of the circular-arc curved surface 52b. That is, each magnet installation hole 12 is surrounded by the circular-arc curved surfaces 52a and 52b and joint surfaces 52c and 52d.

The joint surface 52c, which is closer to the q-axis than the joint surface 52d is, is located to be substantially parallel to the q-axis, and the joint surface 52d, which is closer to the d-axis than the joint surface 52c is, is located to be substantially perpendicular to the d-axis.

In each magnet installation hole 12, a magnet 51, which has a shape conforming with the shape of the corresponding magnet installation hole 12, is installed. That is, the magnets 51 filled in the respective magnet installation holes 12 of each pair constitute one magnetic pole.

As illustrated in FIG. 14, each magnet 51 has opposing ends 51a and 51b in its longitudinal direction, and each magnet 51 has easy axes of magnetization thereinside (see arrows).

Each magnet 51 is arranged such that the easy axes of magnetization are changed from orientations close to a q-axis side orientation perpendicular to the q-axis to orientations close to a d-axis side orientation parallel to the d-axis from the end 51b closer to the q-axis to the end 51a closer to the d-axis; each easy axis of magnetization is convexly curved toward an anti-stator direction opposite to the stator 30.

That is, each magnetic path of the magnet 51 has a circular-arc shape that passes through the magnet 51 in its lateral direction, and the orientation of each magnetic path of the magnet 51 is convexly curved toward the center axis of the rotor core 11.

The magnet 51 having the easy axes of magnetization defined set forth above strengthens demagnetization-resistance performance thereof against a demagnetization field based on the rotating magnetic field of the stator 30, thus appropriately reducing demagnetization of the magnet 51.

Specifically, the magnet 51 is configured such that

1. The easy axes of magnetization of the end 51b closer to the q-axis oriented to be close to the q-axis side orientation that is perpendicular to the q-axis, and the easy axes of magnetization of the end 51a closer to the d-axis are oriented to be close to the d-axis side orientation that is parallel to the d-axis 2. Each easy axis of magnetization is convexly curved toward the anti-stator direction opposite to the stator 30

This configuration makes longer each of the magnetic paths in the magnet 51 to thereby increase the magnetic flux of the magnet 51, and efficiently create magnetic flux that counters the demagnetization field from the stator 30.

In addition, each of the easy axes of magnetization of the d-axis side end 51a of the magnet 51 is oriented to be closer to the direction parallel to the d-axis. This reduces demagnetization of the magnet 51 due to mutual flux interferences in the vicinity of the d-axis.

The q-axis side end 51b of the magnet 51 is located to be radially closer to the stator 30 than the d-axis side end 51a of the magnet 51 is, and an intermediate portion of the magnet 51 between both ends 51a and 51b thereof is arranged to be convex toward the stator 30. That is, the magnets 51 of each pair across the corresponding d-axis have a substantially V shape, and each of the magnets 51 of the corresponding pair has a circular-arc shape that is convex toward the stator 30, i.e., the upper direction in FIG. 14. The magnet installation holes 12 of each pair is shaped to be in conformity with the respective magnets 51 of the corresponding pair.

In other words, the curved surface 52a, which is an outflux effective surface closer to the stator 30 than the curved surface 52b is, of each magnet 51 is shaped to convexly project toward the stator 30 from a line segment connecting both ends of the curved surface 52a.

Each magnet 51 of the above configuration of the rotor 10 is arranged to be close to the outer circumferential surface of the rotor core 11 to make shorter the distance between the stator 30 and the corresponding magnet 51, thus increasing torque of the rotary electric machine 1 of the second embodiment. Although making shorter the distance between the stator 30 and the corresponding magnet 51 may increase demagnetization field as a counter reaction of the shorter distance, the curved easy axes of magnetization of each magnet 51 reduce negative effects of the increased demagnetization field.

The above configuration of the rotor 10 enables the percentage of a region of the rotor core 11, which is located to be closer to the stator 30 than each magnet 51, i.e. each magnet installation hole 12, is, to be smaller; the region is subjected to the sum of the magnetic flux of the stator 30 and the magnetic flux of the corresponding magnet 51. This therefore reduces, in the rotor 10, a saturation region in which magnetic saturation may occur based on the magnetic flux of the stator 30 and the magnetic flux of each magnet 51, thus more efficiently obtaining the performance from each magnet 51.

Each magnet 51 is configured to be convex toward in a radially outward direction. This configuration enables a region in the rotor core 11, which is located radially outward from the magnet installation holes 12, to be smaller. This configuration reduces the stress concentration factor of the rotor 10 against centrifugal force, thus increasing the mechanical strength of the rotor 10.

Let us compare the structure of the rotor 10 of the second embodiment with the structure of the rotor 10 of the first embodiment illustrated in FIG. 3, which includes the auxiliary magnets 22 and 23 located at the respective ends of the main magnet 21. As a result of the comparison, the magnet 51 of the second embodiment performs both functions of the respective auxiliary magnets 22 and 23.

Note that FIG. 14 illustrates the pair of magnets 51 constituting the d-axis, but, when the pair of magnets 51 constitutes the q-axis, the easy axes of magnetization of each magnet 51 are oriented to be opposite to the orientations of the respective easy axes of magnetization illustrated in FIG. 14.

In addition, each magnet 51 illustrated in FIG. 14 can be divided into plural magnet segments. That is, each magnet 51 can be divided into plural magnet segments in the longitudinal direction of the corresponding magnet 51, and the magnet segments can be arranged such that face-to-face end surfaces of magnet segments of each adjacent pair are located to abut on each other. In this modification, the divided magnet segments are preferably arranged in each magnet installation hole 12. This arrangement prevents, for example, overcurrent loss due to change in flux interlinkage with the magnet 51 while the rotary electric machine 1 is operating.

As illustrated in FIGS. 13(a) and 13(b), the rotor core 11 of the rotor 10 illustrated in FIG. 14 can have formed grooves 42 and/or 43. This modified configuration enables adjustment of the orientations of the lines of the magnetic flux in the region of the rotor core 11 adjacently around the stator 30, and adjustment of the quantity of the magnetic flux in the region of the rotor core 11 adjacently around the stator 30. This therefore makes it possible to efficiently obtain excellent performances from each magnet 51.

Figure 15:
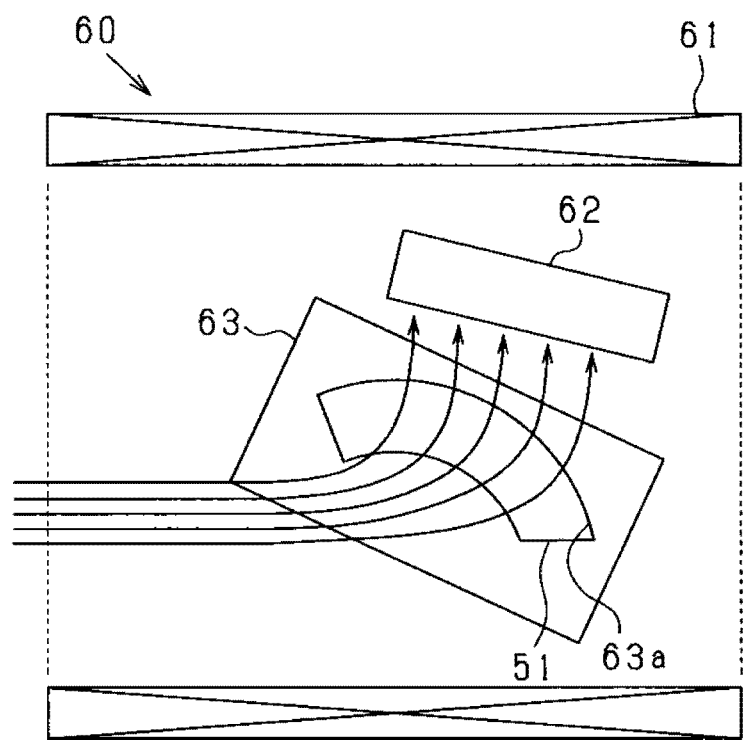
FIG. 15 is an explanation view for explaining how to magnetize a magnet using an oriented magnetic field.

Next, the following describes how to manufacture a magnet 51 used in the second embodiment. FIG. 15 is an explanation view used for explaining how to magnetize the magnet 51 using an oriented magnetic field.

As illustrated in FIG. 15, an orientation apparatus 60 includes a magnetic field coil 61, an orientation core 62, and a mold 63 serving as a magnet production mold. The orientation core 62 and mold 63 are arranged in the magnetic field coil 61.

The magnetic field coil 61 is configured to generate a magnetic field passing through the inside of the coil 61 when energized.

The orientation core 62 serves to curve the magnetic field generated by the magnetic field coil 61 to a predetermined direction. The mold 63 is arranged to enable the curved magnetic field to pass therethrough.

That is, the magnetic field coil 61 generates linear magnetic field lines, and the orientation core 62 enables the linear magnetic field lines to be curved as curved magnetic field lines. The mold 63 is composed of a non-magnetic material, and has formed a mold chamber 63a shaped in conformity with the shape of the magnet 51.

The following describes a method of manufacturing the magnet 51.

First, magnet materials are pulverized into magnetic powders or a magnet powdery member, and the magnetic powders are filled in the mold chamber 63a of the mold 63.

Next, the magnetic powders are compressed to have the predetermined shape set forth above in the mold 63. Thereafter, the orientation core 62 enables curved magnetic field lines to be generated. The curved magnetic field lines cause magnetic field lines of the compressed magnetic powders in the mold chamber 63a to be oriented. That is, during the orientation process, the magnetic powders are aligned such that their easy axes of magnetization are oriented, and compressed to be fixed as a molded body.

Thereafter, the molded body is sintered, and thereafter, magnetized. The above series of processes result in the magnet 51 being manufactured.

The above series of processes results in the easy axes of magnetization of the magnet 51 being changed to non-linear, i.e. circular-arc, easy axes of magnetization thereof.

Then, the magnet 51 is installed in the magnet installation hole 12, so that, as illustrated in FIG. 14, the easy axes of magnetization are changed from orientations close to the q-axis side orientation perpendicular to the q-axis to orientations close to the d-axis side orientation parallel to the d-axis from the q-axis side end 51b to the d-axis side end 51a; each easy axis of magnetization is convexly curved toward the anti-stator direction opposite to the stator 30.

The following describes modifications of the rotor 10 according to the second embodiment; at least one part of the rotor 10 is modified in each modification. The following describes mainly the different points between the structure of the rotor 10 according to each modification and the structure of the rotor 10 illustrated in FIG. 14.

First Modification

Figure 16:
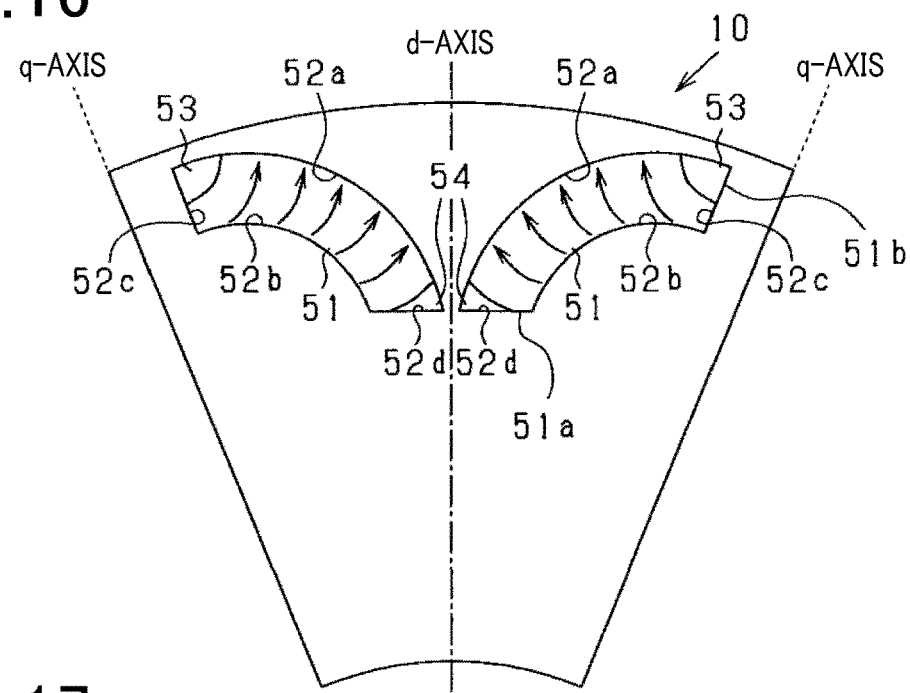
FIG. 16 is a partial plan view of a rotor according to a first modification of the second embodiment.

Each magnet 51 of the rotor 10 according to the first modification illustrated in FIG. 16 has opposing d-axis side end with a first surface and q-axis side end with a second surface, and each of the first and second surfaces of the d- and q-axis side ends is oriented to be in conformity with the easy axes of magnetization of the magnet 51. In the magnet installation hole 12, a flux barrier 53 is provided to be located at the outer side of the second surface of the q-axis side end, and a flux barrier 54 is provided to be located at the outer side of the first surface of the d-axis side end.

For forming the flux barrier 53, cutting a part of the q-axis side end of the magnet 51 illustrated in FIG. 14 in its longitudinal direction enables the flux barrier 53 to be formed. Similarly, for forming the flux barrier 54, cutting a part of the d-axis side end of the magnet 51 illustrated in FIG. 14 in its longitudinal direction enables the flux barrier 54 to be formed.

That is, the magnet 51 has the surface of each of the d-axis side end and q-axis side end thereof; the surface intersects with the flux effective surfaces of the magnet 51. The surface of each of the d-axis side end and q-axis side end of the magnet 51 is oriented to be substantially parallel to the orientation of each of the easy axes of magnetization. The flux barrier 53 is provided to be located at the outer side of the q-axis side end 51b of the magnet 51 in the magnet installation hole 12. Similarly, the flux barrier 54 is provided to be located at the outer side of the d-axis side end 51a of the magnet 51 in the magnet installation hole 12.

Specifically, cutting a first corner of the q-axis side end of the magnet 51 illustrated in FIG. 14, which is closer to the stator 30 than an opposing second corner is, enables the flux barrier 53 to be formed in the magnet installation hole 12. Similarly, for forming the flux barrier 54, cutting a first corner of the d-axis side end of the magnet 51 illustrated in FIG. 14, which is closer to the d-axis than an opposing second corner is, enables the flux barrier 54 to be formed in the magnet installation hole 12. Note that the surface of each of the d-axis side end and q-axis side end of the magnet 51 can be flat or curved.

Each easy axis of magnetization of the magnet 51 between the q-axis side end and the d-axis side end according to the second embodiment is configured to be non-linearly. This configuration enables the length of each magnetic path, i.e. the length of a corresponding inner magnetic line, to be longer than the length of each linear magnetic path of a magnet, which is perpendicular to the length direction of the magnet. Relatively shorter magnetic paths are however locally located at each end of the magnet 51. Because the length of each magnetic path at each end of the magnet 51 is proportional to the magnetic permeance at the corresponding end of the magnet 51, it is desired to prevent reduction in the length of each magnetic path at each end of the magnet 51.

From this viewpoint, each of the first and second surfaces, which intersects with the flux effective surfaces, of the d- and q-axis side ends of the magnet 51 is oriented to be in conformity with the easy axes of magnetization of the magnet 51. This reduces shorter magnetic paths locally present in each end of the magnet 51. In addition, each of the flux barriers 53 and 54 is provided to be located at the outer side of the corresponding one of the second and first surfaces of the q- and d-axis side ends. This reduces demagnetization at both d- and q-axis side ends of the magnet 51.

Note that any one of the first and second surfaces of the d- and q-axis side ends can be oriented to be in conformity with the easy axes of magnetization of the magnet 51.

Second Modification

Figure 17:
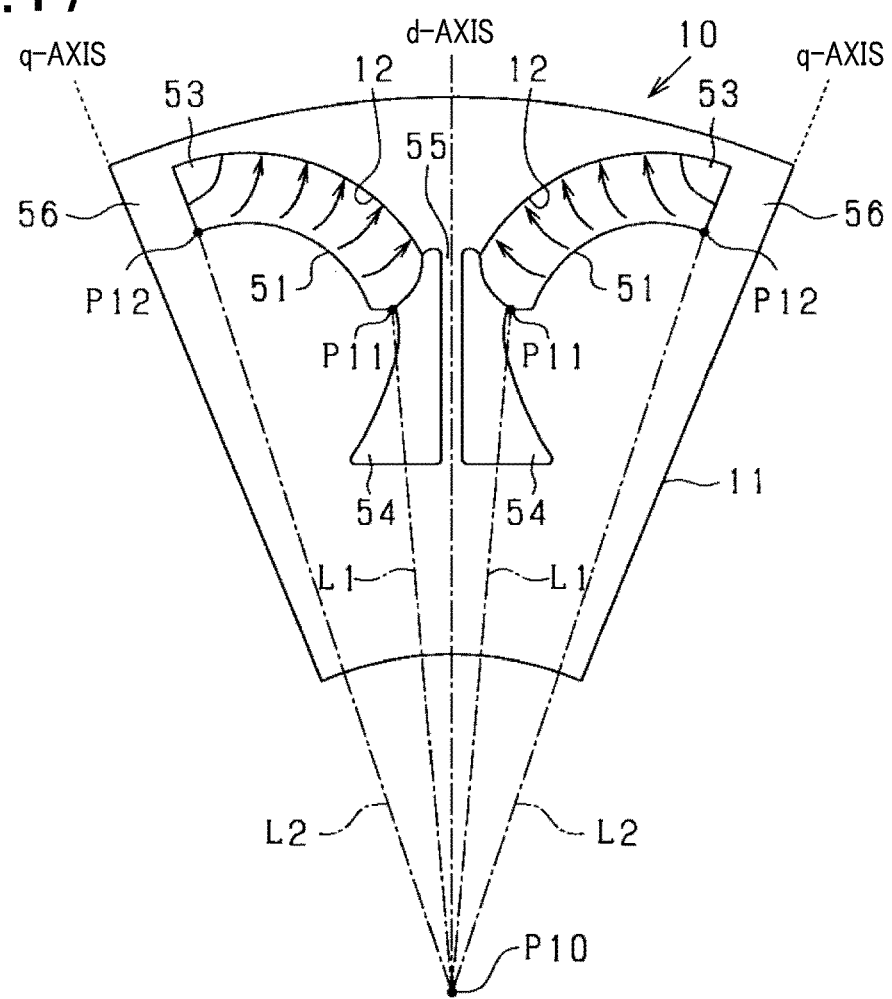
FIG. 17 is a partial plan view of a rotor according to a second modification of the second embodiment.

In the rotor 10 according to the second modification illustrated in FIG. 17, the d-axis flux barriers 54 for each pair of the magnets 51 extend beyond the respective radially inner ends of the respective magnets 51 toward the center of the rotational axis along the d-axis. The flux barriers 54, which are located to face each other across the d-axis, provide a d-axis core portion 55 therebetween. That is, the magnets 51 of each pair are arranged in the rotor core 11 across the corresponding d-axis core portion 55. The flux barriers 54 are provided to be located across the d-axis core portion 55 in the rotor core 11 to extend from the anti-stator side ends of the respective magnets 51 toward the anti-stator direction opposite to the stator 30. Each of the flux barriers 54 is configured as a part of the corresponding magnet installation hole 12. A void or a space in a part of each magnet installation hole 12 can serve as the corresponding flux barrier 54, or a non-magnetic material filled in the void or space in the part each magnet installation hole 12 can serve as the corresponding flux barrier 54. The flux barrier 54 of each magnet installation hole 12 serves as a non-magnetic member.

Each magnet 51 has a radially innermost point P11, and a q-axis core portion located on each q-axis, and a virtual line L1 connecting between the radially innermost point P11 and a rotational center P10 of the rotor core 11 is defined. At that time, the flux barrier 54 for each magnet 51 projects toward the q-axis side over the virtual line L1. The length of each flux barrier 54 in the circumferential direction of the rotor core 11 can be preferably determined in accordance with the quantity of q-axis magnetic flux and the circumferential width of the q-axis core portion 56. That is, the flux barrier 54 can project up to a virtual line L2 connecting between a q-axis side end P12 of the magnet installation hole 12 and the rotational center P10 of the rotor core 11, or can project beyond the virtual line L2 to be closer to the q-axis by a predetermined length.

The above configuration enables the flux barriers 54 of each pair to increase the magnetic resistance of the corresponding d-axis core portion 55. This therefore prevents a short circuit between the pair of magnets 51 to accordingly utilize magnetic force more efficiently.

The d-axis core portion 55 for each pair of magnets 51 constitutes a thin portion of the rotor core 11 located on the corresponding d-axis, which extends along the corresponding d-axis. The d-axis core portion 55 for the magnets 51 of each pair strengthens the corresponding core portion to thereby prevent the magnets 51 from falling off from the rotor core 11 due to centrifugal force.

Note that the d-axis core portion 55 for the magnets 51 of each pair serves as resistance to a magnetic circuit therethrough. That is, an increase in the d-axis core portion 55 in the d-axis enables magnetic resistance of the d-axis core portion 55 to increase. This enables the magnitude of each magnetic flux vector flowing toward the d-axis from each of the magnets 51 to be smaller. That is, the rotor 10 according to the second modification of the second embodiment is configured to resist demagnetization of the magnets 51, and improve torque of the rotary electric machine 1 according to the second modification of the second embodiment.

The flux barriers, non-magnetic members, 54 for each pair of magnet installation holes 12 are provided to extend toward the anti-stator side in the rotor core 11 while the rotor core 11 is partially separated into a q-axis closer portion and a d-axis closer portion. This reduces mutual interferences of both (i) magnetic flux generated from one of the paired magnets 51 and (ii) magnetic flux generated from the other of the paired magnets 51 while properly designing the magnetic flux of each of the paired magnets 51.

Each flux barrier 54 projects toward the q-axis side over the virtual line L1, making it possible to reduce the moment of the interior of the rotor 10.

Third Modification

Figure 18:
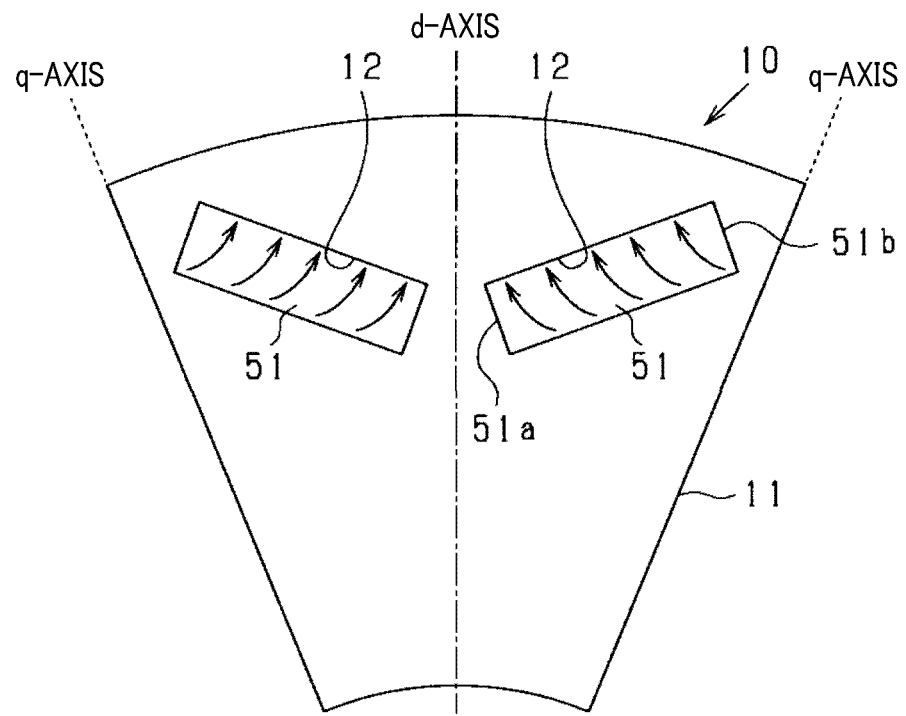
FIG. 18 is a partial plan view of a rotor according to a third modification of the second embodiment.

The rotor 10 according to the third modification illustrated in FIG. 18 has different points, as compared with the rotor 10 illustrated in FIG. 14, where each of the magnet installation holes 12 of each pair has a rectangular shape in its lateral cross section perpendicular to the axial direction of the rotor core 11, and each of the magnets 51 installed in the corresponding one of the magnet installation holes 12 also has a rectangular shape in its lateral cross section. The right and left magnet installation holes 12 of each pair have a substantially V shape across the d-axis, so that the right and left magnets 51 of each pair installed in the respective magnet installation holes 12 also have a substantially V shape across the d-axis.

In particular, each of the easy axes of magnetization formed in each of the magnets 51 is changed from the q-axis side orientation at the q-axis side end to the d-axis side orientation at the d-axis side end.

Fourth Modification

Figure 19:
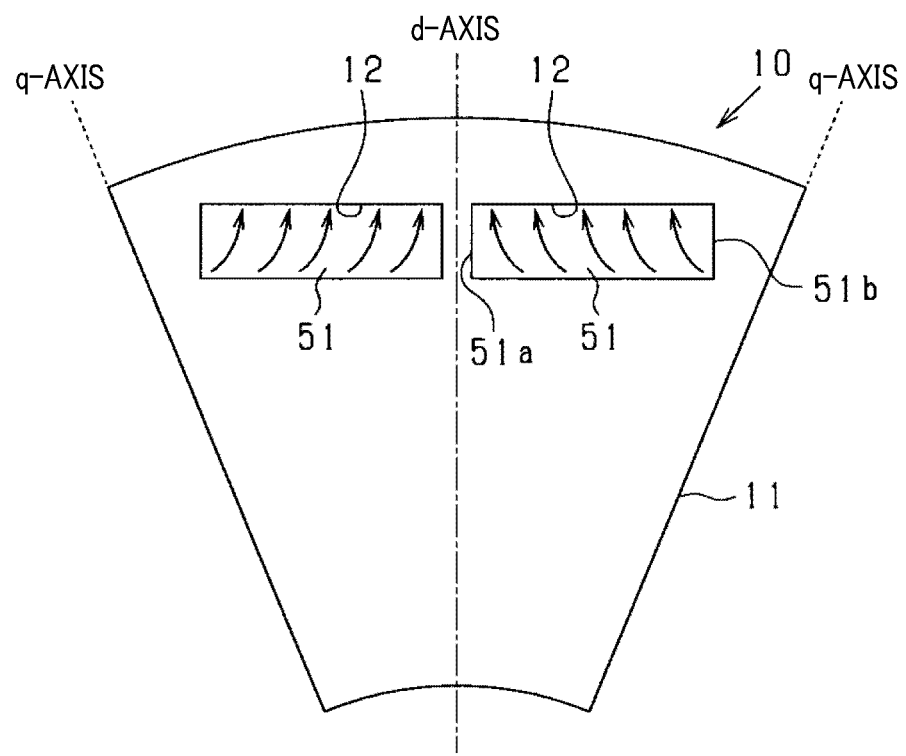
FIG. 19 is a partial plan view of a rotor according to a fourth modification of the second embodiment.

The rotor 10 according to the fourth modification illustrated in FIG. 19 has different points, as compared with the rotor 10 illustrated in FIG. 14, where each of the magnet installation holes 12 of each pair has a rectangular shape in its lateral cross section perpendicular to the axial direction of the rotor core 11, and each of the magnets 51 installed in the corresponding one of the magnet installation holes 12 also has a rectangular shape in its lateral cross section.

The right and left magnet installation holes 12 of each pair are arranged to be aligned in a direction perpendicular to the d-axis across the d-axis, so that the right and left magnets 51 of each pair installed in the respective magnet installation holes 12 are also arranged to be aligned in the direction perpendicular to the d-axis across the d-axis.

In particular, each of the easy axes of magnetization formed in each of the magnets 51 is changed from the q-axis side orientation at the q-axis side end to the d-axis side orientation at the d-axis side end.

Note that the right and left magnet installation holes 12 of each pair are arranged to be aligned in the direction perpendicular to the d-axis across the d-axis as illustrated in FIG. 19. In other words, a minimum separation distance between the d-axis side corner and the stator 30 is longer than a minimum separation distance between the corresponding q-axis-side corner and the stator 30.

Third Embodiment

The following describes the third embodiment while focusing on one or more different points of the third embodiment from the first embodiment. Like the second embodiment, the third embodiment uses magnets each with easy axes of magnetization; the orientation of each of the easy axes of magnetization of the magnet is changed from a predetermined first orientation through one of the opposing flux effective surfaces to a predetermined second orientation through the other of the opposing flux effective surfaces; the first orientation is different from the second orientation.

Figure 20:
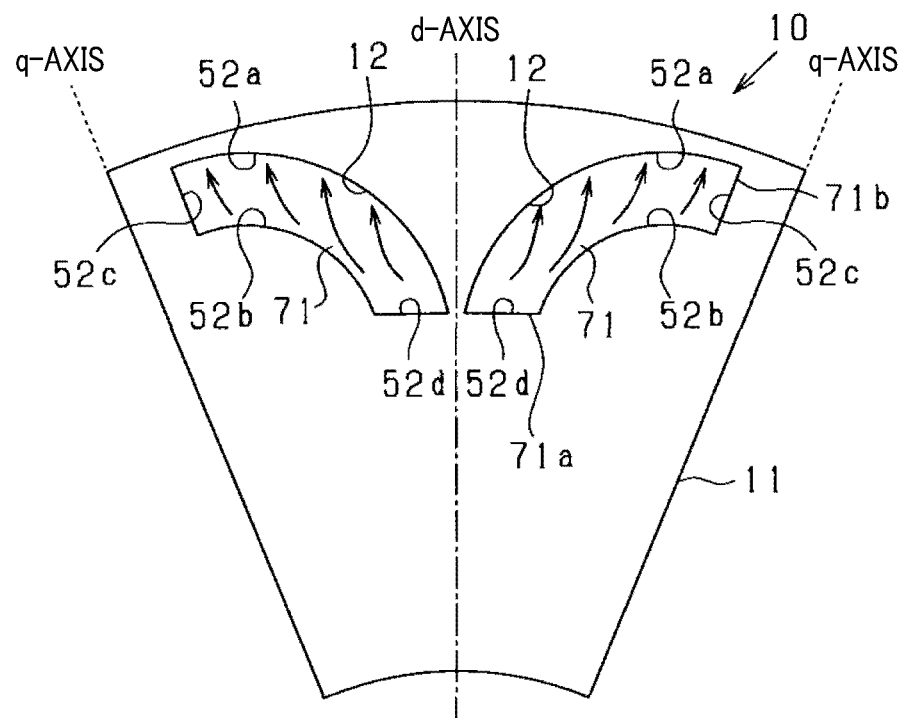
FIG. 20 is a partial plan view of a rotor according to a third embodiment.

FIG. 20 schematically illustrates a rotor 10 of the third embodiment.

Referring to FIG. 20, the rotor core 11 has formed a pair of magnet installation holes 12 for each d-axis; each of the magnet installation holes 12 has a circular-arc shape, i.e., an arched shape. Because the shape of each of the magnet installation holes 12 illustrated in FIG. 20 is substantially identical to the shape of the corresponding one of the magnet installation holes 12 illustrated in FIG. 14, the description of each of the magnet installation holes 12 illustrated in FIG. 20 is omitted.

In each magnet installation hole 12, a magnet 71, which has a shape conforming with the shape of the corresponding magnet installation hole 12, is installed. That is, the magnets 71 filled in the respective magnet installation holes 12 of each pair constitute one magnetic pole.

As illustrated in FIG. 20, each magnet 71 has easy axes of magnetization thereinside (see arrows). Each magnet 71 has opposing ends 71a and 71b in its longitudinal direction.

Each magnet 71 is arranged such that the easy axes of magnetization are changed from orientations close to a d-axis side orientation perpendicular to the d-axis to orientations close to a q-axis side orientation parallel to the q-axis from the end 71a closer to the d-axis to the end 71b closer to the q-axis; each easy axis of magnetization is convexly curved toward an anti-stator direction opposite to the stator 30.

That is, each magnetic path of the magnet 71 is configured such that the orientation of each magnetic path of the magnet 71 is convexly curved toward the center axis of the rotor core 11.

The magnet 71 having the easy axes of magnetization defined set forth above strengthens demagnetization-resistance performance thereof against a demagnetization field based on the rotating magnetic field of the stator 30, thus appropriately reducing demagnetization of the magnet 71.

Specifically, the magnet 71 is configured such that

1. The easy axes of magnetization of the end 71a closer to the d-axis oriented to be close to the d-axis side orientation that is perpendicular to the d-axis, and the easy axes of magnetization of the end 71b closer to the q-axis are oriented to be close to the q-axis side orientation that is parallel to the d-axis 2. Each easy axis of magnetization is convexly curved toward the anti-stator direction opposite to the stator 30

This configuration makes longer each of the magnetic paths in the magnet 71 to thereby increase the magnetic flux of the magnet 71, and efficiently create magnetic flux that counters the demagnetization field from the stator 30.

In addition, each of the easy axes of magnetization of the d-axis side end 71a of the magnet 71 is oriented to be closer to the direction parallel to the d-axis. This reduces demagnetization of the magnet 71 due to mutual flux interferences in the vicinity of the d-axis.

The q-axis side end 71b of the magnet 71 is located to be radially closer to the stator 30 than the d-axis side end 71a of the magnet 71 is, and an intermediate portion of the magnet 71 between both ends 71a and 71b thereof is arranged to be convex toward the stator 30. That is, the magnets 71 of each pair across the corresponding d-axis have a substantially V shape, and each of the magnets 71 of the corresponding pair has a circular-arc shape that is convex toward the stator 30, i.e., the upper direction in FIG. 20. The magnet installation holes 12 of each pair is shaped to be in conformity with the respective magnets 71 of the corresponding pair.

In other words, the curved surface 52a, which is an outflux effective surface closer to the stator 30 than the curved surface 52b is, of each magnet 71 is shaped to convexly project toward the stator 30 from a line segment connecting both ends of the curved surface 52a.

Each magnet 71 of the above configuration of the rotor 10 is arranged to be close to the outer circumferential surface of the rotor core 11 to make shorter the distance between the stator 30 and the corresponding magnet 71, thus increasing torque of the rotary electric machine 1 of the second embodiment. Although making shorter the distance between the stator 30 and each magnet 71 may increase demagnetization field as a counter reaction of the shorter distance, the curved easy axes of magnetization of each magnet 71 reduce negative effects of the increased demagnetization field.

The above configuration of the rotor 10 enables the percentage of a region of the rotor core 11, which is located to be closer to the stator 30 than each magnet 71, i.e. each magnet installation hole 12, is, to be smaller; the region is subjected to the sum of the magnetic flux of the stator 30 and the magnetic flux of the corresponding magnet 71. This therefore reduces, in the rotor 10, a saturation region in which magnetic saturation may occur based on the magnetic flux of the stator 30 and the magnetic flux of each magnet 71, thus more efficiently obtain the performance from each magnet 71.

Each magnet 71 is configured to be convex toward in a radially outward direction. This configuration enables a region in the rotor core 11, which is located radially outward from the magnet installation holes 12, to be smaller. This configuration reduces the stress concentration factor of the rotor 10 against centrifugal force, thus increasing the mechanical strength of the rotor 10.

Note that FIG. 20 illustrates the pair of magnets 71 constituting the d-axis, but, when the pair of magnets 71 constitutes the q-axis, the easy axes of magnetization of each magnet 71 are oriented to be opposite to the orientations of the respective easy axes of magnetization illustrated in FIG. 20.

It is preferable that a magnet installation hole 12 with one or more flux barriers can be provided between the magnets 71 of each pair illustrated in FIG. 20. This reduces lines of the magnetic flux passing through the d-axis.

In addition, each magnet 71 illustrated in FIG. 20 can be divided into plural magnet segments. That is, each magnet 71 can be divided into plural magnet segments in the longitudinal direction of the corresponding magnet 71, and the magnet segments can be arranged such that face-to-face end surfaces of magnet segments of each adjacent pair are located to abut on each other. In this modification, the divided magnet segments are preferably arranged in each magnet installation hole 12. This arrangement prevents, for example, overcurrent loss due to change in flux interlinkage with the magnet 71 while the rotary electric machine 1 is operating.

Figure 21:
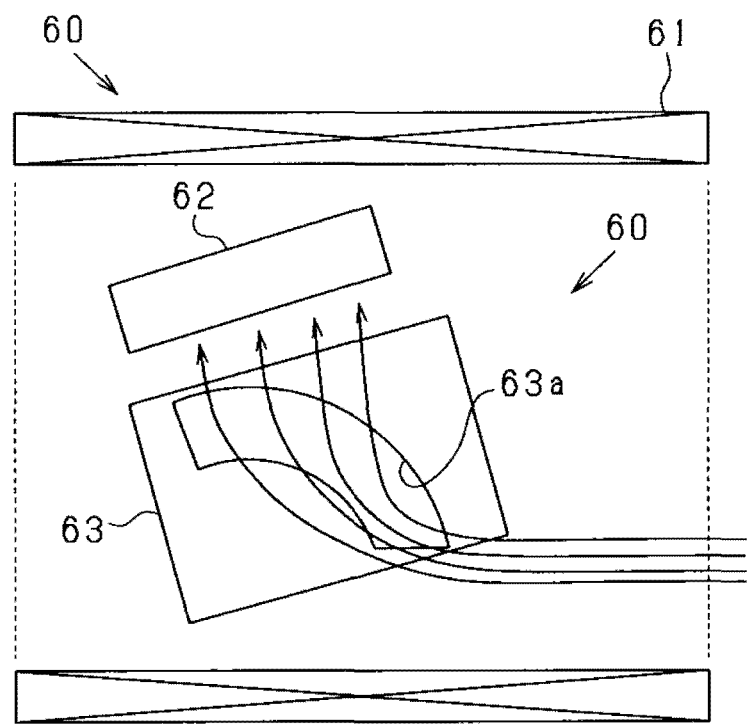
FIG. 21 is an explanation view for explaining how to magnetize a magnet using an oriented magnetic field.

Next, the following describes how to manufacture a magnet 71 used in the second embodiment. FIG. 21 is an explanation view used for explaining how to magnetize the magnet 71 using an oriented magnetic field.

As illustrated in FIG. 21, an orientation apparatus 60 includes a magnetic field coil 61, an orientation core 62, and a mold 63 serving as a magnet production mold. The orientation core 62 and mold 63 are arranged in the magnetic field coil 61. These components 60 to 63 have been described in FIG. 15.

The following describes a method of manufacturing the magnet 71.

First, magnet materials are pulverized into magnetic powders, and the magnetic powders are filled in the mold chamber 63a of the mold 63.

Next, the magnetic powders are compressed to have the predetermined shape set forth above in the mold 63. Thereafter, the orientation core 62 enables curved magnetic field lines to be generated. The curved magnetic field lines cause magnetic field lines of the compressed magnetic powders in the mold chamber 63a to be oriented. That is, during the orientation process, the magnetic powders are aligned such that their easy axes of magnetization are oriented, and compressed to be fixed as a molded body.

Thereafter, the molded body is sintered, and thereafter, magnetized. The above series of processes result in the magnet 71 being manufactured.

The above series of processes results in the easy axes of magnetization of the magnet 71 being changed to non-linear, i.e. circular-arc, easy axes of magnetization thereof.

Then, the magnet 71 is installed in the magnet installation hole 12, so that, as illustrated in FIG. 20, the easy axes of magnetization are changed from orientations close to the d-axis side orientation perpendicular to the d-axis to orientations close to the q-axis side orientation parallel to the q-axis from the d-axis side end 71a to the q-axis side end 71b; each easy axis of magnetization is convexly curved toward the anti-stator direction opposite to the stator 30.

Modification of Magnet Manufacturing Method

It is possible to use the following method as a method of manufacturing a magnet in which curved easy axes of magnetization are defied.

Figure 22A:
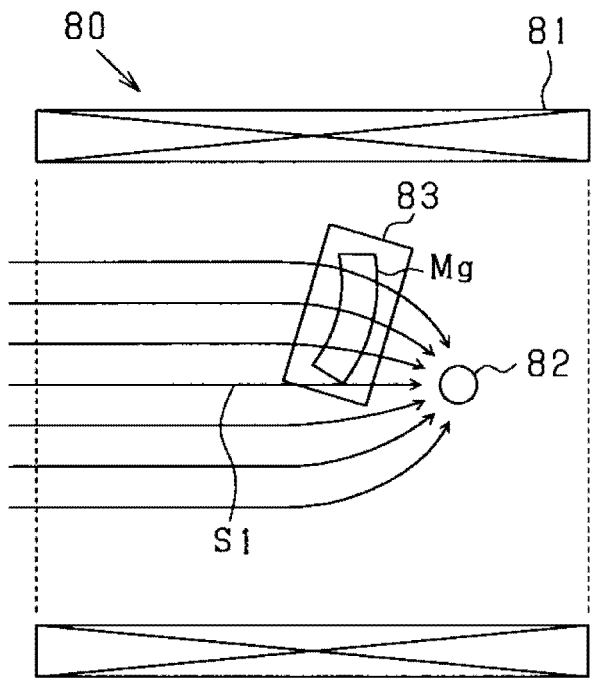
FIG. 22(a) and FIG. 22(b) are explanation views for explaining how to magnetize a magnet using an oriented magnetic field.
Figure 22B:
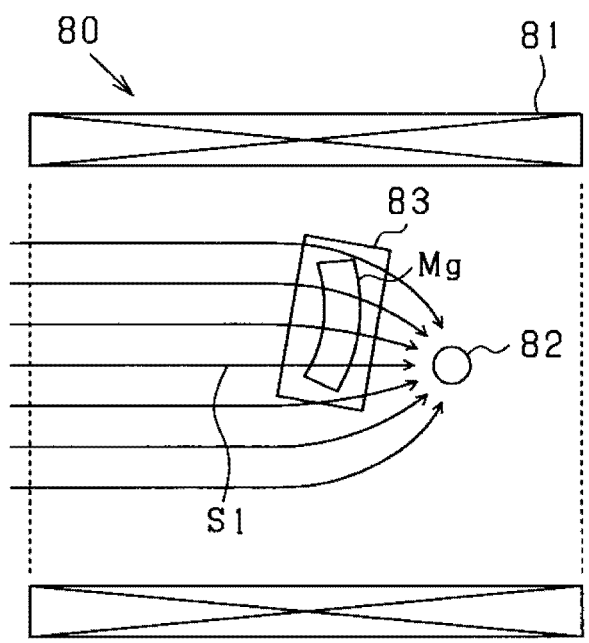

In each of FIGS. 22(a) and 22(b), an orientation apparatus 80 includes a magnetic field coil 81, an orientation core 82, and a mold 83 serving as a magnet production mold. The orientation core 82 and mold 83 are arranged in the magnetic field coil 81. The structure of the orientation apparatus 80 is basically identical to the structure of the orientation apparatus 60 except that the shape of the orientation core 82 is different from the shape of the orientation core 62.

The orientation core 82 is disposed at a radially center position of the magnetic field coil 81. The orientation core 82 of the third embodiment has a circular cross section, so that oriented magnetic field lines are focused onto the center of the orientation core 82. In the oriented magnetic field lines, a line S1, which linearly extends toward the orientation core 82, so that the line S1 is defined as an orientation center.

In FIG. 22(a), a curved magnetic field includes opposing first and second regions partitioned by the orientation center S1. Orientation of a magnet is performed in one of the first and second regions. In FIG. 22(b), orientation of a magnet is performed in both the first and second regions across the orientation center S1.

The following describes a method of manufacturing a magnet Mg.

First, magnetic powders are filled in the mold 83.

Next, the orientation core 82 enables magnetic field lines generated by the magnetic field coil 81 to be curved, and the curved magnetic field lines cause magnetic field lines of the magnetic powders in the mold 83 to be oriented. Thereafter, the molded body is sintered, and thereafter, magnetized.

If polygonal permanent magnets are installed in a rotor, these polygonal permanent magnets are disposed in a linear magnetic field while having respectively different angles with respect to the linear magnetic field lines, so that orientation of each of the polygonal permanent magnets is performed.

Fourth Embodiment

The following describes the fourth embodiment while focusing on one or more different points of the fourth embodiment from the first embodiment. The fourth embodiment uses magnets each with easy axes of magnetization intersecting with at least one of flux effective surfaces of the corresponding magnet at an angle except for 90 degrees.

In particular, the orientation of each of the easy axes of magnetization of each magnet is inclined with respect to the corresponding d-axis at an angle except for 90 degrees, and each of the easy axes of magnetization intersects with the flux effective surfaces at an angle except for 90 degrees.

Figure 23:
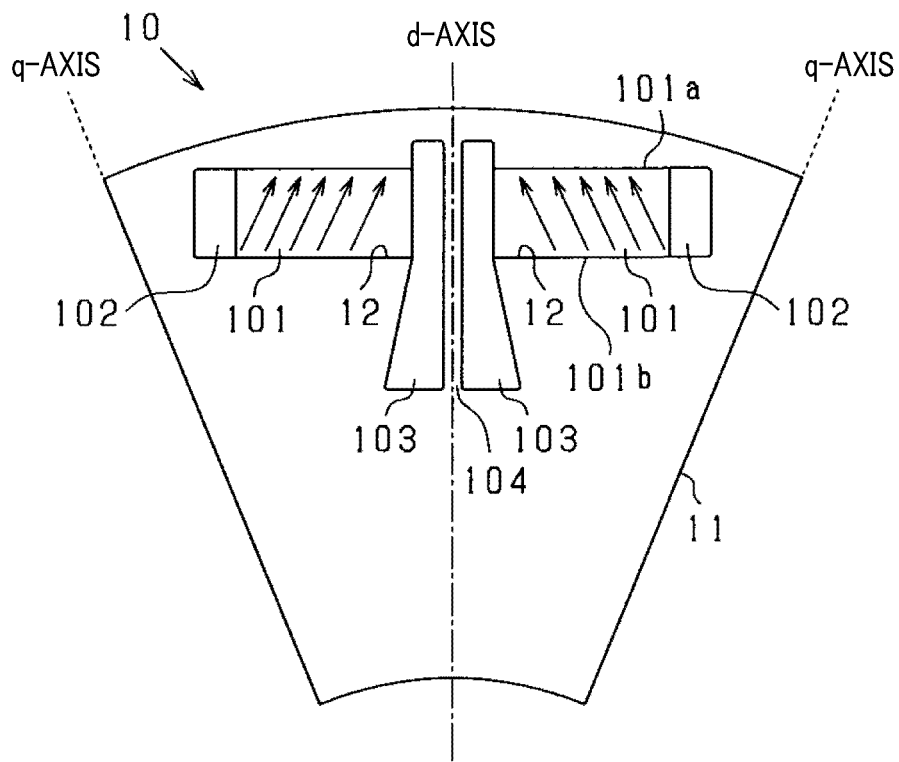
FIG. 23 is a partial plan view of a rotor according to a fourth embodiment.

FIG. 23 schematically illustrates a rotor 10 of the fourth embodiment.

Referring to FIG. 23, the rotor core 11 has formed a pair of magnet installation holes 12 for each d-axis; each of the magnet installation holes 12 extends in perpendicular to the corresponding d-axis. In other words, a distance between each of the magnet installation holes 12 and the stator 30 becomes larger toward the radially outside of the rotor core 11. The magnet installation holes 12 of each pair have a symmetrical profile with respect to the d-axis, that is, the magnetic pole center axis. Eight pairs of the magnet installation holes 12 are arranged with regular intervals in the circumferential direction.

A pair of magnets 101 installed in each pair of magnet installation holes 21 constitutes one magnetic pole. That is, the magnets 101 of eight pairs provide plural magnetic poles, i.e. eight poles in the first embodiment, with their polarities being alternately changed in the circumferential direction. The magnets 101 of each pair constituting one magnetic pole are arranged to be symmetrical with respect to the corresponding d-axis.

Each magnet 101 has a rectangular shape in its lateral cross section. Each magnet 101 has easy axes of magnetization, i.e. orientations of magnetic field lines, which are magnetic paths, of the magnet 101, and the easy axes of magnetization are oriented to be inclined with respect to the d-axis, and each of the easy axes of magnetization intersects with the flux effective surfaces 101a and 101b at an angle except for 90 degrees.

In particular, each of the easy axes of magnetization of each magnet 101 is oriented to intersect with two side surface, i.e. a stator-closer side surface and an anti-stator side surface, which respectively serve as magnet effective surfaces, at an angle except for 90 degrees.

In addition, the easy axes of magnetization of each magnet 101 are inclined with respect to each of the flux effective surfaces 101a and 101b, and intersect with each other at a region of the rotor core 11 closer to the stator 30 than the corresponding magnet installation hole 12. For example, rare-earth magnets, such as sintered neodymium magnets, can be used for the magnets 101.

The orientations of the easy axes of magnetization of one of the magnets 101 arranged across the d-axis are different from the orientations of the easy axes of magnetization of the other of the magnets 101 arranged across the d-axis. The easy axes of magnetization of each of the magnets 101 linearly extend and are parallel to each other.

Because the easy axes of magnetization of the magnet 101 intersect with the flux effective surfaces 101a and 101b at an angle except for 90 degrees, the length of each magnetic path, i.e. the length of each magnetic line, formed in the magnet 101 becomes longer than the length of each magnetic line formed in a magnet whose easy axes of magnetization are perpendicular to the flux effective surfaces of the magnet. This longer length of each magnetic path strengthens the magnetic flux of the magnet 101, thus improving demagnetization-resistance performance of the magnet 101 against the demagnetization field due to the rotating magnetic flux of the stator 30.

Note that, in FIG. 23, the magnets 101 serving as the north pole are illustrated. If the magnets 101 serve as the south pole, the easy axes of magnetization of each of the magnets 101 are oriented in the opposite directions as compared with the easy axes of magnetization of the corresponding one of the magnets 101 serving as the north pole.

Portions in the magnet installation hole 12, in which no magnets 101 are disposed, serve as flux barriers 102 and 103, each of which reduces self-shorting of magnet flux in the rotor 10. Specifically, the magnet installation hole 12 has a first end closer to the q-axis in the lengthwise direction of its lateral cross section, and a second end closer to the d-axis in the lengthwise direction of its lateral cross section. The first and second ends of the magnet installation hole 12 respectively serve as the flux barriers 102 and 103. The flux barrier 102 provided at the q-axis side end of the magnet installation hole 12, which will be referred to as an outer flux barrier 102, reduces self-shorting of the magnetic flux around the q-axis side end.

In particular, the second end of the magnet installation hole 12 closer to the d-axis extends along the d-axis toward both the stator 30 and the rotary shaft 2, resulting in the flux barrier 103, which will be referred to as an inner flux barrier 103, provided at the d-axis side end also extending along the d-axis.

The inner flux barriers 103 of each pair of the magnet installation holes 12 reduce the lines of magnetic flux oriented to be perpendicular to the d-axis from the magnets 101 that are arranged on both sides of the d-axis. The inner flux barriers 103 also reduce an inductance in the d-axis to thereby efficiently create reluctance torque. A void or a space in the region at each of the first and second ends of the magnet installation hole 12 serves as the corresponding one of the flux barriers 102 and 103, or a non-magnetic material filled in the space can serve as the corresponding one of the flux barriers 102 and 103.

The fourth embodiment described above obtains the following excellent effects.

In the rotor 10 of the interior permanent magnet rotary electric machine, the rotating magnetic field from the stator 30 may act as a demagnetization field on the rotor 10, so that the demagnetization field may demagnetize a region of each magnet 101, which is close to the outer circumferential surface of the rotor core 11 facing the stator 30.

From this viewpoint, each magnet 101 of the fourth embodiment is configured such that the easy axes of magnetization of the corresponding magnet 101 are inclined with respect to the d-axis and each intersect with the flux effective surfaces, each of which generates magnetic flux, of the corresponding magnet 101 at an angle except for 90 degrees.

This configuration enables the length of each magnetic path, i.e. the length of each magnetic line, formed in the corresponding magnet 101 to become longer than the length of each magnetic line formed in a magnet whose easy axes of magnetization are perpendicular to the flux effective surfaces of the magnet. This longer length of each magnetic line strengthens the magnetic flux of the magnet 101, thus improving demagnetization-resistance performance of the magnet 101 against the demagnetization field due to the rotating magnetic flux of the stator 30. This therefore properly reduces demagnetization of each magnet 101.

The magnets 101 are respective located across the d-axis in both first and second regions partitioned by the d-axis. The easy axes of magnetization of each of the magnets 101 are inclined with respect to the flux effective surfaces of the corresponding one of the magnets 101, and the easy axes of magnetization of one of the magnets 101 cross with the easy axes of magnetization of the other of the magnets 101 at a region in the rotor core 11, which is closer to the stator 30 than the corresponding magnet installation hole 12 is. This efficiently strengthens magnetic flux on the d-axis while improving demagnetization-resistance performance of the corresponding one of the magnets 101 against the demagnetization field.

When the magnet 101 has a rectangular shape in its lateral cross section, the easy axes of magnetization of the magnet 101 are oriented to intersect with the opposing side surfaces 101a and 101b of the magnet 101 at a non-right angle. This configuration enables the length of each magnetic path, i.e. the length of each magnetic line, formed in the corresponding magnet 101 to become longer than the minimum distance between the opposite side surfaces 101a and 101b. This longer length of each magnetic path strengthens the magnetic flux of the magnet 101, thus improving demagnetization-resistance performance of the magnet 101 against the demagnetization field.

Note that, for avoiding demagnetization, a conventional technology may use magnets each configured to 1. Have a portion with a larger thickness; this portion is subjected to a large demagnetization field
2. Contain a larger percentage of heavy rare-earth elements, and/or
3. Have a finer design In contrast, the rotary electric machine 1 according to the fourth embodiment is configured to devise the easy axes of magnetization in each magnet 101 to thereby reduce demagnetization of the corresponding magnet 101 due to a demagnetization field. This makes it possible to construct the rotary electric machine 1 using non heavy rare earth magnets without the need of increasing the size of each magnet 101.

Eliminating the usage of heavy rare earth elements, which are valuable in current vehicular products, enables the percentage of neodymium elements with higher flux density in the magnets to be increased. This results in the rotary electric machine 1 increasing the output torque while 1. Maintaining the total amount of magnets used by the machine 1, which is the same as that used by the rotary electric machine of the conventional technology
2. Maintaining or reducing the cost of the rotary electric machine 1 as compared with the cost of the rotary electric machine of the conventional technology Usually, a magnet material is cut into magnets such that magnetic orientations in each magnet are parallel to a cut surface. This is because parallelizing an orientation magnetic field for producing magnets using a cut surface enables the number of magnets for one magnetization of the magnets using an orientation magnetic field to be maximized.

From this viewpoint, each magnet 101 according to the fourth embodiment, which has a rectangular cross section, has oblique magnetic orientations. That is, each magnet 101 has been magnetically oriented such that the length of a magnetic path, which passes through a selected corner of the corresponding magnet 101 in the rectangular cross section, is longer than the length of a lateral side of the corresponding magnet 101; the selected corner is most likely demagnetized.

Additionally, each magnet 101 has been magnetically oriented such that the magnetic path passing through the selected corner is obliquely inclined with respect to the orthogonal direction orthogonal to each of the flux effective surfaces 101a and 101b.

This improves demagnetization resistance of the selected corner of each magnet 101. This reduces, although the number of magnets 101 for one magnetization of the magnets 101 using an orientation magnetic field is reduced, the weight of each magnet 101. This results in many magnets 101 being obtained for one magnetic orientation in the magnets 101, and makes it possible to reduce the quantity of a magnet material, such as a neodymium material, for each magnet 101, thus reducing the manufacturing cost of the magnets 101.

According to the inventor's estimate, it is possible to reduce the weight of the magnet 101 by an approximately 30 percent as compared with a magnet having magnetic force that is the same as magnetic force of the magnet 101. This therefore results in the rotary electric machine 1 having a smaller amount of rare earth elements, a smaller weight, and/or a smaller moment of the inertia thereof. These features enable the rotary electric machine 1 to have an improved tracking performance and an improved mechanical reliability, thus contributing to reduction in energy consumption of the rotary electric machine 1 and/or improvement of the safety of the rotary electric machine 1.

The following describes modifications of the rotor 10 according to the fourth embodiment; at least one part of the rotor 10 is modified in each modification. The following describes mainly the different points between the structure of the rotor 10 according to each modification and the structure of the rotor 10 illustrated in FIG. 23. Note that, in the following figures, other components except for the rotors 10 of the respective modifications are omitted from illustration. In each modification, we describe the structure of the rotor 10 using a partial plan view illustrating one pole portion of the corresponding rotor 10 having the d-axis located as the center of the one pole portion thereof.

Figure 24:
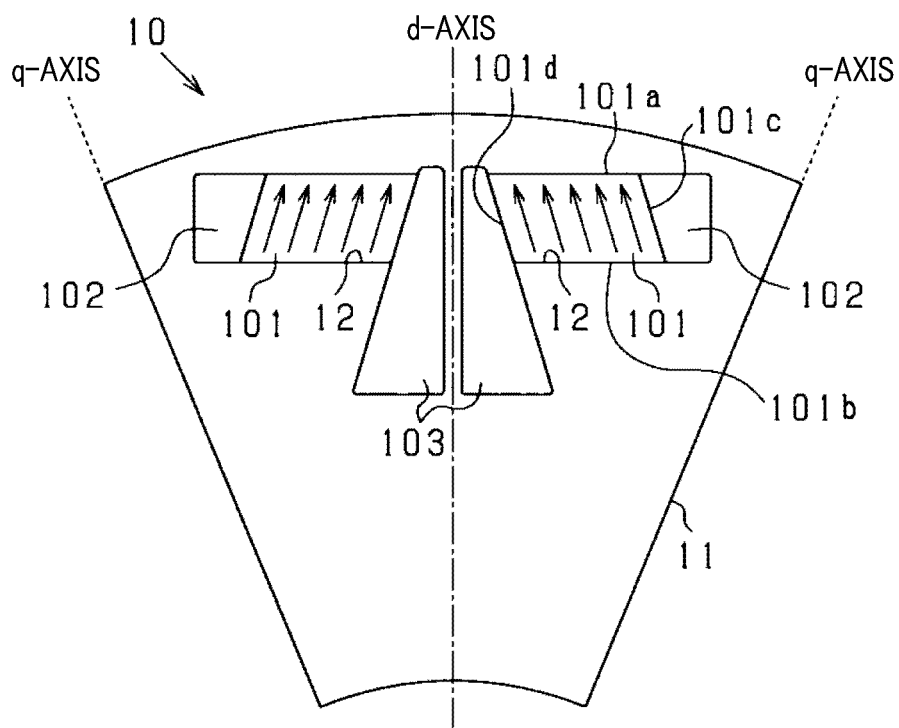
FIG. 24 is a partial plan view of a rotor according to a first modification of the fourth embodiment.

First modification Each of the magnets 101 of the rotor 10 according to the first modification illustrated in FIG. 24 is configured such that a surface of the q-axis side end 101c is oriented to be in conformity with an angle of each easy axis of magnetization with respect to the flux effective surfaces 101a and 101b, and a surface of the d-axis side end 101d is oriented to be in conformity with an angle of each easy axis of magnetization with respect to the effective surfaces 101a and 101b.

That is, the orientation of the surface of each of the q- and d-axis side ends 101c and 101d is defined to be in conformity with each axis of magnetization. In other words, the orientation of the surface of each of the q- and d-axis side ends 101c and 101d is identical to the orientation of each axis of magnetization in planer view as seen in planar view. The flux barrier 102 is arranged at the outer side of the q-axis side end 101c, and the flux barrier 103 is arranged at the outer side of the d-axis side end 101d.

Note that, in FIG. 24, each magnet 101 is configured such that the

1. The surface of the q-axis side end 101c is oriented to be in conformity with the angle of each easy axis of magnetization with respect to the flux effective surfaces 101a and 101b
2. The surface of the d-axis side end 101d is oriented to be in conformity with the angle of each easy axis of magnetization with respect to the flux effective surfaces 101a and 101b In place of this configuration, each magnet 101 can be configured such that only the surface of the q-axis side end 101c is oriented to be in conformity with the angle of each easy axis of magnetization with respect to the flux effective surfaces 101a and 101b. The surface of the d-axis side end 101d can be oriented to be parallel to the d-axis. That is, the magnet 101 can have a parallelogram shape in its lateral cross section illustrated in FIG. 24, or a trapezoidal shape in its lateral cross section in place of the rectangular shape in its lateral cross section.

As described above, each easy axis of magnetization in the magnet 101 is oriented to intersect with the flux effective surfaces 101a and 101b at a non-right angle. This configuration enables the length of each magnetic path in the magnet 101 to be longer than the length of each magnetic path in another configuration of the magnet 101 in which each easy axis of magnetization in the magnet 101 is oriented to perpendicularly intersect with the flux effective surfaces 101a and 101b. However, the lengths of partial magnetic paths in each end of the magnet 101 may be smaller.

From this viewpoint, the surface of the q-axis side end 101c is oriented to be in conformity with the angle of each easy axis of magnetization with respect to the flux effective surfaces 101a and 101b, thus reducing partial magnetic paths with smaller lengths in each end of the magnet 101.

Note that the magnet 101 illustrated in FIG. 24 is configured such that each end of the magnet 101, which does not contribute to an increase in magnetic flux, has been obliquely eliminated, resulting in the amount of magnet in the rotor 10 illustrated in FIG. 24 being smaller than the amount of magnet in the rotor 10 illustrated in FIG. 23. This results in the number of cavities in the mold being larger and the quantity of magnetic materials putted into the mold being smaller.

Second Modification

Figure 25:
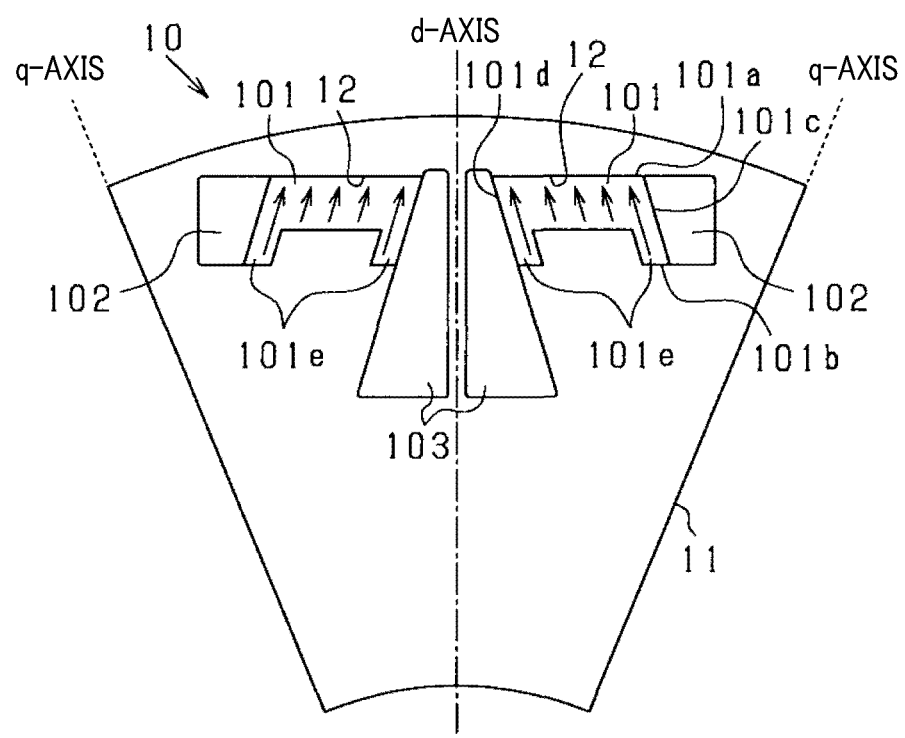
FIG. 25 is a partial plan view of a rotor according to a second modification of the fourth embodiment.

Each of the magnets 101 of the rotor 10 according to the second modification illustrated in FIG. 25 is configured such that the length of each of the q- and d-axis side ends 101c and 101d of the corresponding one of the magnets 101, which has one or more easy axes of magnetization, is longer than the lengths of the respective other portions in the corresponding one of the magnets 101.

That is, each of the q- and d-axis side ends 101c and 101d of the magnet 101 has an extension portion 101e, so that the extension portions 101e of the respective q- and d-axis side ends 101c and 101d of the magnet 101 define a concave groove formed on the second flux effective surface 101b therebetween.

The extension portion 101e of each of the q- and d-axis side ends 101c and 101d results in the corresponding one or more lines of the magnetic flux based on the magnet 101 partially extending. That is, the extension portion 101e serves as a flux extension member. The extension portions 101e are provided to the second flux effective surface 101b that is closer to the rotary shaft 2 than the first flux effective surface 101a thereto.

Note that each of the q- and d-axis side ends 101c and 101d of the magnet 101 has the extension portion 101e illustrated in FIG. 25, but only the q-axis side end 101c can have the extension portion 101e.

The magnet 101 of the second modification is configured such that
1. Each easy axis of magnetization in the magnet 101 is oriented to intersect with the flux effective surfaces 101a and 101b at a non-right angle
2. Each of the q- and d-axis side ends 101c and 101d has a partially extended magnetic path This results in a further improvement of demagnetization-resistance performance of the magnet 101.

Third Modification

Figure 26A:
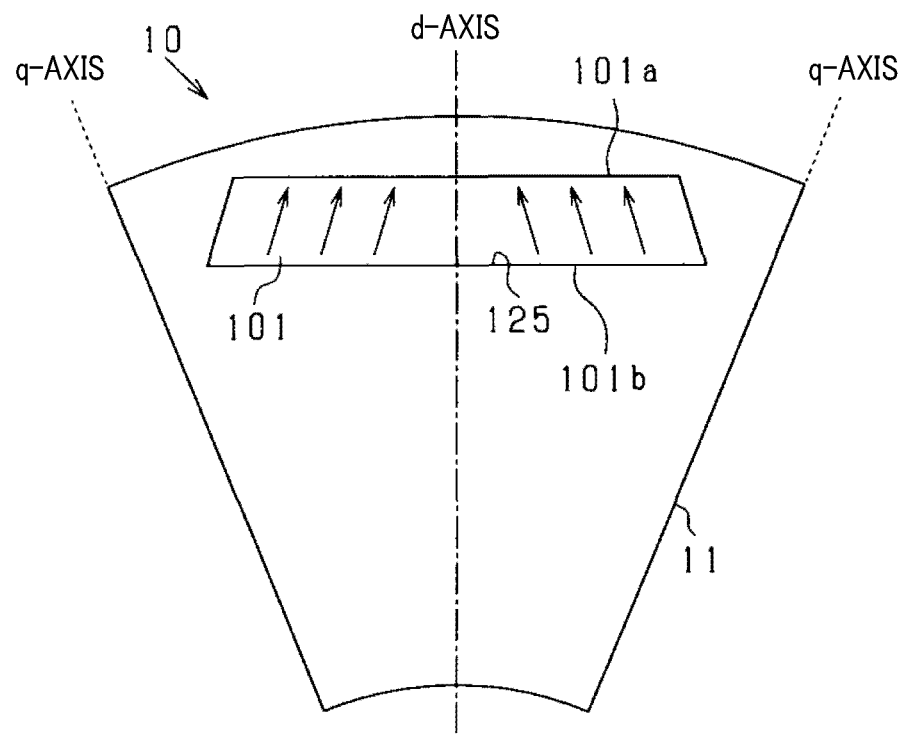
FIG. 26(a) and FIG. 26(b) are partial plan views of a rotor according to a third modification of the fourth embodiment.
Figure 26B:
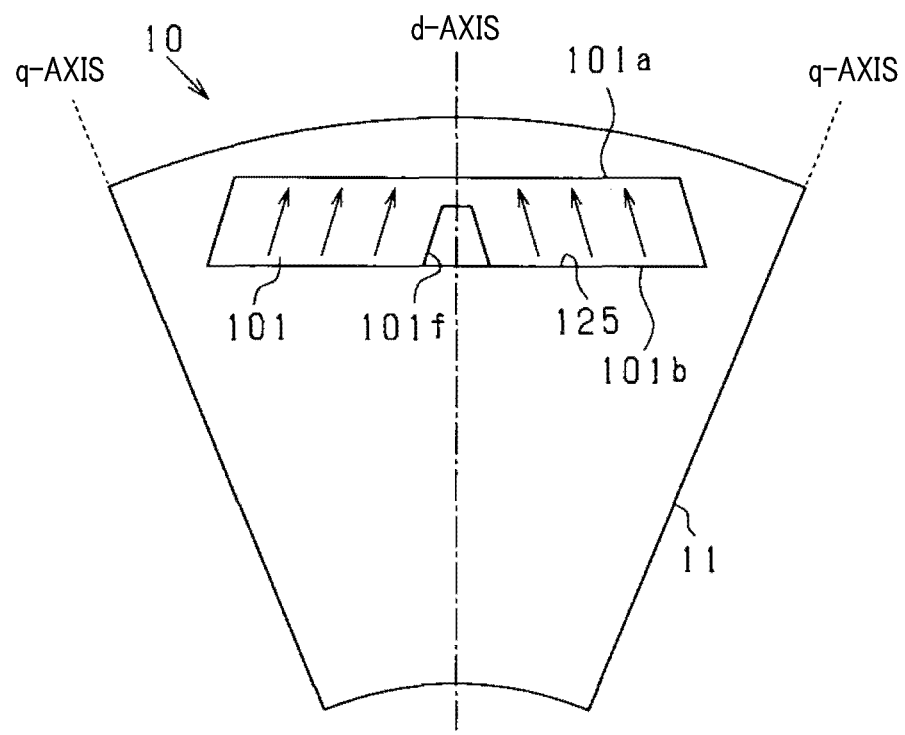

In the rotor core 11, a magnet 101 can be arranged in FIG. 26(a) or FIG. 26(b).

The rotor core 11 of the rotor 10 according to the third modification illustrated in FIG. 26(a) includes eight magnet installation holes 125 that have been formed through a peripheral portion of the rotor core 11 in the axial direction thereof; the peripheral portion is located to be adjacent to the outer circumferential surface of the rotor core 11, which faces the inner circumferential surface of the stator 30. The magnet installation holes 125 are arranged with regular intervals in the circumferential direction.

Each of the magnet installation holes 125 is located across the corresponding d-axis to be perpendicular to the corresponding d-axis.

The magnet 101 is installed in each of the magnet installation holes 125 has a left half part and a right half part in FIG. 26(a). The left half part includes easy axes of magnetization are oriented obliquely right upward, and the right half part includes easy axes of magnetization are oriented obliquely left upward.

That is, the easy axes of magnetization of each of the left and right half parts of the magnet 101, which are arranged across the d-axis, are oriented to pass through a region of the rotor core 11 arranged on the d-axis and located to be closer to the stator 30 than the magnet 11, i.e. the magnet installation hole 12, thereto. Specifically, the easy axes of magnetization of each of the left and right half parts of the magnet 101, which are arranged across the d-axis, are oriented to focus on the region of the rotor core 11 arranged on the d-axis and located to be closer to the stator 30 than the magnet 11, i.e. the magnet installation hole 12, thereto. That is, the region is located to face a middle portion of the magnet 101 except for its both ends.

In the rotor 10 illustrated in FIG. 26(a), the lines of magnetic flux flowing from the magnet 101 may mutually interfere with each other. This may result in demagnetization of the magnet 101.

From this viewpoint, as illustrated in FIG. 26(b), each magnet 101 includes a concave groove 101f formed in the second flux effective surface 101b; the concave groove 101f is located on the corresponding d-axis. The concave groove 101f has opposing left and right inner sides across the d-axis illustrated in FIG. 26(b)

The left inner side of the concave groove 101f is oriented to be in conformity with the easy axes of magnetization oriented to be obliquely right upward, and the right inner side of the concave groove 101f is oriented to be in conformity with the easy axes of magnetization oriented to be obliquely left upward. This structure illustrated in FIG. 26(b) makes it possible to reduce the cost of the rotor 10 by the smaller amount of magnet in the rotor 10.

Fourth Modification

Figure 27:
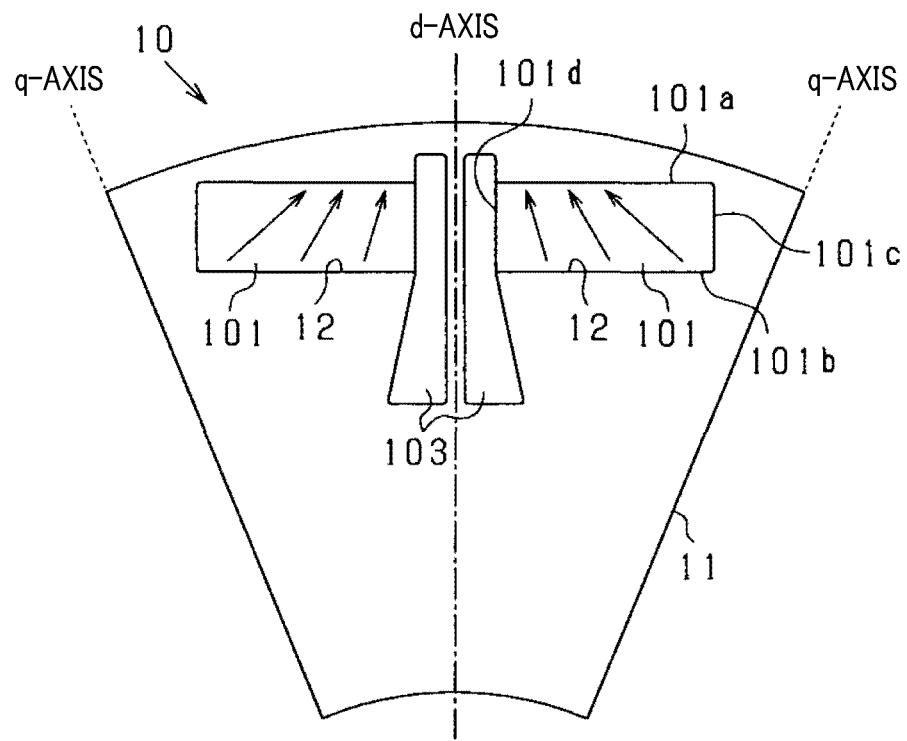
FIG. 27 is a partial plan view of a rotor according to a fourth modification of the fourth embodiment.

Each of the magnets 101 of the rotor 10 according to the fourth modification illustrated in FIG. 27 is configured such that the orientations of one or more easy axes of magnetization located to be closer to one of the q- and d-axis side ends 101c and 101d are different from the orientations of one or more easy axes of magnetization located to be closer to the other thereof. In particular, one or more easy axes of magnetization located to be closer to the d-axis side end 101d are oriented to be close to the parallel direction parallel to the d-axis. Inclined angles of easy axes of magnetization with respect to the parallel direction parallel to the d-axis sequentially increase from the d-axis side end 101d to the q-axis side end 101c, in other words, degrees of non-parallelism of easy axes of magnetization with respect to the d-axis sequentially increase from the d-axis side end 101d to the q-axis side end 101c.

In other words, each of the magnets 101 of the rotor 10 according to the fourth modification illustrated in FIG. 27 is configured such that the orientations of one or more easy axes of magnetization located to be closer to one of the q- and d-axes are different from the orientations of one or more easy axes of magnetization located to be closer to the other of the q- and d-axes. In particular, one or more easy axes of magnetization located to be closer to the d-axis are oriented to be more nearly parallel to the d-axis than one or more axes of magnetization located to be closer to the q-axis are.

Figure 28:
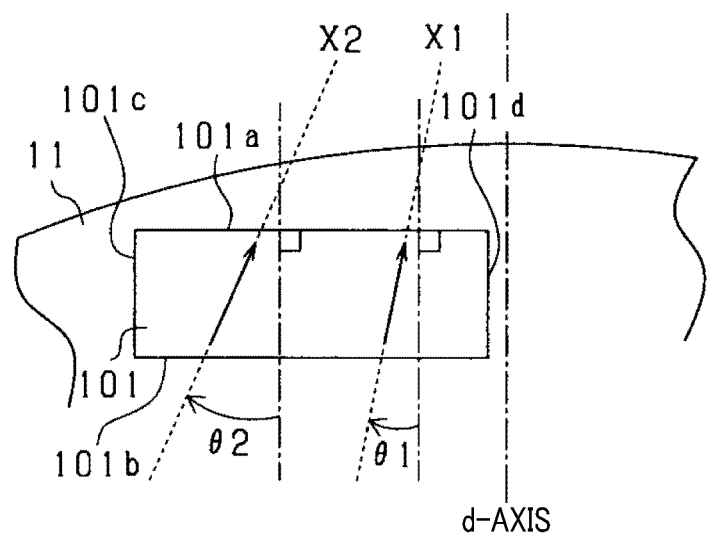
FIG. 28 is a view illustrating, in detail, magnetic orientations of a magnet.

In particular, as illustrated in FIG. 28, at least one easy axis of magnetization located at a predetermined position of the magnet 101 to be closer to the d-axis side end 101d than to the q-axis side end 101c will be referred to as at least one easy axis of magnetization X1, and at least one easy axis of magnetization located at a predetermined position of the magnet 101 to be closer to the q-axis side end 101c than to the d-axis side end 101d will be referred to as at least one easy axis of magnetization X2.

At that time, the at least one easy axis of magnetization X1 is more nearly parallel to the d-axis than the at least one easy-axis of magnetization X2 is.

In addition, in the magnet 101, an inclination angle θ2 of the at least one easy-axis of magnetization X2 with respect to the d-axis, i.e. the orthogonal direction orthogonal to the flux effective surfaces 101a and 101b, is larger than an inclination angle θ1 of the at least one easy-axis of magnetization X1 with respect to the d-axis, i.e. the orthogonal direction orthogonal to the flux effective surfaces 101a and 101b.

Specifically, in the magnet 101, lengths of respective easy axes of magnetization, i.e. lengths of magnetic paths respectively corresponding to the easy axes of magnetization sequentially decrease from the q-axis side end 101c to the d-axis side end 101d; each magnetic path can be defined from a start point to an end point of the corresponding easy axis of magnetization. Each magnet 101 can include at least one easy axis of magnetization oriented to be perpendicular to the flux effective surfaces 101a and 101b for generating magnetic flux in addition to the easy axes of magnetization each oriented to intersect with the flux effective surfaces 101a and 101b at a non-right angle.

Note that, as illustrated in FIG. 28, the magnet 101 is arranged such that the flux effective surfaces 101a and 101b are perpendicular to the d-axis, so that the orthogonal direction orthogonal to the flux effective surfaces 101a and 101b is in agreement with the direction of the d-axis.

In contrast, if the flux effective surfaces 101a and 101b are not perpendicular to the d-axis, the orthogonal direction orthogonal to the flux effective surfaces 101a and 101b is not in agreement with the direction of the d-axis. Even if the orthogonal direction orthogonal to the flux effective surfaces 101a and 101b is not in agreement with the direction of the d-axis, the inclination angle θ2 of the at least one easy-axis of magnetization X2 with respect to the orthogonal direction orthogonal to the flux effective surfaces 101a and 101b is larger than the inclination angle θ1 of the at least one easy-axis of magnetization X1 with respect to the orthogonal direction orthogonal to the flux effective surfaces 101a and 101b.

Note that the inclination θ1 of the at least one easy-axis of magnetization X1 corresponds to an orientation, i.e. an orientation direction, of the corresponding at least one easy-axis of magnetization, and similarly, the inclination θ2 of the at least one easy-axis of magnetization X2 corresponds to an orientation, i.e. an orientation direction, of the corresponding at least one easy-axis of magnetization.

The orientation of easy axes of magnetization represents an orientation with 50% or more of the orientation ratio, or represents an averaged orientation of the easy axes of magnetization. Specifically, as illustrated in FIG. 28, the predetermined portion of the magnet 101 corresponding to the at least one easy-axis of magnetization X1 has 50% of the orientation ratio of easy axes of magnetization each with the inclination θ1, or has an averaged orientation the easy axes of magnetization each with the inclination θ1.

The orientations of one or more easy axes of magnetization located to be closer to the d-axis side end 101d are different from the orientations of one or more easy axes of magnetization located to be closer to the q-axis side end 101c. That is, the inclinations of one or more easy axes of magnetization, which are located to be closer to the d-axis side end 101d, with respect to the d-axis are different from the inclinations of one or more easy axes of magnetization, which are located to be closer to the q-axis side end 101c, with respect to the d-axis.

This configuration enables the magnetic flux components to be collected to a region in the rotor core 11 between the d-axis and the q-axis; the region is located to be closer to the stator 30 than the magnet 101 is. This strengthens the magnetic flux based on the magnet 101.

One or more easy axes of magnetization located to be closer to the d-axis are oriented to be more nearly parallel to the d-axis than one or more axes of magnetization located to be closer to the q-axis are. This results in the magnetic paths at the portion of the magnet 101 closer to the q-axis side end 101c being longer than the magnetic paths at the portion of the magnet 101 closer to the d-axis side end 101d.

This configuration strengthens magnet flux on the q-axis of the rotor 10 to thereby properly address a countermeasure to demagnetization of the q-axis side end 101c of the magnet 101 due to a demagnetization field. When one or more easy axes of magnetization in the d-axis side end 101d of one of the pair of magnets 101 located across the d-axis and one or more easy axes of magnetization in the d-axis side end 101d of the other of the pair of magnets 101 are inclined to face each other, this configuration reduces mutual interferences between magnetic flux of one of the pair of magnets 101 and magnetic flux of the other of the pair of magnets 101. This therefore reduces demagnetization on the d-axis.

In the magnet 101, the inclination, i.e. the inclination angle θ2, of at least one easy-axis of magnetization closer to the q-axis side end 101c with respect to the orthogonal direction orthogonal to the flux effective surfaces 101a and 101b is larger than the inclination, i.e. the inclination angle θ1, of at least one easy-axis of magnetization closer to the d-axis with respect to the orthogonal direction orthogonal to the flux effective surfaces 101a and 101b.

This configuration enables the length of a magnetic path in the q-axis side end 101c to become longest, making it possible to strength the demagnetization resistance of the q-axis side end 101c against a demagnetization field, thus achieving both a decrease in demagnetization of the q-axis side end 101c of the magnet 101 and an increase in the torque of the magnet 101.

Note that, as illustrated in FIG. 27, each magnet installation hole 12 is formed in the rotor core 11 to linearly extend in a direction perpendicular to the corresponding d-axis. In addition, one or more easy axes of magnetization in the magnet 101 closer to the d-axis side end 101d is oriented to more nearly parallel to the d-axis than one or more easy axes of magnetization in the magnet 101 closer to the q-axis side end 101c. This configuration enables the inclination, i.e. the inclination angle θ2, of at least one easy-axis of magnetization closer to the q-axis side end 101c with respect to the orthogonal direction orthogonal to the flux effective surfaces 101a and 101b to be larger than the inclination, i.e. the inclination angle θ1, of at least one easy-axis of magnetization closer to the d-axis with respect to the orthogonal direction orthogonal to the flux effective surfaces 101a and 101b.

Fifth Modification

Figure 29:
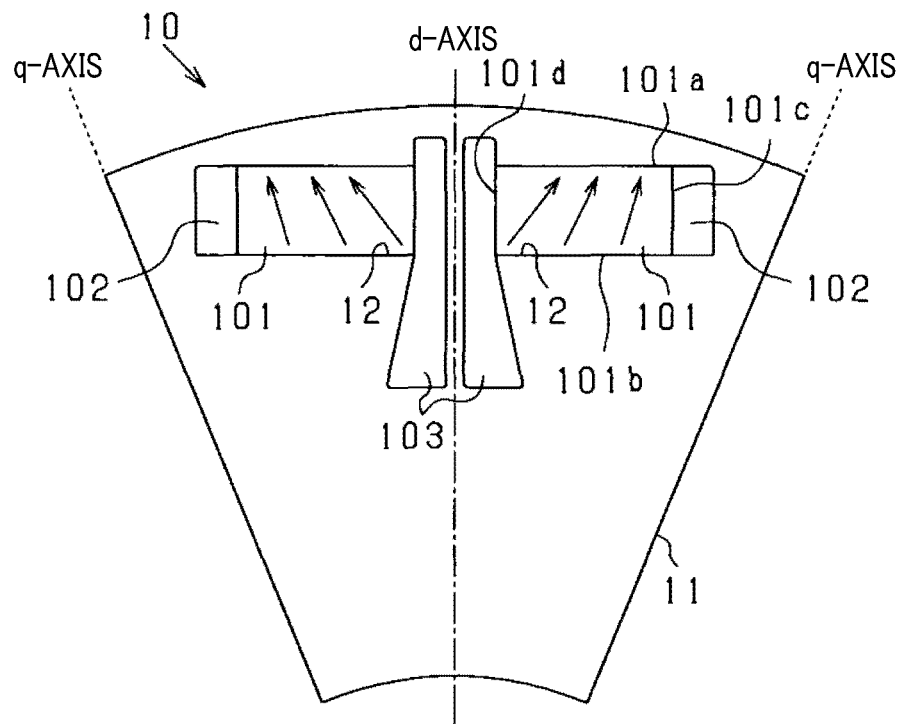
FIG. 29 is a partial plan view of a rotor according to a fifth modification of the fourth embodiment.

Each of the magnets 101 of the rotor 10 according to the fifth modification illustrated in FIG. 29 is configured such that, like the fourth modification, the orientations of one or more easy axes of magnetization located to be closer to one of the q- and d-axis side ends 101c and 101d are different from the orientations of one or more easy axes of magnetization located to be closer to the other thereof. In particular, the orientations of easy axes of magnetization in the magnet 101 according to the fifth modification are different from the orientations of easy axes of magnetization in the magnet 101 according to the fourth modification.

Specifically, one or more easy axes of magnetization located to be closer to the q-axis side end 101c are more nearly parallel to the q-axis than one or more easy axes of magnetization located to be closer to the d-axis side end 101d.

In the magnet 101, the lengths of respective easy axes of magnetization, i.e. lengths of magnetic paths respectively corresponding to the easy axes of magnetization, gradually decrease from the d-axis side end 101d to the q-axis side end 101c; each magnetic path can be defined from a start point to an end point of the corresponding easy axis of magnetization.

Because one or more easy axes of magnetization in the q-axis side end 101c of the magnet 101 are oriented to be parallel to the q-axis, it is possible to strengthen magnetic flux components based on the magnet 101 on the q-axis, which are oriented to be perpendicular to the outer circumferential surface of the rotor core 11 facing the stator 30, i.e. magnet flux components oriented to be against a demagnetization field. This results in properly providing a countermeasure to demagnetization of the q-axis side end 101c of the magnet 101 due to a demagnetization field.

Sixth Modification

Figure 30:
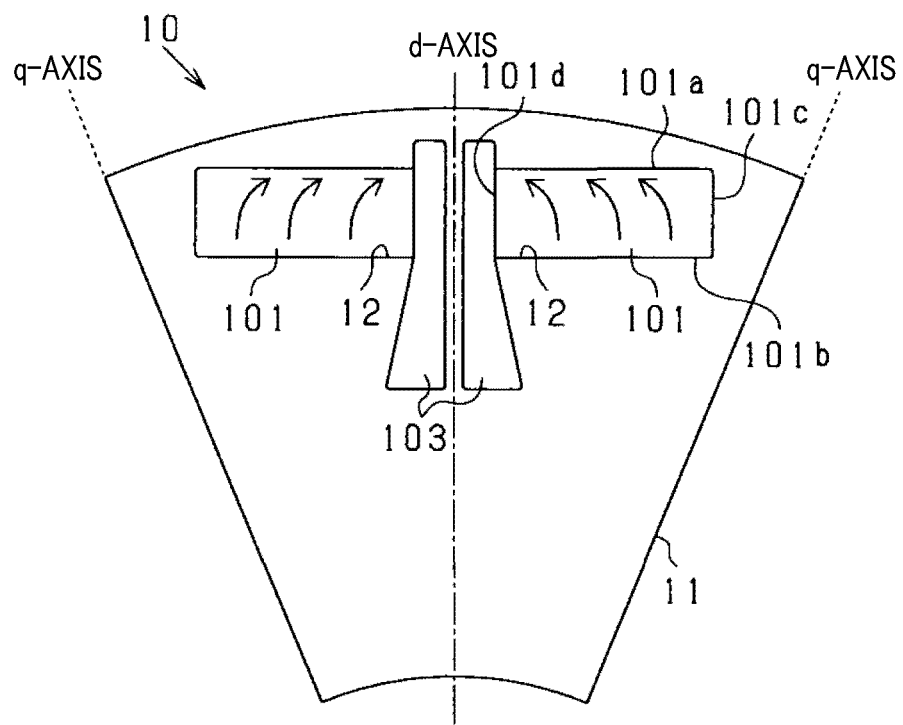
FIG. 30 is a partial plan view of a rotor according to a sixth modification of the fourth embodiment.

Each of the magnets 101 of the rotor 10 according to the sixth modification illustrated in FIG. 30 is configured such that each of easy axes of magnetization in the magnet 101 has a circular-arc shape, i.e. a non-linear shape. This enables the lengths of the respective easy axes of magnetization in the magnet 101 to further increase, making it possible to further strengthen magnetic flux of the magnet 101.

Seventh Modification

Figure 31A:
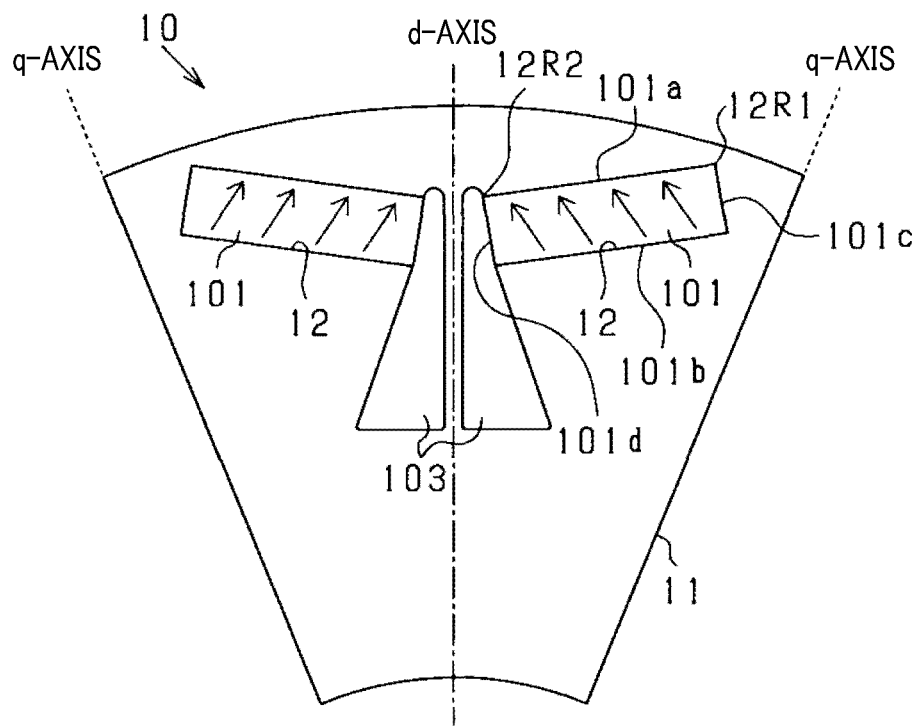
FIG. 31(a) and FIG. 31(b) are partial plan views of a rotor according to a seventh modification of the fourth embodiment.
Figure 31B:
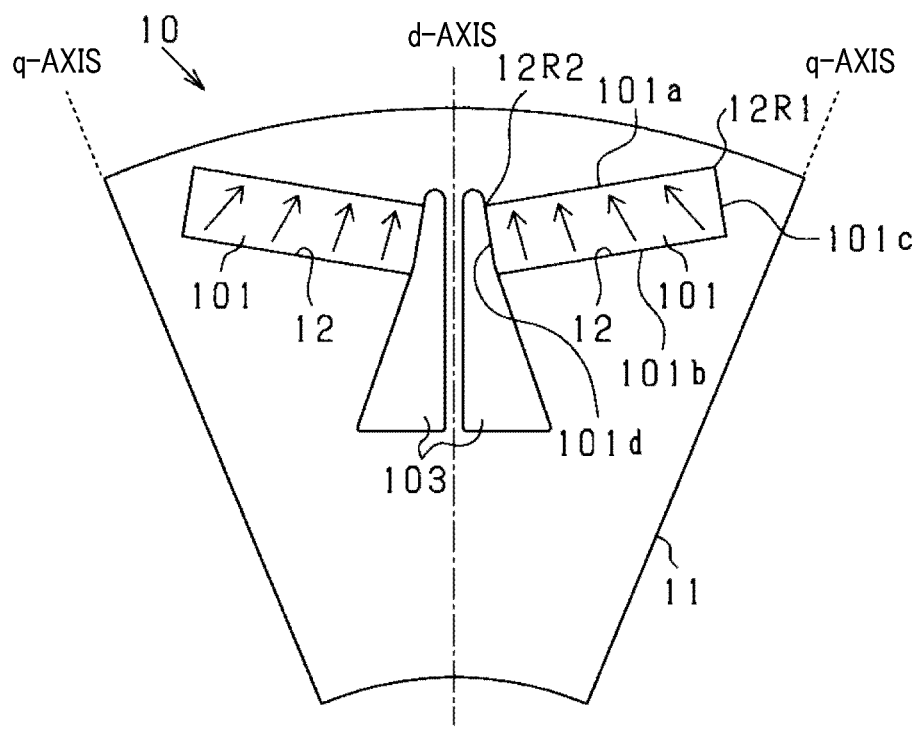

Referring to FIGS. 31(a) and 31(b), the rotor core 11 has formed a pair of two magnet installation holes 12 for each d-axis; the two magnet installation holes 12 of each pair have a substantially V shape such that a distance between the two magnet installation holes 12 becomes larger toward the radially outside of the rotor core 11.

That is, each of the magnet installation holes 12 has a rectangular shape in its lateral cross section perpendicular to the axial direction of the rotor core 11, and has opposing first and second major surfaces. In each of the magnet installation holes 12, the first major surface, which is closer to the stator 30, is inclined such that an outer corner 12R1 of the first major surface is closer to the stator 30 than an inner corner 12R2 of the first major surface, resulting in the pair of magnet installation holes 12 having a substantially V shape.

In FIG. 31(a), like FIG. 23, each of easy axes of magnetization in the magnet 101 is inclined with respect to the d-axis while intersecting with the opposing side surfaces 101a and 101b, which generate magnetic flux, of the magnet 101 at a non-right angle.

In FIG. 31(b), like FIG. 27, the orientations of one or more easy axes of magnetization located to be closer to the q-axis side end 101c are different from the orientations of one or more easy axes of magnetization located to be closer to the d-axis side end 101d. In particular, the one or more easy axes of magnetization located to be closer to the d-axis side end 101d are more nearly parallel to the d-axis than one or more easy axes of magnetization located to be closer to the q-axis side end 101q.

Note that, as described in FIG. 29, the one or more easy axes of magnetization located to be closer to the q-axis side end 101c can be more nearly parallel to the q-axis than one or more easy axes of magnetization located to be closer to the d-axis side end 101d.

Eighth Modification

Figure 32A:
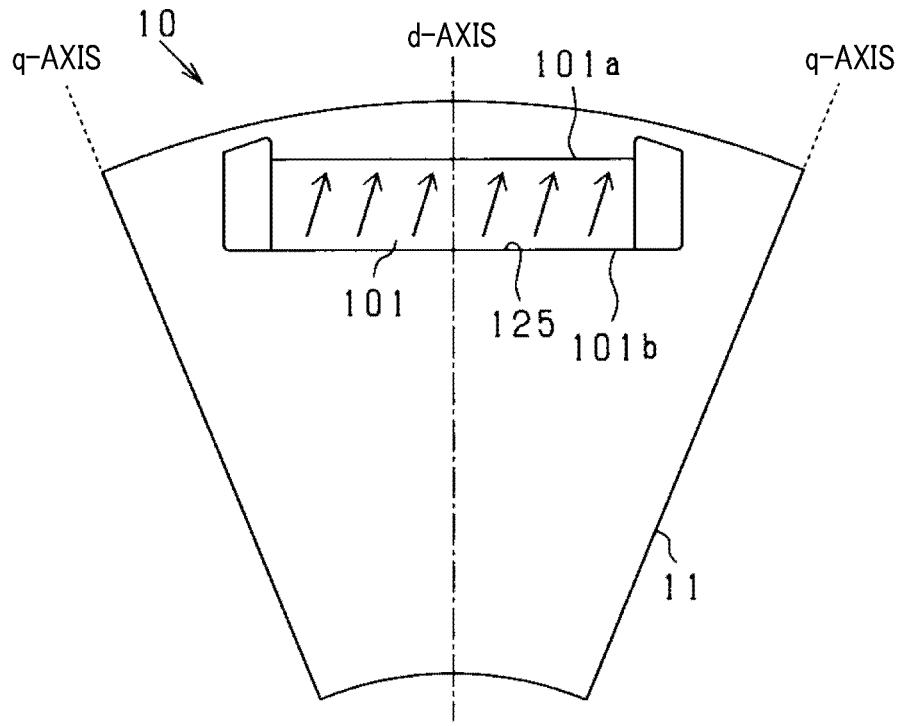
FIG. 32(a) and FIG. 32(b) are partial plan views of a rotor according to an eighth modification of the fourth embodiment.
Figure 32B:
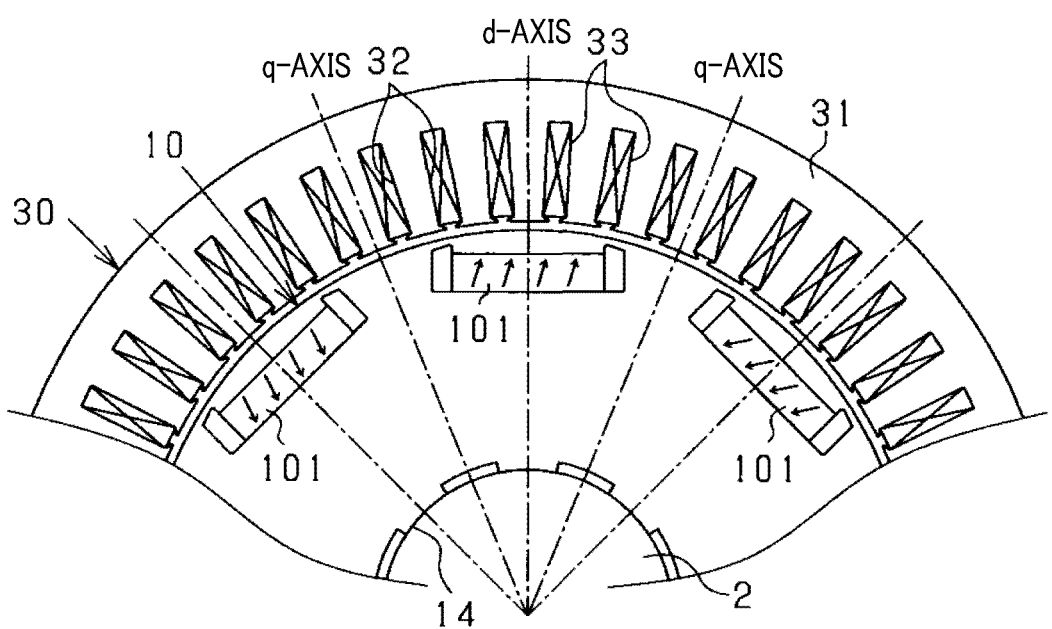

FIGS. 32(a) and 32(b) illustrate the eighth modification. As illustrated in FIG. 32(a), the magnet 101 is installed in each of the magnet installation holes 125 located across the corresponding d-axis while easy axes of magnetization, i.e. orientations of respective magnetic paths corresponding to the easy axes of magnetization, are asymmetric about the corresponding d-axis.

That is, the easy axes of magnetization in the magnet 101 are oriented to be inclined with respect to the d-axis while each intersecting with the flux effective surfaces at a non-right angle; the orientations of the respective easy axes of magnetization located in one side of the d-axis are identical to the orientations of the respective easy axes of magnetization located in the other side of the d-axis. The rotor 10 illustrated in FIG. 32(a) increases the length of each magnetic path in the magnet 101 to thereby strengthen magnetic flux of the magnet 101 against a demagnetization field. Note that each of the magnetic paths in the magnet 101 can have a nonlinear shape, for example, a circular-arc shape being convexly curved toward the anti-stator direction opposite to the stator 30, which corresponds to the lower direction in FIG. 32(a).

FIG. 32(b) schematically illustrates the rotor 10 and stator 30. The center pole of the rotor 10 illustrated in FIG. 32(b) is the north pole, and the d-axis, and the left and right side poles adjacent to the north pole are respectively the south poles. Each magnet 101 illustrated in FIG. 32(b) for the corresponding pole has both first and second portions across the d-axis, i.e. located on respective sides of the d-axis, and the orientations of the respective magnetic paths in the first portion, which are inclined with respect to the d-axis, are identical to the orientations of the respective magnetic paths in the second portion.

In the rotor core 11, each magnet 101 located on the corresponding d-axis is configured such that the easy axes of magnetization are asymmetric about the corresponding d-axis. This configuration results in a larger peak of torque generated by the rotary electric machine with the rotor 10 rotating in a forward direction as compared with a case where the easy axes of magnetization of each magnet 101 located on the corresponding d-axis are symmetric about the corresponding d-axis.

The magnets 101 having the easy axes of magnetization being asymmetric about the corresponding d-axis are preferably used for rotary electric machines each rotating in only one direction or rotating in mainly one direction.

Ninth Modification

Figure 33:
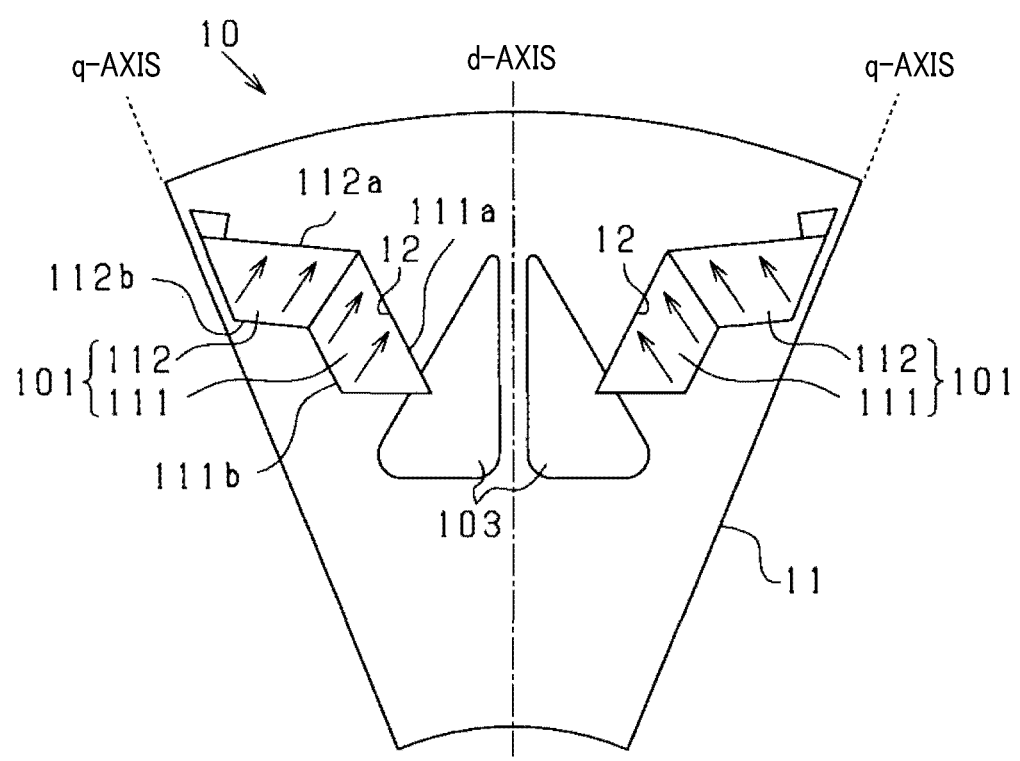
FIG. 33 is a partial plan view of a rotor according to a ninth modification of the fourth embodiment.

Referring to FIG. 33, the magnets 101 of each pair located across the corresponding d-axis, i.e. located at both sides across the corresponding d-axis, is comprised of two magnets 111 and 112, each of which has a trapezoidal shape in its lateral cross section. That is, the magnets 111 and 112 of each pair constitute a magnet assembly. Each of the magnets 111 and 112 has an isosceles trapezoidal shape. In each magnetic assembly, one of legs of the magnet 111 abuts on one of legs of the magnet 112 such that the magnets 111 and 112 are arranged to be convex toward the stator 30 while their legs abut on each other.

In each of the magnets 111 and 112, easy axes of magnetization, which respectively correspond to orientations of magnetic paths in the corresponding magnet, are defined to be parallel to one of the legs of the corresponding magnet. Each of the magnets 111 and 112 has opposing bases, i.e. upper and lower bases, each of which serves as a flux effective surface. That is, each of the magnets 111 and 112 is configured such that each of the corresponding easy axes of magnetization intersects with the flux effective surfaces at a non-right angle. One of the legs of the magnet 111, which are parallel to its easy axes of magnetization, abuts on one of the legs of the magnet 112, which are parallel to its easy axes of magnetization. This results in the orientations of the respective easy axes of magnetization of the magnet assembly located in each side of the d-axis being identical to one another.

In other words, the magnet 101 includes the magnet 111 located to be closer to the d-axis, and the magnet 112 located to be closer to the q-axis within the range from the d-axis to the q-axis; the magnet 111 serves as a first magnet, and the magnet 112 serves as a second magnet. The magnets 111 and 112 are installed in the magnet installation hole 12 in the rotor core 11.

The assembly of the magnets 111 and 112 are bent at the joined portion therebetween to be convex toward the stator windings. The magnet 111 has a pair of opposing effective surfaces 111a and 111b that respectively serve as flux inflow-outflow surfaces, and the magnet 112 has a pair of opposing effective surfaces 112a and 112b that respectively serve as flux inflow-outflow surfaces. The magnet 111 has linear magnetic paths each being loner than a magnet thickness between the effective surfaces 111a and 111b. Similarly, the magnet 112 has linear magnetic paths each being loner than a magnet width between the effective surfaces 112a and 112b. Each of the magnets 111 and 112 includes the magnetic paths that are parallel to each other. As described above, each of the magnets 111 and 112 has an isosceles trapezoidal shape in its lateral cross section, and the length of each base of the magnet 111 is the same as the length of the corresponding base of the magnet 112, and the length of each leg of the magnet 111 is also the same as the length of the corresponding leg of the magnet 112. In addition, the orientations of the easy axes of magnetization of the magnet 111 are identical to the respective orientations of the easy axes of magnetization of the magnet 112.

As compared with a configuration where the magnets 111 and 112 are linearly joined to each other, the rotor 10 illustrated in FIG. 33 enables each of the magnets 111 and 112 to be closer to the stator windings, making it possible to increase torque of the rotary electric machine 1. The closer each of the magnets 111 and 112 is, the more a demagnetization field may increase. The rotor 10 illustrated in FIG. 33 however is configured such that each magnetic path of each of the magnets 111 and 112 becomes longer between the flux effective surfaces of the corresponding magnet; this configuration counters the increase in the demagnetization field.

The above configuration of the rotor 10 enables the percentage of a region of the rotor core 11, which is located to be closer to the stator 30 than each magnet 101 (each magnet installation hole 12) is, to be smaller; the region is subjected to the sum of the magnetic flux of the stator windings and the magnetic flux of the corresponding magnet 101. This therefore reduces, in the rotor 10, a saturation region in which magnetic saturation may occur based on the magnetic flux of the stator windings and the magnetic flux of each magnet 101, thus more efficiently obtaining the performance from each magnet 101.

In the rotor core 11 of the rotor 10 of the internal rotation rotary electric machine 1, the percentage of the region located to be closer to the stator 30 than each magnet installation hole 12. This reduces the centrifugal force stress concentration factor of the rotor 10, thus increasing the mechanical strength of the rotor 10.

Figure 34A:
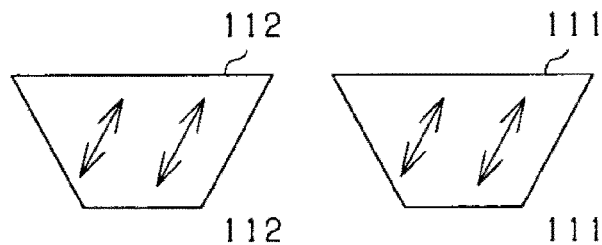
FIG. 34(a)-FIG. 34(f) are views illustrating various configurations of magnets.
Figure 34B:
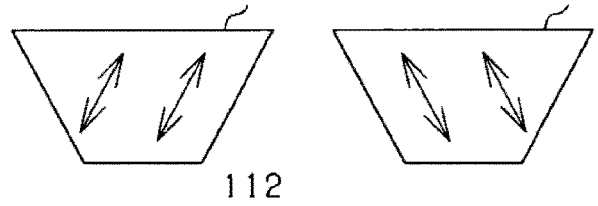
Figure 34C:
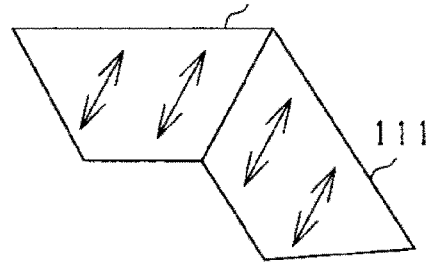

The magnets 111 and 112 have the same product-number magnets, so that they have the same configurations, the same dimensions, and the same easy axes of magnetization. For example, as illustrated in FIG. 34(a), the magnets 111 and 112 respectively having the same produce numbers are prepared, and as illustrated in FIGS. 34(b) and 34(c), the magnet 112, which has been reversed, is joined to the magnet 111. Note that magnets having different base lengths can be used as the respective magnets 111 and 112.

The magnets 111 and 112 can have identical shapes in their lateral cross sections, and the magnets 111 and 112 can respectively have sides that are adjacent to each other and intersect with each other at a non-right angle. The magnets 111 and 112 are installed in the rotor core 11 while they are oppositely oriented.

Figure 34D:
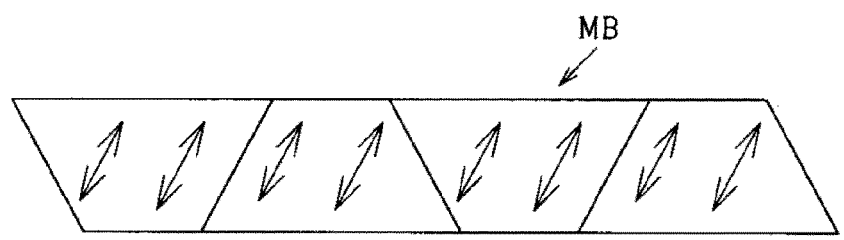

For example, as illustrated in FIG. 34(d), a plate-like magnet block MB including obliquely oriented magnetic paths are divided into plural isosceles-trapezoidal magnets such that longer and shorter bases of the respective divided magnets are alternately arranged; the divided magnets respectively have the same shapes. The divided magnets are installed in the rotor core 11 while they are oppositely oriented.

Figure 34E:
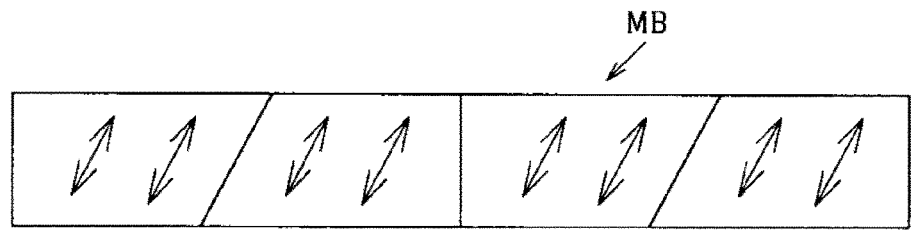
Figure 34F:
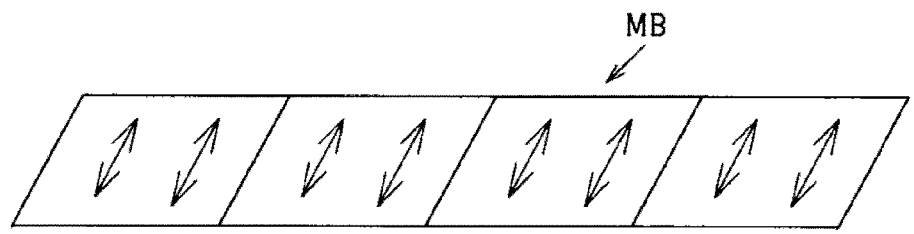

As another example, as illustrated in FIG. 34(e), the plate-like magnet block MB are divided into plural trapezoidal magnets respectively having the same shapes; each of the magnets has legs with respectively different inclinations. As a further example, the plate-like magnet block MB are divided into plural parallelogram magnets respectively having the same shapes. The divided magnets illustrated in each of FIGS. 34(e) and 34(f) are installed in the rotor core 11 while they are oppositely oriented.

Tenth Modification

Figure 35:
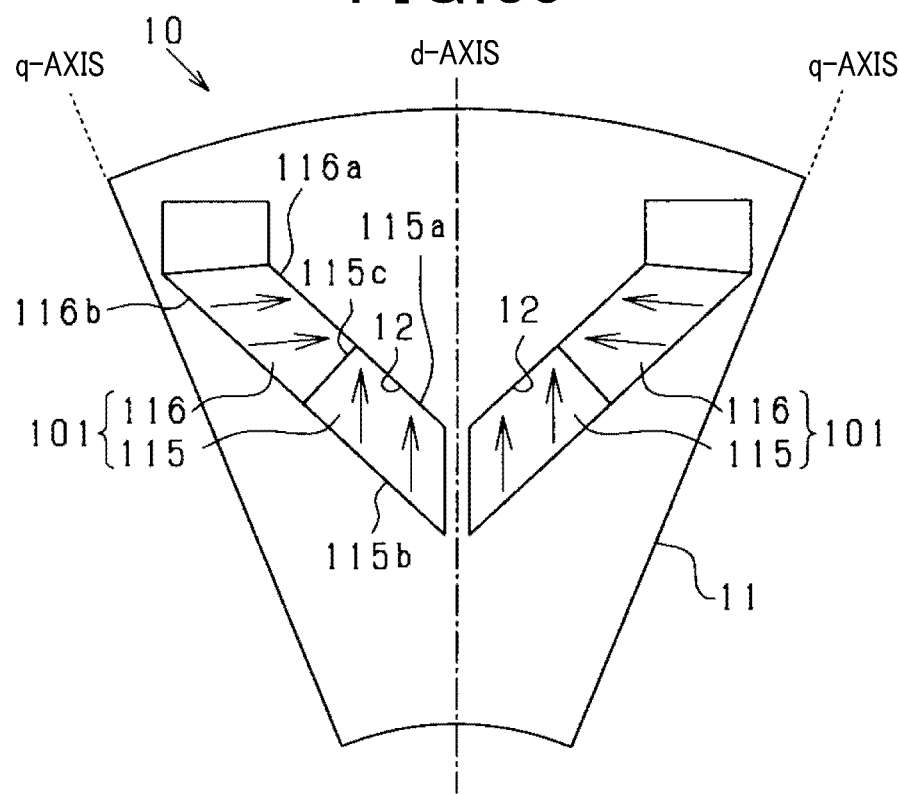
FIG. 35 is a partial plan view of a rotor according to a tenth modification of the fourth embodiment.

Referring to FIG. 35, each magnet 101 is comprised of two magnets 111 and 112, which constitute a magnet assembly. The magnets 101 of each pair are located across the corresponding d-axis, i.e. located at both sides across the corresponding d-axis. Each of the magnets 101 is comprised of two magnets 115 and 116, each of which has a trapezoidal shape in its lateral cross section.

Each of the trapezoidal magnets 115 and 116 has different first and second base angles. The first base angle is set to the right angle, and the second base angle is set to an acute angle. The magnets 115 and 116 are arranged while their right-angle side legs abut on each other.

Each of the magnets 115 and 116 has defined therein easy axes of magnetization, i.e. orientations of corresponding magnetic paths, defined to be in parallel to the acute-angle side leg. This configuration of each of the magnets 115 and 116 causes each the easy axes of magnetization to intersect with flux effective surfaces as its upper and lower bases at a non-right angle. The easy axes of magnetization of the magnet 116, which is located to be closer to the q-axis, have the right angle or an angle close to the right angle with respect to the q-axis, and the easy axes of magnetization have an angle parallel to the d-axis or an angle close to the angle parallel to the d-axis.

In other words, each magnet 101 is comprised of the magnet 115 located to be closer to the d-axis, and the magnet 116 located to be closer to the q-axis within the range from the d-axis to the q-axis; the magnet 115 serves as a first magnet, and the magnet 116 serves as a second magnet. The magnets 115 and 116 are installed in the magnet installation hole 12 in the rotor core 11. Each of the magnets 115 and 116 has linear magnetic paths defined to be parallel to each other in the corresponding magnet. The magnets 115 and 116 are fixed to the rotor core 11 while the orientations of the magnetic paths in the magnet 115 are different from the orientations of the magnetic paths in the magnet 116.

Specifically, each magnet installation hole 12 is located to be inclined with respect to the d-axis such that the d-axis side end is more separated from the stator windings, i.e. the outer circumferential surface of the rotor core 11 facing the stator windings, than the q-axis side end is. In addition, the orientations of the magnetic paths in the magnet 116 are more nearly perpendicular to the d-axis than the orientations of the magnetic paths in the magnet 115.

The magnet 115 has a pair of opposing effective surfaces 115a and 115b that respectively serve as flux inflow-outflow surfaces. The magnet 115 also has linear magnetic paths, each of which is loner than a magnet thickness dimension between the effective surfaces 115a and 115b, and is oriented to be along the corresponding one of the easy axes of magnetization defined in the magnet 115.

Similarly, the magnet 116 has a pair of opposing effective surfaces 116a and 116b that respectively serve as flux inflow-outflow surfaces. The magnet 116 also has linear magnetic paths, each of which is loner than a magnet thickness dimension between the effective surfaces 116a and 116b, and is oriented to be along the corresponding one of the easy axes of magnetization defined in the magnet 116.

Not that the magnet thickness dimension of the magnet 115 can be defined as the thickness of the magnet 115 in the direction perpendicular to the flux effective surfaces 115a and 115b, i.e. the minimum distance between the flux effective surfaces 115a and 115b. Similarly, the magnet thickness dimension of the magnet 116 can be defined as the thickness of the magnet 116 in the direction perpendicular to the flux effective surfaces 116a and 116b, i.e. the minimum distance between the flux effective surfaces 116a and 116b.

The rotor 10 illustrated in FIG. 35 is configured to intentionally strengthen magnet flux in a predetermined location thereof within the range from the d-axis to the q-axis of each pole to thereby increase the demagnetization resistance against a demagnetization field from the stator windings. That is, if the magnet 101 were comprised of only the magnet 115, the magnet 101 might be likely to be demagnetized. However, the magnet 116 having the orientations of the magnetic paths, which are different from the orientations of the magnetic paths of the magnet 115, is arranged to constitute the magnet 101. This arrangement of the magnet 116 reduces demagnetization of the magnet 115 due to a demagnetization field, thus reducing demagnetization of the magnet 101. In particular, the configuration of the magnet 101 achieves desired effects of reducing demagnetization of the magnet while using parallel anisotropic magnets, which are relatively inexpensive, as the respective magnets 115 and 116.

Figure 36:
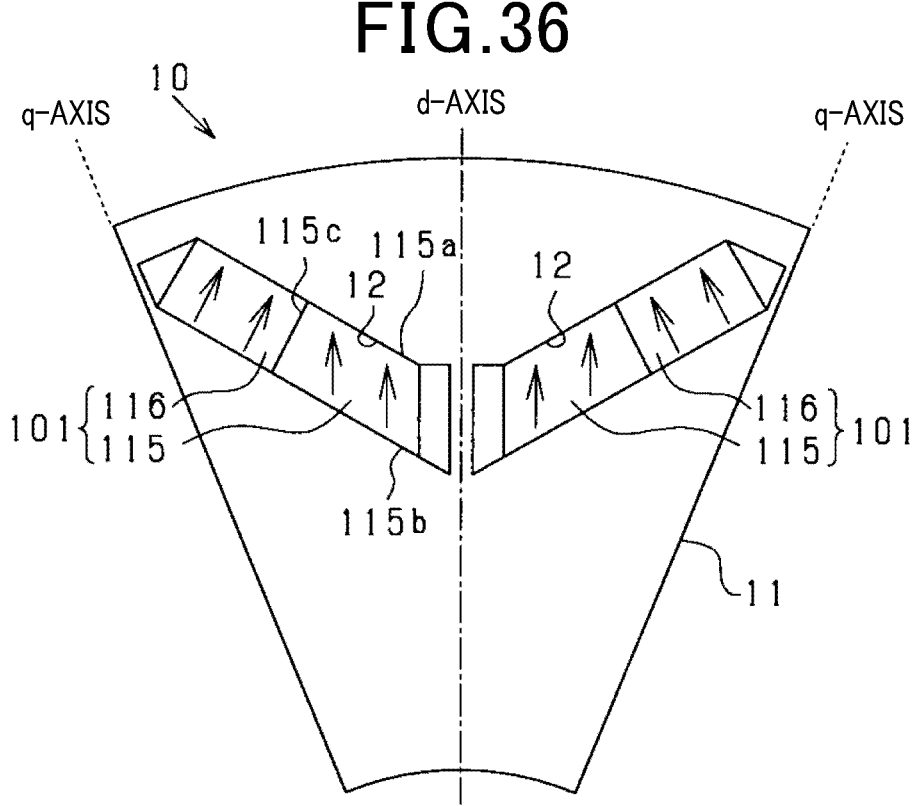
FIG. 36 is a partial plan view of a rotor according to the tenth modification of the fourth embodiment.
Figure 37:
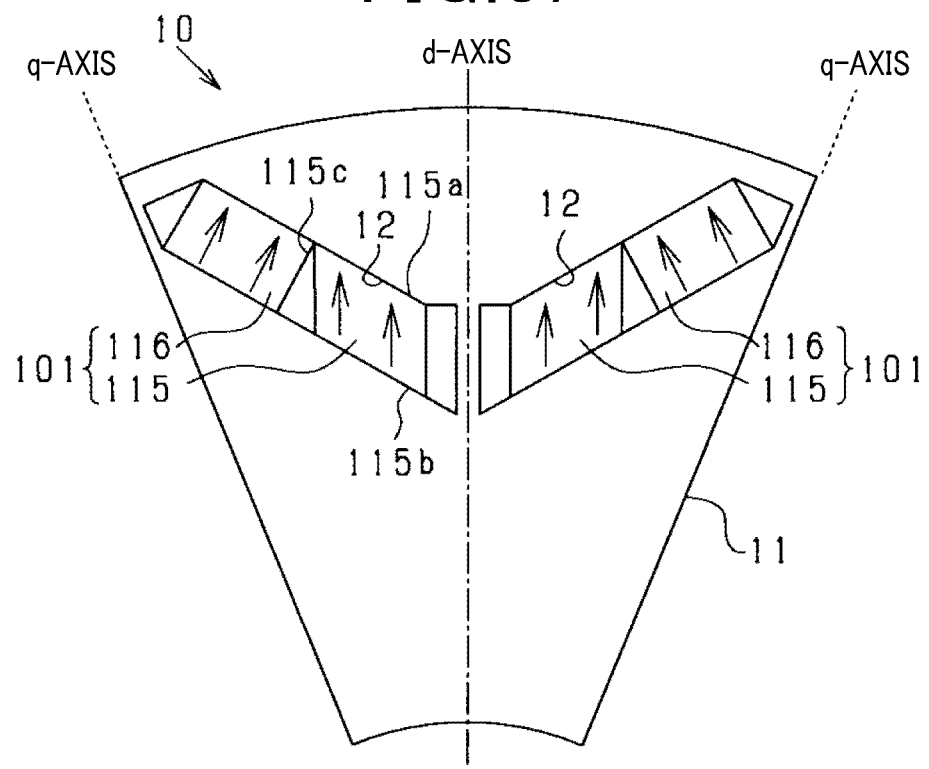
FIG. 37 is a partial plan view of a rotor according to the tenth modification of the fourth embodiment.

Each of FIGS. 36 and 37 illustrates a modification of the rotor 10, a part of which has been modified. Specifically, the modified configuration illustrated in each of FIGS. 36 and 37 includes, as the magnet 116, a magnet having easy axes of magnetization that are oriented to be perpendicular to the flux effective surfaces of the magnet. In particular, the modified configuration illustrated in FIG. 37 includes the magnet 115 having a parallelogram shape with easy axes of magnetization that are parallel to right and left sides thereof. The modified configuration illustrated in FIG. 37 also includes a flux barrier located between the magnets 115 and 116. The modified configuration illustrated in FIG. 37 can include no flux barrier located between the magnets 115 and 116, so that a corresponding part of the rotor core 11 can be located between the magnets 115 and 116. In the modified configuration illustrated in FIG. 37, the magnet 115 has a surface 115c of the q-axis side end that intersects with the pair of flux effective surfaces 115a and 115b, and is parallel to the magnetic paths defined in the magnet 115.

Fifth Embodiment

The following describes the fifth embodiment while focusing on one or more different points of the fifth embodiment from the first embodiment.

Figure 38:
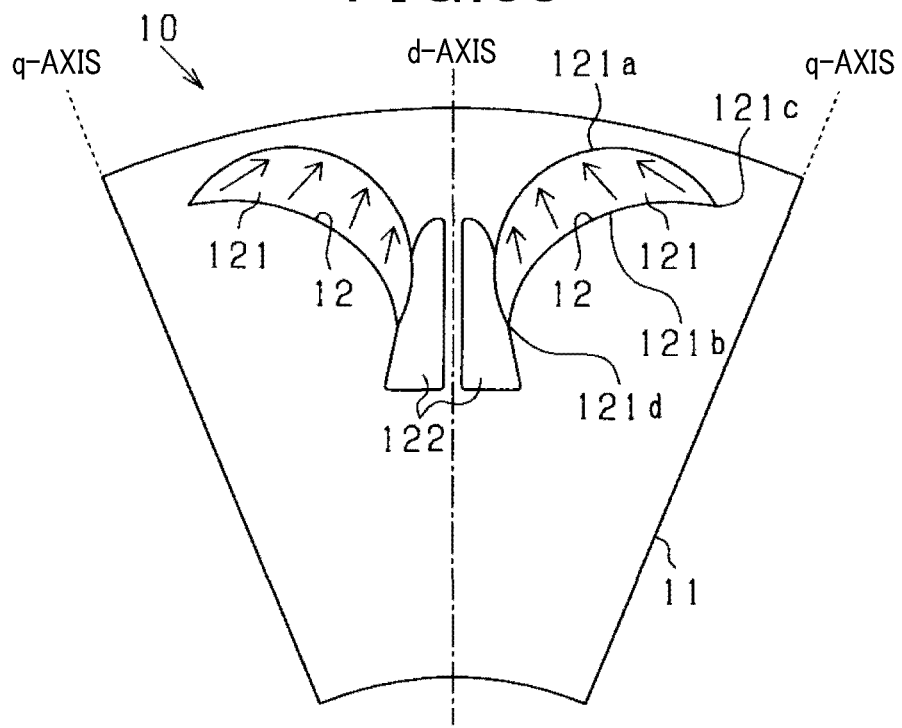
FIG. 38 is a partial plan view of a rotor according to a fifth embodiment.

FIG. 38 schematically illustrates a rotor 10 of the fifth embodiment.

Referring to FIG. 38, each magnet installation hole 12 has a q-axis side end and a d-axis side end along the lengthwise direction of the hole 12 in its lateral cross section. The q-axis side end is located to be closer to the stator 30 in a corresponding radial direction of the rotor core 11 than the d-axis side end is. In addition, each magnet installation hole 12 has a middle portion between the q- and d-axis side ends, and the middle portion is shaped to convexly project toward the stator 30.

A magnet 121 installed in each magnet installation hole 12 has flux effective surfaces 121a and 121b, a q-axis side end 121c, and a d-axis side end 121d. Like the magnet installation hole 12, the q-axis side end 121c is located to be closer to the stator 30 in a corresponding radial direction of the rotor core 11 than the d-axis side end 121d is. In addition, each magnet 121 has a middle portion between the q- and d-axis side ends 121c and 121d, and the middle portion is shaped to convexly project toward the stator 30.

Specifically, each magnet 121 has a circular-arc shape in its lateral cross section; the circular-arc shape is convex toward the stator 30. In particular, each magnet 121 has a crescent-shaped circular-arc shape in its lateral cross section. Each magnet 121 is however not limited to the circular-arc shape that is convex toward the stator 30. For example, each magnet 121 can be configured such that the flux effective surfaces 121a and 121b are bent at one or more portions thereof to thereby convexly project toward the stator 30.

The magnet 121 has easy axes of magnetization defined therein; the easy axes of magnetization are inclined with respect to the d-axis, and each intersect with the flux effective surfaces 121a and 121b at a non-right angle. The easy axes of magnetization can however include at least one easy axis of magnetization that is oriented to be perpendicular to the flux effective surfaces 121a and 121b. Each of the easy axes of magnetization defined in the magnet 121 can have a linear shape or a non-linear shape, such as a circular-arc shape.

In addition, each magnet 121 has a d-axis close portion closer to the d-axis side end 121d than to the q-axis side end 121c, and a q-axis close portion closer to the q-axis side end 121c than to the d-axis side end 121d, and easy axes of magnetization included in the d-axis close portion are different from easy axes of magnetization included in the q-axis close portion. In particular, the easy axes of magnetization included in the d-axis close portion are oriented to be closer to the direction parallel to the d-axis than the easy axes of magnetization included in the q-axis close portion are. This results in the length of each of the magnetic paths defined in the magnet 121 being longer.

Note that, in each magnet 121, inclinations of the respective easy axes of magnetization included in the q-axis close portion with respect to the perpendicular direction perpendicular to the flux effective surfaces 121a and 121b can be larger than inclinations of the respective easy axes of magnetization included in the d-axis close portion with respect to the perpendicular direction perpendicular to the flux effective surfaces 121a and 121b.

This configuration of the rotor 10 according to the fifth embodiment enables each magnet 121 to be closer to the outer circumferential surface of the rotor core 11, i.e. the surface of the rotor core 11 facing the stator. This closer arrangement of each magnet 121 makes it possible to reduce the magnetic resistance of the d-axis portion of the rotor core 11, thus increasing torque of the rotary electric machine 1. Although making shorter the distance between the stator 30 and each magnet 121 may increase demagnetization field as a counter reaction of the shorter distance, the longer easy axes of magnetization of each magnet 121 reduce negative effects of the increased demagnetization field.

The above configuration of the rotor 10 enables the percentage of a region of the rotor core 11, which is located to be closer to the stator 30 than each magnet 121, i.e. each magnet installation hole 12, is, to be smaller; the region is subjected to the sum of the magnetic flux of the stator 30 and the magnetic flux of the corresponding magnet 121. This therefore reduces, in the rotor 10, a saturation region in which magnetic saturation may occur based on the magnetic flux of the stator 30 and the magnetic flux of each magnet 121, thus more efficiently obtain the performance from each magnet 121.

In particular, a part of the magnet 121 is not installed

In the d-axis side end of each magnet installation hole 12, any part of the magnet 121 is not installed, and the d-axis side end extends along the d-axis to constitute a flux barrier 122.

Figure 39:
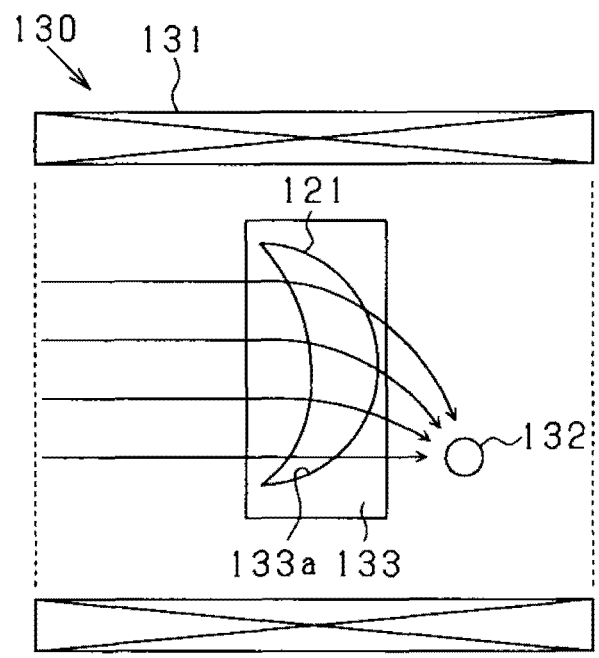
FIG. 39 is an explanation view for explaining how to magnetize a magnet using an oriented magnetic field.

Next, the following describes how to manufacture a magnet 121 used in the fifth embodiment. FIG. 39 is an explanation view used for explaining how to magnetize the magnet 121 using an oriented magnetic field. For example, FIG. 39 illustrates how to magnetize the left-side magnet 121 located in FIG. 38.

As illustrated in FIG. 39, an orientation apparatus 130 includes a magnetic field coil 131, an orientation core 132, and a mold 133. The orientation core 132 and mold 133 are arranged in the magnetic field coil 131.

The magnetic field coil 131 is configured to generate a magnetic field passing through the inside of the coil when energized.

The orientation core 132 serves to curve the magnetic field generated by the magnetic field coil 131 to a predetermined direction. The mold 133 is arranged to enable the curved magnetic field to pass therethrough.

That is, the magnetic field coil 131 generates linear magnetic field lines, and the orientation core 132 enables the linear magnetic field lines to be curved as curved magnetic field lines. The mold 133 is composed of a non-magnetic material, and has formed a mold chamber 133a shaped in conformity with the shape of the magnet 121.

The following describes a method of manufacturing the magnet 121.

First, magnet materials are pulverized into magnetic powders, and the magnetic powders are filled in the mold chamber 133a of the mold 133.

Next, the magnetic powders are compressed to have the predetermined shape set forth above in the mold 133. Thereafter, the orientation core 132 enables curved magnetic field lines to be generated. The curved magnetic field lines cause magnetic field lines of the compressed magnetic powders in the mold chamber 133a to be oriented. That is, during the orientation process, the magnetic powders are aligned such that their easy axes of magnetization are oriented, and compressed to be fixed as a molded body. In particular, the orientation core 132 is preferably located to be offset to one side in the longitudinal direction of the magnet 121.

Thereafter, the molded body is sintered, and thereafter, magnetized. The above series of processes result in the magnet 121 being manufactured.

Note that, for manufacturing the right-side magnet 121 illustrated in FIG. 38, the location of the orientation core 132 is changed.

The above series of processes results in the magnet 121 being produced.

Figure 40:
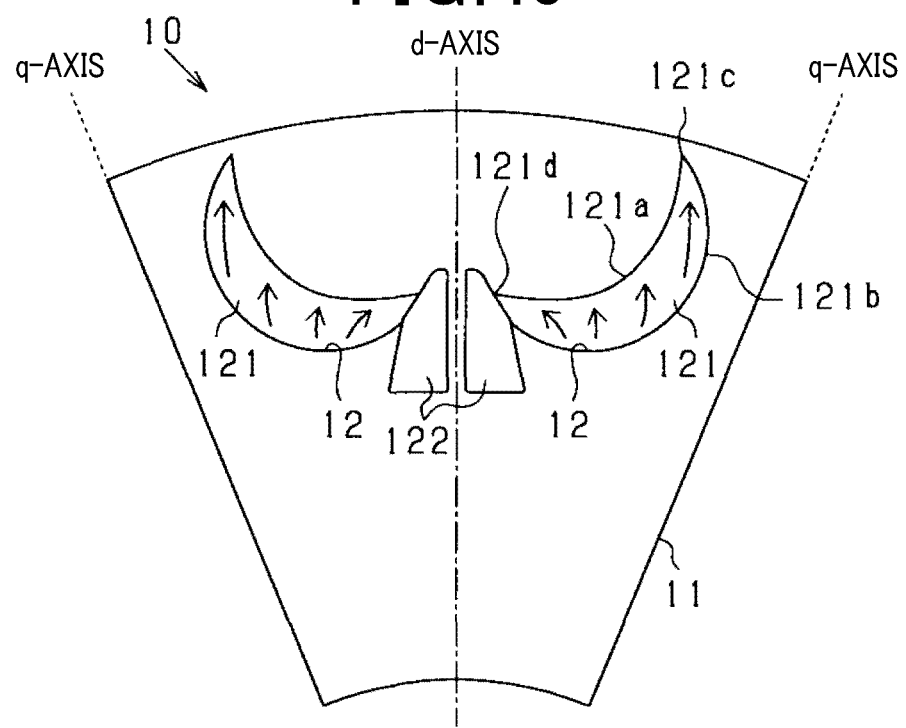
FIG. 40 is a partial plan view of a rotor according to a modification of the fifth embodiment.

Each magnet 121 illustrated in FIG. 40 is configured such that the q-axis side end 121c is located to be closer to the stator 30 in a corresponding radial direction of the rotor core 11 than the d-axis side end 121d is. In addition, each magnet 121 has a middle portion between the q- and d-axis side ends 121c and 121d, and the middle portion is shaped to convexly project toward the anti-stator direction.

Specifically, each magnet 121 has a circular-arc shape in its lateral cross section; the circular-arc shape is convex toward the anti-stator direction, i.e. the rotor direction. In particular, each magnet 121 has a crescent-shaped circular-arc shape in its lateral cross section toward the anti-stator direction. Each magnet 121 is however not limited to the circular-arc shape that is convex toward the anti-stator direction. For example, each magnet 121 can be configured such that the flux effective surfaces 121a and 121b are bent at one or more portions thereof to thereby convexly project toward the anti-stator direction.

The magnet 121 has easy axes of magnetization defined therein; the easy axes of magnetization are inclined with respect to the d-axis, and each intersect with the flux effective surfaces 121a and 121b at a non-right angle. The easy axes of magnetization can however include at least one easy axis of magnetization that is oriented to be perpendicular to the flux effective surfaces 121a and 121b. Each of the easy axes of magnetization defined in the magnet 121 can have a linear shape or a non-linear shape, such as a circular-arc shape.

This configuration enables, in the rotor core 11, a region closer to the stator 30 than each magnet 121 is to be wider, making it possible to increase, in the region, magnet force of the magnets arranged in the rotor core 11.

Other Embodiments

A rotor having one of the configurations illustrated in respective FIGS. 41 to 44 can be used as the rotor 10.

Figure 41:
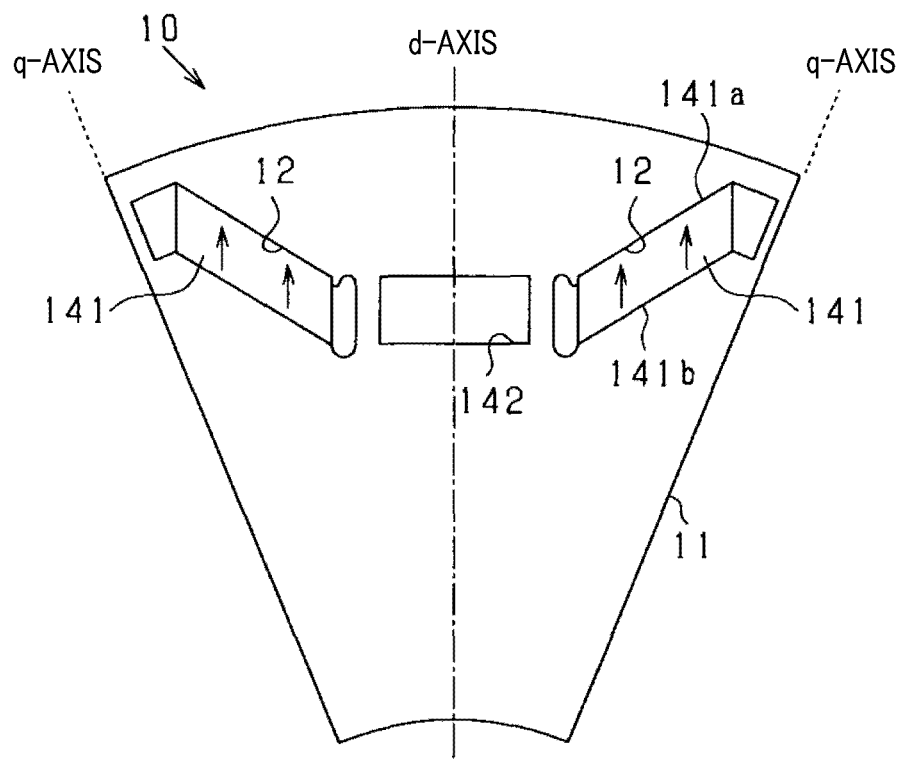
FIG. 41 is a partial plan view of a rotor according to another embodiment.

The rotor 10 illustrated in FIG. 41 has formed a pair of magnet installation holes 12 for each d-axis; the magnet installation holes 12 of each pair have a substantially V shape. The rotor 10 also includes plural pairs of magnets 141, and the magnets 141 of each pair are installed in the respective magnet installation holes 12 of the corresponding pair, so that the magnets 141 of each pair are arranged to have a V shape. Each of the magnets 141 is inclined with respect to the d-axis, and has easy axes of magnetization oriented to be parallel to the d-axis or close to the direction parallel to the d-axis. Each of the easy axes of magnetization intersects with flux effective surfaces 141a and 141b of the magnet 141 at a non-right angle.

Center openings 142 have been formed through the rotor core 11 of the rotor 10; each of the center openings 142 is located on the corresponding d-axis between the magnet installation holes 12 of the corresponding pair.

The above configuration of the rotor 10 includes the easy axes of magnetization oriented to be parallel to the d-axis or close to the direction parallel to the d-axis. This configuration therefore reduces components of magnetic flux obtained from the rotor 10; the components of the magnetic flux face the d-axis, thus reducing demagnetization of the d-axis. Each center opening 142 can be comprised of a space itself, or a non-magnetic material can be filled in each center opening 142.

Figure 42:
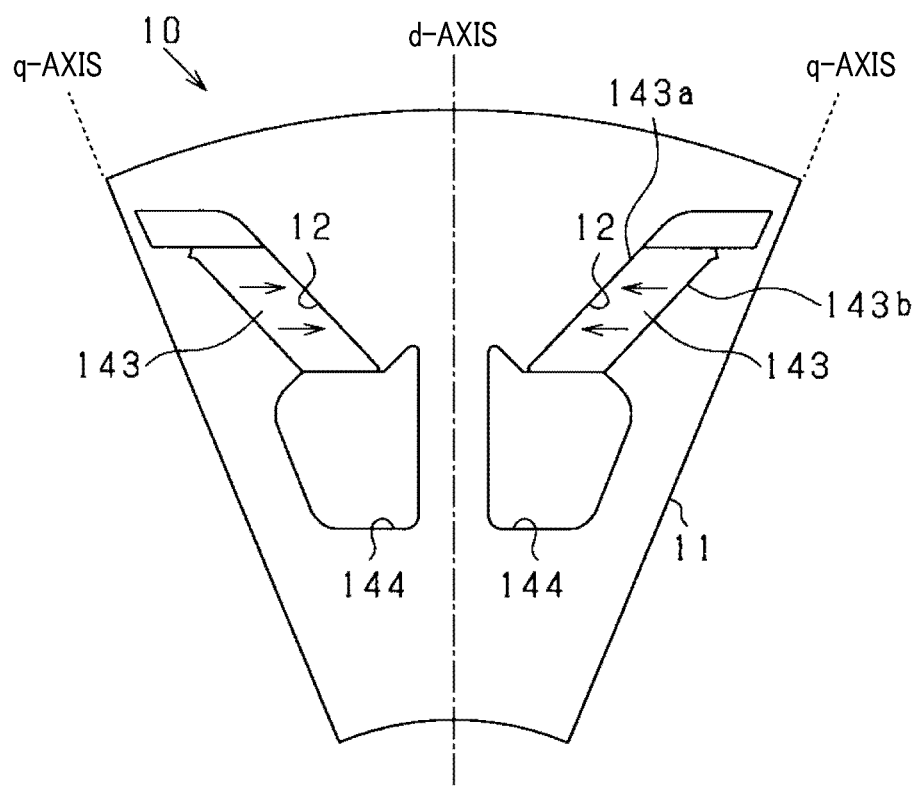
FIG. 42 is a partial plan view of a rotor according to a further embodiment.

The rotor 10 illustrated in FIG. 42 has formed a pair of magnet installation holes 12 for each d-axis; the magnet installation holes 12 of each pair have a substantially V shape. The rotor 10 also includes plural pairs of magnets 143, and the magnets 143 of each pair are installed in the respective magnet installation holes 12 of the corresponding pair, so that the magnets 143 of each pair are arranged to have a V shape. Each of the magnets 143 is inclined with respect to the d-axis, and has easy axes of magnetization oriented to be perpendicular to the q-axis or close to the direction perpendicular to the q-axis. Each of the easy axes of magnetization intersects with flux effective surfaces 143a and 143b of the magnet 143 at a non-right angle.

The rotor core 11 also has formed plural pairs of flux barriers 144; the flux barriers 144 of each pair are located to be adjacent to d-axis side ends of the respective magnets 141 of the corresponding pair; the flux barriers 144 of each pair extend along the corresponding d-axis.

This configuration illustrated in FIG. 42 strengthens magnet flux on each q-axis. Orienting magnetic field lines toward each q-axis core portion of the rotor core 11 enables each q-axis core portion of the rotor core 11 to be magnetically saturated, making it possible to enhance field weakening effects of the rotor 10. In the rotor 10 illustrated in FIG. 42, increasing a same-pole distance across each d-axis, which is defined as a minimum distance between the adjacent magnets 143 across the corresponding d-axis, makes it possible to reduce d-axis demagnetization, i.e. self-demagnetization, of the rotor 10 based on magnetic flux generated by the respective adjacent magnets 143.

Figure 43:
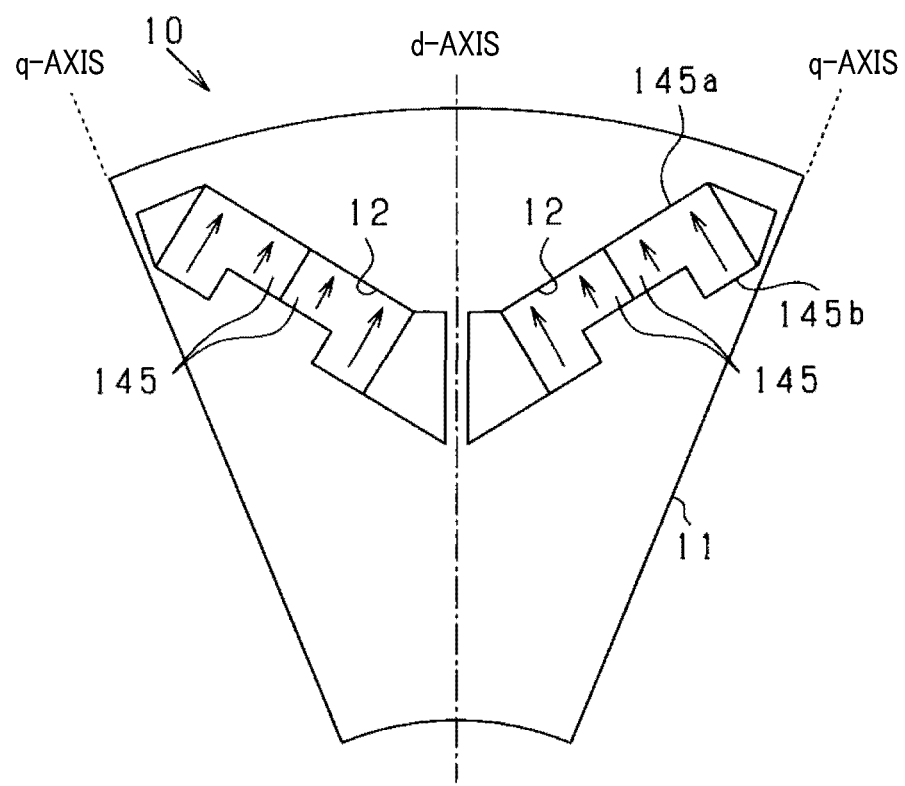
FIG. 43 is an explanation view for explaining how to magnetize a magnet using an oriented magnetic field according to a still further embodiment.

The rotor 10 illustrated in FIG. 43 has formed a pair of magnet installation holes 12 for each d-axis; the magnet installation holes 12 of each pair have a substantially V shape. The rotor 10 also includes plural pairs of magnets 145, and the magnets 145 of each pair are installed in the corresponding one of the magnet installation holes 12, so that the assembly of the magnets 145 of a first pair installed in a first magnet installation hole 12 and the assembly of the magnets 145 of a second pair installed in a second magnet installation hole 12 adjacent to the first magnet installation hole 12 are arranged to have a V shape.

Each of the magnets 145 has opposing d- and q-axis side ends in its lengthwise direction; the d-axis side end corresponds to one longitudinal end surface of the corresponding one of the magnets 145, and the q-axis side end corresponds to the other longitudinal end surface of the corresponding one of the magnets 145.

Each of the magnets 145 is configured such that the length of each of the q- and d-axis side ends of the corresponding one of the magnets 145, which has one or more easy axes of magnetization, is longer than the lengths of the respective other portions in the corresponding one of the magnets 145.

That is, each magnet 145 is comprised of a base, and first and second ends extending from the base in respective directions perpendicular to each other. A pair of magnets 145 are installed in each of the magnet installation holes 12 while the first end of one of the magnets 145 is butted to the first end of the other of the magnets 145 to constitute the integrated assembly of the pair of magnets 145. The integrated assembly of the pair of magnets 145 has a stator-side flux effective surface 145a configured as a flat surface perpendicular to the easy axes of magnetization defined in the assembly, and also has an anti-stator side flux effective surface 145b. The anti-stator side flux effective surface 145b of the assembly of the pair of magnets 145 has a concave groove formed in the center of the anti-stator side flux effective surface 145b.

Figure 44:
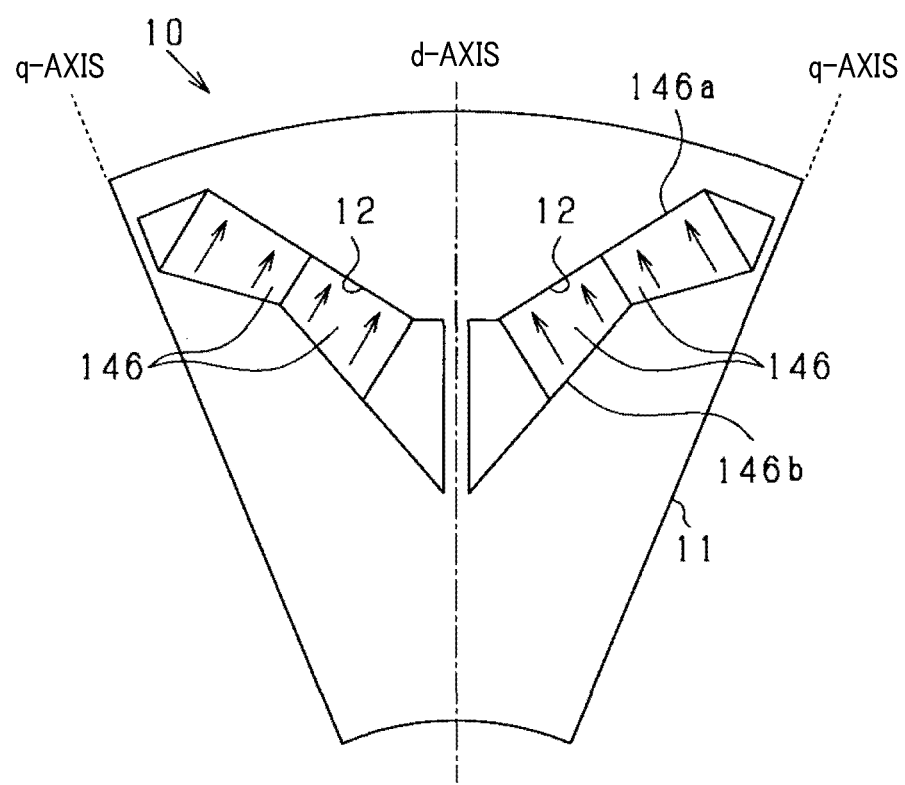
FIG. 44 is a partial plan view of a rotor according to a still further modification of the fifth embodiment.

The rotor 10 illustrated in FIG. 44 has formed a pair of magnet installation holes 12 for each d-axis; the magnet installation holes 12 of each pair have a substantially V shape. The rotor 10 also includes plural pairs of magnets 146, and the magnets 146 of each pair are installed in the corresponding one of the magnet installation holes 12, so that the assembly of the magnets 146 of a first pair installed in a first magnet installation hole 12 and the assembly of the magnets 146 of a second pair installed in a second magnet installation hole 12 adjacent to the first magnet installation hole 12 are arranged to have a V shape.

Each of the magnets 146 has a substantially trapezoidal shape in its lateral cross section. Specifically, each of the magnets 146 has a first end surface serving as an upper base, and a second end surface serving as a lower base, the second end surface being longer than the first end surface. A pair of magnets 145 are installed in each of the magnet installation holes 12 while the first end surface of one of the magnets 146 is butted to the first end surface of the other of the magnets 146 to constitute the integrated assembly of the pair of magnets 146. The integrated assembly of the pair of magnets 146 has a stator-side flux effective surface 146a configured as a flat surface perpendicular to the easy axes of magnetization defined in the assembly, and also has an anti-stator side flux effective surface 146b. The anti-stator side flux effective surface 146b of the assembly of the pair of magnets 146 has a concave groove formed in the center of the anti-stator side flux effective surface 146b.

Each of the magnets including the magnets 13 set forth above can be comprised of a plurality of divided magnet segments. In this modification, the divided magnet segments are preferably arranged along the d-axis for each of both sides relative to the d-axis. This arrangement of the magnets 146 reduces eddy loss of each magnet 13, which serves as a conductive member. For example, a plurality of magnets, each of which has, for example, a substantially square cross section, i.e. divided magnets, having different easy axes of magnetization, are aligned to each other to constitute each magnet 13 that has an elongated cross section. This results in the magnet 13 with a higher value of the orientation ratio as compared with a magnet, having an elongated cross section, in which easy axes of magnetization has been defined using variable magnetic orientations.

Each of the rotors 10 of the above respective configurations can have freely formed therethrough any flux barrier at each of the d- and q-axis ends of a magnet of the corresponding one of the rotors 10.

Each of the rotors 10 set forth above can be comprised of divided core segments in its axial cross section such that the divided core segments are combined with each other while they are circumferentially shifted at predetermined respective angles, resulting each of the rotors 10 having a skewed structure. The skewed structure of each rotor 10 reduces torque ripples of the corresponding rotary electric machine.

In place of the rotary electric machines, each of which is comprised of the rotor 10 including the magnets, such as magnets 13, and the stator 30 including the stator windings 33, rotary electric machines, in each of which the stator windings 33 can be mounted to the rotor 10, can be used. In this modification, magnet installation holes having one of the various types of shapes set forth above have been formed in a stator core configured as a ferromagnetic core, and magnets each having one of the various types of shapes set forth above have been installed in the respective magnet installation holes.

Sixth Embodiment

Figure 45:
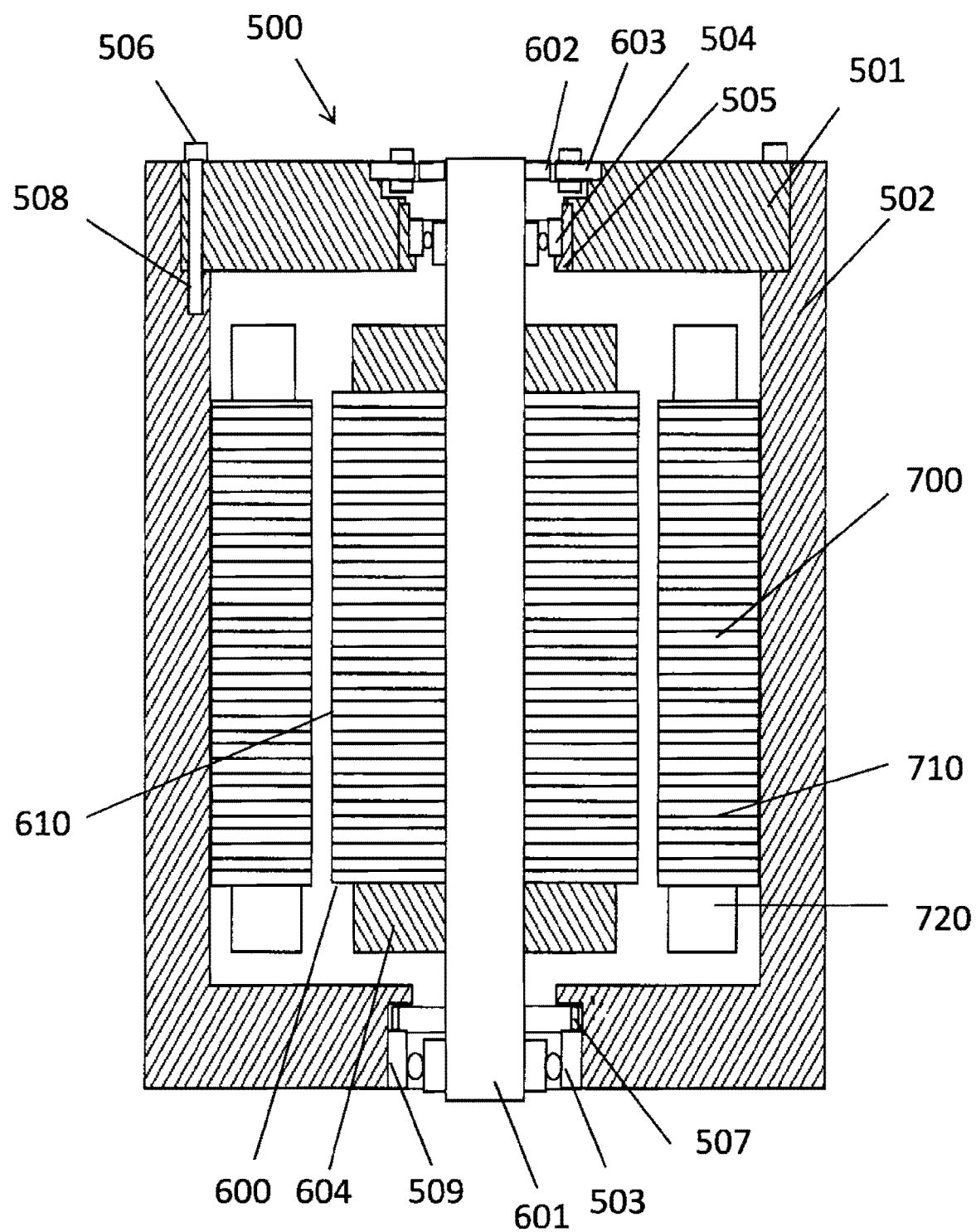
FIG. 45 is a lengthwise cross-sectional view of a rotary electric machine according to a sixth embodiment.

The following describes a rotary electric machine 500 according to the sixth embodiment. The rotary electric machine 500 serves as an electromagnetic machine. FIG. 45 is a longitudinal cross-sectional view of the rotary electric machine 500.

Referring to FIG. 45, the rotary electric machine 500 includes, for example, a discoidal end housing 501, a hollow cylindrical housing 502, bearings 503 and 504, a bearing holder 505, a pressurized spring 507, a rotor 600, and a shaft 601. The discoidal end housing 501 is fitted in the hollow cylindrical housing 502 with high accuracy using a predetermined fit tolerance.

The discoidal end housing 501 holds, with a predetermined fit tolerance, the bearing 504 therein; the bearing 504 rotatably supports the rotor 600. The discoidal end housing 501 has a three-dimensional design, and is manufactured using, for example, aluminum die-casting.

Note that it is preferable to hold the bearing 504 using a bearing holder made of a steel material with a predetermined expansion coefficient that is similar to, i.e. has only a small difference from, an expansion coefficient of the bearing 504. From this viewpoint, the bearing 504 is fitted in the iron bearing holder 505, which is produced by forging. The discoidal end housing 501 has a given number of threaded holes each formed through an axial direction thereof. The hollow cylindrical housing 502 has formed therein a plurality of threaded holes 508. Installing a plurality of volts 506 in the respective threaded holes and in the respective threaded holes 508 results in the discoidal end housing 501 being fastened to the hollow cylindrical housing 502.

The hollow cylindrical housing 502 includes a support hole 509 in which the bearing 503 is fitted; the bearing 503 rotatably supports the rotor 600. The shaft 601 is fitted in the rotor 600 while the shaft 601 is rotatably supported by the bearings 503 and 504 each with a predetermined fit tolerance. For example, the shaft 601 is pressed to be fitted in each of the bearings 503 and 504, but can be loosely fitted in each of the bearings 503 and 504 and fastened thereto using a retaining ring. Similarly, each of the bearings 503 and 504 is press fitted in the housing 501, but can be loosely fit in the housing 501 and fastened thereto using a retaining ring, and the housing 501 is press fitted in the housing 502, but can be loosely fit in the housing 502 and fastened thereto using a retaining ring.

The bearing 503 is comprised of an inner ring, an outer ring, and balls disposed between the inner ring and outer ring. The pressurized spring 507 is configured to press the outer ring, so that the outer and inter rings in the bearing 503 and the balls are continuously contact with each other by predetermined force by the pressurized spring 507. This configuration enables each of the inner and outer rings to have a constant contact load and a constant contact position to each of the balls, causing one of the inner ring and outer ring to quietly rotate during a lifetime of the baring 503. In particular, the pressing force of the pressurized spring 507 is applied to the bearing 503 via the shaft 601. The inner ring of each of the bearings 503 and 504 is located to be farther from the rotor 600 than the outer ring thereof is. This configuration enables a thrust load based on the bearing 503 to be offset by a thrust load based on the bearing 504, making it possible to stably locate the rotor 600 to a predetermined position suitable for the stator 700, i.e. an armature.

The predetermined position of the rotor 600 suitable for the stator 700 is defined such that, when the rotor 600 is located at the predetermined position, the center of the axial length of the rotor 600 is in agreement with the center of the axial length of the stator 700. The bearing 503 is in contact with the pressurized spring 507. A first contact surface of the bearing 503 and a second contact surface of the pressurized spring 507, which are in contact with each other, have a value of a friction coefficient that is set to be equal to or more than 0.4. Friction force based on the friction coefficient prevents the bearing 503 and pressurized spring 507 from rotating relative to each other.

The center position of the rotor 600 including permanent magnets and the center position of the stator 700 can be offset from each other to thereby apply magnetic force to the bearings 503 as pressurizing force. This configuration, which uses magnetic force as the pressurizing force, can be effectively used for a hard-disk drive motor that includes a disk plate located at one side of its axial direction, and for a fan motor that includes an impeller located at one side of its axial direction.

The rotor 600 includes a rotor core 610 that is fastened over the shaft 601, for example, pressed to be fitted over the shaft 601. Permanent magnets, i.e. magnets 400, are installed in the rotor core 610. The rotor 600 is configured as a permanent magnet rotor that provide alternate north and south poles. The rotor 600 includes an end plate 604 that is press fitted over the shaft 601; the end plate 604 is adapted to securely support the permanent magnets in the axial direction.

The rotor 600 includes a rotor 602 of a resolver that is press fitted over the shaft 601; the rotor 602 of the resolver is configured to measure a rotational angle of the rotor. A stator 603 of the resolver used together with the rotor 602 of the resolver is press fitted in the discoidal end plate 501 to be fixed thereto. The stator 603 of the resolver is coaxial with the bearing 504 with high accuracy.

The rotor 602 of the resolver and the rotor core 611 according to the sixth embodiment are fastened to the shaft 601 using press fitting.

In the sixth embodiment, detailed descriptions of the operating principle of the rotor 2 of the resolver are omitted. Specifically, magnetic resistance changes are generated between the rotating rotor 602 and the stator 603 of the resolver. The magnetic resistance changes induce voltage changes in stator coils of the stator 603. The resolver measures the voltage variations to thereby detect a position of the rotor 602, and the resolver detects, based on the detected position of the rotor 602, a rotational position of the rotor 600. The resolver sends the detected rotational position of the rotor 600 to a controller 930 via an unillustrated A/D converter.

Such a rotational angle sensor, which has the configuration set forth above, is configured to output an accurate rotational angle if the rotor and stator of the resolver are made of respective materials, each of which has the same linear expansion coefficient with high accuracy. This enables such a rotational angle sensor to output an accurate rotational angle while maintaining its characteristics unchanged as its temperature changes. For this reason, such a rotational angle sensor can be effective for rotary electric machines according to the sixth embodiment, each of which has a wider rotational-speed control range. The sixth embodiment can use Hall sensors for the respective phases of the rotary electric machine 1, or a single Hall sensor for detecting a rotational position of a typical phase selected from the plural phases of the rotary electric machine 1. Such a Hall sensor, which is inexpensive, is desirably used under the conditions including 1. A first condition that the outer diameter of the motor (rotary electric machine) 1 is set to 50 mm or less, so that it is difficult to use the resolver, and/or 2. A second condition that the temperature of the motor 1 is maintained to be less than 80° C.

The press-fit tolerance between the rotor 600 and the shaft 601 is designed to become several microns, preferably be infinitely near zero, when the rotor 600 is rotating at a maximum rotational speed. This design enables the rotor 600 to be fixed to the shaft 601 when the rotational speed of the rotor 600 takes any value.

Figure 46:
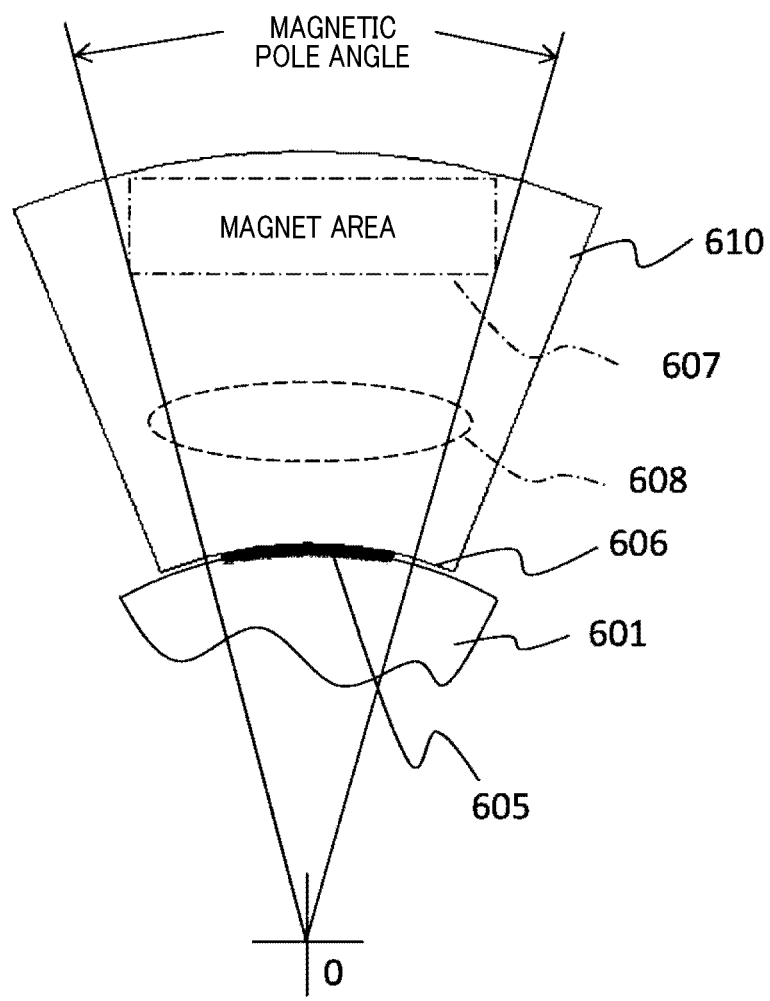
FIG. 46 is a view illustrating press fitting of a rotor core over a shaft.

FIG. 46 illustrates press fitting of the rotor core 610 over the shaft 601.

Dimensions of the rotor core 610 are determined such that

1. Each contact portion 605 is provided on an inner circumferential surface of the rotor core 610 to be in contact with the outer circumferential surface of the shaft 601; each contact portion 605 is located within an angular range enclosed in a magnetic pole angle defined by the corresponding one of the magnet areas 607

2. Each of other portions provided on the inner circumferential surface of the rotor core 610 has a clearance 606 with respect to the outer circumferential surface of the shaft 601

This determination of the dimensions of the rotor core 610 prevents deformation of the rotor core 610, which may occur during press fitting of the rotor core 610 over the shaft 601, from being transferred to the outer circumferential surface of the rotor 600, making it possible to design the air gap between the air gap between the outer circumferential surface of the rotor 600 and the stator 700 with high accuracy. Providing a flux barrier 608 between each magnet area 607 (see dashed-dotted line in FIG. 46) and the shaft 601 enables press-fit stress from being transferred to the corresponding magnet area 607.

Loosely fitting the rotor core 610 over the shaft 601 with a predetermined tolerance between the shaft 601 and the rotor core 610 can be carried out using a key and/or a pin for stopping circumferential rotation of the rotor core 610. This increases the productivity of the assembly of the rotor core 610 and the shaft 601 with one of the rotor core 610 and the shaft 601 being easily removable from the other thereof.

The key mounted on one of the rotor core 610 and the shaft 601 is desirably intermediately or lightly fitted in a corresponding key groove formed in the other thereof. If the key were loosely fitted in the corresponding key groove, the rotor 600 might circumferentially swing within the clearance between the key and the key groove. This might result in an angular position outputted from the resolver being different from an actual angular position of the rotor 600, making it difficult to control the rotor 600.

The shaft 601 can have a splined surface or a knurled surface, and the rotor core 610 can be press fitted over the shaft 601. For spline fitting, splines on the surface of the shaft 601 can be loosely fitted in corresponding grooves on the inner circumferential surface of the rotor core 610 as long as the controller sufficiently controls the rotor 600. The voltage variations are transferred to the controller 930 via the stator 700.

Figure 47A:
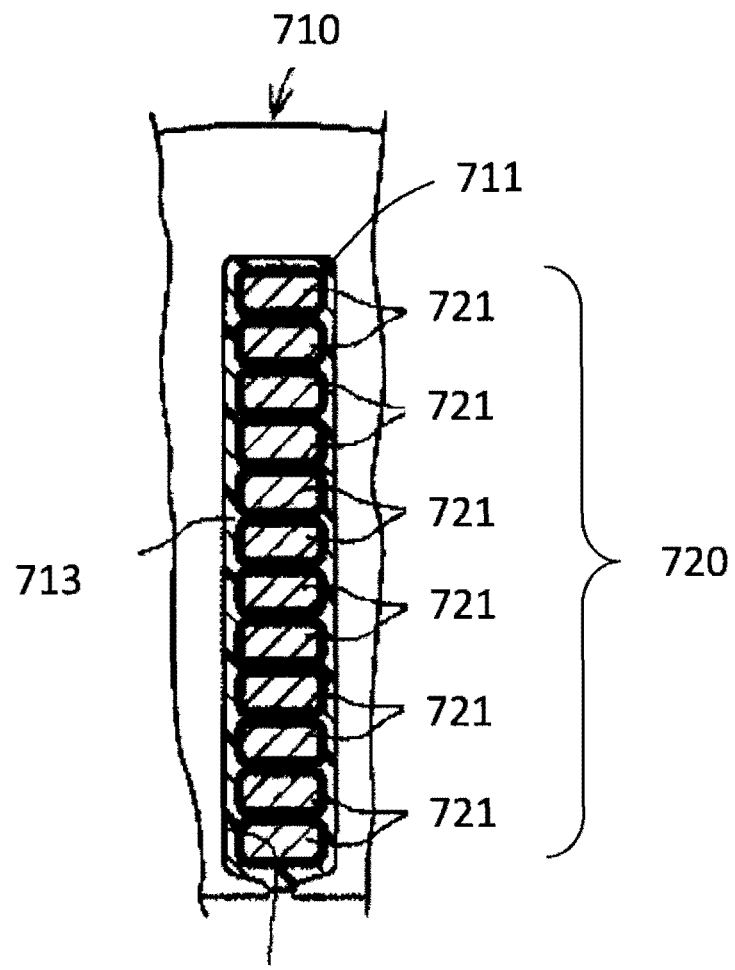
FIG. 47(a) is a view illustrating a structure of stator windings installed in a stator.
Figure 47B:
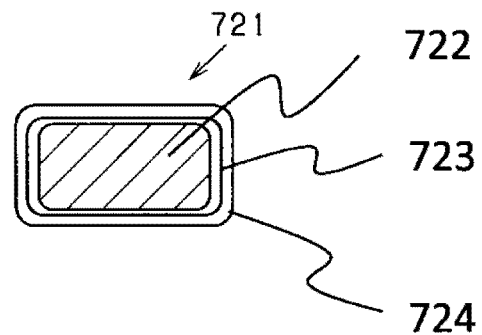
FIG. 47(b) is a cross-sectional view illustrating a structure of a wire.

Next, the following describes the stator 700 with reference to FIGS. 47(a) and 47(b).

The stator 700 includes a stator core 710 and a stator coil 720 comprised of multiphase stator windings. The rotary electric machine 500 according to the sixth embodiment is configured as a three-phase doble-slot permanent-magnet rotary electric machine. The stator core 710 has slots 711 in each of which conductor wires, i.e. copper wires, 721 constituting the stator coil 720 are installed. The number of slots 711 is set to 48, which is obtained in accordance with the following equation:

$$48 = 8 \times 3 \times 2$$

where:

8 represents the number of poles of the rotor 600; and 3 represents the number of the phases of the stator coil 720

Each of the conductor wires 721 according to the sixth embodiment has a rectangular shape in its lateral cross section, and the conductor wires, i.e. rectangular wires, 721 for each of the three-phase are distributedly wound in the slots 711.

Each of the conductor wires 721 is not limited to having a quadrangular shape, and can have a hexagonal shape. Using rectangular wires as the conductor wires 721 achieves a higher slot-fill factor than using round wires as the conductor wires 721. Note that the slot fill factor represents the percentage of the cross-sectional occupation area of the copper wires in each slot 711 to the whole cross-sectional area of the corresponding slot 711. Installing a predetermined number of the conductor wires 721 each having a rectangular or polygonal shape in each slot 711 while the installed wires 721 are surface contact with each other without any gaps therebetween enables each stator winding having a lower direct-current resistance in each slot 711 than a case of using round wires as the conductor wires 721. This makes the radial thickness of the stator 700 thinner.

Note that conductor wires each having an ellipsoidal shape in its lateral cross section can be used as the conductor wires 721; while each conductor wire 721 is installed in a corresponding one of the slots 711, the corresponding conductor wire 721 can have a flat shape with a circumferential width and a radial width smaller than the circumferential width.

Making thinner the radial thickness of the stator 700 enables a radial length of the air gap between the rotor 600 and the stator 700 of the motor 500 to be longer than another motor having the same outer diameter as the outer diameter of the motor 500.

Because torque of the motor 500 is expressed as the product of the radius of the rotor 600, interlinkage flux interlinking across the conductor wires, and current flowing through each of the conductor wires, an increase of the slot-fill factor results in an increase of the torque of the motor 500.

A conventional motor may have a disadvantage due to an increase in moment of inertia that is due to an increase in the rotor radius. For example, when a motor with a rotor having an excessively large radius is used as a traction motor that is configured to turn in synchronization with a vehicular engine, it may be difficult to synchronize the RPM of the motor with the RPM of the vehicular engine.

Because the rotor 600 of the sixth embodiment has a higher value of a permeance, i.e. a permeance coefficient, Pc, it is possible to increase the effective amount of magnetic flux of each magnet. For this reason, each magnet installed in the rotor 600 has a larger contribution rate of torque per unit volume of the corresponding magnet as compared with another same-size magnet, thus generating a larger amount of magnetic flux. While maintaining each magnet having a larger contribution rate of torque, reducing the setting value of impedance of the stator coil 720, i.e. reducing the number of the conductor wires 721, enables an electrical and mechanical time constant Tk of the rotary electric machine 500 to be reduced, thus improving the mechanical controllability of the rotary electric machine 500.

That is, the electrical and mechanical time constant Tk can be expressed by the equation (1) described later.

Because the electrical and mechanical time constant Tk has the inductance L at its numerator, reducing the number of turns of each stator winding by the reciprocal of an increment of magnet flux $\Psi$ enables the electrical and mechanical time constant Tk to be reduced, thus improving the mechanical controllability of the rotary electric machine 500.

Note that the electrical and mechanical time constant Tk can be expressed by the following equation (1):

$$Tk=(J \cdot L) \div (Kt \cdot Ke) \quad (1)$$

where J represents the inertia moment, L represents inductance, Kt represents a torque constant, and Ke represents a back-emf constant.

In addition, reducing the inductance enables a surge voltage to be reduced. Note that any conductor can be used as each of the conductive wires 721. For example, a conductor based on a carbon nanotube, an aluminum conductor, a silver conductor, or a gold conductor can be used as each conductive wire 721, each of which can provide good performance suitable for a conductor.

Specifically, each conductive wire 721 is comprised of a conductor 722, and a coating, such as an enamel coating, 723 that coverts the outer circumference of the corresponding conductive wire 722; the enamel coating can be made of polyimide, amide-imide, and/or a polyamide-imide.

In each slot 711, an outer layer 724 is provided to cover the outer circumference of the coating 723. Each of the coating 723 and outer layer 724 has a value of a dielectric strength voltage; the value of the dielectric strength voltage of the outer layer 724 is higher than the value of the dielectric strength voltage of the coating 723. The outer layer 724 can be comprised of strand wires or litz wires.

The outer layer 724 of the sixth embodiment is made of a poly ether-ether ketone (PEEK) material. In each slot 711, the outer layers of the respective conductive wires 721 abut on the steel inner walls of the slot 711 via a varnish member 713. That is, the in-slot members, i.e. the conductive wires 721, installed in each slot 711 are preferably fixed by the corresponding slot 711, the varnish member 713, and the outer layer 724.

The above configuration of the stator 710 efficiently reduces the vibration noise of the stator coil 720 to be within the range from 3 dB to 5 dB or thereabout according to the results of the research by the applicant's company. The varnish member 713 can be preferably made of, for example, an epoxy resin and/or a silicon adhesive. This configuration enables the linear expansion coefficients of the respective coating 723, outer layer 724, and varnish member 13 to be set to sequentially increase in this order.

If the outer layer 724 is made of a poly phenylene sulfide (PPS) material, the linear expansion coefficient of the PPS material has a wider range depending on the state of the PPS material. For this reason, it is necessary to blend a selected material into the outer layer 724 to thereby set the linear expansion coefficient of the outer layer 724 to be higher than the linear expansion coefficient of an enamel coating. The above setting of the linear expansion coefficients of the components 723, 724, and 713 efficiently reduces stress on the components 723, 724, and 713 due to the differences among the linear expansion coefficients of the respective components 723, 724, and 713. That is, even if the stator coil 720 is sequentially oil-cooled, air-cooled, or water-cooled from the varnish member 713 toward the innermost layer of each conductive wire 721 upon the stator coil 720 being subjected to a vehicular or train environment, so that stress on these insulator components 723, 724, and 713 due to the differences among the linear expansion coefficients of the respective components 723, 724, and 713 can be reduced, the configuration of the stator 710 efficiently reduces the stress on these insulator components 723, 724, and 713.

In particular, the adhesive strength between the varnish member 713 and the outer layer 724 is set to be smaller than the adhesive strength between the outer layer 724 and the coating 723. This setting prevents, even if the varnish member 713 has cracked due to stress caused by the differences among the linear expansion coefficients of the respective components 723, 724, and 713, this cranking from impacting on the coating 723.

In addition, the adhesive strength between the coating 723 and the conductor 722 is set to be smaller than the adhesive strength between the outer layer 724 and the coating 723. This setting would ensure, if the outer layer 724 has cracked, electrical isolation of the stator coil 720 to the stator core.

The above coating structure of each conductive wire 721 exerts a stronger effect at a portion of the corresponding conductive wire 721 projecting from the corresponding slot 711 than the other portion installed in the corresponding slot 711.

The rotor 600 includes the hollow cylindrical rotor core 610 having the inner circumferential surface, and the inner circumferential surface of the rotor core 610 is mounted to the outer circumferential surface of the shaft 601.

Figure 48:
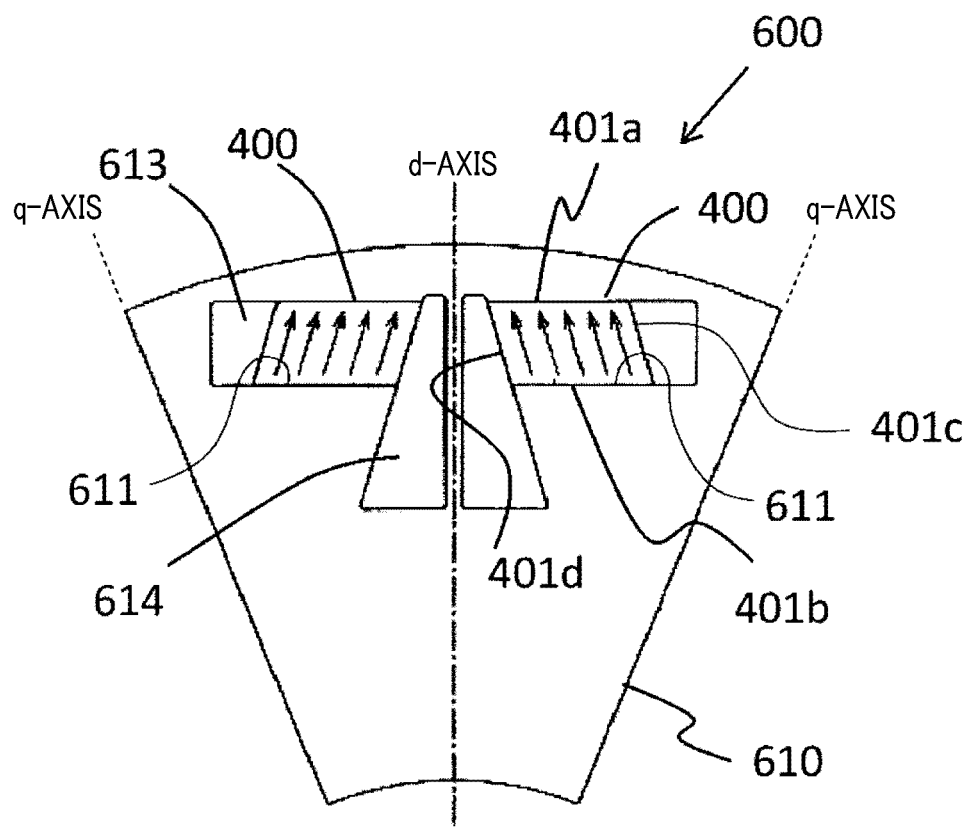
FIG. 48 is a partial plan view of a rotor.

FIG. 48 specifically illustrates the structure of the rotor 600. Note that FIG. 48 illustrates one magnetic pole, which is extracted from the magnetics poles of the rotor 600; the extracted pole of the rotor 600 illustrated in FIG. 48 represents the d-axis at the center of the extracted pole, and each of the left and right ends represents the q-axis serving as a magnetic-pole boundary portion.

The rotor core 610 has formed a pair of magnet installation holes 611 located at both sides of the d-axis. The magnet installation holes 611 of the pair have a symmetrical profile with respect to the d-axis. The magnet installation holes 611 are linearly aligned at both sides of the d-axis while being separated from each other on the d-axis. In each magnet installation hole 611, a magnet 400 composed of, for example, a permanent magnet, such as a sintered neodymium magnet, is installed.

Figure 49:
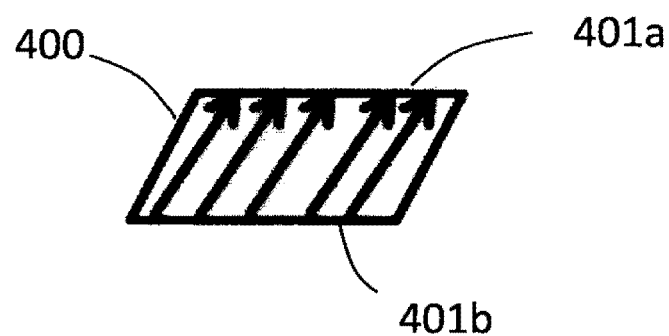
FIG. 49 is a lateral cross-sectional view of a magnet.

The following describes the magnet 400 according to the sixth embodiment with reference to FIG. 49. FIG. 49 illustrates a lateral cross-sectional view of the magnet 400, which is perpendicular to the axial direction of the rotor core 610. FIG. 49 also illustrates magnetic orientations defined in the magnet 400 using arrows. Note that, in some of the following figures in addition to FIG. 49, magnetic orientations in a magnet can be illustrated using arrows. The magnetic orientations in the magnet 400 respectively show oriented easy axes of magnetization in the magnet 400, so that magnetic paths are defined along the respective magnetic orientations in the easy axes of magnetization. The magnetic orientations in the magnet 400 also show the magnetic orientations of respective magnetic lines, i.e. the magnetic orientations of the respective easy axes of magnetization defined in the magnet 400.

Referring to FIG. 49, the magnet 400 has a parallelogram shape in its lateral cross section, and has opposing first and second major surfaces 401a and 401b. The first major surface 401a faces the stator 700, and the second major surface 401b faces the shaft 601. The first and second major surfaces 401a and 401b respectively serve as flux inflow-outflow surfaces. That is, in FIG. 49, the magnet 400 has a first pair of longitudinal opposite surfaces parallel to each other, and a second pair of lateral opposite surfaces parallel to each other, and the longitudinal opposite surfaces of the first pair respectively serve as the effective surfaces 401a and 401b.

In other words, the magnet 400 has a first pair of longitudinal magnet surfaces, and a second pair of lateral magnet surfaces, and the longitudinal magnet surfaces of the first pair respectively serve as the effective surfaces 401a and 401b. As illustrated in FIG. 48, the left and right magnets 400 are provided in the rotor core 610 so as to be symmetrical to each other with respect to the d-axis.

Magnetic orientation in the magnet 400 causes crystal orientations to be aligned. If an anisotropic magnet has completely non-controlled orientations, the anisotropic magnet has ideal magnetic characteristics. The magnetic orientations in the magnet 400 have been aligned based on an oriented magnetic field during a manufacturing process of the magnet 400.

The second pair of the lateral opposite surfaces of the magnet 400 respectively serve as non-effective surfaces, i.e. zero-flux inflow-outflow surfaces, 401c and 401d.

The magnet 400 has magnetic paths each being loner than a magnet thickness between the effective surfaces 401a and 401b, and the easy axes of magnetization of the magnet 400 are oriented to be along the respective magnetic paths. In other words, the length of a line along each axis of magnetization in the magnet 400 is longer than the magnet thickness between the effective surfaces 401a and 401b.

That is, the magnetic orientations defined in the magnet 400 are respectively directed from the effective surface 401b to the effective surface 401a, and each intersect with the effective surfaces 401a and 401b at a non-right angle. In other words, the magnetic orientations defined in the magnet 400 are for example parallel to the non-effective surfaces 401c and 401d.

Figure 50A:
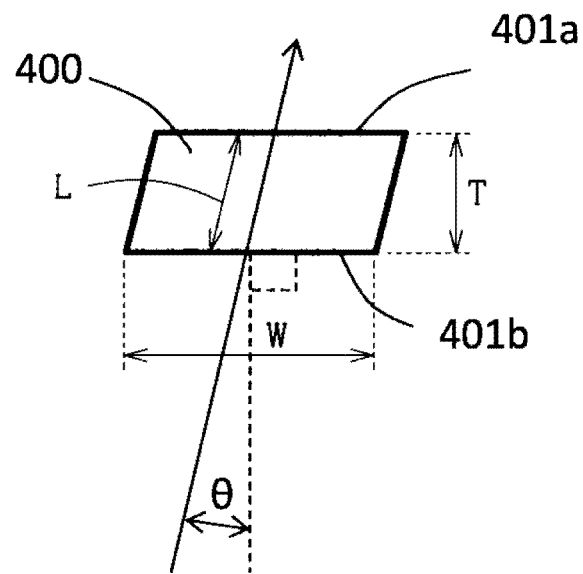
Figure 50B:
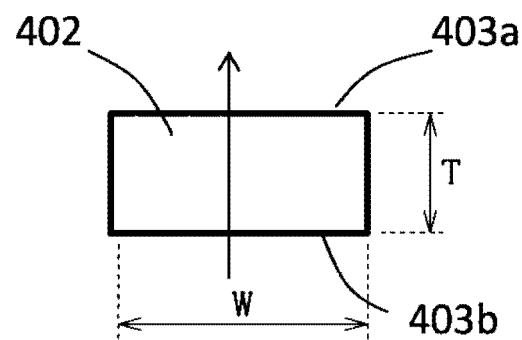

FIG. 50(a) illustrates the magnet 400 according to the sixth embodiment. FIG. 50(b) also illustrates a magnet 402 as a comparative example of the magnet 400. Note that the cross-sectional area of the magnet 400 illustrated in FIG. 50(a) is identical to the cross-sectional area of the magnet 402 illustrated in FIG. 50(b).

In addition, the width dimension W of each effective surface of the magnet 400, which represents the length of the magnet 400 in its lengthwise direction, is identical to that of the corresponding effective surface of the magnet 402. The geometric thickness dimension T of the magnet 400 is identical to the geometric thickness dimension of the magnet 402. Note that the geometric thickness dimension T of the magnet 400 represents the length of a line connecting between the longitudinal surfaces, i.e. the effective surfaces, to be perpendicular to the effective surface. The magnet 402 as the comparative example has opposing effective surfaces 403a and 403b, and has easy axes of magnetization defined in the magnet 402; the easy axes of magnetization are perpendicular to the opposing effective surfaces 403a and 403b.

The magnetic orientations in the magnet 400 of the sixth embodiment each intersect with the effective surfaces 401a and 401b at a non-right angle, but the magnetic orientations in the magnet 402 of the comparative example are perpendicular to the effective surfaces 403a and 403b at the right angle.

That is, the thickness dimension T of the magnet 402 is identical to the length of each magnetic circuit, i.e. each magnetic path, defined in the magnet 402.

In contrast, because the magnetic orientations defined in the magnet 400 of the sixth embodiment are each obliquely inclined with respect to the effective surfaces at a selected angle θ, the length of each magnetic path defined in the magnet 400 becomes longer as compared with the magnet 400. For this reason, although the weight and the total magnetic force of the magnet 400 are identical to the respective weight and the total magnetic force of the magnet 402, it is possible to increase the effective flux density Bd of the magnet 400 to be higher than the effective flux density of the magnet 402. Note that the effective flux density Bd [T] can be expressed by the following equation (2):

$$Bd = Br \div \{1 + 1/Pc\} \qquad (2)$$

where Br [T] represents the remanent flux density, and Pc represents the permeance coefficient that is defined as the ratio of the permeability of magnetic flux through a magnet. The equation (2) represents that the effective flux density Bd becomes equal to the remanent flux density when the permeance coefficient Pc reaches an infinite value.

Figure 51:
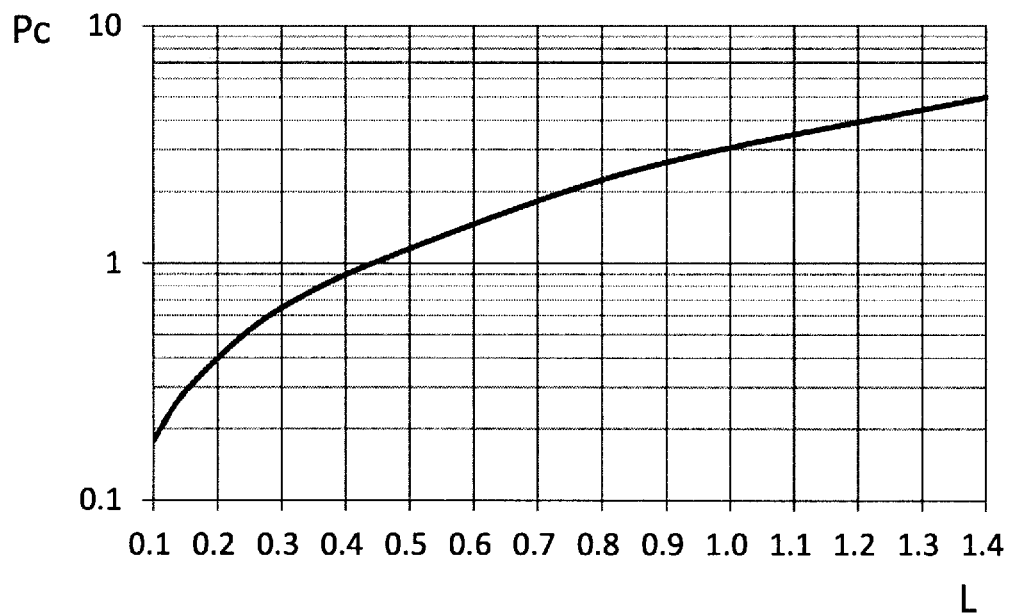
FIG. 51 is a graph illustrating a relationship between a magnetic-path length of a magnet and a permeance coefficient.

FIG. 51 illustrates an example of a relationship between the magnetic-path length L of a magnet and the permeance coefficient Pc. As illustrated in FIG. 51, the longer the magnetic-path length L in each orientation defined in the magnet, the higher the permeance coefficient Pc.

The magnet 400 of the sixth embodiment, which has the same volume as the volume of the magnet 402, includes the easy axes of magnetization, respectively corresponding to the magnetic orientations, that are characterized to extend the length L of each magnetic path to thereby increase the effective flux density Bd as compared with the magnet 402. In particular, the length L of each magnetic path defined in the magnet 400 is (1/cos θ) times larger than the length of the corresponding magnetic path defined in the magnet 402.

In other words, the length L of a line along the corresponding easy axis of magnetization between the opposing effective surfaces 401a and 401b of the magnet 400 is (1/cos θ) times longer than the magnet thickness dimension T.

Next, the following describes in detail the rotor 600 in which the magnets 400 are installed.

As illustrated in FIG. 48, each magnet 400 is configured such that the effective surfaces 401a and 401b are perpendicular to the d-axis, and the surface 401c of the q-axis side end and the surface 401d of the d-axis side end, which are respectively non-effective surfaces, are non-parallel to the d-axis. For example, the surfaces 401c and 401d of the respective q- and d-axis side ends are oriented to have an angle that is identical to the angle of each orientation with respect to the effective surfaces 401a and 401b. In other words, the magnetic orientations of the surfaces 401c and 401d of the respective q- and d-axis side ends are identical to the respective magnetic orientations defined in the magnet 400, that is, the surfaces 401c and 401d of the respective q- and d-axis side ends are parallel to the easy axes of magnetization defined in the magnet 400 as seen in planer view.

A flux barrier 613 is provided in a first end of the magnet installation hole 611, which faces the q-axis; the flux barrier 613 is located to be adjacent to the surface 401c of the q-axis side end of the magnet 400. Similarly, a flux barrier 614 is provided in a second end of the magnet installation hole 611, which faces the d-axis; the flux barrier 614 is located to be adjacent to the surface 401d of the d-axis side end of the magnet 400. The flux barrier 614 extends along the d-axis in particular toward the shaft 601.

Note that, in FIG. 48, each of the surfaces 401c and 401d of the q- and d-axis side ends of the magnet 400 is oriented to be in conformity with the angle of each of the magnetic orientations defined in the magnet 400 with respect to the effective surfaces 401a and 401b. Although illustration is omitted, only the surface 401c of the q-axis side end of the magnet 400 may be oriented in conformity with the angle of each of the magnetic orientations defined in the magnet 400 with respect to the effective surfaces 401a and 401b; the surface 401d of the d-axis side end may be kept parallel to the d-axis. That is, the magnet 400 can be modified to have any quadrangular shape, such as one of a rectangular shape, a parallelogram shape, and a trapezoidal shape in its lateral cross section.

The magnet 400 can have a rectangular shape, and have magnetic orientations defined therein such that each of the magnetic orientations intersects with the flux effective surfaces 401a and 401b at a non-right angle. This configuration enables the length of each magnetic path to be longer, but relatively shorter magnetic paths are however locally located at each end of the magnet 400. At that time, because each of the surfaces 401c and 401d of the q- and d-axis side ends of the magnet 400 is oriented to be with the angle of each of the magnetic orientations defined in the magnet 400 with respect to the effective surfaces 401a and 401b, it is possible to reduce shorter magnetic paths locally present in each end of the magnet 400.

Note that the magnet 400 illustrated in FIG. 48 is configured such that each end of the magnet 400, which does not contribute to an increase in magnetic flux, has been obliquely eliminated. This results in the amount of magnet in the rotor 600 illustrated in FIG. 48 being smaller than the amount of magnet in a rotor using a rectangular magnet with each longitudinal side and the corresponding lateral side have a right angle therebetween. This results in the number of cavities in the mold being larger and the quantity of magnetic materials putted into the mold being smaller.

Figure 52:
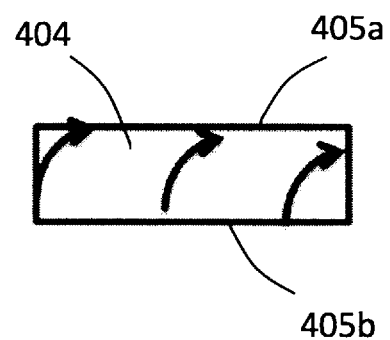
FIG. 52 is a lateral cross-sectional view of another structure of a magnet.

A magnet 404 illustrated in FIG. 52 can be installed in the rotor 600 in place of the magnet 400. The magnet 404 has a rectangular shape in its lateral cross section, and has opposing first and second flux effective surfaces 405a and 405b. The magnet 404 has curved magnetic orientations defined therein. That is, the magnetic orientations are curved with respect to the flux effective surfaces 405a and 405b. As illustrated in FIG. 51, the longer the magnetic-path length L in each orientation defined in the magnet, the higher the permeance coefficient Pc. For this reason, the above configuration of the magnet 404 enables the lengths of the respective magnetic paths in the magnet 404 to further increase, making it possible to further increase the permeance coefficient Pc.

Figure 53:
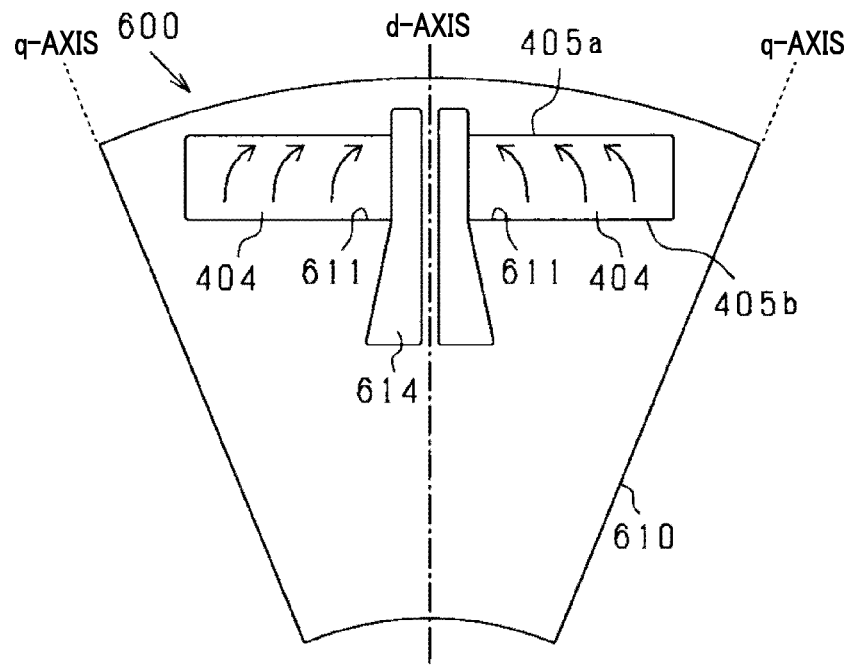
FIG. 53 is a partial plan view of a rotor.

The magnet installation holes 611 of each pair, which corresponds to the north pole, illustrated in FIG. 53 are arranged to be symmetrical with respect to the corresponding d-axis, and extend in the direction perpendicular to the corresponding d-axis.

FIG. 53 illustrates that the magnets 404 illustrated in FIG. 52 are installed in the respective magnet installation holes 611 of the rotor core 611. In FIG. 53, the left and right magnets 404 are provided in the rotor core 610 so as to be linear symmetrical to each other with respect to the d-axis. That is, the easy axes of magnetization defined in each of the magnets 404 of the pair are oriented from the effective surface 405b to the effective surface 405a while being bent toward the d-axis.

In one end portion of the magnet installation hole 611, in which no magnet 404 is disposed, located to be closer to the d-axis than the other end portion is, the flux barrier 614 is provided to prevent self-shorting of magnet flux in the rotor core 611. The flux barrier 614 extends along the d-axis.

Next, the following describes how to manufacture a permanent magnet used in the sixth embodiment. In particular, the following describes in detail an orientation step in the process for manufacturing a permanent magnet. First, the following describes the magnet manufacturing process simply.

First, magnet materials, such as neodymium magnets, are combined with each other, and thereafter, the magnet materials are dissolved in a melting furnace, and thereafter an ingot is produced. Thereafter, a pulverization step is carried out, so that the ingot is pulverized into fine magnetic powders, which are on the order of several microns.

After the pulverization step, the molded body of the magnetic powders in a press mold is arranged in a magnetic field, and thereafter an orientation step is carried out such that crystal orientations of the molded body, i.e. easy axes of magnetization, are aligned. That is, while the magnetic powders are filled in the press mold, the crystal orientations of the magnetic powers are aligned with an orientation magnetic field, so that high magnetic characteristics in each orientation direction are provided to the press-molded body of the magnetic powders in the press mold.

Thereafter, the press-molded body of the magnetic powders to which the magnetic orientations are provided is subjected to a sintering step and a thermal step in a vacuum. After the sintering step, the sintered magnet is arranged in a magnetizing field, and thereafter, magnetized in a magnetizing step, so that a permanent magnet is manufactured.

Next, the following describes a specific structure for performing the orientation step using FIGS. 54(*a*) and 54(*b*).

FIG. 54(*a*) schematically illustrates an orientation apparatus 300 used in the orientation step for the molded body in an orientation magnetic field. FIG. 54(*b*) illustrates a plurality of magnets MG, each of which has been magnetically oriented in the orientation step. Note that FIG. 54(*a*) illustrates a mold 250 serving as a magnet production mold used for producing a magnet MG, and the mold 250 is arranged such that a pair of opposing outer surfaces corresponding to a pair of flux effective surfaces of the magnet MG obliquely intersect with the orientation magnetic field.

The orientation apparatus 300 includes a magnetic field generator 301 having a size capable of enclosing the mold 250. The magnetic field generator 301 includes a coil 301*a* configured to generate the orientation magnetic field thereinside in a predetermined direction when energized.

The mold 250 including therein the molded body of the magnetic powders, which is an orientation target, is arranged in the coil 301*a* such that a normal line N perpendicular to a selected outer surface of the molded body of the magnetic powders in the mold 250 is non-orthogonal to an axial direction of the coil 301*a*. This carries out the magnetic orientation, i.e. the magnetic alignment, of the molded body of the magnetic powders while applying the orientation magnetic field to the selected outer surface of the molded body in a direction non-orthogonal to the selected surface. Note that the mold 250 is arranged in an inner space of the coil 301*a* while the magnetic powders are filled in the mold 250.

For example, the orientation apparatus 300 is configured to energize the magnetic field generator 301, i.e. the coil 301*a* to cause the coil 301*a* to generate the orientation magnetic field, and apply the orientation magnetic field generated from the energized coil 301*a* to the mold 250, thus carrying out orientation of the magnetic powders in the mold 250 based on the orientation magnetic field. This results in the magnet MG being efficiently manufactured while increasing the orientation ratio of the magnet MG. Note that the orientation ratio represents the ratio of the remanent flux density Br of the magnet MG to a saturation flux density of the magnet MG.

The sixth embodiment uses the magnetic field generator 301 including the coil 301*a* to thereby create the strong orientation magnetic field, enabling the orientation ratio of the magnet MG to be equal to or more than 90%. In FIG. 54(*b*), a solid oblique line through each magnet MG represents the magnetic orientation in the corresponding magnet MG.

The orientation step using the orientation apparatus 300 efficiently manufactures the magnets 400 each with a high orientation ratio. In particular, the orientation step causes the magnet MG to have linear magnetic orientations that are parallel to each other.

After the magnet MG having been subjected to the orientation step and the sintering step, the MG can be divided into divided magnets MG, and thereafter, the magnetization step is carried out for each of the divided magnets MG.

Figure 55A:
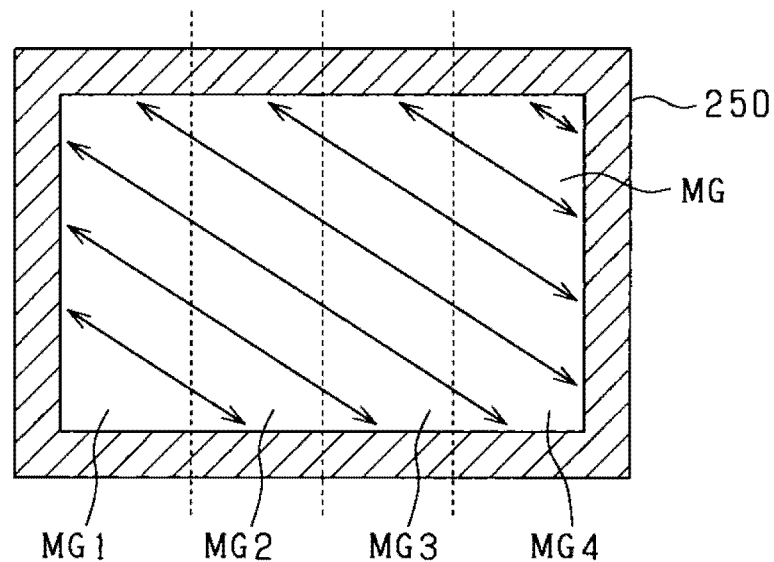
FIG. 55(a) and FIG. 55(b) are cross-sectional views illustrating molds and the inner structure of each mold.
Figure 55B:
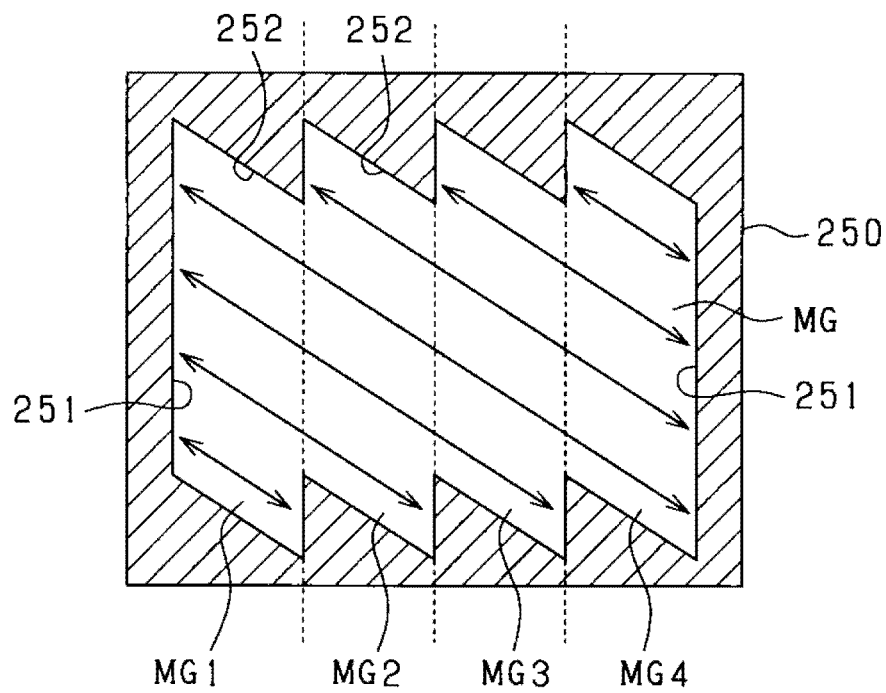

As illustrated in FIG. 55(*a*), a magnet, which is a magnet block, MG from which a predetermined number of magnets, such as four magnets MG1 to MG4 in FIG. 55(*a*), can be divided, is installed in the mold 250. While the magnet block MG is installed in the mold 250, the magnet block MG is subjected to the orientation step and the sintering step. After the sintering step, the magnet block MG is divided into the four magnets MG1 to MG4 aligned with each other. Note that, in the sintering step, the magnet block MG may contract. For this reason, in the oscillation step, the molded body of the magnetic powders in the press mold is shaped as the magnet block MG in consideration of the contract of the magnet block MG.

In the orientation step, the magnetic orientation, i.e. the magnetic alignment, causes the magnet block MG to be oriented in a direction obliquely with respect to a selected outer surface of the MG. For this reason, if the magnet block MG has a rectangular parallelepiped shape, the division step cuts the magnet block in a direction parallel to the selected outer surface (see one vertical surface in FIG. 55(*a*)).

This division step efficiently manufactures, as for example the magnets 400 illustrated in FIG. 49, the divided magnets MG1 to MG4, each of which has 1. Magnetic paths each having the length longer than the thickness dimension of the corresponding magnet 2. Easy axes of magnetization oriented to be parallel to the respective magnetic paths As illustrated in FIG. 55(*b*), the mold 250 is comprised of, as inner walls for partitioning an inner space therein, a first wall 251 and a second wall 252. The first wall 251 is inclined with respect to the orientation magnetic field (see the direction of the arrows), and the second wall 252 is comprised of wall portions each is parallel to the orientation magnetic field.

This configuration enables

1. Each of the magnets MG1 to MG4 to have the magnetic paths each having the length longer than the thickness dimension of the corresponding one of the magnets MG1 to MG4

2. A portion having a relatively shorter magnetic path to be efficiently excluded from each of the magnets MG1 to MG4 during the orientation step This therefore reduces the amount of the magnetic materials for the magnets MG1 to MG4, and eliminates a cutting step of cutting the portion having the relatively shorter magnetic path from each of the magnets MG1 to MG4.

Figure 56A:
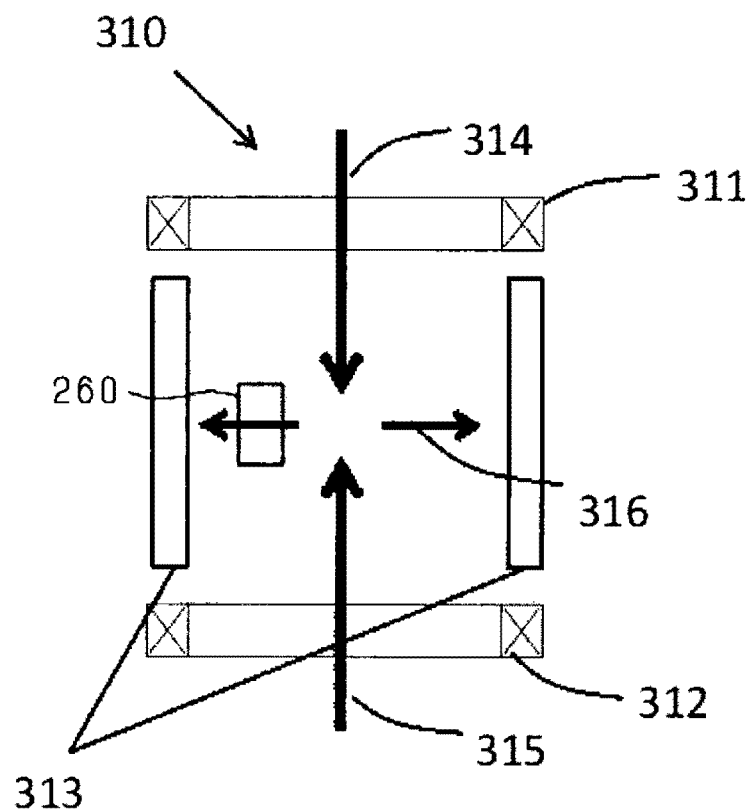
FIG. 56(a) and FIG. 56(b) are views illustrating an orientation performing step of a magnet.
Figure 56B:
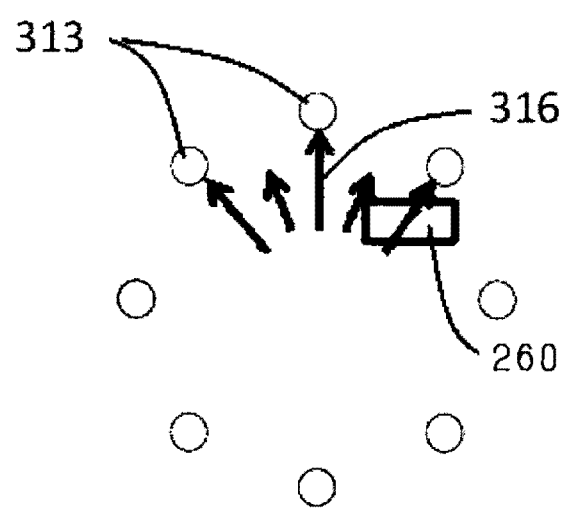

Next, the following describes another structure for performing the orientation step using FIGS. 56(*a*) and 56(*b*).

FIG. 56(*a*) schematically illustrates a schematic side view of an orientation apparatus 310, and FIG. 56(*b*) illustrates a schematic cross-sectional view of the orientation apparatus 310. FIG. 56(*b*) shows a positional relationship between an orientation magnetic field 316 and a mold 260.

The orientation apparatus 310 includes a pair of coils 311 and 312, and a plurality of cores 313.

The coils 311 and 312 are coaxially arranged with each other with a predetermined distance therebetween, and are configured to generate a magnetic field.

The cores 313 are disposed between the coils 311 and 312, and located to be separated from the common center axis of the coils 311 and 312; the cores 313 serve as an orientation yoke. These coils 311 and 312 and the cores 313 serve as a magnetic field generator.

Each of the coils 311 and 312 is configured to generate a magnetic field directed inwardly, i.e. directed toward the center of the orientation apparatus 310, when energized.

The cores 313 are distributedly arranged in a circle. Specifically, a radial position of each of the cores 313 can be located to be radially outward from the coils 311 and 312. Note that each of the cores 313 has an annular shape in its longitudinal cross section, but can have a rectangular or a circular-arc shape in its longitudinal cross section. The mold 260 for forming the magnet MG is disposed inside of a virtual circle formed by the arrangement of the cores 313.

Specifically, the coils 3111 and 312 are configured to respectively generate inward magnetic fields from each other toward the center of the orientation apparatus 30 when energized, so that the generated magnetic fields result in being different from each other. Specifically, the magnetic fields generated from the respective coils 311 and 312 are inequivalently oriented based on the number of the cores 313 and the intervals of the cores 313.

That is, magnetic fields 314 and 315, which have opposite polarities from each other, are generated by the respective coils 311 and 312 and are transferred toward the mold 260 in which the magnetic powders are filled. In this situation, the two magnetic fields 314 and 315 come into collision from each other so as to repulse one another, thus generating an orientation magnetic field 316 that expands radially outward. In this case, the orientation magnetic field 316, which uniformly expands radially outward based on the repulsion of the opposite-polarity magnetic fields, is focused onto each of the cores 313 circumferentially distributed, resulting in the orientation magnetic field 316 having a distribution. That is, it is possible to generate the orientation magnetic field 316 having magnetic field components, i.e. lines, each with a curvature, i.e. the orientation magnetic field 316 having circular-arc magnetic field lines. Using the orientation magnetic field 316 having curved magnetic field lines enables the above magnets 400 and 404 to be obtained with high orientation ratio.

Figure 57A:
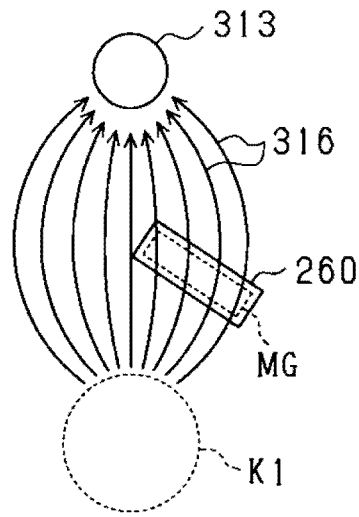
FIG. 57(a) and FIG. 57(b) are views specifically illustrating magnetic orientations for a magnet.

FIG. 57(a) specifically illustrates magnetic orientations for the magnet MG. In FIG. 57(a), repulsion between the opposite magnetic fields has occurred in a region K1, and the repulsion causes an orientation magnetic field 316 from the region K1 to the core 313. The orientation magnetic field 316 has magnetic flux lines being curvedly focused onto the core 313. In this case illustrated in FIG. 57(a), arranging the mold 260 to be oriented such that magnet outer surfaces, which respectively serve as flux effective surfaces, obliquely intersect with the orientation magnetic field 316 enables the magnet MG filled in the mold 260 to have desired magnetic orientations.

The above orientation step therefore makes it possible to efficiently manufacture the magnet, such as the magnet 404 illustrated in FIG. 53, that has 1. Magnetic paths each having the length longer than the thickness dimension of the corresponding magnet 2. Easy axes of magnetization oriented to be parallel to the respective magnetic paths In particular, the above orientation step efficiently enables the magnet MG to have circular-arc magnetic orientations.

Figure 57B:
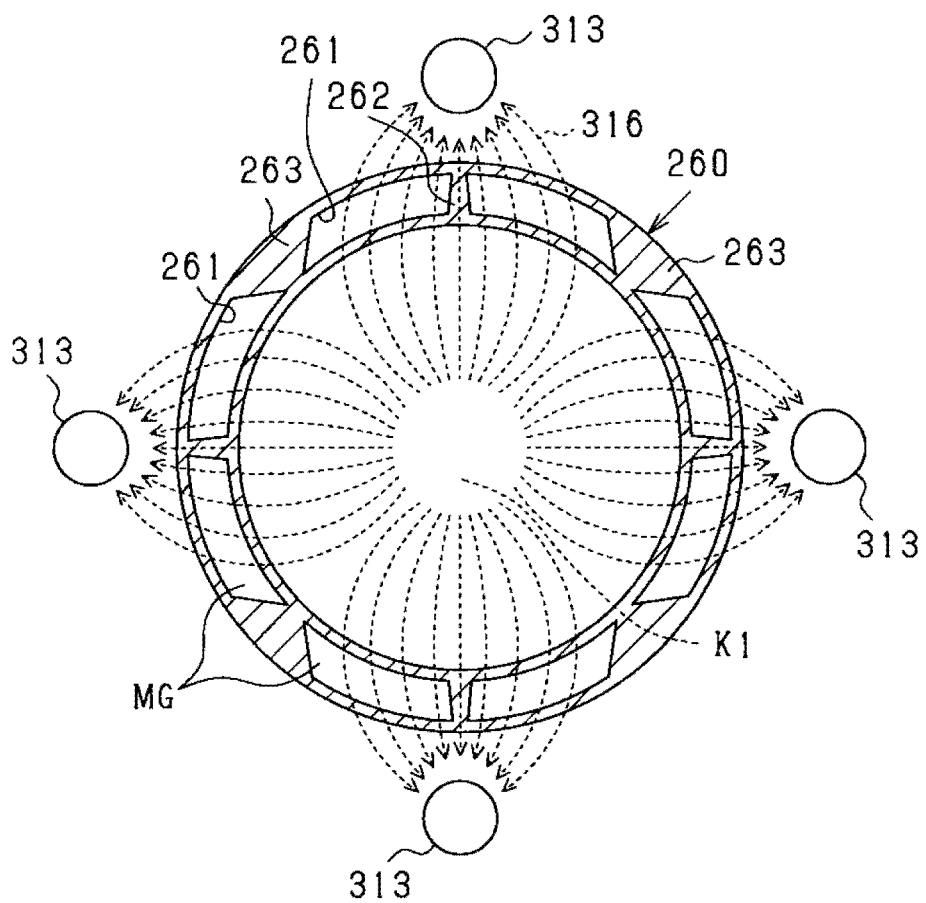

It is possible to configure the mold 260 as illustrated in FIG. 57(b). In this modification, the mold 260 has an annular shape, and includes eight installation portions 261 formed therein in a circumferential direction of the mold 260. At least one of the installation portions 261 is provided for each rod-shaped core 313. Preferably, the two installation portions 261 are provided for each rod-shaped core 31, so that the total number of the installation portions 261 is preferably set to be twice the total number of the rod-shaped cores 313. The mold 260 also includes partitioning walls 262 and 263, one of which is located between each adjacent pair of the installation portions 261; each of the partitioning walls 262 and 263 has an angularly inclined to be in conformity with a corresponding magnetic flux line of the orientation magnetic field 316.

Figure 58A:
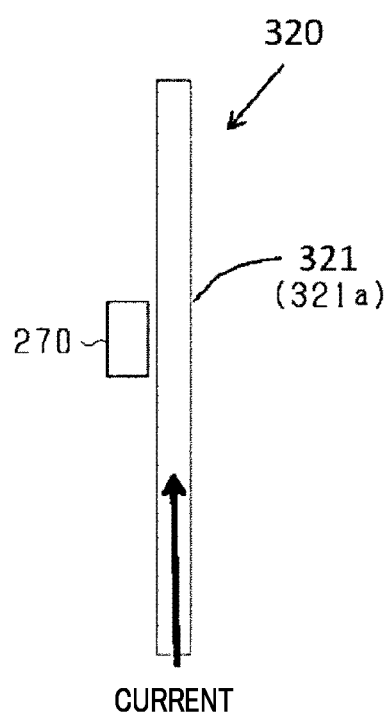
FIG. 58(a) and FIG. 58(b) are views illustrating an orientation performing step of a magnet.
Figure 58B:
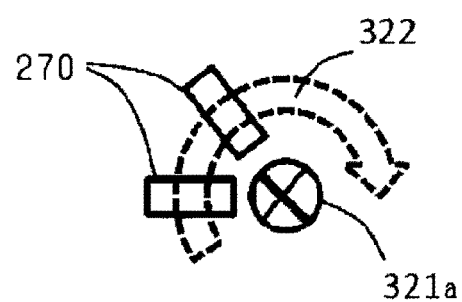

The following describes a further structure for performing the orientation step using FIGS. 58(a) and 58(b).

FIG. 58(a) schematically illustrates a schematic side view of an orientation apparatus 320, and FIG. 58(b) illustrates a schematic cross-sectional view of the orientation apparatus 320. FIG. 58(b) shows a positional relationship between an orientation magnetic field 322 and a mold 270.

The orientation apparatus 320 includes a magnetic field generator 321 comprised of a linear conductor 321a. Energizing the linear conductor 321a causes an orientation magnetic field 322 in a circumferential direction around the linear conductor 321a to be generated. A mold 270 in which magnetic powders are filled is located around the linear conductor 321a having a predetermined angular direction with respect to the linear conductor 321a. The orientation apparatus 320 therefore makes it possible to efficiently generate the magnets 400 and 404 each with high orientation ratio. In this modification, a mold for injection molding can be used to shape magnetic powders filled in the mold. This enables magnets to be manufactured without cutting step, making it possible to further improve the magnet manufacturing efficiency.

It is possible to arrange the molds 270 around the linear conductor 321a in the form of a ring. In addition, it is possible to freely determine the orientation of the mold 270 in accordance with desired orientations for the magnetic powders filled in the mold 270.

The above sixth embodiment efficiently manufactures magnets, such as the magnets 404 illustrated in FIG. 53; each of the magnets has (1) A pair of opposing effective surfaces, each of which serves as a flux inflow surface into which magnetic fluxes flow or a flux outflow surface out of which magnetic fluxes flow (2) Magnetic paths each having a length larger than the thickness dimension between the pair of effective surfaces (3) Easy axes of magnetization are each oriented to be along a corresponding one of the magnetic paths This configuration of each of the manufactured magnets enables each magnet MG to easily have a circular-arc magnetic orientation.

Seventh Embodiment

The following describes a modified structure of each permanent magnet of the rotor 600 according to the seventh embodiment.

Figure 59:
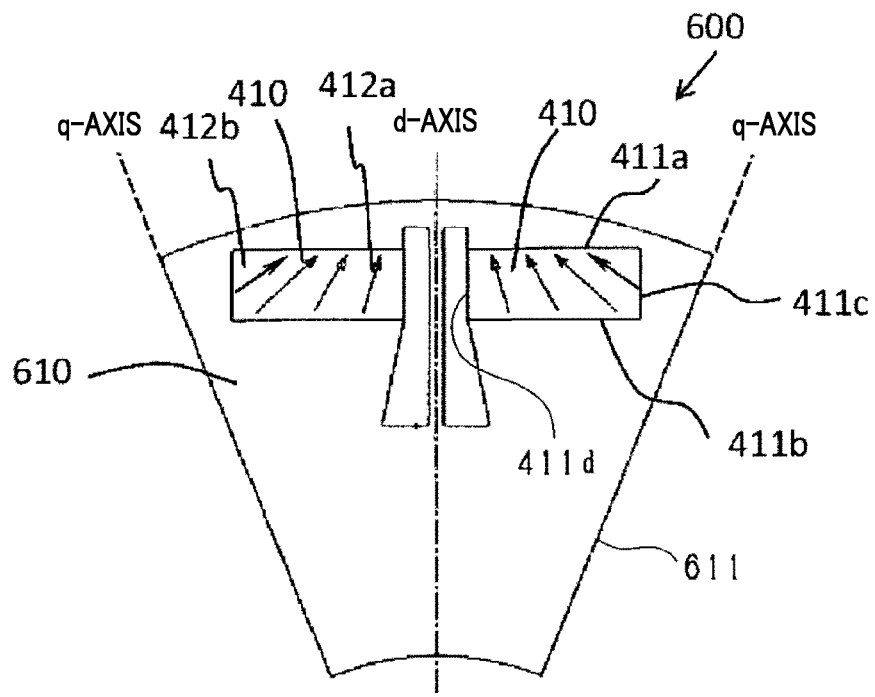
FIG. 59 is a partial plan view of a rotor of a seventh embodiment.

FIG. 59 illustrates a specific configuration of the rotor 600. As illustrated in FIG. 59, magnets 410 are installed in respective magnet installation holes 611 of the rotor core 610 so as to be located both sides of the d-axis. The magnets 410 are arranged to be symmetrical about the d-axis.

Each magnet 410 has a rectangular shape in its lateral cross section, and has opposing side surfaces 411a and 411b arranged radially at respective outer and inner sides; the side surfaces 411a and 411b respectively serve as flux inflow-outflow effective surfaces.

Each of the magnets 410 of the rotor 600 according to the seventh embodiment is configured such that magnetic orientations, i.e. easy axes of magnetization, in a portion 412a closer to the d-axis than to the q-axis are different from those in a portion 412b closer to the q-axis than to the d-axis.

That is, the magnetic orientations of the magnetic paths in one end of the magnet 410 in its longitudinal direction are different from those in the other end of the magnet 410 in its longitudinal direction.

In particular, the magnetic orientations located to be closer to the d-axis in the magnet 410 are oriented to be closer to the parallel direction parallel to the d-axis than those located to be closer to the q-axis. In other words, the magnetic orientations, i.e. easy axes of magnetization, located to be closer to the d-axis in the magnet 410 are oriented to be closer to the parallel direction parallel to the d-axis than those located to be closer to the q-axis.

Each magnet 410 has a q-axis side end 411c closer to the q-axis, and a d-axis side end 411d closer to the d-axis in its lengthwise direction. That is, each magnet 410 has both ends 411c and 411d in its longitudinal direction along the flux effective surfaces 411a and 411b. The magnetic orientations, i.e. easy axes of magnetization, located to be closer to one of the d-axis side end 411d and q-axis side end 411c are different from those located to be closer to the other of the d-axis side end 411d and q-axis side end 411.

That is, in each magnet 410, the magnetic orientations in the portion 412a closer to the d-axis are closer to the direction parallel to the d-axis than those in the portion 412b closer to the q-axis.

Figure 60:
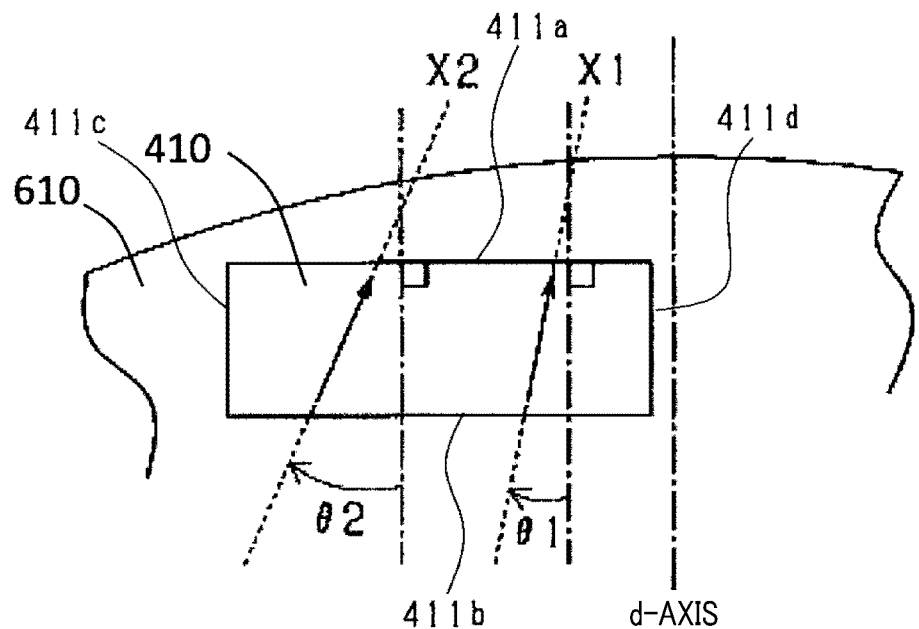
FIG. 60 is a view illustrating, in detail, magnetic orientations of a magnet.

In particular, as illustrated in FIG. 60, at least one magnetic orientation located at a predetermined position of the magnet 410 to be closer to the d-axis side end 411d than to the q-axis side end 411c will be referred to as at least one magnetic orientation X1, and at least one magnetic orientation located at a predetermined position of the magnet 410 to be closer to the q-axis side end 411c than to the d-axis side end 411d will be referred to as at least one magnetic orientation X2.

At that time, the at least one magnetic orientation X1 is more nearly parallel to the d-axis than the at least one magnetic orientation X2 is.

That is, in the magnet 410, an inclination angle θ2 of the at least one magnetic orientation X2 with respect to the d-axis, i.e. the orthogonal direction orthogonal to the flux effective surfaces 411a and 411b, is larger than an inclination angle θ1 of the at least magnetic orientation X1 with respect to the d-axis, i.e. the orthogonal direction orthogonal to the flux effective surfaces 411a and 411b.

Specifically, in the magnet 410, magnet lengths along respective magnetic orientations, i.e. lengths of magnetic paths respectively corresponding to the magnetic orientations sequentially decrease from the q-axis side end 411c to the d-axis side end 411d; each magnetic path can be defined from a start point to an end point of the corresponding easy axis of magnetization.

Defining the magnetic orientations, i.e. the orientation angles, in each magnet 410 as illustrated in FIG. 59 enables magnetic flux components from the left-side magnet 410 relative to the d-axis directed toward the right-side magnet 410 and magnetic flux components from the right-side magnet 410 relative to the d-axis directed toward the left-side magnet 410 to be reduced. This therefore reduces demagnetization of repulsion of the magnetic flux components from the left-side magnet 410 relative to the d-axis and the magnetic flux components from the right-side magnet 410 relative to the d-axis.

Figure 86A:
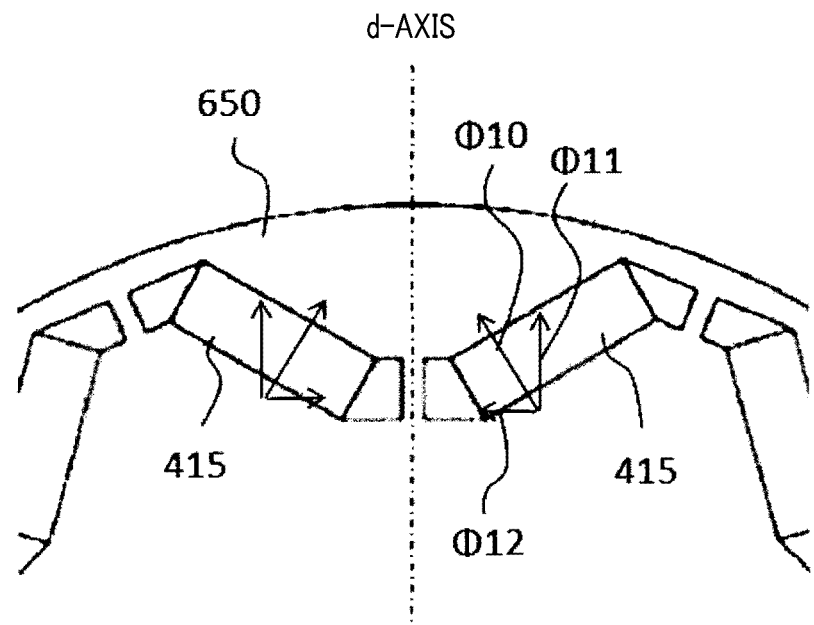
FIG. 86(a) and FIG. 86)b) are views illustrating an orientation of magnetic flux around the d-axis.
Figure 86B:
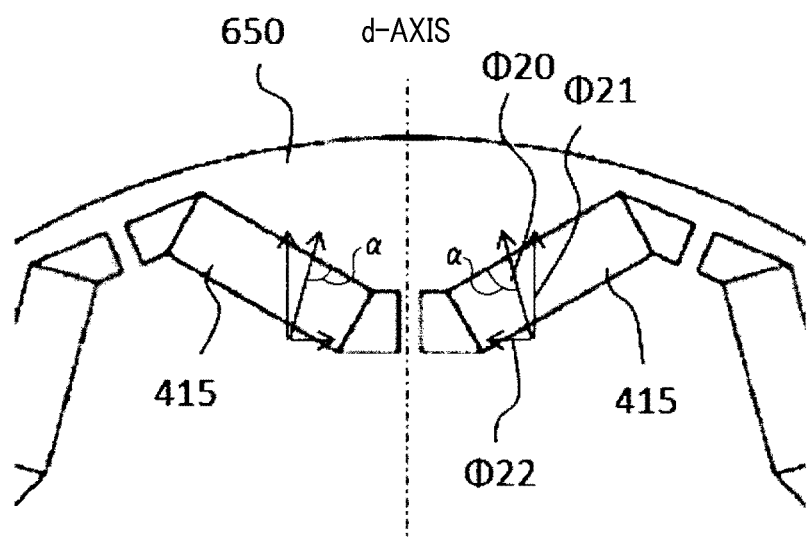

Next, the following describes effects in the vicinity of the d-axis, which are obtained by the magnetic orientations in the magnet 410 defined set forth above with reference to FIGS. 86(a) and 86(b). Note that, in each of FIGS. 86(a) and 86(b), two magnets 415 are arranged in a rotor core 650 to have a substantially V shape. FIG. 86(a) illustrates a conventional structure, and FIG. 86(b) illustrates the structure of the seventh embodiment.

The following describes effects obtained by the configuration of the magnet 410, which is oriented such that at least one easy axis of magnetization in the d-axis side end 411d is inclined with respect to a direction perpendicular to the flux effective surface 411a, and extends toward the d-axis (see the X1 direction in FIG. 60) with reference to FIGS. 86(a) and 86(b).

In each of FIGS. 86(a) and 86(b), the pair of magnets 415 are arranged in a rotor core 650 to have a substantially V shape. At that time, FIG. 86(a) illustrates the conventional structure in which easy axes of magnetization in a d-axis side end of each magnet 415 are inclined with respect to a direction perpendicular to flux effective surfaces of the corresponding magnet 415.

In contrast, FIG. 86(b) illustrates, although the structure of the magnet 415 in FIG. 86(b) is different from the structure of the magnet 410 illustrated in FIG. 59, that easy axes of magnetization in the d-axis side end 411d of each magnet 415 are inclined with respect to the flux effective surfaces of the corresponding magnet 415 and extend toward the d-axis, which is similar to the structure of the seventh embodiment illustrated in FIG. 59.

In FIG. 86(a), magnetic flux Φ10 is generated in the magnet 415, which is perpendicular to the flux effective surfaces. The magnetic flux Φ10 is comprised of a component Φ11 parallel to the d-axis, and a component Φ12 perpendicular to the d-axis. In this case, the component Φ12, which is perpendicular to the d-axis, of the left-side magnet 415 becomes a magnetic flux component facing, i.e. repulsing, the component Φ12, which is perpendicular to the d-axis, of the right-side magnet 415.

In contrast, as illustrated in FIG. 86(b), magnetic flux Φ20 is generated in the magnet 415, which intersects with each the flux effective surfaces at a non-right angle. The magnetic flux Φ20 includes a component Φ21 parallel to the d-axis, and a component Φ22 perpendicular to the d-axis. In this case, the orientation of the magnetic flux Φ20 is closer to the direction parallel to the d-axis as compared with the magnetic flux Φ10 illustrated in FIG. 86(a). This results in the component Φ22, which is perpendicular to the d-axis, of each magnet 415 being smaller than the component Φ12. This therefore reduces the magnetic flux from the left-side magnet 415 and the magnetic flux from the right-side magnet 414, which face each other, i.e. repulse each other, making it possible to reduce demagnetization of the magnet 415.

Note that the magnetic orientations defined in the magnet 410 illustrated in FIG. 59 can include at least one magnetic orientation being perpendicular to each of the flux effective surfaces 411a and 411b.

Each magnet 410 illustrated in FIG. 59 has the pair of opposing surfaces 411a and 411b arranged radially at respective outer and inner sides; the side surfaces 411a and 411b respectively serve as flux inflow-outflow effective surfaces. In addition, each magnet 410 illustrated in FIG. 59 has a surface of the q-axis side end 411c, which serves as a flux inflow-outflow effective surface; the surface of the q-axis side end 411c will also be referred to as a q-axis end surface 411c.

That is, the magnetic orientations in the q-axis side end of the magnet 410 are closer to the direction perpendicular to the q-axis than those in the d-axis side end thereof. For this reason, magnetic flux can flow into or flow out from the q-axis side end of the magnet 410. Hereinafter, the opposing surfaces 411a and 411b arranged radially at respective outer and inner sides will be referred to respectively as first effective surfaces 411a and 411b, and the q-axis end surface 411c will be referred to as a second effective surface 411c. Note that, in the magnet 410, because the magnetic orientations in the q-axis side end are inclined with respect to the direction perpendicular to the first effective surface 411a located at the stator side, i.e. the upper side in FIG. 59, the second effective surface 411c is therefore formed.

One or more magnetic paths are defined between the first effective surface 411a, which is located to be closer to the stator than the effective surface 411b, and the second effective surface 411c. The magnet 410 is provided in the rotor core 610 such that the second effective surface 411c abuts on a corresponding inner wall surface, i.e. a corresponding inner side surface, of the magnet installation hole 611, that is, such that there is as little clearance as possible between the second effective surface 411c and the corresponding inner wall surface of the magnet installation hole 610.

When the pair of magnets 411 serves as the north pole, the stator-side first effective surface 411a serves as a flux outflow surface, and each of the anti-stator side first effective surface 411b and the second effective surface 411c serves as a flux inflow surface. Otherwise, when the pair of magnets 411 serves as the south pole, the stator-side first effective surface 411a serves as a flux inflow surface, and each of the anti-stator side first effective surface 411b and the second effective surface 411c serves as a flux outflow surface.

In other words, when the pair of magnets 411 serves as the north pole, the stator-side first effective surface 411a in the three effective surfaces 411a, 411b, and 411c serves as a flux outflow surface of each magnet, and the remaining first effective surface 411b and the second effective surface 411c serve as a flux inflow surface.

When the second flux surface 411c serves as a flux inflow surface, magnetic flux flowing into the magnet 410 from each of the two effective surfaces, i.e. the anti-stator side first effective surface 411b and the second effective surface 411c, flows out from the stator-side first effective surface 411a. When the second flux surface 411c serves as a flux outflow surface, magnetic flux flowing into the magnet 410 from the single effective surface, i.e. the stator side first effective surface 411a, flows out from each of the two effective surfaces, i.e. the second effective surface 411c and the second effective surface 411c. In this case, it is possible to collect magnetic flux components to a region of the rotor core 610 around the q-axis side end of the magnet 410, or distribute magnetic flux components from the region.

Each of the first effective surfaces 411a and 411b serves as an effective surface for generating magnetic flux at the center of a corresponding magnetic pole as magnetic-pole flux, and the second effective surface 411c serves as an effective surface for generating magnetic flux based on the magnet 411 passing through the q-axis. The magnet 410 of the seventh embodiment is configured such that each of the magnetic orientations intersects with each of the first and second effective surfaces 411a, 411b, and 411c at a non-orthogonal angle.

Each of the magnets 410 for a corresponding first magnetic pole according to the seventh embodiment is configured such that magnetic paths are defined between the stator-side first effective surface 411a and the second effective surface 411c. Because the second effective surface 411c is formed on the surface of the q-axis side end of each magnet 410 in this configuration, magnetic flux flow through the second effective surface 411c of the magnet 410 in the first magnetic pole and the second effective surface 411c of the magnet 410 in the second magnetic pole adjacent to the first magnetic pole; the magnet 410 of the first magnetic pole and the magnet 410 of the second magnetic pole are adjacent to each other.

This therefore makes it possible to adjust magnetic saturation on each region in the rotor core 610; each region is located around the corresponding one of the q-axes. That is, the seventh embodiment is specially configured to positively use each q-axis region in the rotor core 610 as a magnetic-circuitry path of each magnet 410; each q-axis region in the interior magnet rotor core 610 has been conventionally unused.

In addition, each 410 is provided in the rotor core 610 such that the second effective surface 411c is in contact with a corresponding inner wall surface of the magnet installation hole 611. This configuration makes it possible to generate, in the adjacent magnets 410 of the adjacent magnetic poles across each q-axis, a magnetic-circuitry path through the second effective surfaces 411c of the respective adjacent magnets 410 and the corresponding q-axis region in the rotor core 610 therebetween. This therefore efficiently adjusts the state of magnetic saturation in each q-axis region in the rotor core 610.

Eighth Embodiment

The following describes a modified structure of each permanent magnet of the rotor 600 according to the eighth embodiment.

Figure 61:
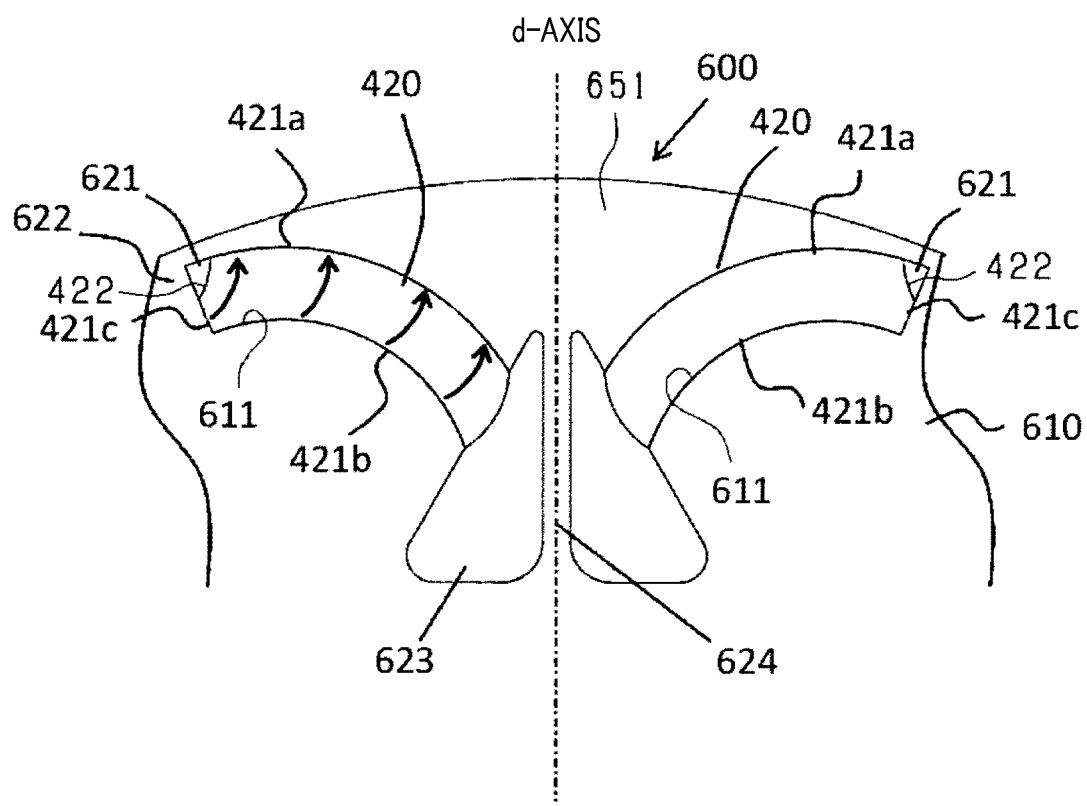
FIG. 61 is a partial plan view of a rotor of an eighth embodiment.

FIG. 61 illustrates a specific configuration of the rotor 600.

As illustrated in FIG. 61, the rotor core 610 has formed a pair of magnet installation holes 611 for each d-axis, and a magnet 420 is installed in each of the magnet installation holes 611. Each of the magnet installation holes 611 has opposing q- and d-axis side ends, and each of the magnets 420 also has opposing q- and d-axis side ends. A radial position of the q-axis side end of each of the magnet installation hole 611 and magnet 420 is different from a radial position of the d-axis side end of the corresponding one of the magnet installation hole 611 and magnet 420. That is, the q-axis side end of each of the magnet installation hole 611 and magnet 420 is located to be radially outer side relative to the d-axis side end of the corresponding one of the magnet installation hole 611 and magnet 420.

Each of the magnet installation holes 611 has a convex shape in its lateral cross section; the convex shape is convex toward the radially outward direction from the rotor 600 in its lateral cross section, and each of the magnets 420 also has a convex shape in its lateral cross section; the convex shape is convex toward the radially outward direction from the rotor 600 in its lateral cross section.

For example, as illustrated in FIG. 61, each of the magnet installation hole 611 and the magnet 420 has a substantially circular-arc shape that is convex toward the radially outward direction, i.e. the d-axis, from the rotor 600. The left and right magnet installation holes 12 of each pair are linearly symmetrical about the corresponding pole, and have a substantially V shape.

Next, the following describes the structure of the rotor 600, which is different from a conventional rotor using plate-like permanent magnets, and benefits of the rotor 600 of the eighth embodiment with reference to FIGS. 87 to 90. In each of FIGS. 87 to 90, two magnets 415 are arranged in a rotor core 650 to have a substantially V shape.

Figure 87:
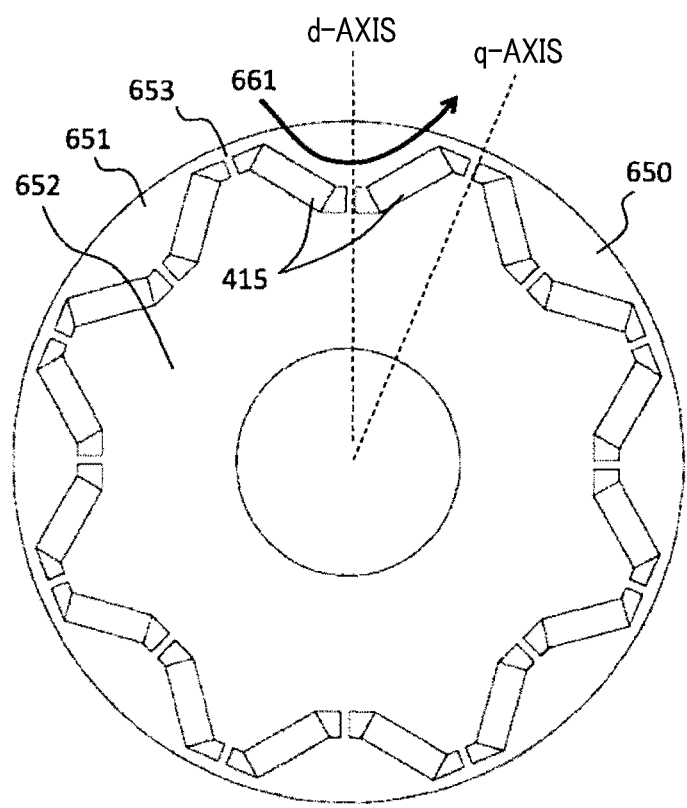
FIG. 87 is a view illustrating a path through which magnetic flux passes in a rotor when the corresponding motor is driven in a normal control mode without executing field weakening control.
Figure 88:
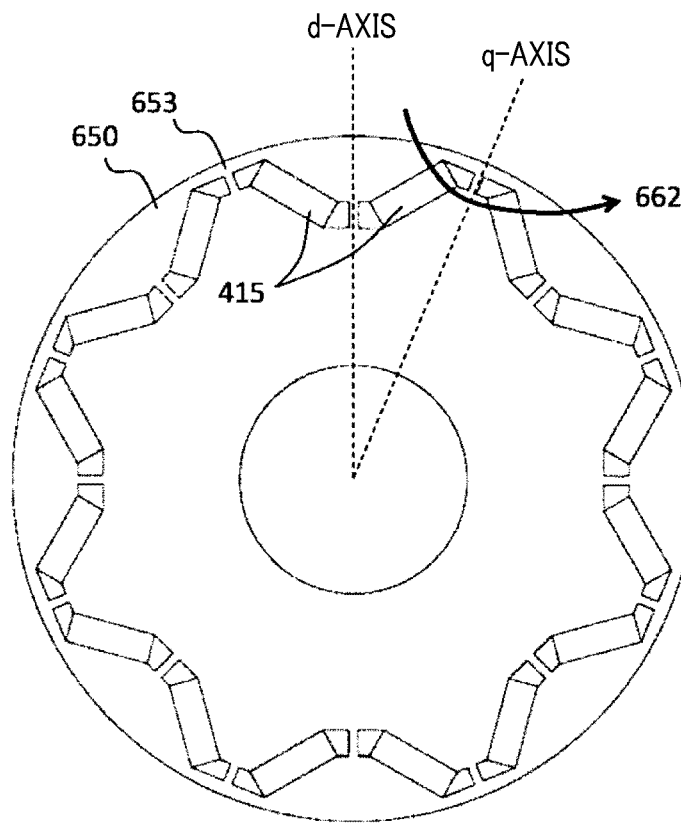
FIG. 88 is a view illustrating how magnetic flux passes through the rotor in execution of the field weakening control mode.
Figure 89:
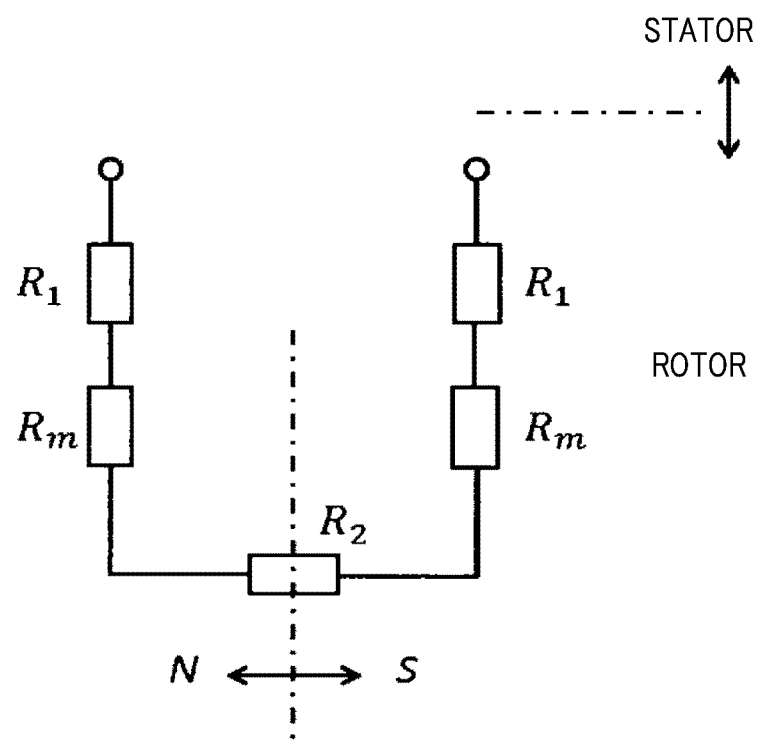
FIG. 89 is a circuit diagram of an equivalent magnetic circuit of an interior magnet rotor.
Figure 90:
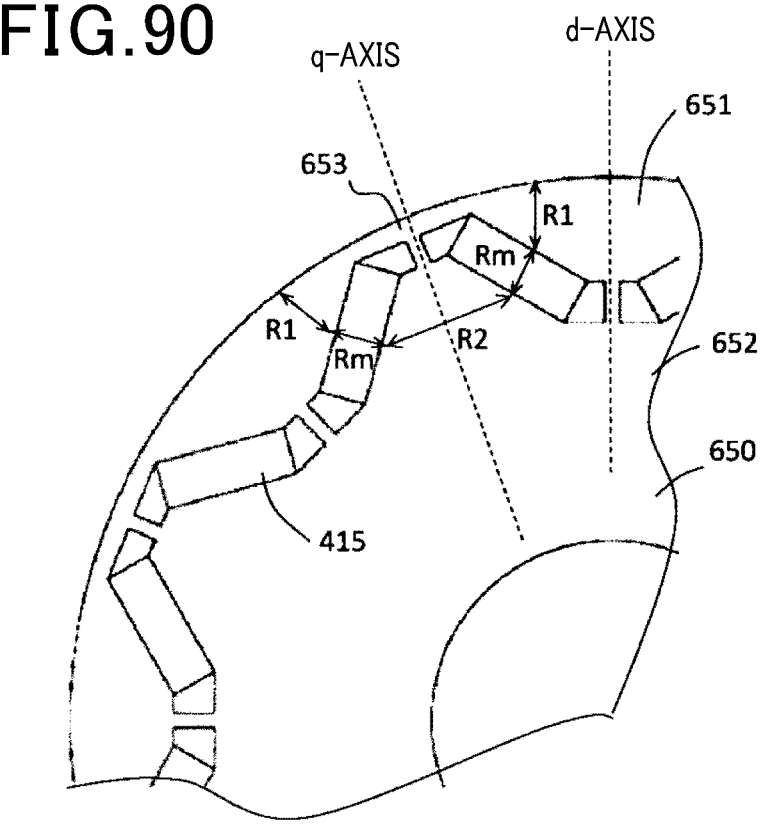
FIG. 90 is a magnetic resistance around the q-axis.

FIG. 87 illustrates an excitation magnetic field 661 passing through a d-axis as a rotating magnetic field from the unillustrated stator. FIG. 88 also illustrates an excitation magnetic field 662 passing through a q-axis as a rotating magnetic field from the unillustrated stator. FIG. 90 illustrates an interior magnet rotor, and FIG. 89 illustrates an equivalent magnetic circuit of the interior magnet rotor illustrated in FIG. 90.

In the structure of the rotor illustrated in FIG. 87, while the excitation magnetic field 661 is given to the rotor from the unillustrated stator, magnetic flux is applied from an outer peripheral side of the rotor to the rotor.

In this situation, an outer peripheral portion 651 of the rotor core 650 for each d-axis is easily expected to be magnetically saturated by a weaker magnitude of the excitation magnetic field as compared with an inner peripheral portion 652 of the rotor core 650.

In particular, magnetic saturation may be generated in a q-axis region 653 in the rotor core 650 for each q-axis, which has a smaller amount of iron, resulting in demagnetization of the q-axis region 653. This is an issue to be measured.

The magnetic saturation in the q-axis region 653 for each q-axis may cause the outer peripheral portion 651 of the rotor core 650 for each d-axis, which is surrounded by the substantially V-shaped magnets 415 of the corresponding d-axis to be magnetically saturated. This may reduce a value of magnetic permeability of the outer peripheral portion 651 for each d-axis, resulting in an increase of magnetic resistance R1 corresponding to the outer peripheral portion 651 for each d-axis. This may result in the magnets 415 for each d-axis being located in the magnetically saturated rotor core 650, resulting in a lower value of the magnetic permeance of each magnet 415, which is similar to a value of a magnet existing in air. This reduction in the magnetic permeance of each magnet 415 may be exposed to demagnetization of the corresponding magnet 415 and/or reduction in magnetic flux of the corresponding magnet 415.

In contrast, the rotor core 610 of the eighth embodiment illustrated in FIG. 61 is configured such that each magnet 420 is shaped to be convex toward the radially outward direction. This configuration reduces the amount of iron of the outer peripheral portion 650 of the rotor core 610 for each d-axis, which is surrounded by the V-shaped magnets 420 and likely to be magnetically saturated, thus reducing the magnetic resistance R1, which is illustrated in FIG. 89. This reduction in the magnetic resistance R1 therefore improves the demagnetization resistance of the rotor 600. This shape of each magnet 420, which is convex toward the radially outward direction, reduces the amount of iron of the outer peripheral portion 650 of the rotor core 610 for each d-axis, making it possible to reduce iron loss of the rotor 600.

Each magnet 420 illustrated in FIG. 61 has the pair of opposing surfaces 421a and 421b arranged radially at respective outer and inner sides; the side surfaces 421a and 421b respectively serve as flux inflow-outflow effective surfaces. In addition, the surface of the q-axis side end of each magnet 420 illustrated in FIG. 61, which will be referred to as a q-axis end surface, partly has a flux inflow-outflow effective surface that will also be referred to as a second effective surface 421c.

That is, the magnetic orientations in the magnet 420 are not linear but are curved to be convex toward the d-axis. This causes a part of the q-axis end surface, which faces the q-axis, to serve as the second effective surface 421c, that is, a flux effective surface.

One or more magnetic paths are therefore defined between the second effective surface 421c and the first effective surface 421a, which is located to be more radially outside than the second effective surface 421b. The length of each of the one or more magnetic paths becomes longer than the physical thickness of the magnet 420, i.e. the distance between the opposing first effective surfaces 421a and 421b. Note that the physical distance between the second effective surface 421c and the first effective surface 421a located radially outward, i.e. the minimum distance along a curved easy axis of magnetization between the second effective surface 421c and the first effective surface 421a located radially outward is preferably set to be longer than the thickness dimension of the magnet 420.

When the pair of magnets 421 serves as the north pole, the stator-side first effective surface 411a located at the upper side in FIG. 61 serves as a flux outflow surface, and each of the anti-stator side first effective surface 421b located at the lower side in FIG. 61 and the second effective surface 421c serves as a flux inflow surface. Otherwise, when the pair of magnets 421 serves as the south pole, the stator-side first effective surface 421a located at the upper side in FIG. 61 serves as a flux inflow surface, and each of the anti-stator side first effective surface 421b located at the lower side in FIG. 61 and the second effective surface 421c serves as a flux outflow surface.

The q-axis end surface of each of the magnets 420 also partly has an ineffective surface 422 in addition to the second effective surface 421c; the ineffective surface 422 is located between the stator-side first effective surface 421a and the second effective surface 421c. The ineffective surface 422 is configured such that no magnetic flux flows into or out from the ineffective surface 422. The ineffective surface 422 is shaped to be circular-arc curved to be concave inwardly. In addition, the ineffective surface 422 is oriented to be in conformity with the corresponding magnetic orientation. In each of the magnet installation holes 611, a non-magnetic portion, such as a space, 621 is defined between the ineffective surface 422 and the rotor core 611, i.e. a corresponding inner wall surface of the rotor core 611.

That is, the q-axis end surface of the magnet 420 is arranged to be in contact with, at its second effective surface 421c, the rotor core 611, and to be in non-contact with, at its ineffective surface 422, the rotor core 611.

The above configuration of the interior magnet rotor core 610 enables each q-axis region in the interior magnet rotor core 610, which has been conventionally unused, to be used as a magnetic-circuitry path through which magnet flux passes. That is, the second effective surface 421c provided to the q-axis side end of the magnet 420 enables magnetic flux to easily pass through a q-axis region 622 of the rotor core 610. In particular, the non-magnetic portion 621 provided radially outside of the q-axis side end of the magnet 420 enables magnetic flux to further flow into the q-axis region 622 of the rotor core 610.

In addition, the above configuration of the rotor 600 enables magnetic flux of the magnet 420 to be distributed toward the effective surfaces 421a, 421b, and 421c. This makes it possible to restrict the level of magnetic saturation to a minimum necessary level, thus further improving demagnetization resistance of the rotor 600. The above configuration of the rotor 600 also properly adjusts the state of magnetic saturation based on the second effective surface 421c while preventing magnet flux from flowing in a closed loop through or around the q-axis region 622.

The following supplementally describes effects by distribution of the magnetic flux.

Because, in the inner rotor motor 600, magnetic flux sent from the stator has a difficulty of extending to the radially inner portion of the inner rotor 610 relative to the magnets. For this reason, magnet flux is present in the radially inner portion of the inner rotor 610 relative to the magnets 420. For this reason, the amount of iron in the radially inner portion of the inner rotor 610 has been designed to permit the amount of flux generated by the assembly of the magnets 420.

The q-axis region 622 of the rotor core 610 according to the eighth embodiment is configured as a passage for magnetic flux passing through the second effective surface 421c of the magnet 420. This efficiently distributes the magnetic flux. The second effective surface 421c of the magnet 420 makes it possible to reduce the amount of iron in the back side of the rotor 600 to thereby reduce the weight of the rotor 600, and/or more increase the efficiency of the motor 600 based on reduction in magnetic saturation.

The q-axis end surface of each of the magnets 420 partly has the ineffective surface 422 shaped to be circular-arc curved to be concave inwardly. A magnetic path is formed on the circular-arc shape of the d-axis side end of the magnet 420 between the effective surfaces 421a and 421c. This reduces the amount of magnet in the rotary electric machine while further increasing demagnetization resistance.

Note that, in the rotor core 610 illustrated in FIG. 61, a pair of flux barriers 623 are provided at both sides of the d-axis; each of the flux barriers 623 is located between the d-axis and the d-axis side end of the corresponding one of the magnets 420. In the rotor core 610, a core rib 624 is provided on a part of the d-axis between the flux barriers 623 to thereby strengthen the d-axis portion of the rotor core 610.

Ninth Embodiment

The following describes a modified structure of each permanent magnet of the rotor 600 according to the ninth embodiment.

Figure 62:
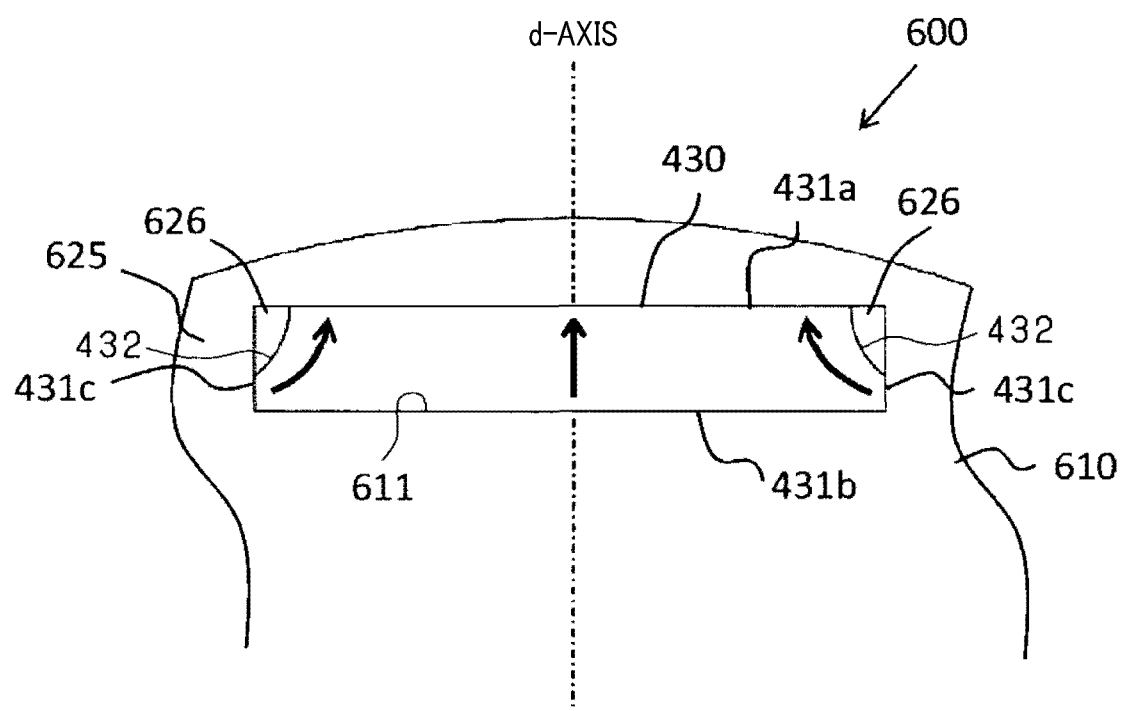
FIG. 62 is a partial plan view of a rotor of a ninth embodiment.

FIG. 62 illustrates a specific configuration of the rotor 600. As illustrated in FIG. 62, magnets 430 are installed in the respective magnet installation holes 611 of the rotor core 610. Each of the magnet installation holes 611 and the corresponding magnet 430 is arranged on the d-axis to extend in perpendicular to the d-axis. That is, the magnet 430 is located across the d-axis to extend to be perpendicular to the d-axis.

Each magnet 430 has a pair of opposite surfaces 431a and 431b arranged radially at respective outer and inner sides; the opposite surfaces 431a and 431b respectively serve as first effective surfaces 431a and 431b into which magnetic flux flows or out of which magnetic flux flows.

In addition, each magnet 430 has a surface of the q-axis side end serving as a second effective surface 431c into which magnetic flux flows or out of which magnetic flux flows.

That is, in the q-axis side end of each magnet 430, magnetic orientations are defined to be convex toward the radially inner direction. The surface 431c of the q-axis side end, which will be referred to as a q-axis end surface 431c, faces the q-axis and serves as a flux effective surface set forth above.

One or more magnetic paths are defined between the second effective surface 431c and the stator-side first effective surface 431a to extend from one of the surfaces 431a and 431c to the other thereof. The length of each of the one or more magnetic paths, which shows a minimum distance between the surfaces 431c and 431a, becomes longer than the physical thickness of the magnet 430, i.e. the minimum distance between the opposing first effective surfaces 431a and 431b.

The second effective surface 631c provided to the q-axis side end of the magnet 430 enables magnetic flux to easily pass through a q-axis region 625 of the rotor core 610. This obtains a higher value of the permeance at the q-axis side end of the magnet 430.

In addition, the q-axis end surface of each of the magnets 430 also partly has the ineffective surface 432 located between the stator-side first effective surface 431a and the second effective surface 431c. The ineffective surface 432 is configured such that no magnetic flux flows into or out from the ineffective surface 432. The ineffective surface 432 is shaped to be circular-arc curved to be concave inwardly. In addition, the ineffective surface 432 is oriented to be in conformity with the corresponding magnetic orientation. In each of the magnet installation holes 611, a non-magnetic portion, such as a space, 626 is defined between the ineffective surface 432 and the rotor core 611, i.e. a corresponding inner wall surface of the rotor core 611.

That is, the non-magnetic portion 626 is provided at the radially outer side of the q-axis side end of the magnet 430. This enables magnetic flux to further collectively flow through the q-axis region 625.

Note that, as illustrated in FIGS. 59, 61, and 62, each of the magnets 410, 420, and 430, which has the second effective surface, can have any shape. Specifically, each of the rotors 600 illustrated in a corresponding one of FIGS. 59, 61, and 62 achieves the corresponding effects set forth above independently of the shape of the corresponding one of the magnets 410, 420, and 430.

The magnetic orientations in the d-axis side end of the magnet 430 are set to be different from the magnetic orientations in the q-axis side end of the magnet 430. That is, the magnetic orientations in the d-axis side end of the magnet 430 are parallel to the d-axis. This reduces demagnetization of the d-axis side end of the magnet 430 due to magnetic flux components perpendicular to the d-axis.

The magnet 430 is provided in the rotor 600 illustrated in FIG. 62 to extend to be perpendicular to the d-axis. This reduces the magnetic resistance R1 (see FIG. 89), thus reducing the amount of magnet of the rotor 600 illustrated in FIG. 62 as compared with that of a rotor having a substantially V-shaped magnets. The structure of the rotor 600 illustrated in FIG. 62 is preferably applied to, for example, a motor-generator directly coupled to a shaft of an engine. That is, a system including the motor-generator is capable of decelerating a vehicle, and outputting torque for an output shaft, which is equivalent to the engine via a speed reducer. The motor-generator system has a higher RPM, so that the motor-generator may have a deficiency of strength against centrifugal force.

Because the structure of the rotor 600 illustrated in FIG. 61, the core rib 624 provided on the center of the d-axis serves to reinforce the rotor 600. However, the structure of the rotor 600 illustrated in FIG. 62, the rotor 600 may have a deficiency of strengthen against centrifugal force, because the rotor 600 includes no core rib 624, so that may have low strength.

If the system is configured such that torque of the motor-generator is directly transferred to the output shaft without the speed reducer, the motor-generator is configured to operate based on an engine RPM within the range from 0 to 9000 RPM. For this reason, the core rib located at the center of the d-axis can be eliminated from the motor-generator. Thus, applying the rotor 600 of the ninth embodiment to the motor-generator of the system without using the speed reducer makes it possible to increase output torque per unit volume of the magnets by the amount of magnetic flux passing through the d-axis core rib illustrated in FIG. 61 as compared with the motor-generator with the rotor illustrated in FIG. 61.

Although the core rib located on the center of the d-axis is effective in reinforcing the rotor core 610, but may serve as a magnetic path through which magnetic flux flows through only the rotor 600. For this reason, the rotor 600 having the structure illustrated in FIG. 62 is preferably used for a motor that outputs torque that is equivalent to torque of the engine, or a compact motor having an outer diameter less than 100 mm and being subjected to small centrifugal force.

Figure 63:
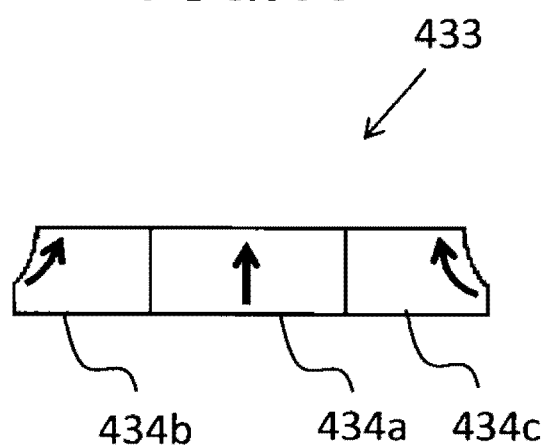
FIG. 63 is a view illustrating a structure of a magnet, a part of which has been modified.

FIG. 63 illustrates a magnet 433 that is a partial modification of the structure of the magnet 430. The magnet 433 illustrated in FIG. 63 is configured as a magnet assembly comprised of a middle magnet 434a located across the d-axis, and two end magnets 434b and 434c respectively jointed to both ends of the middle magnet 434a. The middle magnet 434a has a rectangular shape in its lateral cross section, and each of the end magnets 434b and 434c has a notched corner closer to the outer circumferential surface of the rotor core 610 and closer to the d-axis. Magnetic orientations of each of the magnets 434b and 434c can be set to the same as those set to the magnet 430 illustrated in FIG. 62, and flux effective surfaces of each of the magnets 434b and 434c can be set to the same as those set to the magnet 430 illustrated in FIG. 62.

The magnet 433 illustrated in FIG. 63 obtains a higher value of the permeance at the q-axis side end of the magnet 433, and reduces demagnetization of the middle portion of the magnet 433 due to concentration of magnet flux components from both ends thereof, which are like the magnet 430.

Tenth Embodiment

It is possible to use magnets 440 and 450 illustrated in respective FIGS. 64(a) and 64(b) for the rotor 600. The magnets 440 illustrated in FIG. 64(a) or the magnets 450 illustrated in FIG. 64(b) can be applied to, for example, the rotor 600 illustrated in FIG. 48.

Specifically, in the rotor 600, the magnets 440 or magnets 450 are used in place of the magnets 400, so that the magnets 440 or magnets 450 are arranged both ends of the d-axis to be linear symmetrical about the d-axis. Note that, if each of the permanent magnets installed in the rotor is changed to another magnet, the distance between the radially outer effective surface and the radially inner effective surface of each changed permanent magnet can be reset.

The magnet 440 illustrated in FIG. 64(a) has opposing surfaces 441a and 441b arranged radially at respective outer and inner sides (corresponding to the upper side and lower side in FIG. 64(a)); the opposing surfaces 441a and 441b respectively serve as first effective surfaces 441a and 441b. The magnet 640 also has a left surface, i.e. a q-axis end surface. The q-axis end surface partly has a second effective surface 441c, and has a remaining surface serving as an ineffective surface.

The magnet 450 illustrated in FIG. 64(b) has opposing surfaces 451a and 451b arranged radially at respective outer and inner sides (corresponding to the upper side and lower side in FIG. 64(b)); the opposing surfaces 451a and 451b respectively serve as first effective surfaces 451a and 451b. The magnet 640 also has a left surface, i.e. a q-axis end surface. The q-axis end surface partly has a second effective surface 451c, and has a remaining surface serving as an ineffective surface.

In each of the magnets 440 and 450, circular-arc magnetic orientations are defined (see arrows). The magnet 440 or magnet 450 is installed in each of the magnet installation holes 611 arranged on both sides of the d-axis in the rotor core 611 such that the second effective surface 441c or 451c is closer to the q-axis than to the d-axis.

When the magnets 440 and 450 are compared with each other, the minimum distance between the first effective surfaces 441a and 441b, i.e. the physical thickness of the magnet 440, is different from the minimum distance between the first effective surfaces 451a and 451b, i.e. the physical thickness of the magnet 450. That is, the thickness dimension of the magnet 440 is smaller than the thickness dimension of the magnet 450. This results in the curvature of each magnetic orientation, i.e. the radius of curvature of the orientation circle, in the magnet 440 being different from the curvature of each magnetic orientation, i.e. the radius of curvature of the orientation circle, in the magnet 450. That is, the radius of curvature of the orientation circle of the magnet 440 is smaller than the radius of curvature of the orientation circle of the magnet 450. Properly defining magnetic orientations in a magnet in accordance with the radius of curvature of the orientation circle enables the orientation ratio of the magnet to be improved. For example, the magnet 440 having the smaller radius of curvature of the orientation circle is preferably magnetically oriented by the orientation magnetic field 322 illustrated in FIG. 58(b).

The magnitude of the orientation magnetic field for neodymium magnets has been known as substantially 2 tesla (T) or thereabout, so that using iron cores made of iron-based material(s) having saturation flux density of 2 T or thereabout may make it difficult to change the curvature of the orientation circle sharply. For this reason, the magnetic orientation field generated by the orientation step illustrated in FIGS. 58(a) and 58(b) may have the smallest radius of curvature.

Figures 54A, 54B:
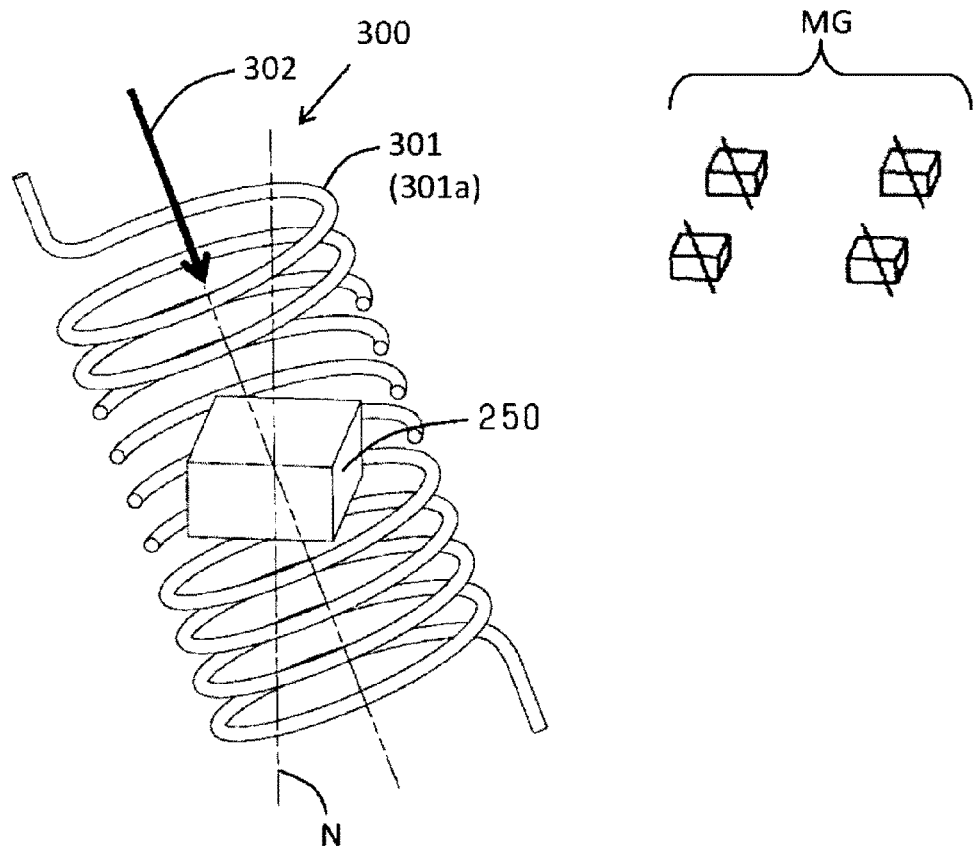
FIG. 54(a) and FIG. 54(b) are views illustrating an orientation performing step of a magnet.

As illustrated in FIG. 54(a), when the orientation magnetic field 302 is generated by the elongated helical coil 301a, the curvature of the orientation circle may be easily expected to be large.

In addition, the orientation magnetic field 302 illustrated in FIG. 54(a) easily maintains its magnitude that is equal to or more than 2 T within the axial dimension of the helical coil 301a, as compared with the orientation magnetic field 322 generated by the smaller number of conductors illustrated in FIGS. 58(a) and 58(b). For this reason, for obtaining the magnet with the high orientation ratio, it is preferable to perform magnetic orientation in a magnet using the orientation step illustrated in FIG. 54(a).

Figure 65A:
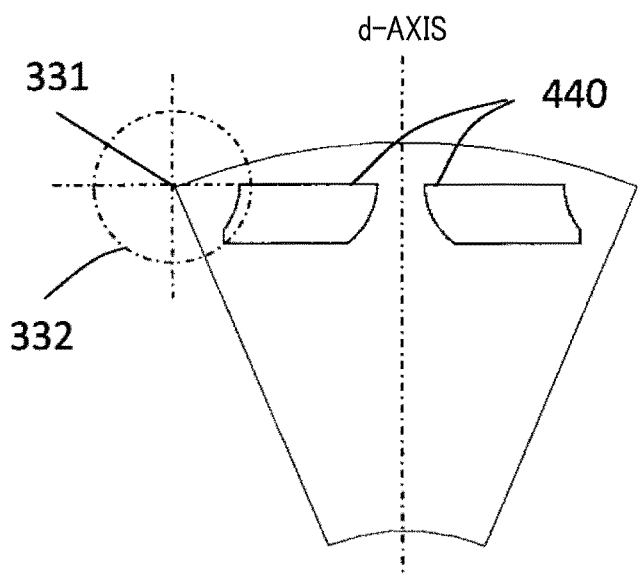
FIG. 65(a) and FIG. 65(b) are views for supplementary explanation of a magnetic orientation of a magnet.
Figure 65B:
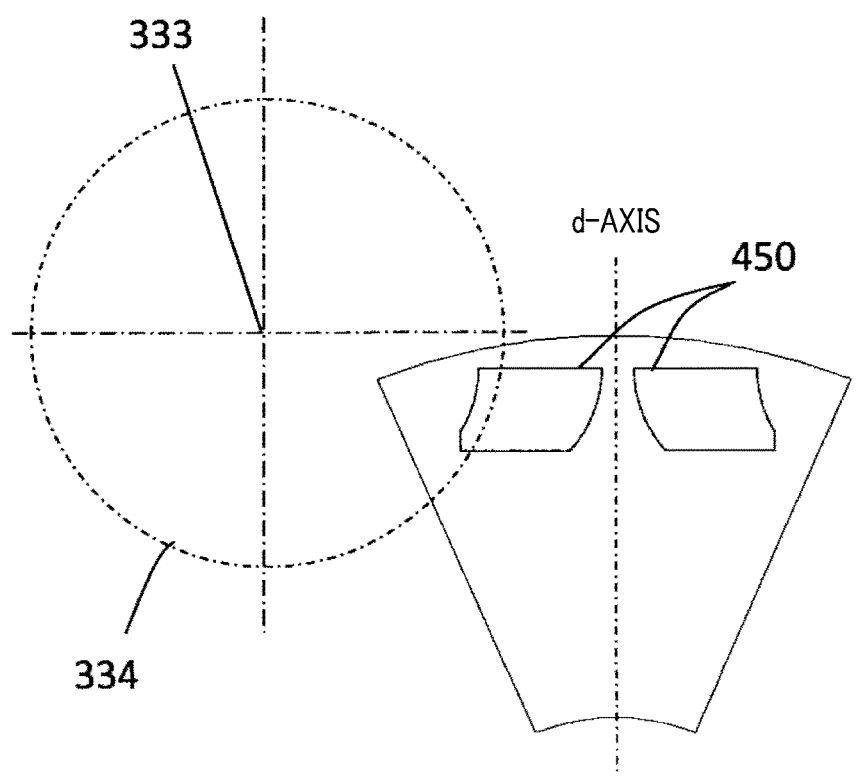

Next, the following supplementally describes the magnetic orientations defined in each of the magnets 440 and 450 with reference to FIGS. 65(a) and 65(b).

FIG. 65(a) illustrates an orientation circle 332 using a dashed-dot line, which defines the magnetic orientations in the magnet 440. This orientation is usually called "polar-anisotropy orientation". In this case, the orientation circle 332 is defined about a center point 331 on the q-axis in the air-gap space defined from the outer circumferential surface of the rotor to the inner radius of the stator. Then, defining of the magnetic orientations of the magnet 440 is carried out using the orientation circle 332. This enables a magnetic density waveform in the air-gap space, in which magnetic flux transfer is carried out between the rotor and stator, to be a sinusoidal waveform.

FIG. 65(b) illustrates an orientation circle 334 using a dashed-dot line, which defines the magnetic orientations in the magnet 450. In this case, the orientation circle 334 is defined about a center point 333 that is separated from the q-axis toward an adjacent pole, and separated from the air-gap space toward the stator. This obtains an effect of improving the orientation ratio.

The magnet 440 based on the orientation circle having the smaller radius of curvature is preferably oriented based on the orientation magnetic field 322 illustrated in FIG. 58(b). The orientation step in FIG. 58(a) or 58(b) makes it difficult to use many conductors as compared with the orientation step illustrated in FIG. 54(a), making it difficult to obtain a high value of the orientation ratio.

For this reason, it is preferable to use the larger radius of curvature of the orientation circle as illustrated in FIG. 54(b), and use the orientation step illustrated in FIG. 54(a).

Eleventh Embodiment

Next, the following describes a magnetizing apparatus used in a magnetizing step of a magnet. The magnetizing step magnetizes an oriented and sintered magnet using the magnetizing apparatus.

Figure 64:
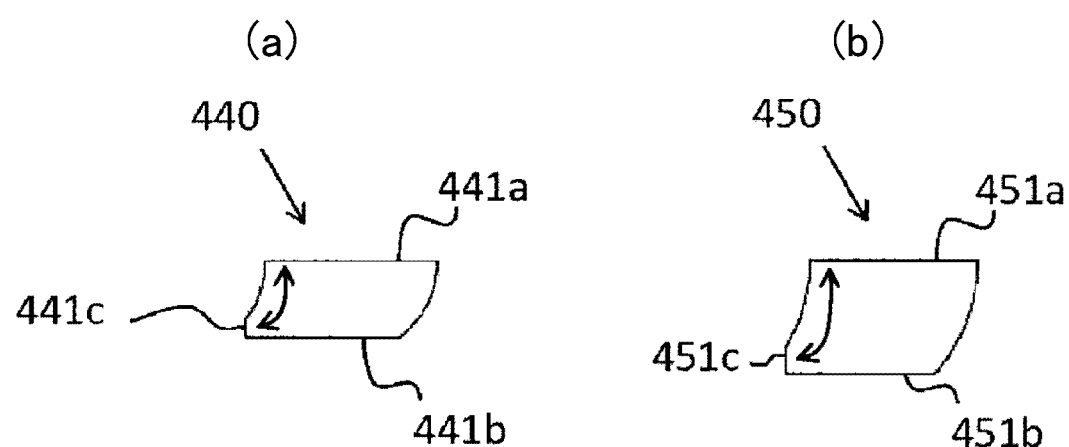
FIG. 64 is lateral cross-sectional views of respective magnets of a tenth embodiment.

The magnetizing apparatus according to the eleventh embodiment is preferably used to generate a magnet having circular-arc magnetic paths between a pair of flux effective surfaces. For example, the magnetizing apparatus of the eleventh embodiment is preferably used when the magnet 404 illustrated in FIG. 52, the magnet 420 illustrated in FIG. 61, the magnet 430 illustrated in FIG. 62, the end magnets 434b and 434c illustrated in FIG. 63, or the magnets 440 and 450 illustrated in FIG. 64 are manufactured.

The magnetizing step is carried out after the orientation step described, for example, based on FIGS. 56 to 58.

Figure 66A:
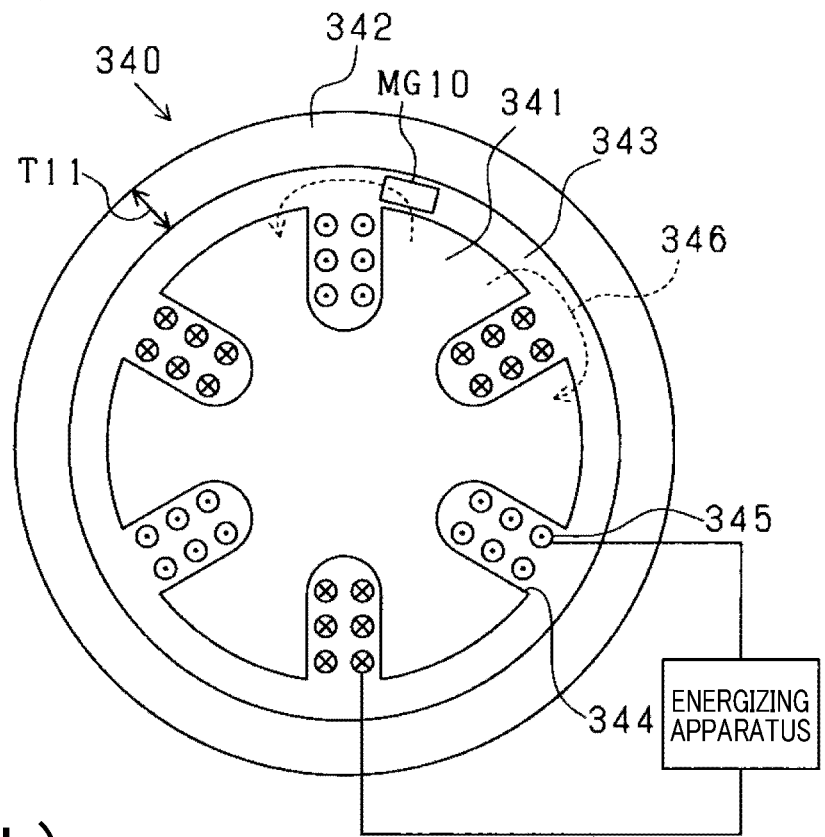
FIG. 66(a) and FIG. 66(b) are views schematically illustrating a magnetizing apparatus according to an eleventh embodiment.
Figure 66B:
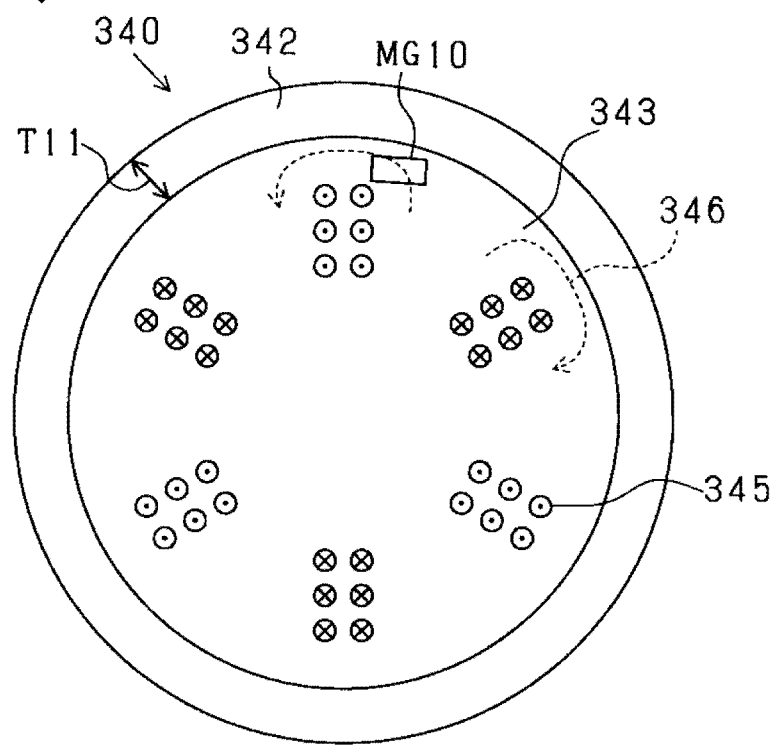
Figure 67:
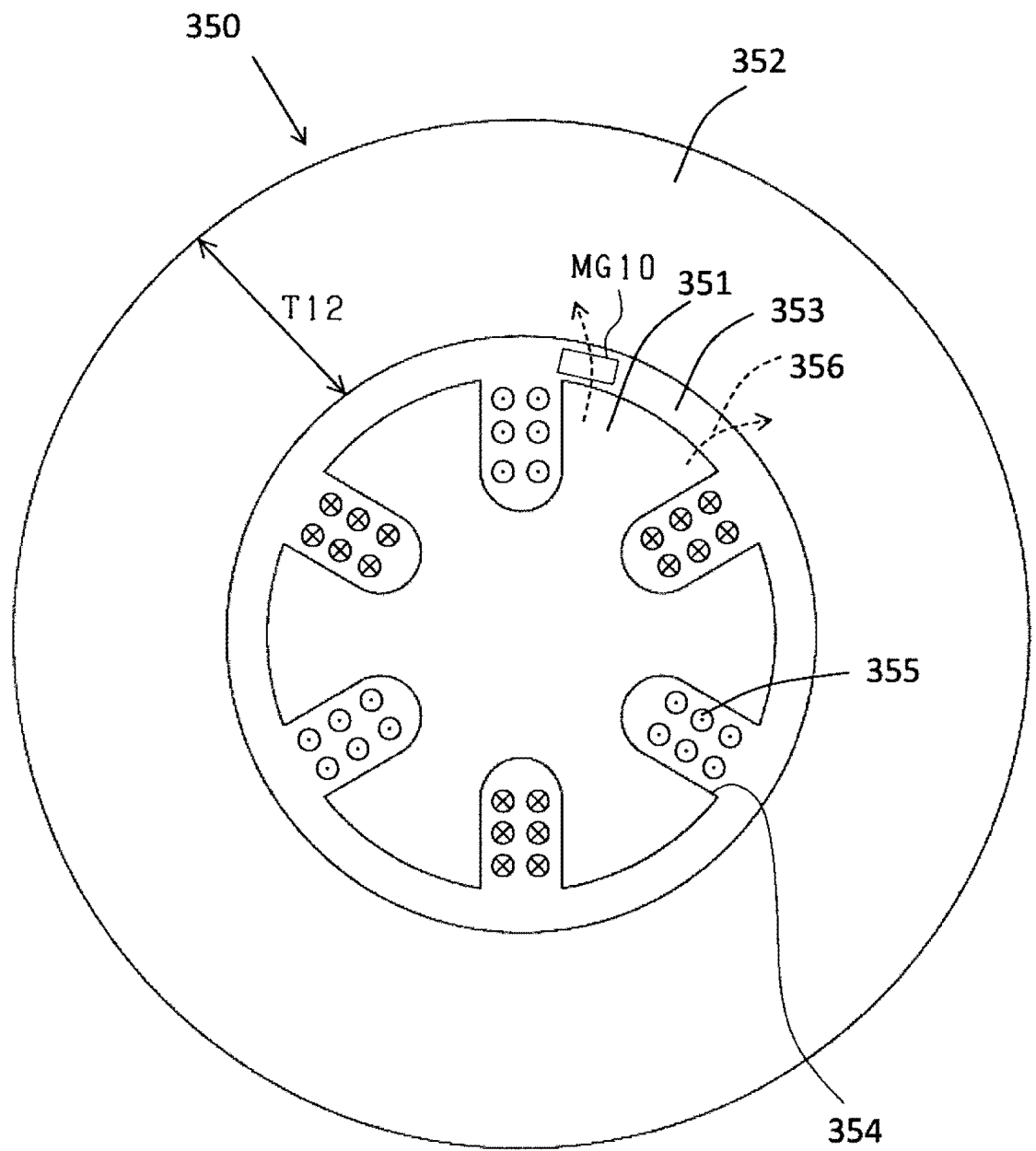
FIG. 67 is a view schematically illustrating the magnetizing apparatus according to the eleventh embodiment.

Each of FIGS. 66(a), 66(b), and 67 illustrates a schematic structure of a lateral cross-section of a corresponding magnetizing apparatus having a substantially cylindrical shape; the lateral cross-section is perpendicular to an axial direction of the magnetizing apparatus.

As illustrated in FIG. 66(a), a magnetizing apparatus 340 includes an inner magnetizing core 341 and an outer magnetizing core 342. The inner magnetizing core 341 has a substantially circular shape on the lateral cross-section. The outer magnetizing core 342 has an annular shape on the lateral cross-section, and is arranged to surround the outer circumferential surface of the inner magnetizing core 341. The inner magnetizing core 341 corresponds to a second magnetizing core, and the outer magnetizing core 342 corresponds to a first magnetizing core. There is a clearance between the outer circumferential surface of the inner magnetizing core 341 and the inner circumferential surface of the outer magnetizing core 342. The clearance serves as a magnet insertion space 343. That is, the magnetizing cores 341 and 342 are arranged to face each other with a predetermined interval therebetween. Each of the magnetizing cores 341 and 342 is made of a soft magnetic material having the saturation flux density Bs of 2 T or thereabout.

The inner magnetizing core 341 has a plurality of slots 344 formed in the outer circumferential surface with predetermined pitches therebetween. Each of the slots 344 is opened toward the inner circumferential surface as a conductor installation concave recess. In each slot 344, a magnetizing coil 345 serving as a magnetizing conductor is installed. For example, the inner magnetizing core 344 includes support portions each provided between a corresponding adjacent pair of slots 344. Each of the coils 345 is wound around a corresponding one of the support portions. This results in the direction of a current flowing through a first part of the corresponding magnetizing coil 345 installed in one of the adjacent slots 344 of each adjacent pair being opposite from the direction of the current flowing through a second part of the corresponding magnetizing coil 345 installed in the other of the adjacent slots 344 of the corresponding adjacent pair.

For example, FIG. 66(a) illustrates six support portions in the inner magnetizing core 341, and the magnetizing coils 345 are wound around the respective support portions. Note that each magnetizing coil 345 is collectively wound in a corresponding one of the slots 344.

Then, in the magnetizing step, a magnet MG10 as a magnetization target is installed in a predetermined position of the magnet insertion space 343, and a selected magnetizing coil 345 is energized by an energization device while the magnet MG10 is installed in the magnet insertion space 343, so that the magnet MG10 is magnetized.

In the magnetizing step, a magnetizing magnetic field 346 is generated in the magnet insertion space 343 based on the energized magnetizing coil 345 while being across the inner magnetizing core 341 and the outer magnetizing core 342. Magnetic flux of the magnetizing magnetic field 346 magnetizes the magnet MG10.

The outer magnetizing core 342 has a thickness dimension T11 as a minimum distance between the inner circumferential surface and the outer circumferential surface thereof. The outer magnetizing core 342 serves as a flux guiding yoke, that is, a magnetizing yoke, which applies a strong magnetic field having a desired direction to the magnet MG10 installed in the magnet insertion space 343 based on the magnetizing magnetic field generated by energization of a selected magnetizing coil 345. The outer magnetizing core 342 has a characteristic that the radial thickness dimension T11 is set to be smaller than a pole pitch of the inner magnetizing core 341. Note that the pole pitch of the inner magnetizing core 341 represents, along the circumferential direction, a distance pitch between a center position of one of adjacent slots 344 and a center position of the other of the adjacent slots 344, or a width dimension of a core portion between adjacent slots 344.

This setting of the radial thickness dimension T11 of the outer magnetizing core 342 enables the magnetizing magnetic field 346 to have a substantially concentric circular configuration passing through any point in the air-gap space without completely passing through the outer magnetizing core 342. That is, in the outer magnetizing core 342, magnetic saturation occurs in a radius direction of the outer magnetizing core 342 before occurring in a circumferential direction thereof. This generates the magnetizing magnetic field 346 having a relatively large curvature in the magnet insertion space 343.

Note that the radial thickness dimension T11 of the outer magnetizing core 342 is preferably set to be smaller than half of the pole pitch of the inner magnetizing core 341. One or more of the magnetizing coils 345 are each preferably energized by a current having a magnitude that enables the occurrence of magnetic saturation in the outer magnetizing core 342.

The above magnetizing step easily carries out desired magnetization of the magnet 440, which is disclosed in FIG. 64(a), even if the magnet 440 has the orientation circle with a relatively small radius of curvature, resulting in the magnet 440 having a magnetization percentage of at least 97 percent.

Note that, as illustrated in FIG. 66(b), the magnetizing coils 345 can be arranged to face the outer magnetizing core 342 without using the inner magnetizing core 341 and the slots 344. In this medication, energizing each of the coils 345 enables a magnetizing magnetic field (see reference numeral 346) to be generated. In addition, the inner magnetizing core 341 can be configured as an annular supporting member made of a non-magnetic material.

That is, the magnetizing step, which uses a magnetizing core having a predetermined thickness, such as the outer magnetizing core 342, arranges a conductor, such as the magnetizing coil 345, and a magnet MG10 at one side of the magnetizing core in its thickness direction.

Then, the magnetizing step energizes the conductor to thereby generate a magnetizing magnetic field, and forms, based on the generated magnetizing magnetic field, circular-arc magnetic paths in the magnet MG 10 between a pair of opposing surfaces of the magnet MG10.

Note that, in the magnetizing step, the conductor (magnetizing coil 345) is preferably arranged to be separated from the magnetizing core (outer magnetizing core 342), and the magnet MG10 is preferably located to be circumferentially separated from the center position of the conductor, and to be closer to the magnetizing core than the conductor thereto.

A magnetizing apparatus 350 illustrated in FIG. 67 has a basic configuration identical to the configuration of the magnetizing apparatus 340, and a part of the magnetizing apparatus 350 is changed from the magnetizing apparatus 340.

As illustrated in FIG. 67, the magnetizing apparatus 350 having a substantially cylindrical configuration includes an inner magnetizing core 351 and an outer magnetizing core 352. The inner magnetizing core 351 has a substantially circular shape on a lateral cross-section perpendicular to the axial direction thereof. The outer magnetizing core 352 has an annular shape on the lateral cross-section, and is arranged to surround the outer circumferential surface of the inner magnetizing core 351. The inner magnetizing core 351 corresponds to a second magnetizing core, and the outer magnetizing core 352 corresponds to a first magnetizing core. There is a clearance between the outer circumferential surface of the inner magnetizing core 351 and the inner circumferential surface of the outer magnetizing core 352. The clearance serves as a magnet insertion space 353. That is, the magnetizing cores 351 and 352 are arranged to face each other with a predetermined interval therebetween. Each of the magnetizing cores 351 and 352 is made of a soft magnetic material having the saturation flux density Bs of 2 T or thereabouts.

The inner magnetizing core 351 has a plurality of slots 354 formed in the outer circumferential surface with predetermined pitches therebetween. Each of the slots 354 serves as a conductor installation recess. In each slot 354, a magnetizing coil 355 serving as a magnetizing conductor is installed. The direction of a current flowing through a first part of the corresponding magnetizing coil 355 installed in one of the adjacent slots 354 of each adjacent pair being opposite from the direction of the current flowing through a second part of the corresponding magnetizing coil 355 installed in the other of the adjacent slots 354 of the corresponding adjacent pair.

For example, FIG. 67 illustrates six support portions in the inner magnetizing core 351, and the magnetizing coils 355 are wound around the respective support portions. Note that each magnetizing coil 355 is collectively wound in a corresponding one of the slots 354.

Then, in the magnetizing step, a magnet MG10 as a magnetization target is installed in a predetermined position of the magnet insertion space 353, and a selected magnetizing coil 355 is energized by an energization device (see FIG. 66(a)) while the magnet MG10 is installed in the magnet insertion space 353, so that the magnet MG10 is magnetized.

In the magnetizing step, a magnetizing magnetic field 356 is generated in the magnet insertion space 353 based on the energized magnetizing coil 355 while being across the inner magnetizing core 351 and the outer magnetizing core 352. Magnetic flux of the magnetizing magnetic field 356 magnetizes the magnet MG10.

The outer magnetizing core 352 serves as a flux guiding yoke, that is, a magnetizing yoke, which applies a strong magnetic field having a desired direction to the magnet MG10 installed in the magnet insertion space 353 based on the magnetizing magnetic field generated by energization of a selected magnetizing coil 355. The outer magnetizing core 352 has, as a characteristic, a thickness dimension T12 as a minimum distance between the inner circumferential surface and the outer circumferential surface thereof.

The thickness dimension T12 of the outer magnetizing core 352 is set to be larger than a pole pitch of the inner magnetizing core 351. Note that the pole pitch of the inner magnetizing core 351 represents, along the circumferential direction, a distance pitch between a center position of one of adjacent slots 354 and a center position of the other of the adjacent slots 354, or a width dimension of a core portion between adjacent slots 354.

This setting of the radial thickness dimension T12 of the outer magnetizing core 352 enables, even if a strong magnetic field with 2 T or more is applied to the magnet insertion space 353, the outer magnetizing core 352 being prevented from being magnetically saturated, making it therefore possible to generate the magnetizing magnetic field 356 having a relatively small curvature.

The above magnetizing step easily carries out desired magnetization of the magnet 450, which is disclosed in FIG. 64(b), even if the magnet 450 has the orientation circle with a relatively large radius of curvature, resulting in the magnet 450 having a magnetization percentage of at least 97 percent.

Note that, as illustrated in FIG. 67, the magnetizing coils 355 can be arranged to face the outer magnetizing core 352 without using the inner magnetizing core 351 and the slots 354. In this medication, energizing each of the coils 355 enables a magnetizing magnetic field (see reference numeral 356) to be generated. In addition, the inner magnetizing core 351 can be configured as an annular supporting member made of a non-magnetic material.

That is, the magnetizing step, which uses a magnetizing core having a predetermined thickness, such as the outer magnetizing core 352, arranges a conductor, such as the magnetizing coil 355, and a magnet MG10 at one side of the magnetizing core in its thickness direction.

Then, the magnetizing step energizes the conductor to thereby generate a magnetizing magnetic field, and defines or forms, based on the generated magnetizing magnetic field, circular-arc magnetic paths in the magnet MG 10 between a pair of opposing surfaces of the magnet MG10.

The magnetizing step is preferably carried out at atmospheric temperature. This enables holding ability of the magnet MG10 for holding its magnetized force to be reduced, making it possible to easily magnetize the magnet as a magnetization target.

Note that, in the magnet manufacturing process using the magnetizing apparatus 340 or 350, before the magnetizing step, magnets can be assembled to each other to have any shape such that, after the magnetizing step, north and south poles are alternately generated in the assembly of the magnets.

In each of the magnetizing apparatuses 340, 350 illustrated in FIGS. 66(a), 66(b), and 67, the slots 344 or 345 are arranged in the outer circumferential surface of the inner magnetizing core 341 or 351 with regular pitches in its circumferential direction, but the slots 344 or 345 can be linearly arranged with regular pitches. Specifically, in each magnetizing apparatus, a pair of first and second magnetizing cores have respective first and second surfaces, and the first and second magnetizing cores are arranged such that 1. The first and second surfaces of the respective first and second magnetizing cores are respectively linearly aligned
2. The first surface of the first magnetizing core faces the second surface of the second magnetizing core Then, one of the first and second magnetizing cores has formed slots, and magnetizing coils are each wound in one or more of the slots. The space between the first and second surfaces of the respective first and second magnetizing cores serves as a magnet installation space In this modification, the thickness dimension of one of the first and second magnetizing cores in the facing direction of the first and second surfaces, which has no slots, in the magnetization apparatus for the magnet 440 having the orientation circle with a relatively large radius of curvature is set to be different from the thickness dimension of the other of the first and second magnetizing cores in the facing direction of the first and second surfaces, which has no slots, in the magnetization apparatus for the magnet 450 having the orientation circle with a relatively large radius of curvature.

For example, the first magnetizing core, in which no slots have been formed, of the magnetizing apparatus for magnetizing the magnet 440 has a thickness dimension smaller than the distance pitch of the second magnetization core. Similarly, the first magnetizing core, in which no slots have been formed, of the magnetizing apparatus for magnetizing the magnet 450 has a thickness dimension larger than the distance pitch of the second magnetization core.

Figure 68:
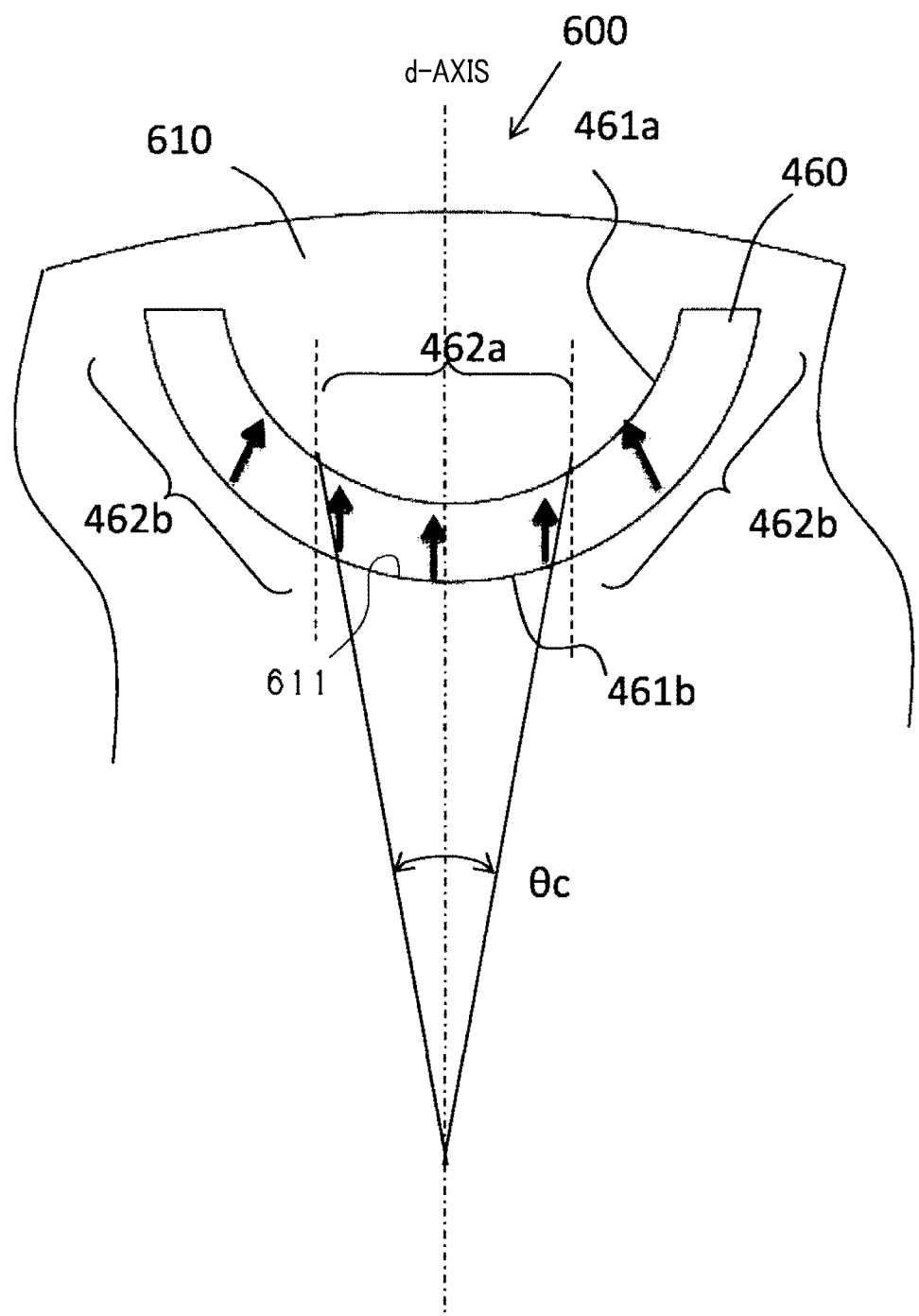
FIG. 68 is a partial plan view of a rotor of a twelfth embodiment.

Next, the following describes a rotor 600 according to the twelfth embodiment. As illustrated in FIG. 68, the rotor core 610 has a magnet installation hole 611 located across the d-axis and extending toward both sides of the d-axis in the form of a circular arc. A magnet 460 is installed in the magnet installation hole 611. Each of the magnet installation hole 611 and the magnet 460 has a substantially circular-arc shape in its lateral cross section.

Each of the magnet installation holes 611 is configured such that a distance from the outer circumferential surface of the rotor core 610 to the magnet 640 becomes larger from the q-axis to the d-axis. To sum up, the magnet 640 has a convex shape to be convex toward a radially inward direction such that the d-axis side end thereof is farthest from the outer circumferential surface of the rotor core 610, and the q-axis side end thereof is closest to the outer circumferential surface of the rotor core 610. Each of the magnet installation hole 611 and the magnet 460 is linearly symmetrical about the corresponding d-axis.

The magnet 460 has a pair of opposing surfaces 461a and 461b arranged radially at respective outer and inner sides; the opposite surfaces 461a and 461b respectively serve as first effective surfaces 461a and 461b into which magnetic flux flows or out of which magnetic flux flows. Each of the effective surfaces 461a and 461b has a circular-arc shape about the d-axis.

In addition, the magnet 462 includes a d-axis close region 462a including the d-axis, and outer regions 462b located at both sides of the d-axis close region 462a. Magnetic orientations defined in the d-axis close region 462a are different from magnetic orientations defined in each of the outer regions 462b. Specifically, in the d-axis close region 462a, the magnetic orientations are defined to be parallel to the d-axis, and, in each of the outer regions 462b, magnetic orientations are defined to be inclined with respect to the d-axis so as to be closer to the d-axis.

The range of the d-axis close region 462a is determined based on an angle θc centered around the d-axis passing through the center of the rotor core 610. The angle θc is set to be preferably to 32.7 electrical degrees.

The following describes the reason why the angle θc is set to be preferably to 32.7 electrical degrees as follows.

In one of widely available rotary electric machines, the stator 700 is designed to have 8 poles and 48 slots. That is, the stator 700 has 6 slots per pole, and includes each of the three-phase windings distributedly wound in the slots. In the stator 700 configured set forth above, each distributed winding shifts one slot to another slot by six times per pole, so that each distributed winding shifts one slot to another slot by twelve times per pole pair. For this reason, in the rotary electric machine including the stator 700 having 8 poles and 48 slots, 11- to 13-order harmonics have been generated. From this viewpoint, the rotor 600 is configured such that the d-axis close region 462a is determined within the range of 32.7 electrical degrees. The 32.7 electrical degrees can be obtained by dividing 360 degrees by 11, which is the order number of 11-order harmonic. This configuration efficiently reduces, from back electromagnetic force generated based on the magnets 460 and the stator windings 720, the 11-order harmonic components.

If the d-axis close region 462a is determined based on an electrical angle larger than 32.7 electrical degrees, a large amount of magnetic flux increases the amplitude of harmonic components. In contrast, the d-axis close region 462a is determined based on an electrical angle smaller than 32.7 electrical degrees, a smaller amount of magnetic flux decreases the amplitude of harmonic components.

Note that the angular range θc of the d-axis close region 462a can be set to any angle within the range from 1.0 electrical degrees to 32.7 electrical degrees inclusive. For example, the angular range θc of the d-axis close region 462a can be set to 27.7 electrical degrees. The 27.7 electrical degrees can be obtained by dividing 360 degrees by 13, which is the order number of 13-order harmonic. This efficiently reduces the 13-order harmonic components.

In addition, the angular range θc of the d-axis close region 462a can be set to any angle within the range from 27.7 electrical degrees to 32.7 electrical degrees inclusive.

Thirteenth Embodiment

Next, the following describes energization control of the rotary electric machine 500.

Figure 69:
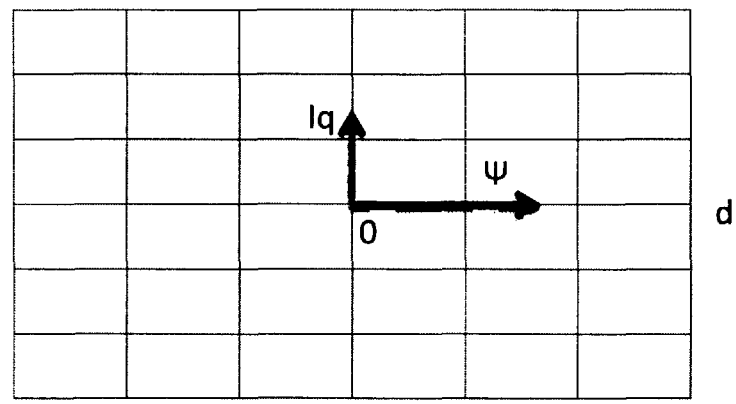
FIG. 69 is a voltage vector diagram illustrating d- and q-axis voltage vectors.

First, the following describes space vector control according to the thirteenth embodiment with reference to a voltage vector diagram of FIG. 69.

In FIG. 69, any magnet flux Ψ is set on the d-axis, and a q-axis current Iq is represented on the q-axis; the axis current Iq is perpendicular to the d-axis at 90 electrical degrees, and enables torque, which is based on Fleming's law and the flux Ψ, torque to be outputted without waste energy.

Figure 70:
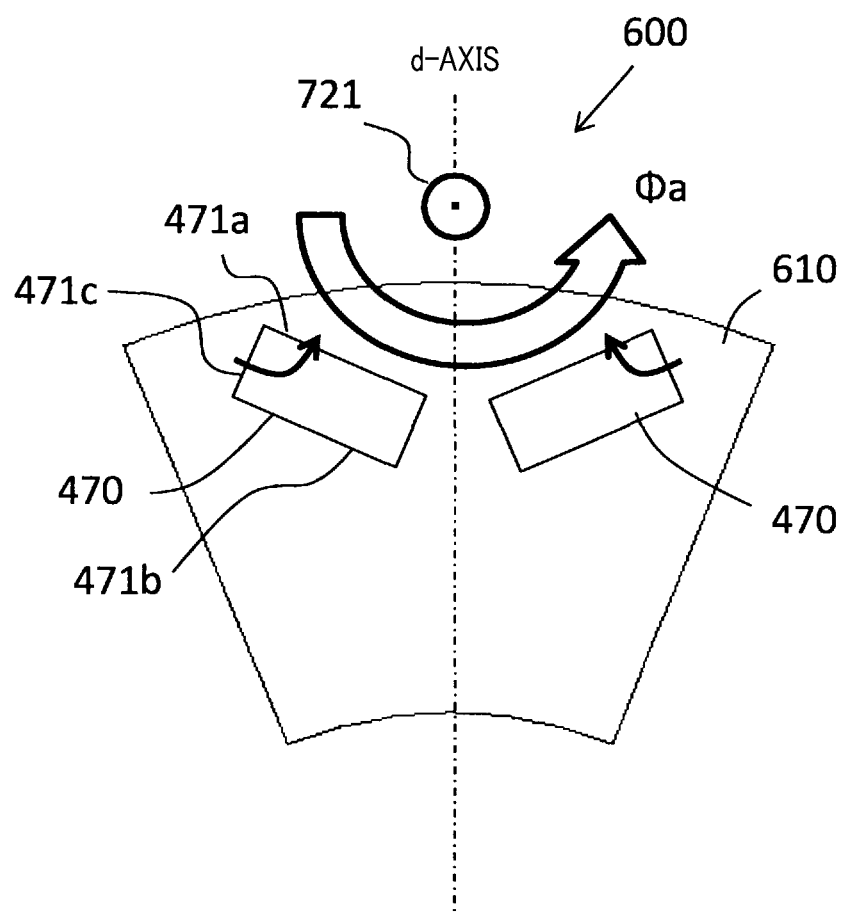
FIG. 70 is a view schematically illustrating a rotating magnetic field, which is perpendicular to the d-axis.

FIG. 70 schematically illustrates the state illustrated in FIG. 69 using one pole portion of the rotor 600.

In FIG. 70, two magnets 470 are arranged in the rotor core 610 to have a substantially V-shape. The magnets 470 can be arranged linearly to be perpendicular to the d-axis.

Like the magnet 410 (see FIG. 59), the magnet 420 see FIG. 61), the magnet 430 see FIG. 62), the magnet 433 (see FIG. 63), and the magnets 440 and 450 (see respective FIGS.

64(a) and 64(b)), the magnet 470 has opposing surfaces 471a and 471b arranged radially at respective outer and inner sides; the opposite surfaces 471a and 471b respectively serve as first effective surfaces 471a and 471b into which magnetic flux flows or out of which magnetic flux flows. The magnet 470 also has a surface of the q-axis side end serving as a second effective surface 471c into which magnetic flux flows or out of which magnetic flux flows.

In FIG. 70, causing a current to flow through a wire 721 of the stator windings 720 located on the d-axis while the d-axis located between the magnets 470 shows the north pole supplies a magnetic field Φa, which is perpendicular to the d-axis, to the rotor 600, so that the rotor 600 is turned counterclockwise.

Figure 71A:
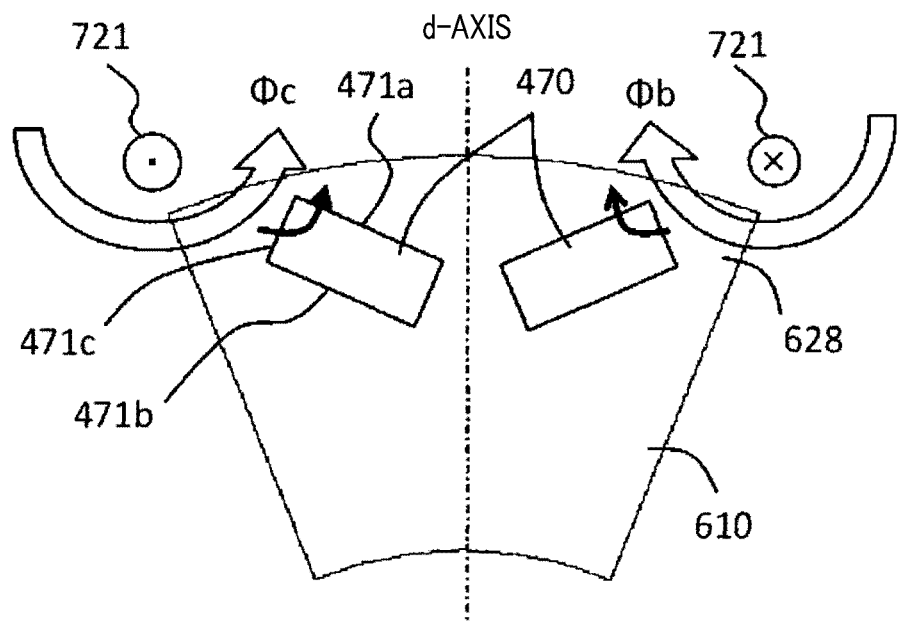
FIG. 71(a) and FIG. 71(b) are views schematically illustrating a rotating magnetic field, which is perpendicular to the q-axis.
Figure 72:
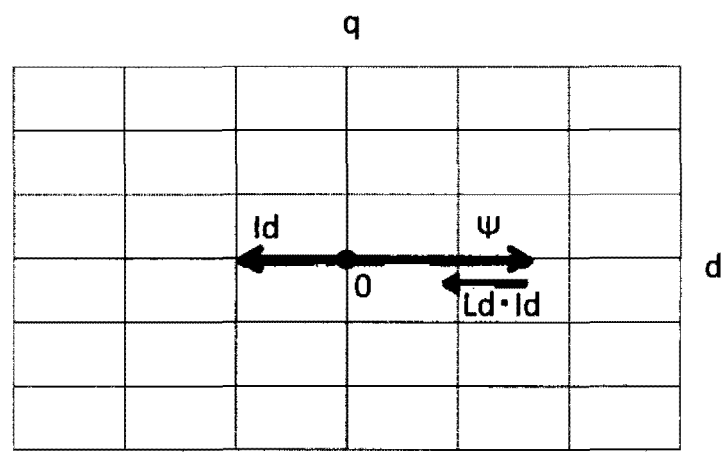
FIG. 72 is a voltage vector diagram illustrating d- and q-axis voltage vectors.

On the other hand, FIG. 71(a) illustrates a magnetic field Φb and a magnetic field Φc, each of which is based on a q-axis current component. Each of the magnetic field Φb and magnetic field Φc causes a q-axis region 628 located on and around the corresponding q-axis and close to the outer circumferential surface of the rotor core 610 to be magnetically saturated. This magnetically saturated state is illustrated in FIG. 72. In FIG. 72, if a current phase is set to β angle relative to the magnet flux Ψ, a magnetic field based on a d-axis current, which prompts magnetic saturation, is generated while the β angle is within the range from 90 degrees to 270 degrees; the d-axis current Id is a negative directional d-axis current.

At that time, the second effective surface 471c is arranged to be closer to the outer circumferential surface of the rotor core 610 than the first effective surfaces 471a and 471b, and to face the magnetically saturated region.

In FIG. 71(a), in a magnetic circuit passing through the second effective surface 471c, a magnetic resistance value is changed based on control of the magnetic saturation. For this reason, when the magnetic circuit is represented by an equivalent circuit, the magnetic saturation region serves as a variable resistor R3. That is, increasing or decreasing the magnetic resistance of the variable resistor R3 enables the magnet flux passing through the second effective surface 471c to serve as a variable magnetic field. This results in flux variation being carried out.

Serving the magnetic saturation region on the q-axis as the variable resistor R3 makes it possible to perform field-weakening control based on a magnetic flux, expressed by (Ld·Id), on the q-axis, thus widening a rotational speed range of the rotary electric machine 500 in a power running mode of the vehicle, and also widening a controllable range of the rotational speed of the rotary electric machine 500.

FIG. 72 illustrates the magnet flux Ψ, which is usually generated by a normal interior magnet rotary electric machine, on the q-axis, and the magnetic flux (Ld·Id) with the magnetic flux (Ld·Id) being non-overlapped with the magnet flux Ψ.

Figure 73A:
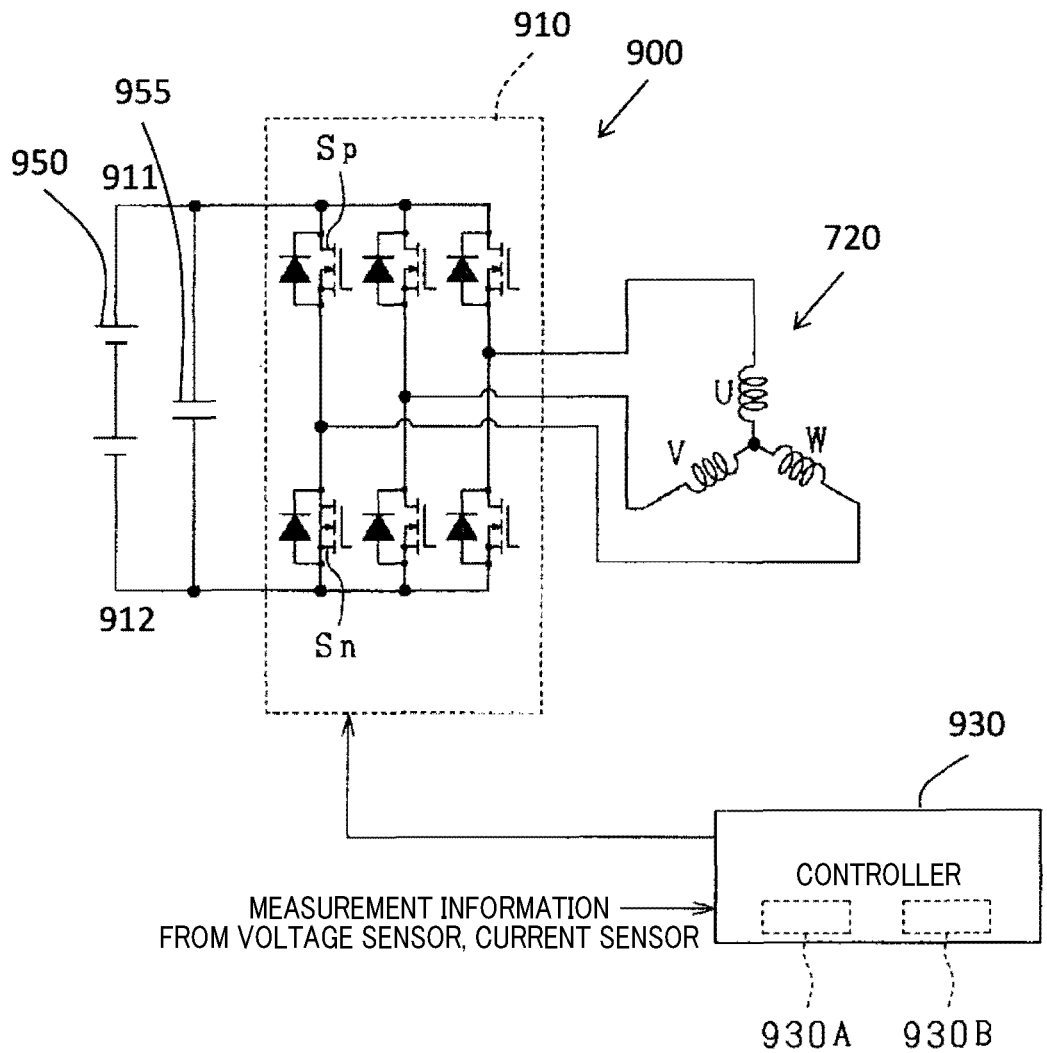
FIG. 73(a) and FIG. 73(b) are circuit diagrams illustrating a rotary electric machine drive system.
Figure 74:
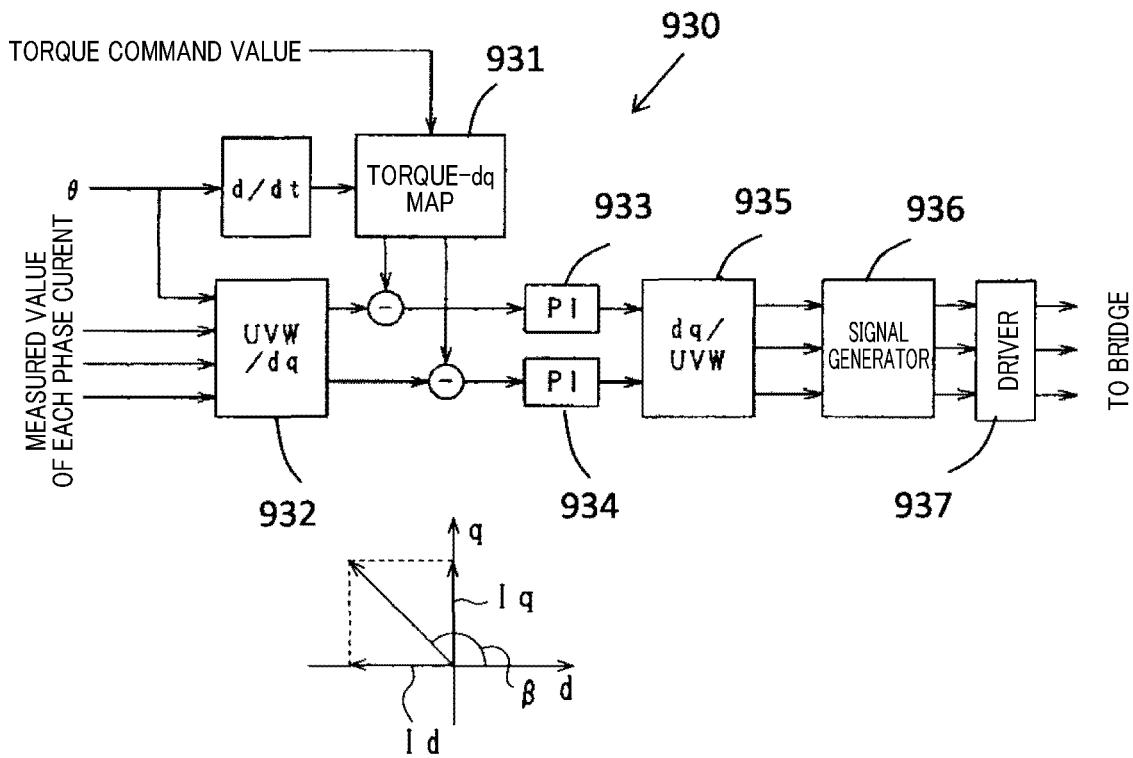
FIG. 74 is a block diagram illustrating a control process for controlling each phase energization current.

This field-weakening control can be carried out by an inverter 900 configured to control the phase of an energization current (see FIG. 73(a)), or the controller 930 (see FIG. 74).

Combination of the setting to reduce the number of turns of each stator winding 720 by the reciprocal of an increment of the magnet flux Ψ with the field-weakening control can further improve current controllability during high speed rotation of the rotor 600 based on reduction in an electric time constant.

The following describes the structure of the inverter 900 installed in a rotary-electric machine drive system illustrated in FIG. 73(a).

The inverter 900 includes an inverter bridge 910 serving as a current adjuster. The inverter bridge 910 is comprised of upper-arms and lower-arms; the number of upper- and lower-arms is the same as the number of phases of the stator windings. Each upper-arm includes a switch Sp, and each lower-arm includes a switch Sn.

The inverter 900 is configured to control on-off switching operations of the upper-arm switches Sp and/or the lower-arm switches Sn to thereby adjust energization currents flowing through the respective phase stator windings 720. A direct-current (DC) power source 950 and a smoothing capacitor 955 are connected in parallel to the inverter bridge 910. The DC power source 950 is configured as a battery pack plural comprised of battery cells connected in series.

The controller 930 serving as a control unit includes a microcomputer comprised of a CPU and various types of memories. The controller 930 is configured to, based on various items of measurement information and a request for one of a power running mode a regeneration mode, control on-off switching operations of the switches Sp and Sn to thereby perform energization control for each phase stator winding. The various items of measurement information include, for example, the rotational angle of the rotor 600 measured by a rotational angle sensor, i.e. the resolver (602, 603), a voltage measured by a voltage sensor, and value of the energization currents for the respective phase stator windings.

Using the resolver as a rotational angle sensor enables the rotary electric machine 500 having a wider controllable range to be controlled with higher accuracy under high temperature conditions.

The inverter bridge 910 is comprised of a U-phase series circuit comprised of the upper- and lower-arm switches Sp and Sn connected in series for the U-phase stator winding, a V-phase series circuit comprised of the upper- and lower-arm switches Sp and Sn connected in series for the V-phase stator winding, and a W-phase series circuit comprised of the upper- and lower-arm switches Sp and Sn connected in series for the W-phase stator winding. A high-side terminal of the upper-arm switch Sp for each phase is connected to a positive terminal 911 of the DC power source 950, and a low-side terminal of the lower-arm switch Sn for each phase is connected to a negative terminal 912 of the DC power source 950.

An intermediate connection point between the upper- and lower-arm switches Sp and Sn for the U-phase is connected to a first end of the U-phase stator winding. An intermediate connection point between the upper- and lower-arm switches Sp and Sn for the V-phase is connected to a first end of the V-phase stator winding. An intermediate connection point between the upper- and lower-arm switches Sp and Sn for the W-phase is connected to a first end of the W-phase stator winding.

Second ends of the stator windings of the respective phases are commonly connected to each other in, for example, star-configuration; the common connection point serves as a neutral point.

The controller 930 is configured to generate drive signals for the respective switches Sp and Sp of the inverter bridge 910, and output the generated drive signals to the respective switches Sp and Sn. For example, the controller 930 is configured to perform pulse width modulation (PWM) based on comparison in magnitude between each of three-phase command voltages and a cyclic carrier signal, such as a cyclic triangular carrier signal, for each cycle of the cyclic carrier signal to thereby generate PWM signals for the respective switches Sp and Sn. Then, the controller 930 individually turns on or off each of the switches Sp and Sn to thereby control the energization currents flowing through the respective three-phase stator windings.

As described above, controlling switches Sp and Sn for each phase stator winding of the stator coil 720 controls a phase of each of the energization currents for the respective three-phases. In particular, the controller 930 is configured to perform phase control to thereby cause 1. At least one of first energization current having a first phase to flow through each of the three-phase stator windings for generating a q-axis current that generates magnetic flux perpendicular to the d-axis 2. At least one of second energization current having a second phase, which is different from the first phase, to flow through each of the three-phase stator windings to thereby generate a d-axis current This configuration makes it possible to variably control, based on the d-axis current Id, the magnetic saturation of the q-axis region 628 through which the magnetic orientations pass (see FIG. 71(*a*)).

Figure 71B:
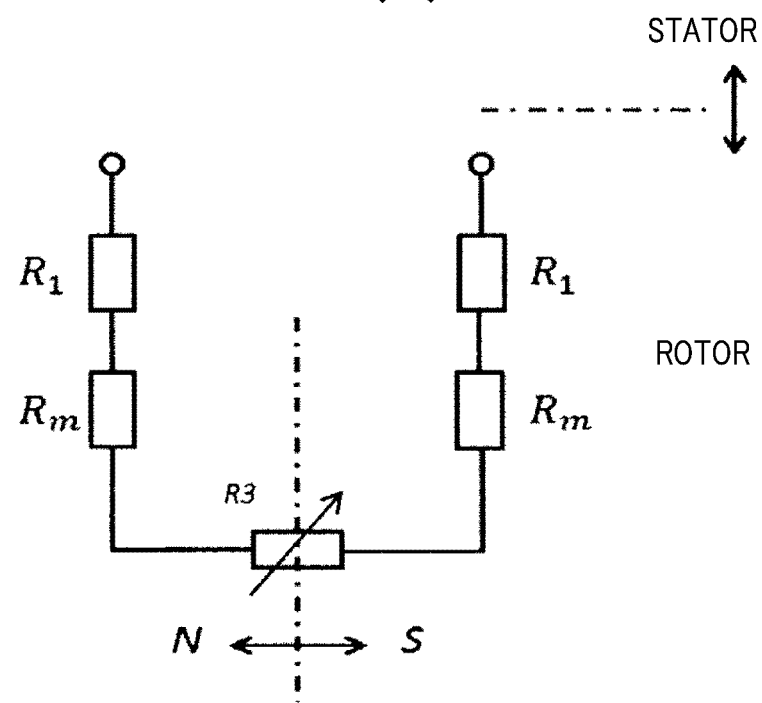

In particular, the controller 930 is configured to perform advance control to thereby supply the d-axis current Id to the stator windings, and thereafter, variably control the e-axis region between the magnetic saturation state and non-magnetic saturation state in accordance with a magnetic field generated based on the d-axis current Specifically, the controller 930 is configured to switchably control the current having the first current phase to generate magnetic flux perpendicular to the d-axis (see FIG. 70), and the current having the second phase different from the first phase (see FIG. 71(*a*)).

This configuration variably controls the q-axis portion 628, which is located between the second effective surfaces 421*c* of the adjacent pole pair, between magnetic saturation state and non-magnetic saturation state in accordance with, for example, a torque command value and/or the rotational speed of the rotary electric machine 500.

For example, the controller 930 selects the q-axis portion 628 to the magnetic saturation state upon low-torque and high-rotation requirement. More specifically, in a predetermined torque-speed characteristic curve of the rotary electric machine 500, a control switch point A1 is defined beforehand. Then, the controller 930 is configured to perform control of causing the q-axis region to be magnetically saturated upon a value of the rotational speed of the rotary electric machine 500 becomes within a region A2 that is higher than the control switch point A1.

For example, the phase of the d-axis current Id, i.e. the second phase, can be preferably set to an advance phase relative to the phase of the q-axis current Iq, i.e. the first phase, and the phase-difference angle can be preferably set to 50 degrees or less.

FIG. 74 illustrates a control process carried out by the controller 930 for controlling the U-, V-, and W-phase energization currents.

A current command value setter 931 is configured to set a d-axis current command value and a q-axis current command value in accordance with 1. Torque-dq command value conversion map
2. A torque command value in the power running mode or a torque command value in the regeneration mode
3. An angular velocity ω, which is obtained by temporally differentiating the rotational electrical angle θ

The dq converter 932 is configured to convert three-phase current measurements, i.e. three-phase currents, measured by current sensors provided for the respective phases, into d- and q-axis currents on an orthogonal rotating coordinate system. The orthogonal rotating coordinate system has a d-axis indicative of the direction of a magnetic field, i.e. the direction of a permanent magnet. The d-axis current is a current component on the d-axis of the orthogonal rotating coordinate system. Because the dq converter 932 is well known, the detailed descriptions of the dq converter 932 can be omitted.

A d-axis feedback controller 933 is configured to calculate a d-axis manipulated variable for feedback controlling the d-axis current to the d-axis current command value. For example, the d-axis feedback controller 933 calculates a d-axis deviation between the d-axis current and the d-axis current command value, and multiplies the d-axis deviation by a Proportional-Integral gain (PI gain) to thereby calculate a corrected d-axis current command value as a d-axis command voltage, i.e. as the d-axis manipulated variable.

Similarly, a q-axis feedback controller 934 is configured to calculate a q-axis manipulated variable for feedback controlling the q-axis current to the q-axis current command value. For example, the q-axis feedback controller 934 calculates a q-axis deviation between the q-axis current and the q-axis current command value, and multiplies the q-axis deviation by a PI gain to thereby calculate a corrected q-axis current command value as a q-axis command voltage, i.e. as the q-axis manipulated variable.

A two-phase to three-phase converter 935 converts the d- and q-axis command voltages into U-, V-, and W-phase command voltages.

Note that the blocks 931 to 935 serve as a feedback control unit that performs, based on dq conversion theory, feedback control of a fundamental current, and the U-, V-, and W-phase command voltages serve as a feedback control value.

A drive signal generator 936 is configured to generate, based on a known triangular-carrier comparison task, the drive signals for the inverter in accordance with the three-phase command voltages.

Specifically, the drive signal generator 936 normalizes each of the three-phase command voltages using a DC voltage of the DC power source. Then, the drive signal generator 936 performs PWM control based on comparison in magnitude between each of the normalized three-phase command voltages and a cyclic carrier signal, such as a cyclic triangular carrier signal, to thereby generate switch drive signals, i.e. duty signals, for the respective upper- and lower-switches Sp and Sn of each phase. A driver 937 turns on or off each of the upper- and lower-switches Sp and Sn in accordance with the corresponding one of the switch drive signals.

The rotary electric machine 500 according to the thirteenth embodiment uses strong magnets, and adjusts the stator coil 720 based on the reciprocal of the increment of magnetic flux, resulting in a value of inductance of the rotary electric machine 500 being smaller than a reference value.

Figure 73B:
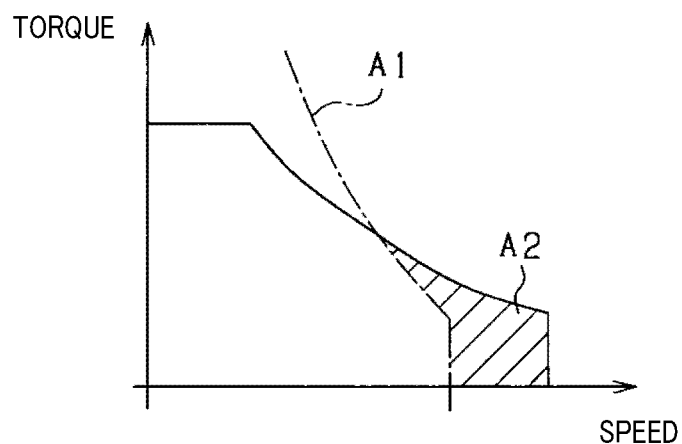

In this case, the current sensors can be provided between the inverter bridge 910 and the stator coil 720 illustrated in FIG. 73(*a*); the current sensors each have a value of inductance, which sufficiently compensates for the decrement of the inductance from the current value of the inductance and the reference value.

This configuration enables the current sensors, which are elements of the feedback control unit, to respectively serve as inductive elements, making it possible to more efficiently perform the feedback control.

In the thirteenth embodiment, the frequency of the cyclic carrier signal, i.e. a carrier frequency, that defines a switching frequency of each switch in the inverter 900 is set to a value higher than 15 kHz. This enables the PWM control to be carried out with the switching frequency being outside an audible frequency range. This provides the rotary-electric machine drive system with lower carrier noise. In particular, the rotary electric machine 500 of the thirteenth embodiment uses the above configured rotor 600, resulting in the rotary electric machine 500 having lower inductance and being controllable using higher carrier frequencies.

The rotary electric machine 500 of the thirteenth embodiment has larger magnet flux and lower inductance. For this reason, in the rotary-electric machine drive system using the rotary electric machine 500, a current control map is set to be closer to magnet torque than to reluctance torque, i.e. closer to the q-axis current Iq.

Torque T of an interior magnet rotary electric machine can be usually expressed in the following equation (3):

$$T = Id \cdot Iq \cdot (Ld - Lq) + \Psi \cdot Iq \qquad (3)$$

where:
Id represents d-axis current
Iq represents q-axis current
Ld represents d-axis inductance
Lq represents q-axis inductance
Ψ represents magnet flux In the right-hand side of the equation (3), the first term shows reluctance torque, and the second term shows the magnet torque.

Figure 75:
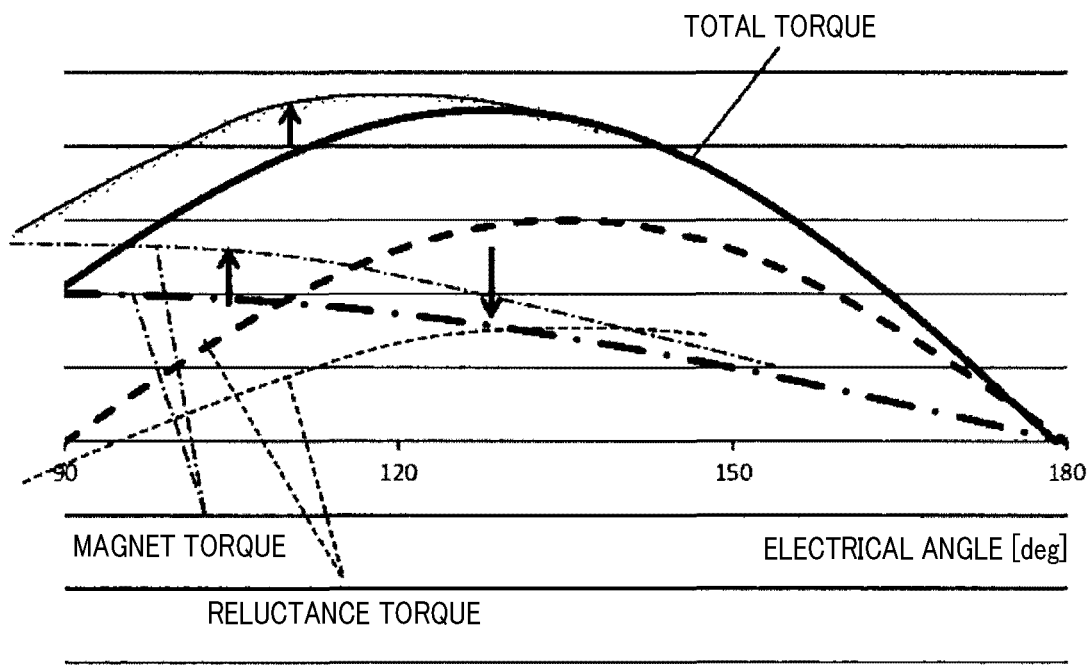
FIG. 75 is a graph illustrating how the phase of each of reluctance torque, magnet torque, and total torque is changed.

FIG. 75 illustrates how reluctance torque, magnet torque, and total torque of the thirteenth embodiment are changed while the rotational angle θ of the rotor 600 relative to the d-axis is within 90 degrees to 180 degrees. Note that the phase angle of the rotor 600 on the d-axis is set to zero degrees.

In FIG. 75, the reluctance torque of the thirteenth embodiment is represented by dashed line, the magnet torque of the thirteenth embodiment is represented by dashed-dotted line, and the total torque of the thirteenth embodiment is represented by solid line.

In contrast, conventional reluctance torque is represented by thicker dashed line, conventional magnet torque of the thirteenth embodiment is represented by thicker dashed-dotted line, and conventional total torque is represented by thicker solid line; these conventional values of torque are obtained in accordance with the above equation (3).

In FIG. 75, the conventional total torque has a peak at the current phase being set to 135 degrees or thereabout. In contrast, in the thirteenth embodiment, as illustrated in the thinner solid line, the obtained total torque is biased on the term of the q-axis current Iq of the equation (3), i.e. the second term of the equation (3).

Because the above torque characteristics of the rotary electric machine 500 are obtained, positively using the q-axis current component Iq to control the rotary electric machine 500 while the d-axis current component Id being relatively low enables efficient control of the rotary electric machine 500 to be carried out. Note that, while the rotary electric machine 500 is operating at a high RPM region without positively executing the field-weakening control, the d-axis current component Id becomes relatively low. In addition, while the ambient temperature is set to ultralow temperatures, such as −20° C., with bearing oil becoming high-viscosity, so that it is necessary to output instant large torque, the d-axis current component Id becomes relatively low.

When the magnets according to the thirteenth embodiment, such as the magnets 470, are used, a first energization of the phase windings with the current phase β, which is the phase of the current vector comprised of a d-axis current vector and a q-axis current vector on the d-q coordinate system, being set to 135° obtains first torque. In contrast, when the magnets according to the thirteenth embodiment, such as the magnets 470, are used, a second energization of the phase windings with the current phase β being set to be within the range from 90° to 135° inclusive obtains second torque. The second torque is higher than the first torque.

There may be a common issue that power factor of a rotary electric machine becomes lower due to impedance based on inductance during execution of the power running mode with the current phase β being larger than 90°. This may result in the DC power source 950, which is a prior stage of the inverter 900 or rotary electric machine 500, having a heavier load.

From this viewpoint, the rotary-electric machine drive system of the thirteenth embodiment is capable of setting a maximum value of torque with the current phase β being smaller than 135°, making it possible to set the current phase β to be closer to 90° than to 135°. This therefore enables the rotary-electric machine drive system to set the current capacity based on the power at the maximum value of torque of the machine 500 to be smaller; the power factor is defied between the rotary electric machine 500 and the inverter 900.

As described above, the thirteenth embodiment provides efficient influence in almost every situations, but, if the rotary electric machine 500 should be controlled based on the carrier frequency of 4 kHz or there about, reduction in inductance of the rotary electric machine 500 may generate an adverse result.

From this viewpoint, it is preferable that the controller 930 is capable of performing additional control except for the PWM feedback control.

That is, as illustrated in FIG. 73(*a*), the controller 930 can include a first energization control unit 930A and a second energization control unit 930B. The first energization control unit 930A generates the PWM signals in accordance with the command voltages for the inverter bridge 910 and the carrier signal, and controls on-off switching operations of the respective switches Sp and Sn in accordance with the respective PWM signals.

The second energization control unit 930B includes pattern information that includes a relationship between 1. Values of the rotational angle θ of the rotor 600 or the electrical angular velocity ω of the rotor 600
2. Corresponding on-off switching patterns of each switch That is, the second energization control unit 930B extracts, from the pattern information, one of the on-off switching patterns of each switch, which corresponds to an actual value of the rotational angle θ of the rotor 600. Then, the second energization control unit 930B controls on-off switching operations of each switch in accordance with the extracted on-off switching pattern of the corresponding switch to thereby control the energization currents for the respective phase windings.

Specifically, the memory of the controller 930 has stored on-off switching patterns of each switch while the energization current for each phase winding is within a predetermined low-current control range. This enables the controller 930 to stably control the rotary electric machine 500 when controlling several amperes of energization current, which is largely separated from current values calculated based on Ohm's law, or stably perform zero-ampere control of energization current.

The controller 930 is also configured to selectively cause one of the first energization control unit 930A and second energization control unit 930B to perform control of energization current for each phase winding.

The second energization control unit 930B performs, as second energization control, on-off switching operations of each switch to thereby control energization current for each phase winding.

Additionally, the second energization control unit 930B can perform, as the second energization control, rectangular energization modes, such as a 120-degree rectangular energization mode, a 150-degree energization mode, and a 180-degree energization mode (see FIG. 85).

The rotor 600 according to the thirteenth embodiment is configured to improve demagnetization resistance based on controlled magnetic orientations defined in each embodiment. In addition to this control, the rotor 600 is configured to control the surface magnetic flux density of the surface of the rotor 600 to thereby increase torque of the rotary electric machine 500.

Figure 77:
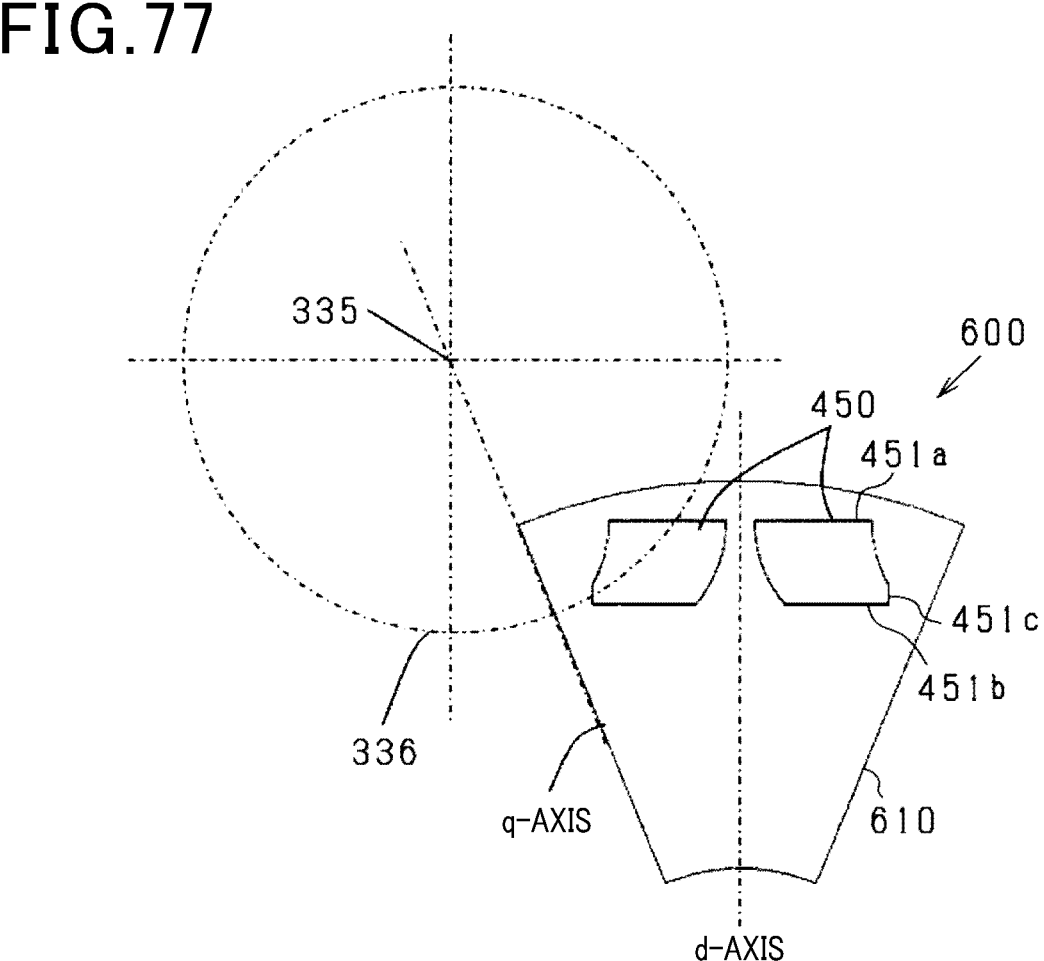
FIG. 77 is a partial plan view of a rotor.

The following describes the control of the surface magnetic flux density of the surface of the rotor 600 when the rotor 600 has the structure illustrated in FIG. 77.

As illustrated in FIG. 77, the rotor 600 is configured such that the magnets 450 illustrated in FIG. 45(*b*) are embedded in the rotor core 610. However, another magnet, which has specific magnetic orientations that are identical to those of the magnet 450, can be used in place of the magnets 450.

Figure 76:
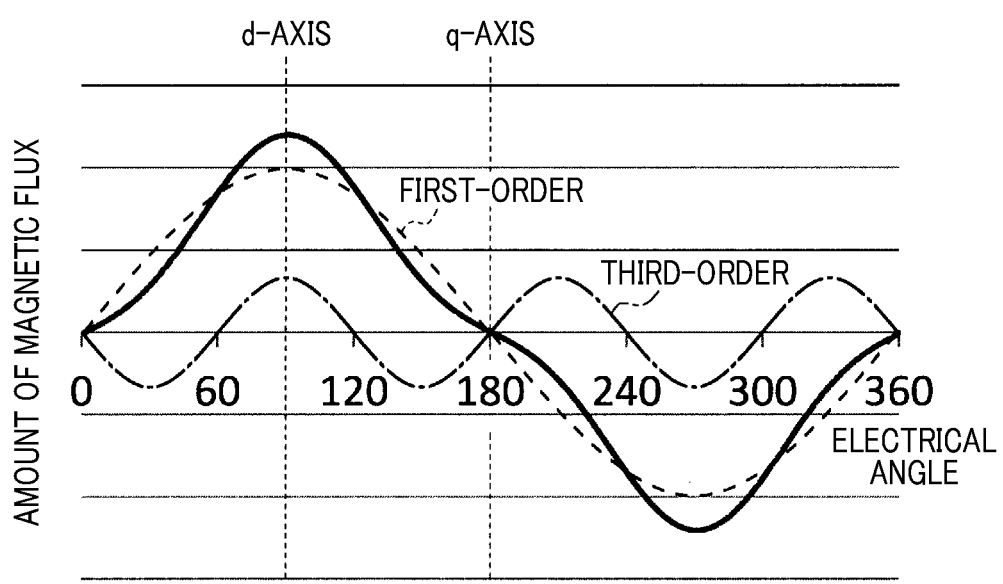
FIG. 76 is a graph illustrating a surface magnetic flux density of a surface of a rotor generated by magnets.

FIG. 76 illustrates the surface magnetic flux density of the surface of the rotor 600 generated by the magnets 450. In FIG. 76, a solid line represents the waveform of magnetic flux by the magnets 450, a dashed line represents the waveform of the first-order magnetic flux, i.e. fundamental magnetic flux, and a dashed-dotted line represents the waveform of the third-order magnetic flux, i.e. third-order harmonic magnetic flux.

The magnets 450 create, as interlinkage magnetic flux, magnet flux configured as the synthesis of the first-order magnetic flux and third-order magnetic flux, which have the same polarity, on the d-axis.

For example, in FIG. 76, the first-order magnetic flux and the third-order magnetic flux have the same positive polarity on the d-axis when the rotor 600 has 90 electrical degrees. In this case, the waveform of the magnetic flux density of the magnets 450 becomes a magnetic flux density waveform that is the synthesis of the first-order magnetic flux and third-order magnetic flux with its phase being shifted by 60 degrees with respect to the first-order magnetic flux.

That is, the waveform of the magnetic flux density of the magnets 450 is configured such that 1. The magnetic flux density on the d-axis is higher than the first-order magnetic flux density (see the dashed line)

2. The magnetic flux density on the d-axis is more aggregated toward the d-axis than the first-order waveform is The waveform of the magnetic flux density of the magnets 450 enables the rotary electric machine 500 to output larger torque. In this case, as compared with a rotary electric machine that includes magnets each having polar anisotropy orientations similar to sinusoidal patterns, or includes a halbach array of magnets, the rotary electric machine 500 is capable of outputting larger torque.

As described above, the controller 930 is capable of controlling the 120-degree rectangular energization mode, 150-degree energization mode, or 180-degree energization mode of the rotary electric machine 500. When the controller 930 performs one of the 120-degree rectangular energization mode, 150-degree energization mode, or 180-degree energization mode of the rotary electric machine 500, energization currents for the respective phase windings may include the third-order harmonic current. From this viewpoint, the rotary electric machine 500 uses the magnets 450 configured set forth above makes it possible to output excellent torque.

The following describes the structure of the magnet 450 for creating the surface magnetic flux density illustrated in FIG. 76 with reference to FIG. 77.

The magnetic orientations of the magnet 450 are aligned to be circular-arc shaped along an orientation circle 336 illustrated in FIG. 77, so that the magnetic orientations of the magnet 450 are defined. The orientation circle 336 is defined about a center point 335 on the q-axis of the rotor core 610. The center point 335 is separated from the outer circumferential surface of the rotor core 610.

The orientation of the magnet 450 based on the orientation circle 336 is carried out, so that the circular-arc orientation on the magnet 450 has a larger curvature as compared with a case where the center point 335 of the orientation circle is defined on the outer circumferential surface or defined to be in the vicinity of the outer circumferential surface.

For this reason, it is possible to set the magnetic orientations of the magnet 450 from the q-axis side surface, i.e. the second effective surface 451*c*, to the d-axis, that is, set the magnetic orientations of the magnet 450 that each intersect with the q-axis at a right angle or an angle close to the right angle. In the magnet 450, magnetic flux is generated from the stator-side first effective surface 451*a* to be lean on the d-axis.

When the magnetic flux distribution of the magnet 450 are plotted with the rotor-surface angular position as a horizontal axis of the graph, the plotted distribution has a peak higher than a peak of a sinusoidal waveform, and both sides of each peak are dented. That is, the magnetic flux distribution of the magnet 450 is illustrated to be identical to the surface magnetic flux density illustrated in FIG. 76. Frequency analyzing the magnetic flux distribution of the magnet 450 makes clear that the third-order harmonic magnetic flux is contained in the magnetic flux distribution of the magnet 450.

Adjusting the center point 335 of the orientation circle 336 enables the percentage of the third-order harmonic in the magnetic flux distribution of the magnet 450 to be adjusted. For example, adjusting the center point 335 to be farther from the surface of the rotor results in the third-order harmonic contained in the magnetic flux distribution of the magnet 450 to increase.

The center point 335 of the orientation circle 336 can be located other than on the q-axis. That is, the center point 335 of the orientation circle 336 can be located on the right side of the q-axis or on the left side of the q-axis in FIG. 77. In this modification, it is preferable that the orientation of the magnet 450 is carried out based on both the orientation circle 336 around the center point 335 on the d-axis and the orientation circle 336 around the center point 335 located to be shifted from the d-axis. This produces the oriented magnet 450 including harmonic magnetic flux other than the third-order harmonic. Note that the phase of the third-order harmonic is not limited to 60 degrees, can be set to an angle before or after 60 degrees. For example, the phase of the third-order harmonic can be set to any angle within the range from 50 to 70 degrees.

As a specific arrangement of the magnets 450, it is preferable that the flux effective surfaces of each magnet 450 for each magnetic pole are concentrically arranged within an angular range from 72 to 120 electrical degrees around the corresponding d-axis that passes the center of the rotor core 610.

In this modification, in a usual multiphase motor that has each phase stator coil 720 arranged within an electrical angular range of 120 degrees, the flux effective surfaces are enclosed within the corresponding phase of the stator coil 720, making it possible to prevent unnecessary harmonics from being outputted from the motor. For this reason, it is possible to accurately calculate, based on the maximum value of the magnetic flux on the d-axis in accordance with Fleming's law. Note that it is preferable that the structure of the stator 700 has a slot-less structure or a core-less structure, which has little reluctance difference.

Fourteenth Embodiment

Figure 78:
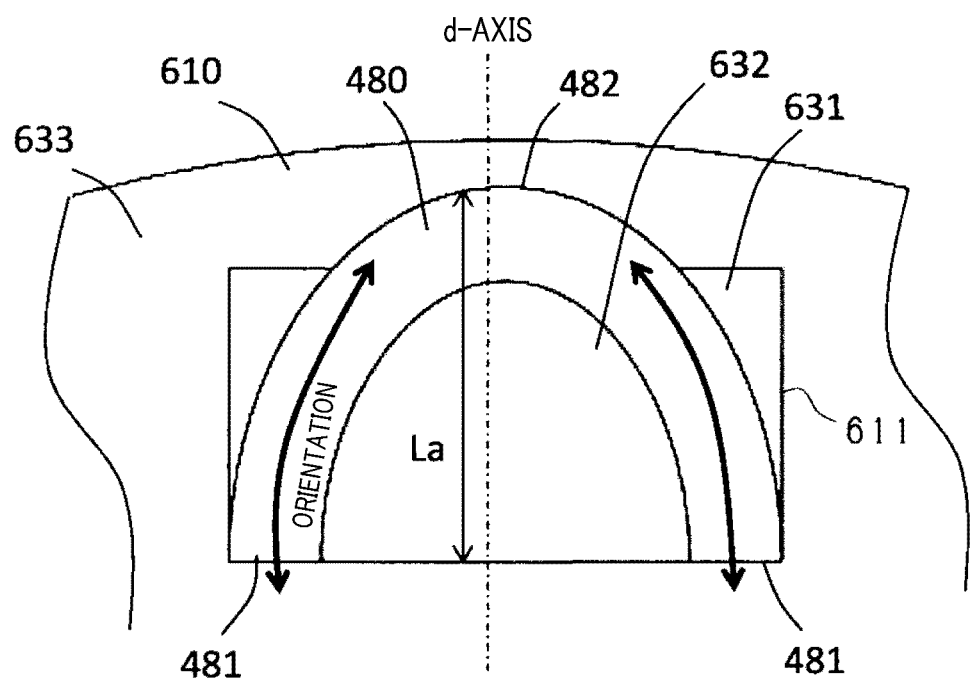
FIG. 78 is a lateral cross-sectional view illustrating a magnet of a fourteenth embodiment.

FIG. 78 schematically illustrates a structure of a rotor 600 according to the fourteenth embodiment. In FIG. 78, the rotor core 610 has a magnet installation hole 611 located across the d-axis and extending toward both sides of the d-axis. The magnet installation hole 611 has a linearly symmetrical about the d-axis. The magnet installation hole 611 has a rectangular shape in its lateral cross section perpendicular to the axial direction of the rotor core 610; the rectangular shape on the lateral cross section convexly projects toward the stator 700.

In the magnet installation hole 611, a magnet 480 is installed. The magnet 480 has a convex shape toward the outer circumferential surface, i.e. the air-gap surface, of the rotor core 610 with respect to the stator 700. The convex end of the magnet 480 is located on the d-axis. The magnet 480 is configured such that a radial distance from the outer circumferential surface to the magnet 480 gradually increases from the d-axis to the q-axis, and convexly projects toward the air-gap surface of the rotor core 610 so that the convex top is located on the d-axis.

That is, the magnet 480 is arranged such that

1. The top located on the d-axis is the closest to the stator windings

2. The closer of a portion of the magnet 480 to the q-axis, the farther the portion of the magnet 480 from the stator windings. In this case, the magnet 480 has an inverted U shape in its lateral cross section.

The magnet 480 has opposing radial outer side surface and radial inner side surface, and each of the radial outer and inner side surfaces has a radial distance from the outer circumferential surface of the rotor core 610. The farther each of the radial outer and inner side surfaces from the d-axis, the larger the radial distance from the outer circumferential surfaced of the rotor core 610. Note that the magnet 480 can have an inverted V shape in its lateral cross section.

In addition, in the magnet 480, magnetic orientations are directed toward the d-axis side top of the magnet 480 from the radially inner portions of the rotor core 610. The magnetic orientations each have a circular-arc shape, and almost of the magnetic orientations are along the longitudinal direction of the magnet 480. In particular, the magnet 480 has a dimension along an opposite direction to the stator 700, i.e. a maximum magnet length La in a radial direction, and magnetic paths of the magnet 480 are longer than the maximum magnet length La. This enables magnet flux on the d-axis to be strengthened.

The magnet 480 has both end surfaces 481, and a top 482 at its center; each of the end surfaces 481 and the top 482 serves as a flux effective surface into which magnetic flux flows or out of which magnetic flux flows. That is, in the magnet 480, each of the outer surface of the top 482 that is the closest to the stator windings, and the farthest outer surfaces 481 from the stator windings serves as the flux effective surface into which magnetic flux flows or out of which magnetic flux flows. It is preferable that the magnetic orientations defined at the d-axis or therearound, i.e. the top 482 or therearound, are parallel to the d-axis or close to the direction parallel to the d-axis. That is, the magnet 480 has a higher permeance at the center thereof. The magnet 480 according to the fourteenth embodiment has long magnetic paths in its thick-wall direction defined therein, making it possible to improve demagnetization resistance.

In FIG. 78, reference numeral 631 represents a space between the outer circumferential surface of the magnet 480 and the magnet installation hole 611, or represents a non-magnetic material filled in the space. The space or non-magnetic material serves as a non-magnetic member, i.e. a flux barrier. Similarly, reference numeral 632 represents a space between the inner circumferential surface of the magnet 480 and the magnet installation hole 611, or represents a non-magnetic material filled in the space. The space or non-magnetic material serves as a non-magnetic member, i.e. a flux barrier.

That is, each of the inner circumferential surface of the magnet 480 and the outer circumferential surface except for the top 482 serves as an ineffective surface configured such that no magnetic flux flows into or out from the ineffective surface. The non-magnetic members 631 and 632 are located to be adjacent to the respective ineffective surfaces.

In the structure illustrated in FIG. 78, the magnet 480 has long magnetic paths with respect to an inner space of the rotor core 611. That is, the magnet 480 is arranged to extend in an arrangeable space of the rotor core 610. In the rotor core 610, a q-axis close portion 633, which is close to the q-axis, has a high possibility of demagnetization. From this viewpoint, the magnet 480 is arranged to be separated from the q-axis close portion 633, and ensures magnetic paths therein. This therefore strengthens demagnetization resistance.

Because the magnet 480 is configured such that a radially inner side is circular-arc concaved toward the center of the rotor core 610 to have a substantially an inverted U shape in its lateral cross section, the weight of the magnet 480 is smaller than a semi-cylindrical magnet without the concaved portion. This therefore provides the magnet 480 having higher permeance.

Note that the magnet 480 illustrated in FIG. 78 has a semi-elliptical shape such that an outer diameter and an inner diameter in the d-axis are longer than an outer diameter and an inner diameter in a direction perpendicular to the d-axis. The magnet 480 however can have a semi-elliptical shape such that the outer diameter and the inner diameter in the direction perpendicular to the d-axis are longer than the outer diameter and the inner diameter in the d-axis. In addition, the magnet 480 however can have a semi-circular shape such that the outer diameter and the inner diameter in the d-axis are respectively equal to the outer diameter and the inner diameter in the direction perpendicular to the d-axis.

FIG. 79(*a*) illustrates a magnet 480A having a first outer diameter dimension of a bottom end of the magnet 480A perpendicular to the d-axis, and FIG. 79(*b*) illustrates a magnet 480B having a second outer diameter dimension of a bottom end of the magnet 480B perpendicular to the d-axis; the first outer diameter is different from the second outer diameter. The outer diameter dimension of the bottom end of the magnet 480 perpendicular to the d-axis represents the ratio of a semi-major axis to a semi-minor axis of the magnet 480 upon the semi-major axis being constant.

Figure 79A:
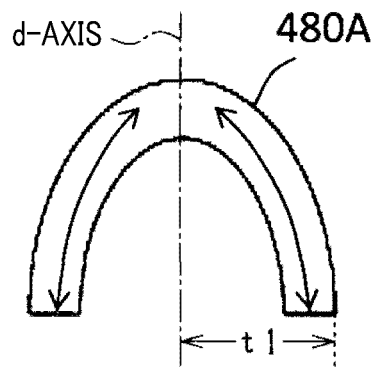
FIG. 79(a), FIG. 79(b), and FIG. 79(c) are views illustrating modifications of the fourteenth embodiment.
Figure 79B:
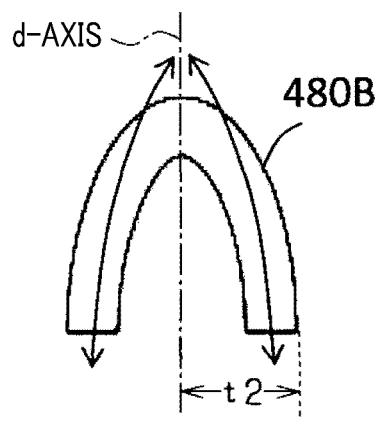
Figure 79C:
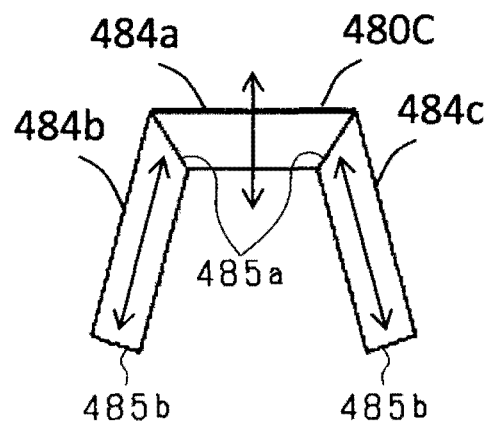

In each of FIGS. 79(a) to 79(c), the center in the left and right direction represents the d-axis.

The semi-minor axis t2 at the bottom end of the magnet 480B is shorter than the semi-minor axis t1 at the bottom end of the magnet 480A. That is, the ratio of the major axis (d-axis dimension) to the minor axis (d-axis orthogonal dimension) of the magnet 480B is larger than the ratio of the major axis (d-axis dimension) to the minor axis (d-axis orthogonal dimension) of the magnet 480A. For this reason, the inclination of the magnet 480B with respect to the d-axis is steeper than the inclination of the magnet 480A with respect to the d-axis.

In addition, FIG. 79(c) illustrates a magnet assembly 480C comprised of magnets 484a, 484b, and 484c, each of which has linear magnetic oscillations defined therein. The magnet assembly 480C is configured as the assembly of the magnets 484a, 484b, and 484c integrated with each other, so that the magnet assembly 480C is similar to the magnet 480 illustrated in FIG. 78.

Specifically, the magnet assembly 480C is comprised of the center magnet 484a located across the d-axis and extending to be perpendicular to the d-axis, and the end magnets 484b and 484c respectively joined to both ends of the center magnet 484a.

The end magnets 484b and 484c are respectively joined to both ends of the center magnet 484a such that (1) The end magnets 484b and 484c are inclined with respect to the d-axis (2) The closer a rotor-core side end (upper end in FIG. 79(c)) of each of the end magnets 484b and 484c to the rotor core 610, the closer the d-axis That is, the magnet assembly 480C of the center magnet 484a and the end magnets 484b and 484c has a convex shape toward the stator 700, i.e. the armature.

Magnetic orientations defined in the center magnet 484a are perpendicular to the longitudinal direction of the center magnet 484a, and parallel to the d-axis. Magnetic orientations defined in each of the end magnets 484b and 484c are parallel to the longitudinal direction of the corresponding one of the end magnets 484b and 484c, and inclined with respect to the d-axis.

The center magnet 484a has a pair of opposing surfaces along the longitudinal direction respectively serving as flux effective surfaces. Each of the end magnets 484b and 484c has both end surfaces in its longitudinal direction, which respectively serving as flux effective surfaces.

That is, in the magnet assembly 484C, the center magnet 484a serving as a first magnet is located to be closer to the stator windings than the end magnets 484b and 484c are; the end magnets 484b and 484c each serve as a second magnet. The center magnet 484a is arranged to intersect with the d-axis at the right angle.

The end magnets 484b and 484c are arranged such that, the closer to the d-axis, the farther from the stator windings. Each of the end magnets 484b and 484c has opposing end surfaces 485a and 485b; the end surface 485a is the closest to the stator windings, and the end surface 485b is the farthest from the stator windings. The end surfaces 485a and 485b respectively serve as flux effective surfaces into which magnetic flux flows or out of which magnetic flux flows.

Like the magnet 480, the magnet assembly 480C strengthens magnet flux on the d-axis, and improves the permeance thereof.

Fifteenth Embodiment

Figure 80:
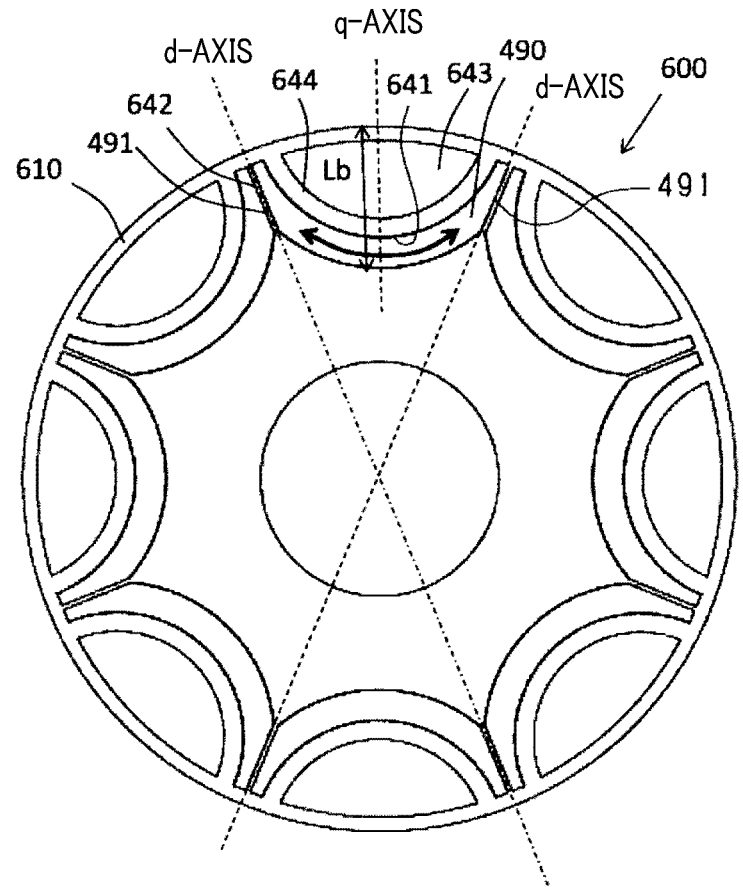
FIG. 80 is a lateral cross-sectional view illustrating a magnet of a fifteenth embodiment.

FIG. 80 schematically illustrates a structure of a rotor 600 according to the fifteenth embodiment. In FIG. 80, the rotor core 610 has a circular-arc shaped magnet installation hole 641 located between circumferentially adjacent two d-axes, i.e. pole centers; each of the magnet installation hole 641 has a convex shape toward the radially center of the rotor core 610 in its lateral cross section.

The number of magnet installation holes 641 is set to be identical to the number of the magnetic poles. In the fifteenth embodiment, eight magnet installation holes 641 are provided in the rotor core 610. Each of the magnet installation holes 641 has both ends, and both ends of each of the magnet installation holes 641 are located to be close to the corresponding respective d-axes. That is, the adjacent magnet installation holes 641 are located across the corresponding d-axis core portion 642.

In each of the magnet installation holes 641, a magnet 490, which is shaped to be in conformity with the hole 641, is installed. That is, like the magnet installation hole 641, the magnet 490 has a circular-arc convex shape toward the radially center of the rotor core 610 in its lateral cross section. The magnet 490 is configured such that the d-axis side portions are closest to the outer circumferential surface of the rotor core 610, and the q-axis side portion is the farthest from the outer circumferential surface of the rotor core 610.

That is, the magnet 490 has a circular-arc shape around the q-axis such that the magnet 490 is convex toward the direction opposite to the stator-winding direction, i.e. convex toward the center of the rotor core 610. Both ends of the magnet 490 are located to be close to the respective d-axes. That is, the rotor 600 of the fifteenth embodiment is provided with the magnet installation hole 641 and the magnet 490 between each adjacent pair of the d-axes.

In the magnet 490, magnetic orientations are defined to be circular-arc shape extending along the longitudinal direction of the magnet 490. The magnet 490 has both end surfaces 491 in its longitudinal direction, and the end surfaces 491 respectively serve as flux effective surfaces into which magnetic flux flows or out of which magnetic flux flows.

That is, in the magnet 490, the end surfaces 491 of the magnet 490, i.e. the d-axis side end surfaces 491, respectively serve as the flux effective surfaces. Magnetic paths defined in the magnet 490 are the same as a length, i.e. a circular-arc length, of the magnet 490 in its longitudinal direction. The magnet 490 is configured such that both ends of the magnet 490 are located to be close to the respective d-axes, and the magnetic orientation are defined therein toward the respective d-axis ends. In particular, the magnet 490 has a dimension along the opposite direction to the stator 700, that is, the maximum magnet length Lb in a radial direction, and the length of each of magnetic paths defined in the magnet 490. The magnetic orientations defined in the magnet 490 are defined to be longer than maximum magnet length Lb. This therefore strengthens magnet flux on the d-axis, and has long magnetic paths in its thick-wall direction defined therein, making it possible to improve demagnetization resistance. Note that the structure of the rotor illustrated in FIG. 80 can obtain rotor characteristics close to characteristics of a surface magnet rotor.

In the rotor core 610, a space is located radially outside of the magnet installation hole 641 (magnet 490), or a non-magnetic material is filled in the space. The space or non-magnetic material filled in the space serves as a non-magnetic member, i.e. a flux barrier 643. That is, an outer side surface of the magnet 490 serves as an ineffective surface configured such that no magnetic flux flows into or out from the ineffective surface. The non-magnetic member 643 is located to be adjacent to the ineffective surface. In the rotor core 610, a bridge 644 is provided to partition the magnet installation hole 641 and the non-magnetic member 643 located outside the hole 641 from each other.

The above rotor 600 is configured such that magnetic orientations are defined in the magnet 490 along the d-axis, making it possible to match a pole-pitch circular arc with the magnetic paths of the magnet 490 for each pole. This configuration of the rotor 600 strongly counteracts against demagnetization.

Other Modification

The present invention is not limited to the above embodiments set forth above, and can be variously modified within the scope of the present invention.

Figure 81:
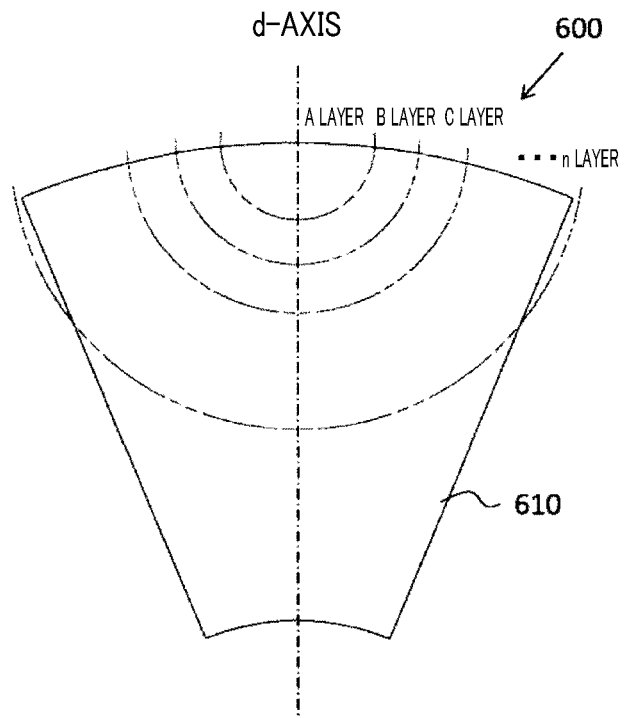
FIG. 81 is a view illustrating a structure of a multi-layered structure.

The rotor 600 of the rotary electric machine 500 can employ the following magnet arrangement. In the rotor core 610 illustrated in FIG. 81, an A layer, a B layer, a C layer, ..., an n layer are defined around a predetermined point on the d-axis; minimum distances of the respective layers A to n from the predetermined point are set to be different from each other. These layers A to n are concentrically provided. Permanent magnets, which can have the same shape and same characteristics or different shapes and different characteristics, are provided in the respective layers.

FIG. 82 illustrates an example of the magnetic arrangement. In FIG. 82, the magnet 430 illustrated in FIG. 62 and the magnets 440 illustrated in FIG. 64 are installed in the rotor core 610. That is, the magnet 430 is arranged in the A layer of the rotor core 610, and the magnets 440 are provided from the B layer to the C layer.

This configuration of the rotor 600 illustrated in FIG. 82 achieves both (i) reduction in demagnetization in each end of the magnet 430, and (ii) reduction in demagnetization in the outer periphery of the rotor core 610. Any combination of magnets in respective A to n layers can be freely determined.

The structure of the orientation apparatus used in the orientation step can be modified. Next, the following describes a specific structure of an orientation apparatus 360. FIG. 83(*a*) illustrates a schematic structure of an orientation apparatus 360 used during the orientation step, and FIG. 83(*b*) illustrates a plurality of magnets MG, each of which has been magnetically oriented in the orientation step.

The orientation apparatus 360 includes a magnetic field generator 361 having a size capable of enclosing a mold 280. The magnetic field generator 361 includes a coil 361*a* configured to generate the orientation magnetic field thereinside in a predetermined direction when energized.

The mold 280 is arranged in the coil 361*a* such that a normal line N is parallel to a selected outer surface of the molded body of the magnetic powders in the mold 280.

For example, the orientation apparatus 360 is configured to energize the magnetic field generator 361, i.e. the coil 361*a* to cause the coil 361*a* to generate the orientation magnetic field, and apply the orientation magnetic field generated from the energized coil 361*a* to the mold 280, thus carrying out orientation of the magnetic powders in the mold 280 based on the orientation magnetic field. This results in the magnet MG being efficiently manufactured while increasing the orientation ratio of the magnet MG.

In this modification, the magnetic field generator 361, i.e. the coil 361, generates a strong magnetic field. For this reason, it is possible to obtain 90% or more as the orientation ratio.

A magnet (magnet block), from which a predetermined number of magnets can be divided, is used. Specifically, after the orientation step for the magnet block, the magnet block is divided into desired magnets.

The mold 280 is arranged in the coil 361*a* such that a normal line N is parallel to a selected outer surface of the mold 280. For this reason, after the magnet block MG is oriented, the oriented magnetic block can be cut while being inclined with respect to the flux effective surfaces of the magnet block MG. This therefore makes it possible to obtain magnets each has magnetic orientations that have an oblique angle with respect to the flux effective surfaces.

Note that an oblique solid line in FIG. 83(*b*) represents the direction of the magnetic orientations of each magnet MG. The orientation step using the orientation apparatus 360 obtains magnets, such as magnets 400, each having a higher value of the orientation ratio.

In the structure illustrated in FIG. 83(*a*), the mold 280 is arranged in the coil 361*a* while the normal line N of the magnet MG is parallel to the axial direction of the coil 361*a*, making it possible to downsize the magnetic field generator 361.

Figure 84:
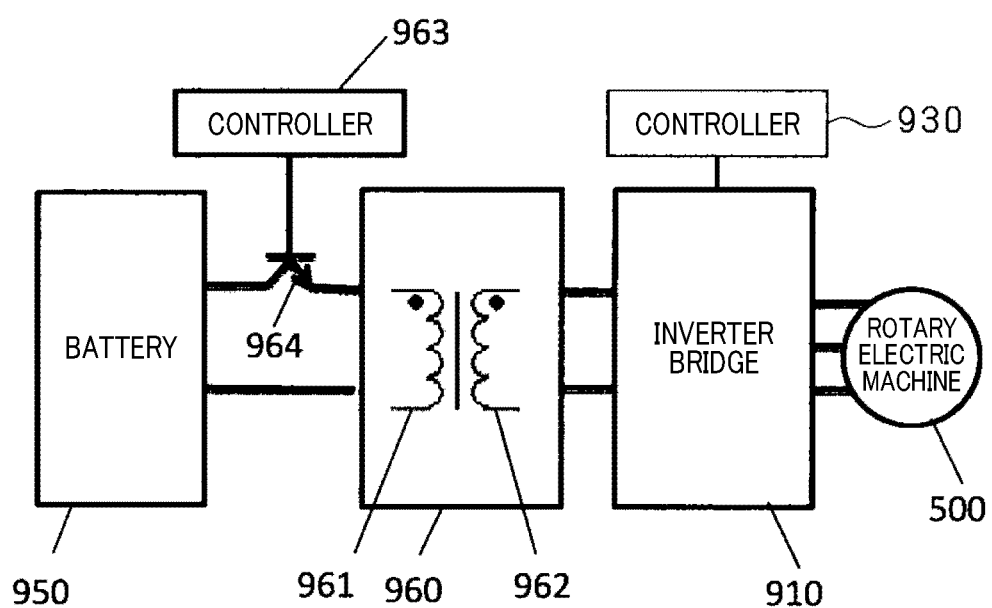
FIG. 84 is a block diagram illustrating a rotary electric machine drive system in which voltage control has been added.

Another example of a rotary-electric machine drive system is illustrated in FIG. 84. In the rotary-electric machine drive system illustrated in FIG. 84, a voltage conversion unit is provided between the DC power source 950 for supplying the DC voltage and the inverter bride 910. The voltage conversion unit is capable of controlling an input voltage to the inverter bridge 910. The controller 930 is configured to perform rectangular voltage control to thereby control the energization currents for the respective phase stator windings.

The voltage control unit includes a voltage converter 960, a switching element 964, and a voltage controller 963. The switching element 964 is provided on a voltage input line to the voltage converter 960. The voltage controller 963 is configured to control the switching element 964.

The voltage converter 960 includes a primary coil 961 and a secondary coil 962. The number of turns of the secondary coil 962 is set to be larger than the number of turns of the primary coil 961. Note that, because this modification does not aim to boost an input voltage, the number of turns of the secondary coil 962 can be set to be equal to or larger than the number of turns of the primary coil 961.

Magnetic flux generated in the primary coil 961 interlinks to the secondary coil 962, so that the DC voltage from the DC power source 950 is supplied to the inverter bridge 910 via the secondary coil 962.

The inductance of the rotary electric machine drive system is set to be equal to or higher than a predetermined threshold, so that voltage variations due to on-off switching operations of the switching element 964 are reduced.

This configuration of the rotary electric machine drive system enables magnetic flux generated in the primary coil 961 to be stably transferred to the secondary coil 962, so that a secondary voltage is generated across the secondary coil 962. This therefore enables the inverter bridge 910 to operate based on a variable voltage generated as a function of the variable voltage that is created by the switching element 961.

The voltage controller 963 for example reads a value of a phase current flowing through the corresponding phase, and controls, based on the obtained value of the phase current a duty of the switching element 964. This makes it possible to control the input voltage to the inverter bridge 910. This maintains a voltage amplitude per pulse to be a lower level as compared with a case where a voltage application based on the carrier frequency is performed. This prevents the occurrence of iron loss due to voltage vibration.

In the rotary electric machine 500 having low inductance, energization control is carried out in accordance with a predetermined carrier frequency, so that there may be divergence of the current control. From this viewpoint, the structure illustrated in FIG. 84 enables the input voltage to the inverter bridge 910 to be controlled between the DC power source 950 and the inverter bridge 910. This makes it possible to reduce current variations, thus preventing divergence of the current control.

The controller 930 performs, in a rectangular voltage control mode, a 120-degree rectangular voltage control mode using on duration corresponding to 120 electrical degrees. Note that the controller 930 can be configured to perform another rectangular voltage control mode using on duration corresponding to any angle selected from the range from 120 electrical degrees to 180 electrical degrees inclusive.

This modification is capable of changing the input voltage to the inverter bridge 910.

In addition, this modification is capable of performing, based on a rectangular pulse signal and the measurement information sent from the resolver, on-off switching operations of each of the switches Sp and Sn without synchronization with the carrier frequency.

For example, when performing the 120-degree rectangular voltage control mode illustrated in FIGS. 85(a) to 85(c), the controller 930 is configured to alternately 1. Turn on the switch for each phase based on a rectangular pulse having an on duration corresponding to 120 electrical degrees 2. Turn off the switch for each phase based on the rectangular pulse having an off duration corresponding to 60 electrical degrees The controller 930 performs four switching operations (on or off operation) for each phase during each electrical degree period (360 electrical degrees), thus performing the total twelve switching operations (on or off operation) during each electrical degree period (360 electrical degrees).

This drastically reduces the number of switching operations of the switches in the inverter bridge 910 as compared with switching operations of the switches based on the carrier frequency, a typical example of which is several kHz. This therefore drastically reduces switching loss in the rotary electric machine drive system. In addition, even if the inductance of the stator windings is small, it is possible to prevent the occurrence of current ripples. Note that, as described above, the 150-degree rectangular voltage control mode uses a rectangular pulse having an on duration corresponding to 150 electrical degrees, and the 180-degree rectangular voltage control mode uses a rectangular pulse having an on duration corresponding to 180 electrical degrees.

In the rotary electric machine 500 according to a corresponding embodiment, as illustrated in FIG. 61 as an example, the magnetic orientations defined in the magnet 420 are directed from the q-axis to the d-axis, so that there is a large number of magnetic flux components oriented toward the center of one magnetic pole, i.e. d-axis. For this reason, this type of rotary electric machines are suitable for 120-degree rectangular voltage control mode except for 180-degree rectangular voltage control mode.

The rotary electric machine drive system illustrated in FIG. 84 can be applied for the rotary electric machines 1 described in the first to fifth embodiments based on FIGS. 1 to 44.

The present disclosure is not limited to the interior magnet rotors, i.e. the interior magnet rotary electric machines, but can be applied to surface magnet rotors, i.e. surface magnet rotary electric machines.

Figure 91A:
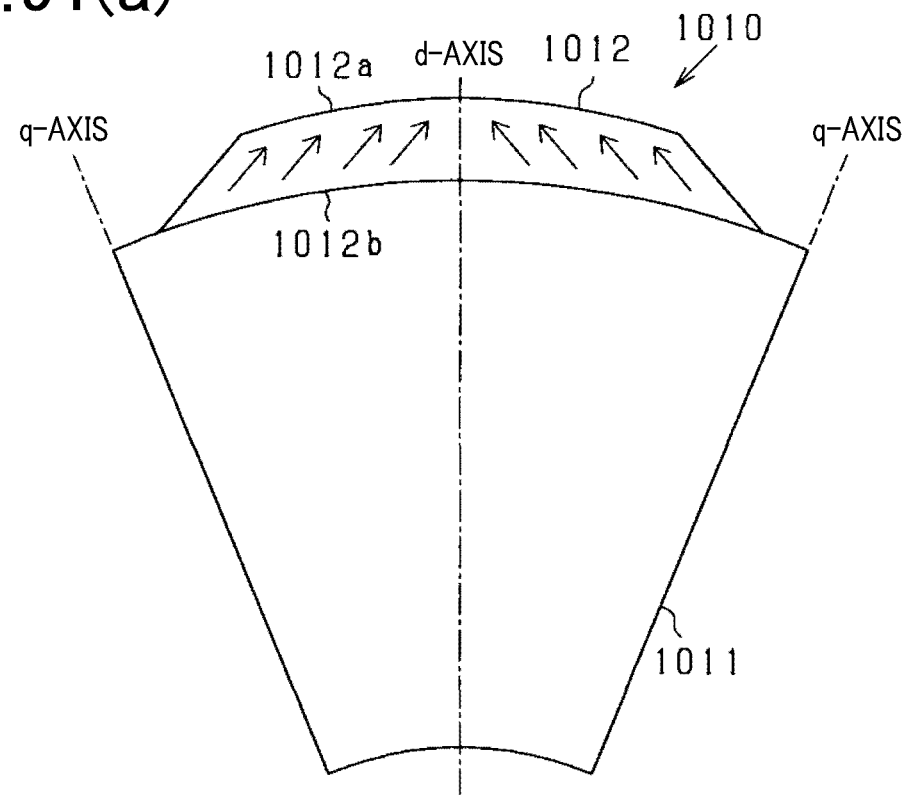
FIG. 91(a) and FIG. 91(b) are surface magnet rotors.
Figure 91B:
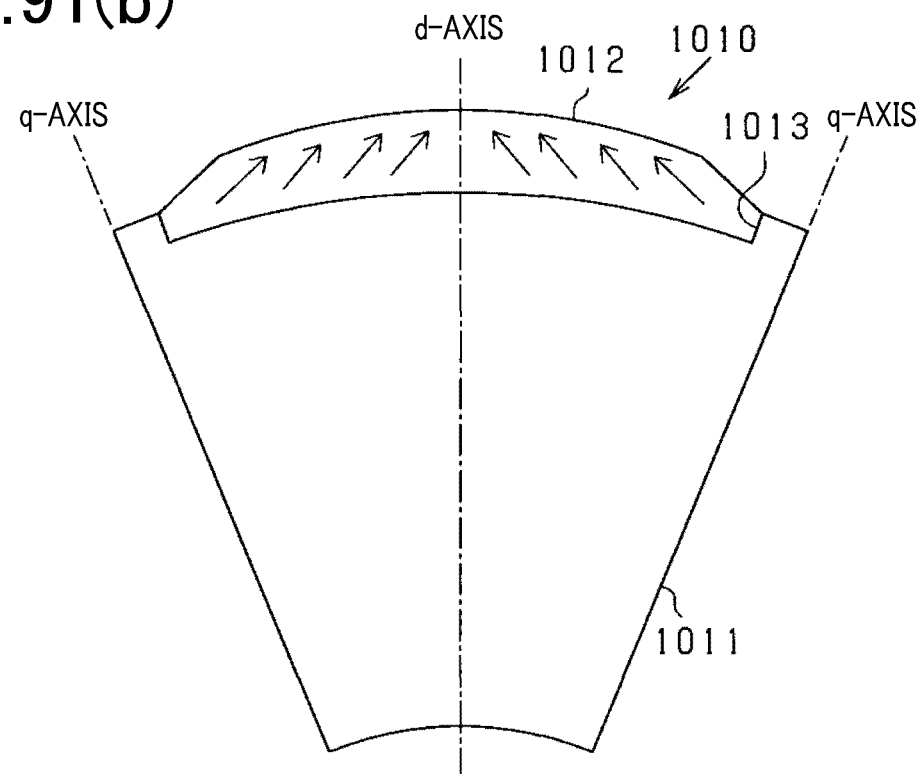

Each of FIGS. 91(a) and 91(b) illustrates a surface magnet rotor 1010. Such a rotor can be applied to, for example, the rotary electric machine 1 illustrated in FIGS. 1 and 2.

As illustrated in FIG. 91(a), the rotor 1010 includes a rotor core 1011, and magnets 1012 fixedly mounted to the outer circumferential surface, i.e. the surface facing the stator windings. Each magnet 1012 has a pair of effective surfaces 1012a and 1012b into which magnetic flux flows or out of which magnetic flux flows. Each magnet 1012 has magnetic paths defined in the corresponding magnet 1012; the length of each of the magnetic paths is longer than the thickness dimension between the effective surfaces 1012a and 1012b. Each magnet 1012 also has easy axes of magnetization defined therein; each of the easy axes of magnetization is oriented along a corresponding one of the magnetic paths.

In addition, as illustrated in FIG. 91(b), the rotor 1010 has concave recesses 1013 formed in the outer circumferential surface, and each magnet 1012 is at least partly installed in the corresponding one of the concave recesses 1013, and is fixed thereto.

Figure 92:
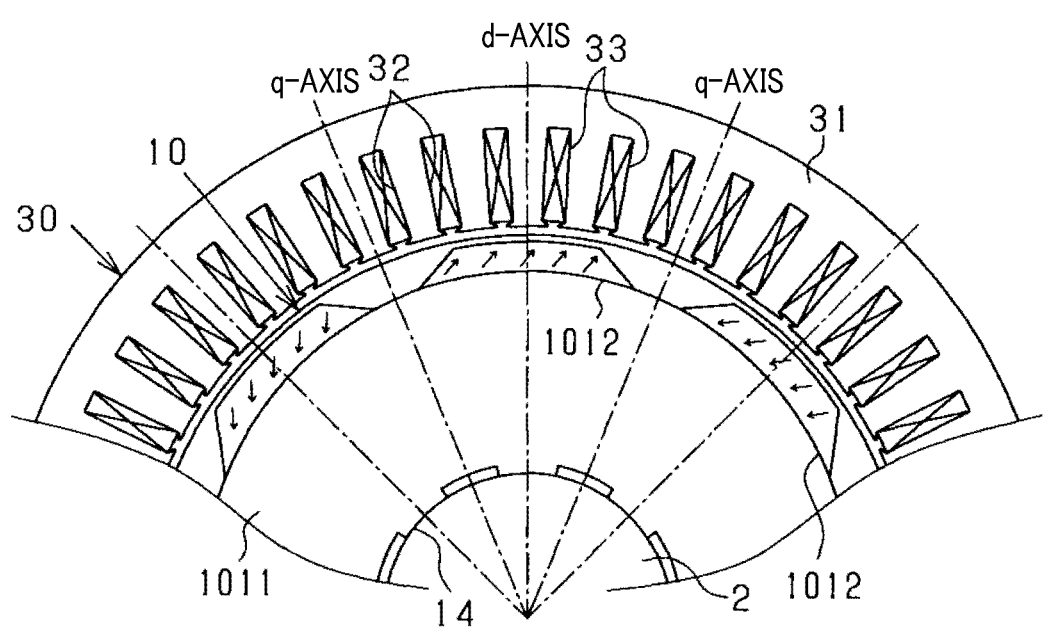
FIG. 92 is a view illustrating the surface magnet rotor and a stator.

In addition, FIG. 92 schematically illustrates that the magnets 1012 are fixedly mounted on the outer circumferential surface of the rotor core 1011; the magnets 1012 are located on the respective d-axes. Each of the magnets 1012 for a corresponding magnetic pole extends to both sides of the corresponding d-axis. Each of the magnets 1012 has the magnetic paths each inclined with respect to the corresponding d-axis. In other words, the magnetic paths defined in each magnet 1012 have identical inclinations with respect to the circumferential direction.

Each magnet 1012 includes a first portion located on one side of the d-axis, and a second portion located on the other side of the d-axis. The magnetic paths defined in the first portion are asymmetrical about the d-axis to the magnetic paths defined in the second portion.

In at least some embodiments, the magnet 1012 has a pair of opposing surfaces parallel to each other as flux effective surfaces (first effective surface). However, the present invention is not limited thereto. Specifically, the magnet 1012 can have a pair of opposing surfaces non-parallel to each other as flux effective surfaces. In this modification, each of the magnetic paths defined in the magnet 1012 can intersect with one of the flux effective surfaces at a non-right angle, and can intersect with the other of the flux effective surfaces at a right angle.

Each of the rotary electric machines set forth above is designed as a rotating field rotary electric machine, but can be designed as a rotating armature rotary electric machine. In this modification, a rotor serving as an armature is fixedly mounted on the rotating shaft, and a stator serving as a magnetic field member is arranged at radially outer side of the rotor. The rotor is comprised of a rotor core and multiphase armature windings mounted on the outer circumferential surface of the rotor core, and the stator is comprised of a stator core and magnets fixedly mounted to the stator core.

The present invention can be applied to rotary electric machines each selectively use a power generator and a motor.

The present invention can be applied to other motors or electromagnetic machines in place of rotary electric machines. For example, the present invention can be applied to a linear motor capable of linearly moving a movable member. That is, the present invention can be applied to motors or electromagnetic machines as long as each of the motors or electromagnetic machines includes magnets each located to face a winding, the magnets being 1. Each configured to perform a relative operation with respect to the corresponding winding when the corresponding winding is energized
2. Arranged such that their polarities are alternately changed in a direction of the relative operations The above embodiments can disclose the following technical ideas.

Measure H1

A magnetic generator for a motor (1) comprising:
a plurality of magnets (13) that is arranged to face a winding (33) and that is movable relative to the winding upon the winding being energized, the magnets being arranged in a relative movement direction while magnetic polarities based on the magnets are alternately changed,
each of the magnets comprising:
a first magnet member (21) configured to generate magnet flux in accordance with a corresponding one of the polarities, the first magnet having first magnetic orientations defined therein; and
a second magnet member (22) having a q-axis side end located closer to a pole boundary, the second magnet member having second magnetic orientations defined therein, the second magnetic orientations intersecting with the first magnetic orientations.

Measure H2

The magnetic generator according to the measure H1, wherein:
the motor is designed as a rotary electric machine (1) that is comprised of:
a winding member (30) in which the winding is wound; and
a magnet hold member (10) including the magnets and radially arranged to face the winding member, the magnetic generator being used as the magnet member,
the first magnet member comprises a plurality of first magnet members arranged in the magnet member in a circumferential direction of the magnet member with predetermined pitches; and
the second magnet member comprises a plurality of second magnet members, each of the second magnet members being provided for the q-axis side end of the corresponding one of the first magnet members.

Measure H3

The magnetic generator according to the measure H2, wherein:
the magnet hold member includes a soft magnetic core (11) having magnet installation holes (12) located across a d-axis for each pole at both sides of the d-axis; and
the first and second magnet members are installed in each of the magnet installation holes.

Measure H4

The magnetic generator according to the measure H3, wherein:
the q-axis side end of each of the first magnet members has a magnet reinforcement point (P1) that is the closest to the armature winding; and
each of the second magnet members is configured to strength magnetic flux at the magnet reinforcement point of the q-axis side end of the corresponding one of the first magnet members.

Measure H5

The magnetic generator according to the measure H3 or H4, wherein:
each of the first and second magnet members has a substantially rectangular shape in a lateral cross section thereof, and a pair of opposing flux effective surfaces;
the first magnetic orientations and the second magnetic orientations of the respective first and second magnet members are perpendicular to the opposing flux effective surfaces of the corresponding one of the first and second magnet members; and
the first and second magnet members are arranged in the soft magnetic core such that a first angle of at least one of the first magnetic orientations of each of the first magnet members with respect to the d-axis or q-axis is different from a second angle of at least one of the second magnetic orientations of the corresponding one of the second magnet members with respect to the d-axis or q-axis.

Measure H6

The magnetic generator according to any one of the measures H3 to H5, wherein:
an angle formed between at least one of the first magnetic orientations of each of the first magnet members and at least one of the second magnetic orientations of the corresponding one of the second magnet members is set to be an acute angle.

Measure H7

The magnetic generator according to any one of the measures H3 to H5, wherein:
the first magnet members are located across the d-axis for each pole to be separated from each other as a pair of magnets (21); and
the first magnetic orientations of each first magnet member are inclined with respect to the d-axis and intersects with the d-axis at a portion of the core, the portion of the core being located to be closer to the armature winding than to an anti-armature winding side,
the magnetic generator further comprising:
a plurality of third magnet members (23, 42) each having third magnetic orientations, each of the third magnet members being provided for a d-axis side end of the corresponding one of the first magnet members such that the third magnetic orientations intersect with the first magnetic orientations of the corresponding one of the first magnetic members.

Measure H8

The magnetic generator according to the measure H7, wherein:
one of the magnets of the pair located across the d-axis for each pole has a magnet reinforcement point (P2) that is closest to the other of the magnets;
the other of the magnets of the pair located across the d-axis for each pole has a magnet reinforcement point (P2) that is closest to one of the magnets; and
each of the third magnet members is configured to strength the second magnet reinforcement portion of the corresponding one of the first magnet members.

Measure H9

The magnetic generator according to the measure H7 or H8, wherein:
an angle formed between at least one of the first magnetic orientations of each of the first magnet members and at least one of the third magnetic orientations of the corresponding one of the third magnet members is set to be an acute angle.

Measure H10

The magnetic generator according to any one of the measures H7 to H9, wherein:
each of the magnet installation holes includes a d-axis side extending portion that is located between the corresponding pair of the magnets and that extends portion that extends toward the d-axis;
each of the third magnet members is arranged in the d-axis side extending portion of the corresponding one of the magnet installation holes; and
each of the magnet installation holes includes a flux barrier located to be closer to the d-axis than the corresponding one of the third magnet members.

Measure H11

The magnetic generator according to any one of the measures H3 to H10, wherein:
the magnet installation holes are located across the d-axis for each pole at both sides of the d-axis to be symmetrical about the d-axis; and
the magnets are arranged across the d-axis for each pole to be symmetrical about the d-axis.

Measure H12

The magnetic generator according to any one of the measures H1 to H11, wherein:
each of the first and second magnet members has a value of coercive force, the value of the coercive force of the second magnet member being smaller than the value of the coercive force of the first magnet member.

Measure H13

The magnetic generator according to any one of the measures H1 to H11, wherein:
each of the first and second magnet members has a value of coercive force, the value of the coercive force of the first magnet member being smaller than the value of the coercive force of the second magnet member.

Measure H14

The magnetic generator according to any one of the measures H3 to H11, wherein:
each of the second and third magnet members has a value of coercive force, the value of the coercive force of the second magnet member being different from the value of the coercive force of the third magnet member.

Measure H15

The magnetic generator according to any one of the measures H3 to H14, wherein:
each of the first magnet members comprises divided magnet segments (27a, 27b) in a direction from the q-axis to the d-axis, each of the magnet segments having at least one of the first magnetic orientations, the at least one of the first magnetic orientations of one of the magnet segments being different from the at least one of the first magnetic orientations of another of the magnet segments;
the magnet segments include at least a q-axis side segment and a d-axis segment, the q-axis side segment being located to be closer to the q-axis than the d-axis segment is, the d-axis side segment being located to be closer to the d-axis than the q-axis segment is; and
the at least one of the first magnetic orientations of the q-axis side segment are closer to a direction parallel to the q-axis than the at least one of the first magnetic orientations of the d-axis side segment is.

Measure H16

The magnetic generator according to the measure H15, wherein:
the magnet segments of each first magnet member have respective ends facing each other; and
the magnet segments of each first magnet member are arranged such that the ends of the respective magnet segments have a concave shape toward the winding.

Measure H17

The magnetic generator according to the any one of the measures H3 to H16, wherein:
the soft magnetic core has an outer surface facing the winding member, and includes a groove (42, 43) extending along an axial direction of the soft magnetic core.

Measure H18

The magnetic generator according to the any one of the measures H3 to H17, wherein:
the soft magnetic core is a rotor core that has:
a through hole (14) formed through a center portion thereof, a rotary shaft (40) is rotatably disposed in the through hole, the through hole having an inner circumferential surface thereof; and
a projection (14a) formed on the inner circumferential surface of the through hole and located on the d-axis for each pole, the projection extending to abut on an outer circumferential surface of the rotary shaft.

Measure J1

A magnetic generator for a motor (1) comprising:
a plurality of magnets (13) that is arranged to face a winding (33) and that is movable relative to the winding upon the winding being energized, the magnets being arranged in a relative movement direction while magnetic polarities based on the magnets are alternately changed,
each of the magnets comprising:
  a plurality of first magnet members (21) located across a d-axis for each pole at both sides of the d-axis to be separated from each other, each of the first magnet members having first magnetic orientations defined therein, the first magnetic orientations of each of the first magnet members being inclined with respect to the d-axis and intersecting with the d-axis at a predetermined position, the predetermined position being located to be closer to the armature winding than to an anti-armature winding side; and
  a plurality of second magnet members (23) each provided for a d-axis side end of a corresponding one of the first magnet members, each of the second magnet members having second magnetic orientations defined therein, the second magnetic orientations of each of the second magnet members intersecting with the first magnetic orientations of the corresponding one of the first magnet members.

Measure J2

The magnetic generator according to the measure J1, wherein:
  the motor is designed as a rotary electric machine (1) that is comprised of:
    a winding member (30) in which the winding is wound; and
    a magnet hold member (10) including the magnets and radially arranged to face the winding member, the magnetic generator being used as the magnet member;
  the magnet hold member includes a soft magnetic core (11) having magnet installation holes (12) located across a d-axis for each pole at both sides of the d-axis; and
  the first and second magnet members are installed in each of the magnet installation holes.

Measure J3

The magnetic generator according to the measure J2, wherein:
  the magnet installation holes are located across the d-axis for each pole at both sides of the d-axis to be symmetrical about the d-axis; and
  the magnets are arranged across the d-axis for each pole to be symmetrical about the d-axis.

Measure J4

The magnetic generator according to the measure J2 or J3, wherein:
  each of the magnet installation holes includes a d-axis side extending portion that is located between the corresponding pair of the magnets and that extends portion that extends toward the d-axis;
  each of the second magnet members is arranged in the d-axis side extending portion of the corresponding one of the magnet installation holes; and
  each of the magnet installation holes includes a flux barrier located to be closer to the d-axis than the corresponding one of the second magnet members.

Measure J5

The magnetic generator according to any one of the measures J1 to J4, wherein:
  one of the magnets of the pair located across the d-axis for each pole has a magnet reinforcement point (P2) that is closest to the other of the magnets;
  the other of the magnets of the pair located across the d-axis for each pole has a magnet reinforcement point (P2) that is closest to one of the magnets; and
  each of the second magnet members is configured to strength the second magnet reinforcement portion of the corresponding one of the first magnet members.

Measure J6

The magnetic generator according to any one of the measures J1 to J5, wherein:
  an angle formed between at least one of the first magnetic orientations of each of the first magnet members and at least one of the second magnetic orientations of the corresponding one of the second magnet members is set to be an acute angle.

Measure K1

A magnetic generator for a motor (1) comprising:
a plurality of magnets (51, 71, 101, 121) that is arranged to face a winding (33) and that is movable relative to the winding upon the winding being energized, the magnets being arranged in a relative movement direction while magnetic polarities based on the magnets are alternately changed,
each of the magnets having:
  flux effective surfaces located at respective winding and anti-winding sides for generation of magnetic flux; and
  magnetic orientations defined therein intersecting with at least one of the flux effective surfaces at a non-orthogonal angle.

Measure K2

The magnetic generator according to the measure K1, wherein:
  the motor is designed as a rotary electric machine (1) that is comprised of:
    a winding member (30) in which the winding is wound;
    a magnet hold member (10) including the magnets and radially arranged to face the winding member, the magnetic generator being used as the magnet member;
  the magnet hold member includes a soft magnetic core (11) having magnet installation holes (12) located across a d-axis for each pole at both sides of the d-axis; and
  the magnets are installed in the respective magnet installation holes.

Measure K3

The magnetic generator according to the measure K2, wherein:

the magnet installation holes are located across the d-axis for each pole at both sides of the d-axis to be symmetrical about the d-axis; and the magnets are arranged across the d-axis for each pole to be symmetrical about the d-axis.

Measure K4

The magnetic generator according to the measure K2 or K3, wherein:
the magnetic orientations of each of the magnets are changed such that the magnetic orientations have a first orientation at the winding-side flux surface, and a second orientation at the anti-winding side flux surface, the first orientation being different from the second orientation.

Measure K5

The magnetic generator according to the measure K4, wherein:
the magnetic orientations of each of the magnets are changed from the q-axis to the d-axis such that the magnetic orientations include an orthogonal orientation in the magnetic orientations closer to a direction orthogonal to the q-axis, and a parallel orientation in the magnetic orientations closer to a direction parallel to the d-axis so as to have a non-linearly convex shape toward the anti-winding side.

Measure K6

The magnetic generator according to the measure K4, wherein:
the magnetic orientations of each of the magnets are changed from the d-axis to the q-axis such that the magnetic orientations include an orthogonal orientation closer to a direction orthogonal to the d-axis, and a parallel orientation closer to a direction parallel to the q-axis so as to have a non-linearly convex shape toward the anti-winding side.

Measure K7

The magnetic generator according to any one of the measures K2 to K6, wherein:
each of the magnets has a q-axis side end, a d-axis side end, and an intermediate portion between the q-axis side end and d-axis side end in the soft magnetic core; and
the q-axis side end is located in the soft magnetic core to be radially closer to the winding than the d-axis side end is; and
the intermediate portion is arranged to be convex toward the winding side.

Measure K8

The magnetic generator according to any one of the measures K2 to K7, wherein:
each of the magnetic orientations of each of the magnets intersect with each of the flux effective surfaces at the non-orthogonal angle;
each of the magnets has end surfaces that are parallel to the magnetic orientations and that intersect with the flux effective surfaces; and each of the magnet installation holes includes a flux barrier (53, 54) located at an outer side of at least one of a d-axis side end and a q-axis side end of the corresponding magnet.

Measure K9

The magnetic generator according to the measure K2 or K3, wherein:
each of the magnetic orientations of each of the magnets is inclined with respect to the d-axis, and intersect with each of the flux effective surfaces at the non-orthogonal angle.

Measure K10

The magnetic generator according to the measure K9, wherein:
the magnets are arranged across the d-axis for each pole to be located at both sides of the d-axis; and
the magnetic orientations of the respective magnets arranged across the d-axis are inclined with respect to the d-axis and intersect with each other at a portion of the soft magnetic core, the portion being located to be closer to the winding than the magnet installation hole is.

Measure K11

The magnetic generator according to the measure K9 or K10, wherein:
each of the magnetic orientations of each of the magnets intersects with each of the flux effective surfaces at the non-orthogonal angle; and
each of the magnets has end surfaces that are parallel to the magnetic orientations and that intersect with the flux effective surfaces.

Measure K12

The magnetic generator according to any one of the measures K9 to K11, wherein:
each of the magnets has a first length of at least one end-orientation of the magnetic orientations defined in one of end surfaces intersecting with the flux effective surface, and a second length of at least one middle-orientation of the magnetic orientations defined in a middle portion between the end surfaces, the second length of the at least one middle-orientation being longer than the first length of the at least one end-orientation.

Measure K13

The magnetic generator according to any one of the measures K9 to K12, wherein:
each of the magnets has a d-axis closer portion and a q-axis closer portion, the d-axis closer portion being closer to the d-axis than the q-axis closer portion is, the q-axis closer portion being closer to the q-axis than the d-axis closer portion is; and
at least one d-axis closer orientation of the magnetic orientations defined in the d-axis closer portion is different from at least one q-axis closer orientation of the magnetic orientations defined in the q-axis closer portion.

Measure K14

The magnetic generator according to the measure K13, wherein:
the at least one d-axis closer orientation defined in the d-axis closer portion of each magnet is closer to a direction parallel to the d-axis than the at least one q-axis closer orientation defined in the q-axis closer portion of the corresponding magnet is.

Measure K15

The magnetic generator according to the measure K14, wherein:
an inclination ($\theta 2$) of the at least one q-axis closer orientation defined in the q-axis closer portion of each magnet with respect to a direction perpendicular to the flux effective surfaces is larger than an inclination ($\theta 1$) of the at least one d-axis closer orientation defined in the d-axis closer portion of the corresponding magnet with respect to the direction perpendicular to the flux effective surfaces.

Measure K16

The magnetic generator according to the measure K13, wherein:
the at least one q-axis closer orientation defined in the q-axis closer portion of each magnet is closer to a direction parallel to the q-axis than the at least one d-axis closer orientation defined in the d-axis closer portion of the corresponding magnet is.

Measure K17

The magnetic generator according to any one of the measures K9 to K12, wherein:
the magnet installation holes include a pair of magnet installation holes located across the d-axis for each pole at both sides of the d-axis, the magnet installation holes of the pair having a substantially V shape such that a facing distance between the magnet installation holes becoming longer toward the winding side;
each of the magnets includes a first magnet portion and a second magnet portion across the d-axis, the first magnet portion including a d-axis side end, the second magnet portion including a q-axis side end; and
at least one of the magnetic orientations defied in the second magnet portion is closer to a direction perpendicular to the q-axis than at least one of the magnetic orientations defined in the first magnet portion is.

Measure K18

The magnetic generator according to the measure K17, wherein:
at least one of the magnetic orientations defined in the first magnet portion is parallel to the d-axis.

Measure K19

The magnetic generator according to the measure K2 or K3, wherein:
each of the magnets has a q-axis side end, a d-axis side end, and an intermediate portion between the q-axis side end and d-axis side end in the soft magnetic core; and
the q-axis side end is located in the soft magnetic core to be radially closer to the winding than the d-axis side end is; and
the intermediate portion is arranged to be convex toward the winding side.

Measure K20

The magnetic generator according to the measure K2 or K3, wherein:
each of the magnets has a q-axis side end, a d-axis side end, and an intermediate portion between the q-axis side end and d-axis side end in the soft magnetic core; and
the q-axis side end is located in the soft magnetic core to be radially closer to the winding than the d-axis side end is; and
the intermediate portion is arranged to be convex toward the anti-winding side.

Measure K21

The magnetic generator according to the measure K19 or K20, wherein:
each of the magnets has a d-axis closer portion and a q-axis closer portion, the d-axis closer portion being closer to the d-axis than the q-axis closer portion is, the q-axis closer portion being closer to the q-axis than the d-axis closer portion is; and
at least one of the magnetic orientations defined in the d-axis closer portion is different from at least one of the magnetic orientations defined in the q-axis closer portion.

Measure K22

The magnetic generator according to any one of the measures K2 to K21, wherein:
the magnetic orientations of each of the magnets each have a circular-arc shape.

Measure K23

The magnetic generator according to any one of the measures K2 to K22, wherein:
the magnets include a pair of first-side magnet and a second-side magnet located across a d-axis core portion (55) of the soft magnetic core;
each of the first- and second-side magnets has opposing winding-side end and an anti-winding side end; and
the soft magnetic core includes a non-magnetic member (54) for each of the first- and second-side magnets, the non-magnetic member (54) extending from the winding-side end of the corresponding one of the first- and second-side magnets toward the anti-winding side end of the corresponding one of the first- and second-side magnets across the d-axis core portion (55).

Measure K24

The magnetic generator according to the measure K23, wherein:
the non-magnetic member for each of the first- and second-side magnets is comprised of a non-magnetic material installed in a part of the corresponding one of the magnetic installation holes.

Measure K25

The magnetic generator according to the measure K23 or K24, wherein:
the soft magnetic core is a rotor core that has:
a through hole (14) formed through a center portion thereof, a rotary shaft (40) is rotatably disposed in the through hole, the through hole having an inner circumferential surface thereof; and
the non-magnetic member (54) for each of the first- and second-side magnets projects toward the q-axis side over a virtual line, the virtual line being defined to connect between a radially innermost point of the corresponding one of the first- and second-side magnets and a center of the rotor core.

Measure K26

A method of manufacturing a magnet (51, 71) to be used for a rotary electric machine (1), the method comprising:
filling a magnetic powdery member into a mold (63, 81) to be arranged in a magnetic field generated by a magnetic field coil (61, 81);
applying a predetermined magnetic orientation to the magnetic powdery member filled in the mold based on the magnetic field while the magnetic field generated by the magnetic field coil is bent based on an orientation core (62, 82); and
sintering the magnetic powdery member filled in the mold.

Measure L1

A soft magnetic core to be arranged to face a winding (33) of an interior magnet rotary electric machine (1) for holding a plurality of magnets (51, 71, 101, 121), the soft magnetic core comprising:
a plurality of magnet installation holes defined therein in which a corresponding one of the magnets is to be installed, wherein:
the magnet installation holes include a pair of magnet installation holes located across the d-axis for each pole at both sides of the d-axis, the magnet installation holes of the pair having a substantially V shape such that a facing distance between the magnet installation holes becoming longer toward the winding side;
each of the magnet installation holes of the pair has a q-axis side end, a d-axis side end, and an intermediate portion between the q-axis side end and d-axis side end; and
the intermediate portion is arranged to be convex toward the winding side.

Measure L2

The soft magnetic core according to the measure L1, wherein:
the rotary electric machine comprises:
an annular stator (30) in which the winding is wound; and
a rotor (10) arranged at a radially inside of the stator to face the stator, the rotor including the magnets;
the soft magnetic core is to be used as a rotor core (11) constituting the rotor; and
the intermediate portion is arranged to be convex toward the stator side.

Measure L3

The soft magnetic core according to the measure L1 or L2, wherein:
the magnet installation holes are located across the d-axis for each pole at both sides of the d-axis to be symmetrical about the d-axis.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The present disclosure can be carried out various combinations, and can include one or more additional elements to each of the embodiments. The present disclosure can include a structure of each embodiment from which one or more part and/or one or more components have been eliminated. The limitations in the claims are to be interpreted broadly based on the language employed in the claims and not limited to examples described in the present specification or during the prosecution of the application, which examples are to be construed as non-exclusive. The disclosed technical range can include various modifications of the limitations in the claims within the scope or its equivalent region of the present disclosure.

What is claimed is:

1. A rotary electric machine comprising:
a plurality of magnets provided in a core and configured to generate magnetic poles arranged in a circumferential direction of the core, each of the magnetic poles defining a d-axis and a q-axis, the d-axis representing a center of the corresponding magnetic pole; and
an armature comprising an armature winding,
each of the magnets comprising:
a magnet body having a pair of opposing flux effective surfaces, one of the flux effective surfaces being a surface out of which magnetic flux flows, the other of the flux effective surfaces being a surface into which magnetic flux flows, the magnet body having a thickness defined as a minimum distance between the opposing flux effective surfaces,
the magnet body having a plurality of easy axes of magnetization,
a length of a line along at least one of the easy axes of magnetization between the flux effective surfaces being longer than the thickness of the magnet body.

2. The rotary electric machine according to claim 1, wherein:
the magnet body has a plurality of easy axes of magnetization; and
each of the easy axes of magnetization is oriented along a corresponding one of the magnetic paths.

3. The rotary electric machine according to claim 2, wherein:
one of the flux effective surfaces faces the armature winding;
the other of the flux effective surfaces faces a direction opposite to the armature winding;
each of the magnets has first and second portions, the first portion being closer to the q-axis than the second portion to the q-axis, the second portion being closer to the d-axis than the first portion to the d-axis; and
at least one of the first and second portions includes one of the magnetic paths, one of the magnetic paths being longer than the thickness of the magnet body.

4. The rotary electric machine according to claim 3, wherein:
   the first portion includes one of the magnetic paths as a first magnetic path; and
   the second portion includes one of the magnetic paths as a second magnetic path,
   the first magnetic path being longer than the second magnetic path.

5. The rotary electric machine according to claim 3, wherein:
   the first portion includes one of the magnetic paths as a first magnetic path;
   the second portion includes one of the magnetic paths as a second magnetic path;
   the first magnetic path of the first portion is inclined with respect to the d-axis at a first angle;
   the second magnetic path of the second portion is inclined with respect to the d-axis at a second angle; and
   the first angle is larger than the second angle.

6. The rotary electric machine according to any one of claims 1 to 5, wherein:
   the magnetic paths defined in the magnet body are inclined with respect to the flux effective surfaces; and
   an orientation of each of the magnetic paths is inclined to be closer to the d-axis toward the armature winding.

7. The rotary electric machine according to claim 1, wherein:
   the magnet body of each of the magnets is located on the d-axis;
   each of the magnets has a first portion and a second portion, the first portion being closer to the q-axis than the second portion, the second portion being located on the d-axis;
   the first portion includes one of the magnetic paths as a first magnetic path;
   the second portion includes one of the magnetic paths as a second magnetic path;
   the first magnetic path is oriented to be inclined with respect to the d-axis; and
   the second magnetic path is oriented to be parallel to the d-axis.

8. The rotary electric machine according to claim 7, wherein:
   the second portion is located within an angular range of 32.7 electrical degrees around the d-axis or within an angular range defined from 27.7 electrical degrees inclusive to 32.7 electrical degrees inclusive around the d-axis.

9. The rotary electric machine according to any one of claims 1 to 5, 7, and 8, wherein:
   the magnet body of each of the magnets has a longitudinal length along the flux effective surfaces, the flux effective surfaces respectively serving as first flux effective surfaces;
   the magnet body of each of the magnets has opposing surfaces in a direction of the longitudinal length, at least one of the surfaces serving as a second flux effective surface out of which magnetic flux flows or into which magnetic flux flows;
   one of the first flux effective surfaces located closer to the armature winding than the other thereto is defined as an outer first flux effective surface; and
   the magnetic paths include at least one magnetic path that extends from one of the outer first flux effective surface and the second flux effective surface to the other thereof.

10. The rotary electric machine according to claim 9, wherein:
    the rotary electric machine comprises a plurality of magnet installation holes formed through the core;
    the magnets are respectively installed in the magnet installation holes; and
    the second flux effective surface of the magnet body of each of the magnets abuts on an inner wall surface of the corresponding magnet installation hole.

11. The rotary electric machine according to claim 9, wherein:
    the first portion in the magnet body of each magnet has an ineffective surface between the outer first flux effective surface and the second flux effective surface, no magnetic flux flowing from the ineffective surface, no magnetic flux flowing into the ineffective surface; and
    the magnet body of each magnet comprises a non-magnetic member (621, 626) arranged between the ineffective surface and the core.

12. The rotary electric machine according to claim 9, wherein:
    at least one magnetic path extending from one of the outer first flux effective surface and the second flux effective surface and the other thereof has a circular-arc shape.

13. A rotary electric machine comprising:
    a plurality of magnets provided in a core and configured to generate magnetic poles arranged in a circumferential direction of the core, each of the magnetic poles defining a d-axis that represents a center of the corresponding magnetic pole; and
    an armature comprising an armature winding,
    each of the magnets comprising:
       a first portion arranged to be closest to the d-axis and to the armature; and
       a second portion arranged to be closest to a q-axis that is magnetically perpendicular to the d-axis and arranged to be farthest from the armature,
    the first portion having an outer surface serving as one of a flux inflow surface and a flux outflow surface,
    the first portion having an inner surface serving as the other of the flux inflow surface and the flux outflow surface.

14. A rotary electric machine comprising:
    a plurality of magnets provided in a core and configured to generate magnetic poles arranged in a circumferential direction of the core, the magnetic poles defining d-axes and q-axes; and
    an armature comprising an armature winding,
    each of the magnets comprising:
       a magnet body having a circular arc shape to be convex toward a center axis of the core,
    the magnet body of each magnet comprising:
       a center portion arranged on a corresponding one of the q-axes; and
       first and second ends extending from the center portion and located to be respectively on the corresponding d-axes or thereabout,
    each of the first and second ends having a flux effective surface into which magnetic flus flows or out of which magnetic flux flows.

15. A rotary electric machine drive system for driving the rotary electric machine according to any one of claims 1 to 5, 7, 8, 10, 11, 12, 13, and 14, the rotary electric machine comprising multiphase armature windings as the armature winding, the rotary electric machine drive system comprising:

a power adjuster including at least one switch connected to the multiphase armature windings;

a controller configured to control on-off switching operations of the at least one switch to thereby control a current supplied to each of the multiphase armature windings; and a voltage converter arranged between a direct-current power source and the power adjuster, and capable of controlling an input voltage to the power adjuster, the controller is configured to control the current for each of the multiphase armature windings in a rectangular voltage control mode.

16. The rotary electric machine drive system according to claim 15, wherein:

the at least one switch comprises a plurality of switches; and the controller comprises:

a first control unit configured to:
generate, for each of the switches, a pulse-width modulation signal (PWM signal) based on a command voltage for each phase and a periodic carrier wave having a predetermined frequency; and
control, based on the PWM signal for each of the switches, on-off switching operations of the corresponding switch in accordance with the corresponding pulse-width modulation signal to thereby control the current to be supplied to each of the multi-phase armature windings; and a second control unit configured to:
have switching pattern information indicative of a relationship between values of the electrical rotational angle of the rotor and a plurality of on-off switching patterns for each switch;
select, based on a present value of the electrical rotational angle of the rotor, a corresponding one of the on-off switching patterns for each switch from the switching pattern information; and
control on-off switching operations of each switch in accordance with the selected on-off switching pattern for the corresponding switch to thereby control the current to be supplied to each of the multi-phase armature windings.

17. A magnet comprising:

a magnet body having a pair of opposing flux effective surfaces, one of the flux effective surfaces being a surface out of which magnetic flux flows, the other of the flux effective surfaces being a surface into which magnetic flux flows, the magnet body having a thickness defined as a minimum distance between the opposing flux effective surfaces, wherein the magnet body has a plurality of easy axes of magnetization, a length of a line along at least one of the easy axes of magnetization between the flux effective surfaces being longer than the thickness of the magnet body.

18. The magnet according to claim 17, wherein:

the magnet body includes a typical easy axis of magnetization defined in the easy axes of magnetization as the at least one of the easy axes of magnetization; and a length of a line along the typical easy axis of magnetization is longer than the thickness of the magnet body.

19. The magnet according to claim 17 or 18, wherein:

the magnet body includes a plurality of magnetic paths defined therein; and each of the magnetic paths is oriented along a corresponding one of the easy axes of magnetization.

20. The magnet according to claim 17 or 18, wherein:

at least one of the magnetic paths is oriented to intersect with at least one of the flux effective surfaces.

21. The magnet according to claim 19, wherein:

the magnet body has a length along the flux effective surfaces, and has opposing first and second ends in a direction of the length;

the first end of the magnet body has one of the magnetic paths as a first magnetic path;

the second end of the magnet body has one of the magnetic paths as a second magnetic path; and the first magnetic path is oriented to be different from the second magnetic path.

22. The magnet according to claim 19, wherein:

the magnet body has a length along the flux effective surfaces, the flux effective surfaces respectively serving as first flux effective surfaces;

the magnet body has opposing surfaces in a direction of the longitudinal length, at least one of the surfaces serving as a second flux effective surface out of which magnetic flux flows or into which magnetic flux flows; and the magnetic paths include at least one magnetic path that links one of the first flux effective surfaces to the second flux effective surface.

23. The magnet according to claim 21, wherein, when the magnet body is installed in a rotor of a rotary electric machine for generating a magnetic pole that defines a d-axis and a q-axis, the magnet body is arranged to have a first end closer to the d-axis than to the q-axis, and a second end closer to the q-axis than to the d-axis;

the first effective surfaces are arranged to extend from the first end to the second end; and the second end of the magnet body has the second effective surface.

24. The magnet according to claim 23, wherein:

the rotary electric machine is an interior magnet rotary electric machine;

the rotor comprises a core including a plurality of magnet installation holes; and the magnet body is installed in in one of the magnet installation holes.

25. The magnet according to claim 23, wherein:

the rotary electric machine is a surface magnet rotary electric machine;

the rotor comprises a core having an outer circumferential surface; and the magnet body is mounted on the outer circumferential surface of the core.

26. A magnet to be installed in a rotary electric machine with an armature winding for generating a magnetic pole that defines a d-axis and a q-axis, the magnet comprising:

a magnet body located on the d-axis and having first and second ends extending toward opposite directions across the d-axis; and a plurality of magnetic paths defined in the magnet body, wherein:

the first end of the magnet body has one of the magnetic paths as a first magnetic path;

the first magnetic path is oriented to intersect with the d-axis at a first angle;

the second end of the magnet body has one of the magnetic paths as a second magnet path; and the second magnetic path is oriented to be inclined with respect to the d-axis at a second angle, the first angle being identical to the second angle.

27. A rotary electric machine comprising:
a plurality of magnets configured to generate magnetic poles, each of the magnetic poles defining a d-axis and a q-axis; and
an armature winding located close to the magnets, each of the magnets comprising:
a magnet body located on the d-axis and having first and second ends extending toward opposite directions across the d-axis; and
a plurality of magnetic paths defined in the magnet body, wherein:
the first end of the magnet body has one of the magnetic paths as a first magnetic path;
the first magnetic path is oriented to cross the d-axis at a first angle;
the second end of the magnet body has one of the magnetic paths as a second magnet path; and
the second magnetic path is oriented to be inclined with respect to the d-axis at a second angle,
the first angle being identical to the second angle.

28. A method of manufacturing a magnet, the method comprising:
arranging a mold in which a magnetic powdery member has been filled in a magnetic field;
performing orientation of easy axes of magnetization of the magnetic powdery member;
sintering the magnetic powdery member with the oriented easy axes of magnetization to thereby produce a magnet body having a pair of opposing surfaces; and
magnetizing the magnet body to thereby manufacture a magnet,
wherein the magnetizing step comprises:
locating a core and a conductor member to face each other to provide an arrangement space between the conductor and the core;
arranging the magnet body in the arrangement space; and
energizing the conductor member to generate a magnetic field in the arrangement space, the magnetic field forming an arc-shaped magnetic path between the opposing surfaces of the magnet body.

29. The method according to claim 28, wherein:
the locating step comprises:
locating a first core as the core; and
locating a second core having a surface with a concaved recess formed therein such that the surface of the second core faces the first core.

30. The method according to claim 29, wherein:
the concaved recess formed in the surface of the first core comprises a plurality of concaved recesses arranged at predetermined pitches therebetween;
the conductor member comprises a plurality of conductor members provided in the respective concaved recesses;
the energizing step is adapted to energize a selected one of the conductor members as a first conductor member in a predetermined first direction, and to energize a selected another of the conductor members as a second conductor member located adjacent to the first conductor member in a second direction opposite to the first direction;
the first core used by the magnetizing step has a substantially annular shape and has an inner circumferential surface and an outer circumferential surface with a predetermined minimum distance therebetween as a thickness in a radial direction of the second core; and
the thickness of the first core in the radial direction is smaller than each of the predetermined pitches.

31. The method according to claim 29, wherein:
the concaved recess formed in the surface of the first core comprises a plurality of concaved recesses arranged at predetermined pitches therebetween;
the conductor member comprises a plurality of conductor members provided in the respective concaved recesses;
the energizing step is adapted to energize a selected one of the conductor members as a first conductor member in a predetermined first direction, and to energize a selected another of the conductor members as a second conductor member located adjacent to the first conductor member in a second direction opposite to the first direction;
the second core used by the magnetizing step has a substantially annular shape and has an inner circumferential surface and an outer circumferential surface with a predetermined minimum distance therebetween as a thickness in a radial direction of the second core; and
the thickness of the second core in the radial direction is greater than each of the predetermined pitches.

32. The method according to any one of claims 28 to 31, wherein:
the orientation performing step generates an orientation magnetic field including magnetic field components that are each oriented to substantially have an arc shape, to thereby orient the easy axes of magnetization of the magnetic powdery member based on the orientation magnetic field.

33. The method according to claim 32, wherein:
the orientation performing step further comprises:
coaxially arranging a pair of first and second coils to face each other with a predetermined space region therebetween;
arranging an orientation yoke in the space region, the orientation yoke being separated to face a common center axis of the first and second coils; and
energizing the first and second coils to cause the first and second coils to respectively generate opposite first and second magnetic fields to the space region so that the first and second magnetic fields interact each other in the space region, resulting in radially expanding magnetic field components away from the common center axis of the first and second coils,
at least part of the radially expanding magnetic field components being collected to the orientation yoke as the orientation magnetic field.

34. The method according to claim 32, wherein:
the orientation performing step further comprises:
arranging a conductor having a predetermined length around the magnetic powdery member; and
energizing the conductor to generate a magnetic field circulating around a direction of the length of the conductor as the orientation magnetic field, thus performing orientation of the easy axes of magnetization of the magnetic powdery member based on the circulating magnetic field.

35. A magnetizing apparatus comprising:
a plurality of conductor members circumferentially arranged with intervals therebetween;
a core arranged to face the conductor members to thereby provide an arrangement space between the conductor members and the core, a magnet body having a pair of opposing surfaces being arranged in the arrangement space;

an energizing unit configured to:
  energize a selected one of the conductor members as a first conductor member in a predetermined first direction; and
  energize a selected another of the conductor members as a second conductor member located adjacent to the first conductor member in a second direction opposite to the first direction to thereby generate a magnetic field in the arrangement space, the magnetic field forming an arc-shaped magnetic path between the opposing surfaces of the magnet body.

36. The magnetizing apparatus according to claim 35, wherein:
  the core is a first core;
  the first core has a substantially annular shape and has an inner circumferential surface and an outer circumferential surface with a predetermined minimum distance therebetween as a thickness in a radial direction of the first core; and
  the magnetizing apparatus further comprises:
    a second core arranged to face the first core, the second core having a surface with a plurality of concaved recesses formed therein, the plurality of conductor members being respectively provided in the plurality of concaved recesses,
  the thickness in the radial direction of the first core being smaller than each of the predetermined intervals.

37. The magnetizing apparatus according to claim 35, wherein:
  the core is a first core;
  the first core has a substantially annular shape and has an inner circumferential surface and an outer circumferential surface with a predetermined minimum distance therebetween as a thickness in a radial direction of the first core; and
  the magnetizing apparatus further comprises:
    a second core arranged to face the first core, the second core having a surface with a plurality of concaved recesses formed therein, the plurality of conductor members being respectively provided in the plurality of concaved recesses,
  the thickness in the radial direction of the first core being larger than each of the predetermined intervals.

38. A rotary electric machine drive system for driving a rotary electric machine, the rotary electric machine comprising:
  a plurality of magnets provided in a core and configured to generate magnetic poles arranged in a circumferential direction of the core, each of the magnetic poles defining a d-axis and a q-axis; and
  an armature comprising multi-phase armature windings, each of the magnets comprising:
  a magnet body having:
    a first flux effective surface that has a pair of opposing first flux effective surfaces, one of the flux effective surfaces being a surface out of which magnetic flux flows, the other of the flux effective surfaces being a surface into which magnetic flux flows;
    opposing first and second ends, the first end being closer to the q-axis than the second end thereto;
    the first end having a surface serving as a second flux effective surface out of which magnetic flux flows or into which magnetic flux flows; and
    a plurality of magnetic paths defined in the magnet body,
  the magnet body having a thickness defined as a minimum distance between the opposing flux effective surfaces, at least one of the magnetic paths being longer than the thickness of the magnet body,
  the magnet body having a plurality of easy axes of magnetization, each of the easy axes of magnetization being oriented along a corresponding one of the magnetic paths,
  the magnetic paths including at least one magnetic path that links one of the first flux effective surfaces to the second flux effective surface,
  the rotary electric machine system comprising:
  a power adjuster comprising switches connected to the respective multi-phase armature windings; and
  a controller configured to control on-off switching operations of the respective switches of the power adjuster to control a current to be supplied to each of the multi-phase armature windings,
  the controller being configured to control on-off switching operations of the respective switches of the power adjuster to thereby adjust:
    a first current that flows through each of the multi-phase windings, the first current having a first phase that generates first magnetic flux perpendicular to the d-axis; and
    a second current that flows through each of the multi-phase windings, the second current having a second phase that is different from the first phase.

39. The rotary electric machine drive system according to claim 38, wherein:
  the controller is configured to adjust the first current and the second current to thereby variably control a magnetically saturated state of a portion of the core and a magnetically non-saturated state of the portion of the core, the portion of the core being located between the second flux effective surfaces of each adjacent pair of the plurality of poles.

40. The rotary electric machine drive system according to claim 38 or 39, wherein:
  each of the magnets is configured to generate, as magnetic flux linked to the armature, composite magnetic flux based on fundamental magnetic flux having a predetermined polarity and third-order harmonic magnetic flux having the same polarity.

41. The rotary electric machine drive system according to claim 38 or 39, wherein:
  the armature comprises an armature core including a plurality of slots arranged in a circumferential direction of the core; and
  the multi-phase armature windings are provided in the slots,
  wherein each of the armature windings has a substantially rectangular shape or a substantially ellipsoidal shape.

42. The rotary electric machine drive system according to claim 38 or 39, wherein:
  the controller is configured to:
    generate, for each of the switches, a pulse-width modulation signal (PWM signal) based on a command voltage for each phase and a periodic carrier wave having a predetermined frequency; and
    control, based on the PWM signal for each of the switches, on-off switching operations of the corresponding switch in accordance with the corresponding pulse-width modulation signal to thereby control the current to be supplied to each of the multi-phase armature windings,
  wherein the frequency of the periodic carrier signal is set to be higher than 15 kHz.

43. The rotary electric machine drive system according to claim 38 or 39, further comprising:
a voltage converter located between a direct-current power source and the power adjuster and adapted to control an input voltage to the power adjuster,
wherein the controller is configured to control the current to be supplied to each of the multi-phase windings in a rectangular voltage control mode.

44. The rotary electric machine drive system according to claim 38 or 39, wherein:
the rotary electric machine comprises a rotor comprising the core and the magnets provided in the core, the rotor being rotatable relative to the armature; and
the controller comprises:
a first control unit configured to:
generate, for each of the switches, a pulse-width modulation signal (PWM signal) based on a command voltage for each phase and a periodic carrier wave having a predetermined frequency; and
control, based on the PWM signal for each of the switches, on-off switching operations of the corresponding switch in accordance with the corresponding pulse-width modulation signal to thereby control the current to be supplied to each of the multi-phase armature windings; and
a second control unit configured to:
have switching pattern information indicative of a relationship between values of the electrical rotational angle of the rotor and a plurality of on-off switching patterns for each switch;
select, based on a present value of the electrical rotational angle of the rotor, a corresponding one of the on-off switching patterns for each switch from the switching pattern information; and
control on-off switching operations of each switch in accordance with the selected on-off switching pattern for the corresponding switch to thereby control the current to be supplied to each of the multi-phase armature windings.

45. A magnet unit to be installed in a rotary electric machine with an armature winding, the magnet unit comprising:
a magnet assembly configured to generate a magnetic pole, the magnetic pole defining a d-axis and a q-axis; and
a holder comprising a magnet installation hole, the holder being configured to hold the magnet assembly installed in the magnet installation hole,
the magnet assembly comprising:
a first magnet; and
a second magnet, the first and second magnets being located within a range from the d-axis to the q-axis, the first magnet being located closer to the d-axis than the second magnet thereto, the second magnet being located closer to the q-axis than the first magnet thereto,
wherein:
the first magnet has linear first magnetic paths defined therein, the first magnetic paths being parallel with each other;
the second magnet has linear second magnetic paths defined therein, the second magnetic paths being parallel with each other; and
the first and second magnets are installed in the corresponding magnet installation hole while an orientation of each of the first magnetic paths is different from an orientation of each of the second magnetic paths.

46. The magnet unit according to claim 45, wherein:
the magnet installation hole is inclined with respect to the d-axis, and has a first end closer to the d-axis than to the q-axis, the first end being located to be farther from the armature winding than the second end therefrom; and
the orientation of each of the second magnetic paths in the second magnet is closer to a direction perpendicular to the d-axis than the orientation of each of the first magnetic paths is.

47. The magnet unit according to claim 46, wherein:
the first magnet has a pair of opposing flux effective surfaces, one of the flux effective surfaces being a surface out of which magnetic flux flows, the other of the flux effective surfaces being a surface into which magnetic flux flows,
the first magnet having a thickness defined as a minimum distance between the opposing flux effective surfaces,
the first magnet having a plurality of easy axes of magnetization,
a length of a line along at least one of the easy axes of magnetization between the flux effective surfaces being longer than the thickness of the first magnet.

48. The magnet unit according to claim 47, wherein:
the second magnet has a pair of opposing flux effective surfaces, one of the flux effective surfaces being a surface out of which magnetic flux flows, the other of the flux effective surfaces being a surface into which magnetic flux flows,
the second magnet having a thickness defined as a minimum distance between the opposing flux effective surfaces,
the second magnet having a plurality of easy axes of magnetization,
a length of a line along at least one of the easy axes of magnetization between the flux effective surfaces being longer than the thickness of the first magnet.

49. The magnet unit according to claim 47 or 48, wherein:
the first magnet has a first end and a second end, the first end closer to the d-axis than the second end is, the second end being closer to the q-axis than the first end is; and
the second end has a surface intersecting with the flux effective surfaces, the surface being oriented to be parallel to the first magnetic paths.

50. The magnet unit according to claim 45, wherein:
the first magnet is located on the d-axis to be closer to the armature winding than the second magnet is;
the second magnet has first and second end surfaces, the second magnet being arranged such that, the farther the second end surface from the first end surface, the farther the second end surface from the armature winding,
the first and second end surfaces respectively serving as flux effective surfaces out of which magnetic flux flows or into which magnetic flux flows.

51. A magnet unit to be installed in a rotary electric machine with an armature winding, the magnet unit comprising:
a magnet assembly configured to generate a magnetic pole, the magnetic pole defining a d-axis and a q-axis; and
a holder comprising a magnet installation hole, the holder being configured to hold the magnet assembly installed in the magnet installation hole, the magnet assembly comprising:
  a first magnet; and
  a second magnet, the first and second magnets being located within a range from the d-axis to the q-axis, the first magnet being located closer to the d-axis than the second magnet thereto, the second magnet being located closer to the q-axis than the first magnet thereto,
wherein:
the first magnet and the second magnet are joined to each other to be convex toward the armature winding;
each of the first and second magnets has a pair of opposing flux effective surfaces, one of the flux effective surfaces being a surface out of which magnetic flux flows, the other of the flux effective surfaces being a surface into which magnetic flux flows,
each of the first and second magnets having a thickness defined as a minimum distance between the opposing flux effective surfaces thereof,
each of the first and second magnets having a plurality of easy axes of magnetization,
a length of a line along at least one of the easy axes of magnetization between the flux effective surfaces of each of the first and second magnets being longer than the thickness thereof.

52. The magnet unit according to claim 51, wherein:
each of the first and second magnets has magnetic paths linearly along the respective easy axes of magnetization, the magnetic paths being parallel to each other.

53. The magnet unit according to claim 51 or 52, wherein:
each of the first and second magnets has an isosceles trapezoidal shape in a cross-section perpendicular to the flux effective surfaces;
the isosceles trapezoidal shape of each of the first and second magnets has a pair of first and second bases and first and second legs;
each of the first base, second base, first leg, and second leg of the isosceles trapezoidal shape of the first magnet is identical to a corresponding one of the first base, second base, first leg, and second leg of the isosceles trapezoidal shape of the second magnet; and
orientations of the easy axes of magnetization of the first magnet are identical to orientations of the easy axes of magnetization of the second magnet.

54. The magnet unit according to any one of claims 45 to 48 and 50 to 52, wherein:
each of the first and second magnets has the same shape in a cross-section perpendicular to the flux effective surfaces; and
the first and second magnets are installed in the corresponding magnet installation hole while the first and second magnets are oppositely oriented and corresponding surfaces of the respective first and second magnets are joined to each other.

55. A rotary electric machine drive system for driving a rotary electric machine in which the magnet unit according to any one of claims 45 to 48 and 50 to 52 is installed as a magnetic pole, the rotary electric machine comprising multiphase armature windings as an armature winding, the rotary electric machine drive system comprising:
  a power adjuster including at least one switch connected to the armature winding;
  a controller configured to control on-off switching operations of the at least one switch to thereby control a current supplied to each of the multiphase armature windings; and
  a voltage converter arranged between a direct-current power source and the power adjuster, and capable of controlling an input voltage to the power adjuster, wherein
  the controller is configured to control the current for each of the multiphase armature windings in a rectangular voltage control mode.

56. The rotary electric machine drive system according to claim 55, wherein:
the at least one switch comprises a plurality of switches; and
the controller comprises:
a first control unit configured to:
  generate, for each of the switches, a pulse-width modulation signal based on a command voltage for each phase and a periodic carrier wave having a predetermined frequency; and
  control, based on the PWM signal for each of the switches, on-off switching operations of the corresponding switch in accordance with the corresponding pulse-width modulation signal to thereby control the current to be supplied to each of the multi-phase armature windings; and
a second control unit configured to:
  have switching pattern information indicative of a relationship between values of the electrical rotational angle of the rotor and a plurality of on-off switching patterns for each switch;
  select, based on a present value of the electrical rotational angle of the rotor, a corresponding one of the on-off switching patterns for each switch from the switching pattern information; and
  control on-off switching operations of each switch in accordance with the selected on-off switching pattern for the corresponding switch to thereby control the current to be supplied to each of the multi-phase armature windings.

57. A method of manufacturing a magnet, the method comprising:
arranging a mold in which a magnetic powdery member has been filled in a magnetic field;
performing orientation of easy axes of magnetization of the magnetic powdery member;
sintering the magnetic powdery member with the oriented easy axes of magnetization to thereby produce a magnet body; and
magnetizing the magnet body to thereby manufacture a magnet,
wherein the orientation performing step generates an orientation magnetic field including magnetic field components that are inequivalently oriented to thereby orient the easy axes of magnetization of the magnetic powdery member based on the inequivalently oriented magnetic field components.

58. The method according to claim 57, wherein:
the orientation performing step generates, as the inequivalently oriented magnetic field components, inequivalently arced magnetic field components to thereby orient the easy axes of magnetization of the magnetic powdery member based on the inequivalently arced magnetic field components.

59. The method according to claim 57, wherein:
the orientation performing step includes the steps of:
  coaxially arranging a pair of first and second coils to face each other with a predetermined space region therebetween;

arranging an orientation yoke in the space region, the orientation yoke being separated to face a common center axis of the first and second coils; and energizing the first and second coils to cause the first and second coils to respectively generate opposite first and second magnetic fields to the space region so that the first and second magnetic fields interact each other in the space region, resulting in radially expanding magnetic field components away from the common center axis of the first and second coils, at least part of the radially expanding magnetic field components being collected to the orientation yoke as the orientation magnetic field.

60. The method according to claim 57, wherein:
the orientation performing step includes the steps of:
arranging a conductor having a predetermined length around the magnetic powdery member; and
energizing the conductor to generate a magnetic field circulating around a direction of the length of the conductor as the orientation magnetic field, thus performing orientation of the easy axes of magnetization of the magnetic powdery member based on the circulating magnetic field.

61. A method of manufacturing a magnet, the method comprising:
performing magnetic orientation by:
generating a linear orientation magnetic field in a predetermined direction using a magnetic field generator;
arranging a mold in which a magnetic powdery member has been filled in a magnetic field for producing a magnet body having a pair of opposing surfaces in the mold such that the opposing surfaces obliquely intersect with the linear orientation magnetic field; and
performing orientation of easy axes of magnetization of the magnetic powdery member of the mold based on the linear orientation magnetic field;
sintering the magnetic powdery member with the oriented easy axes of magnetization to thereby produce the magnet body; and
magnetizing the magnet body to thereby manufacture a magnet.

62. The method according to claim 61, wherein:
the orientation performing step includes the steps of:
arranging an orientation coil of the magnetic field generator in the magnetic field; and
energizing the orientation coil while the magnetic powdery member is arranged in the orientation coil to thereby generate the linear orientation magnetic field, so that the opposing surfaces obliquely intersect with the linear orientation magnetic field.

63. The method according to claim 61 or 62, wherein:
the mold is configured such that the magnet body in the mold is dividable into plural magnets aligned with each other;
the magnet body that has been magnetized by the magnetizing step is divided into the plural magnets; and
the orientation performing step arranges the mold such that:
the linear orientation magnetic field passes through the magnet body in an alignment direction of the magnets; and
division lines for the magnets obliquely intersect with the linear orientation magnetic field.

64. The method according to claim 61 or 62, wherein:
the mold arranged in the magnetic field has, as inner walls for defining an internal space therein, a first wall portion inclined with respect to the linear orientation magnetic field, and a second wall portion parallel to the linear orientation magnetic field.

* * * * *